United States Patent
Maglica et al.

(10) Patent No.: US 9,247,598 B2
(45) Date of Patent: Jan. 26, 2016

(54) PORTABLE LIGHTING DEVICES

(75) Inventors: Anthony Maglica, Ontario (CA); Stacey H West, Temecula, CA (US); Scott Nathanson, Los Gatos, CA (US); Robert P Radloff, Corona, CA (US)

(73) Assignee: MAG INSTRUMENT, INC., Ontario, CA (US)

( * ) Notice: Subject to any disclaimer, the term of this patent is extended or adjusted under 35 U.S.C. 154(b) by 949 days.

(21) Appl. No.: 12/657,290

(22) Filed: Jan. 15, 2010

(65) Prior Publication Data

US 2010/0219775 A1    Sep. 2, 2010

Related U.S. Application Data

(63) Continuation-in-part of application No. 12/505,555, filed on Jul. 20, 2009, now abandoned, which is a continuation-in-part of application No. 12/502,237, filed on Jul. 14, 2009, now abandoned.

(60) Provisional application No. 61/145,120, filed on Jan. 16, 2009.

(51) Int. Cl.
*H05B 37/02* (2006.01)
*H05B 33/08* (2006.01)
(Continued)

(52) U.S. Cl.
CPC ............ *H05B 33/0842* (2013.01); *F21L 4/045* (2013.01); *F21V 23/0407* (2013.01); *F21V 23/0414* (2013.01); *F21V 23/0421* (2013.01); *F21V 23/0442* (2013.01); *H02J 7/0045* (2013.01)

(58) Field of Classification Search
USPC .......... 315/291, 152, 343, 297, 159; 340/815.65, 815.77, 815.45; 362/276
See application file for complete search history.

(56) References Cited

U.S. PATENT DOCUMENTS 3,535,282 A   10/1970   Mallory
4,286,311 A   8/1981   Maglica
(Continued)

FOREIGN PATENT DOCUMENTS

CN   2491693 Y   5/2002
CN   1419797 A   5/2003
(Continued)

OTHER PUBLICATIONS

Secondary Optics Design Considerations for Super Flux LEDs, Application Note 1149-5, Hewlett Packard, Sep. 1998.
(Continued)

*Primary Examiner* — Douglas W Owens
*Assistant Examiner* — Jonathan Cooper

(57) ABSTRACT

A portable lighting device having a plurality of modes of operation and method of operating the portable lighting device are disclosed. One method of operating the portable lighting device is by rotating the portable lighting device along a principal axis of projection of the light source to enter into a new mode of operation. Normal, dim, motion sensitive, variable brightness, blink, right and left hand, lock out, SOS, night light, strobe, compass and signal modes are disclosed, and the modes may be adjusted. A rechargeable battery pack is disclosed that includes a housing, a rechargeable battery, and an accelerometer. A battery cassette is disclosed that provides a negative electrode at each end of the battery cassette, and a central connector that provides a positive electrode at both ends of the battery cassette.

6 Claims, 62 Drawing Sheets

(51) Int. Cl.
*F21L 4/04* (2006.01)
*F21V 23/04* (2006.01)
*H02J 7/00* (2006.01)

(56) References Cited

U.S. PATENT DOCUMENTS

| | | | |
|---|---|---|---|
| 4,450,351 A | 5/1984 | Fraden |
| 4,451,871 A | 5/1984 | Kirkley et al. |
| 4,656,565 A | 4/1987 | Maglica |
| 4,683,519 A | 7/1987 | Murakami |
| 4,851,974 A | 7/1989 | Maglica |
| 4,959,637 A | 9/1990 | Woods |
| 5,161,879 A | 11/1992 | McDermott |
| 5,213,408 A | 5/1993 | Shiau |
| 5,383,280 A | 1/1995 | McDermott |
| 5,459,649 A | 10/1995 | Ellion |
| 5,485,360 A | 1/1996 | Maglica |
| 5,549,481 A | 8/1996 | Morlion et al. |
| 5,598,068 A | 1/1997 | Shirai |
| 5,765,937 A | 6/1998 | Shiau |
| 5,783,909 A | 7/1998 | Hochstein |
| 5,801,490 A | 9/1998 | Fai |
| 5,865,529 A | 2/1999 | Yan |
| 5,974,064 A | 10/1999 | Uchida |
| 5,975,714 A | 11/1999 | Vetorino et al. |
| 6,046,572 A | 4/2000 | Matthews et al. |
| 6,086,218 A | 7/2000 | Robertson |
| 6,127,784 A | 10/2000 | Grossman et al. |
| 6,153,985 A | 11/2000 | Grossman |
| 6,161,910 A | 12/2000 | Reisenauer et al. |
| 6,168,288 B1 | 1/2001 | St. Claire |
| 6,175,196 B1 | 1/2001 | Ragner et al. |
| 6,190,020 B1 | 2/2001 | Hartley |
| 6,220,719 B1 | 4/2001 | Vetorino et al. |
| 6,222,138 B1 | 4/2001 | Matthews et al. |
| 6,249,089 B1 | 6/2001 | Bruwer |
| 6,274,924 B1 | 8/2001 | Carey et al. |
| 6,328,456 B1 | 12/2001 | Mize |
| 6,345,464 B1 | 2/2002 | Kim et al. |
| 6,376,994 B1 | 4/2002 | Ochi et al. |
| 6,400,101 B1 | 6/2002 | Biebl et al. |
| 6,406,196 B1 | 6/2002 | Uno et al. |
| 6,408,824 B1 | 6/2002 | Pacucci et al. |
| 6,411,046 B1 | 6/2002 | Muthu |
| 6,439,738 B1 | 8/2002 | Matthews et al. |
| 6,517,215 B2 | 2/2003 | Mele |
| 6,522,261 B2 | 2/2003 | Scheffler et al. |
| 6,540,377 B1 | 4/2003 | Ota et al. |
| 6,585,391 B1 | 7/2003 | Koch et al. |
| 6,622,416 B2 | 9/2003 | Kim |
| 6,642,667 B2 | 11/2003 | Avis |
| 6,693,394 B1 | 2/2004 | Guo et al. |
| 6,722,772 B2 | 4/2004 | Maglica |
| 6,791,283 B2 | 9/2004 | Bowman et al. |
| 6,808,287 B2 | 10/2004 | Lebens et al. |
| 6,827,468 B2 | 12/2004 | Galli |
| 6,828,739 B2 | 12/2004 | Bruwer et al. |
| 6,841,941 B2 | 1/2005 | Kim et al. |
| 6,841,947 B2 | 1/2005 | Berg-johansen |
| 6,854,865 B2 | 2/2005 | Probst et al. |
| 6,966,677 B2 | 11/2005 | Galli |
| 7,014,335 B2 | 3/2006 | Probst et al. |
| 7,033,040 B2 | 4/2006 | Spahr et al. |
| 7,057,153 B2 | 6/2006 | Linge et al. |
| 7,083,297 B2 | 8/2006 | Matthews et al. |
| 7,091,874 B2 | 8/2006 | Smithson |
| 7,114,831 B2 | 10/2006 | Popovich et al. |
| 7,116,061 B2 | 10/2006 | Kim et al. |
| 7,153,004 B2 | 12/2006 | Galli |
| 7,173,533 B1 | 2/2007 | Beron et al. |
| 7,220,016 B2 | 5/2007 | Matthews et al. |
| 7,293,893 B2 | 11/2007 | Kim |
| 7,296,913 B2 | 11/2007 | Catalano et al. |
| 7,393,120 B2 | 7/2008 | Kang et al. |
| 7,543,961 B2 | 6/2009 | Arik et al. |
| 7,549,765 B2 | 6/2009 | Kim et al. |
| 7,579,782 B2 | 8/2009 | West |
| 7,585,087 B2 | 9/2009 | Gagne et al. |
| 7,652,609 B2 | 1/2010 | Kim et al. |
| 7,758,202 B2 | 7/2010 | Krieger |
| 7,794,101 B2 | 9/2010 | Galica et al. |
| 7,963,663 B2 | 6/2011 | Simard |
| 2001/0020546 A1 | 9/2001 | Eldridge et al. |
| 2002/0058459 A1 | 5/2002 | Holt |
| 2003/0006965 A1 | 1/2003 | Bohn |
| 2003/0035284 A1 | 2/2003 | Maglica |
| 2003/0057889 A1 | 3/2003 | Avis |
| 2003/0072440 A1 | 4/2003 | Murray et al. |
| 2003/0080691 A1 | 5/2003 | Yasuda et al. |
| 2005/0012698 A1 | 1/2005 | Takahashi |
| 2005/0024864 A1 | 2/2005 | Galli |
| 2005/0057187 A1 | 3/2005 | Catalano |
| 2005/0088120 A1 | 4/2005 | Avis |
| 2005/0122711 A1 | 6/2005 | Matthews et al. |
| 2005/0122714 A1 | 6/2005 | Matthews et al. |
| 2005/0135091 A1 | 6/2005 | Sharrah et al. |
| 2005/0237005 A1 | 10/2005 | Maxik |
| 2006/0039139 A1 | 2/2006 | Maglica et al. |
| 2006/0044797 A1 | 3/2006 | Steady et al. |
| 2006/0132323 A1 | 6/2006 | Grady |
| 2007/0086189 A1 | 4/2007 | Raos et al. |
| 2007/0091581 A1 | 4/2007 | Gisin et al. |
| 2007/0103898 A1 | 5/2007 | Koch et al. |
| 2007/0118026 A1 | 5/2007 | Kameyama et al. |
| 2007/0133201 A1 | 6/2007 | Lui |
| 2007/0159833 A1 | 7/2007 | Netzel, Sr. et al. |
| 2007/0171082 A1 | 7/2007 | Melnik |
| 2007/0257272 A1 | 11/2007 | Hutchins |
| 2007/0274096 A1 | 11/2007 | Chew et al. |
| 2007/0278962 A1 | 12/2007 | Bruwer |
| 2008/0099770 A1 | 5/2008 | Mendendorp et al. |
| 2008/0158887 A1 | 7/2008 | Zhu et al. |
| 2008/0174550 A1 | 7/2008 | Laurila et al. |
| 2008/0232119 A1 | 9/2008 | Ribarich |
| 2008/0272928 A1* | 11/2008 | Shuster ............. 340/815.75 |
| 2009/0024353 A1 | 1/2009 | Lee et al. |
| 2009/0058315 A1 | 3/2009 | Baeumle |
| 2009/0190341 A1 | 7/2009 | Galli et al. |
| 2009/0251893 A1 | 10/2009 | Shiao |
| 2009/0261737 A1* | 10/2009 | Wright et al. ............. 315/154 |
| 2010/0026205 A1 | 2/2010 | Galli et al. |
| 2010/0219775 A1 | 9/2010 | Maglica et al. |
| 2011/0012535 A1 | 1/2011 | West et al. |

FOREIGN PATENT DOCUMENTS

| | | | |
|---|---|---|---|
| JP | H11-285083 A | 10/1999 |
| JP | 2001-347080 A | 12/2001 |
| RU | 32744 U1 | 9/2003 |
| SU | 402095 | 2/1974 |
| WO | WO 2007/010445 A2 | 1/2007 |

OTHER PUBLICATIONS

Using Super Flex LEDs in Automotive Design Lamps, Application Note 1149-1, Hewlett Packard, 1999.
PCT International Search Report, PCT/US06/35764 (related to U.S. Appl. No. 11/227,768), Jul. 30, 2008.
PCT Written Opinion of the International Searching Authority, PCT/US06/35764 (related to U.S. Appl. No. 11/227,768), Jul. 30, 2008.
PCT International Preliminary Report on Patentability, PCT/US06/35764 (related to U.S. Appl. No. 11/227,768), Jul. 14, 2010.
PCT International Search Report, PCT/US2009/053219 (related to U.S. Appl. No. 12/188,201), Nov. 30, 2009.
PCT Written Opinion of the International Searching Authority, PCT/US2009/053219 (related to U.S. Appl. No. 12/188,201), Nov. 30, 2009.
PCT International Preliminary Report on Patentability, PCT/US2009/053219 (related to U.S. Appl. No. 12/188,201), Jan. 21, 2011.
PCT Written Opinion of the International Preliminary Examining Authority, PCT/US09/53219 (related to U.S. Appl. No. 12/188,201), Nov. 8, 2010.

(56) References Cited

OTHER PUBLICATIONS

PCT International Search Report, PCT/US05/28560 (related to U.S. Appl. No. 10/922,714), Oct. 4, 2007.
PCT Written Opinion of the International Searching Authority, PCT/US05/28560 (related to U.S. Appl. No. 10/922,714), Oct. 4, 2007.
PCT International Search Report, PCT/US 10/00103, Jun. 9, 2010.
PCT Written Opinion of the International Searching Authority, PCT/US10/00103, Jun. 9, 2010.
International Preliminary Report on Patentability, Nov. 7, 2011, PCT.

* cited by examiner

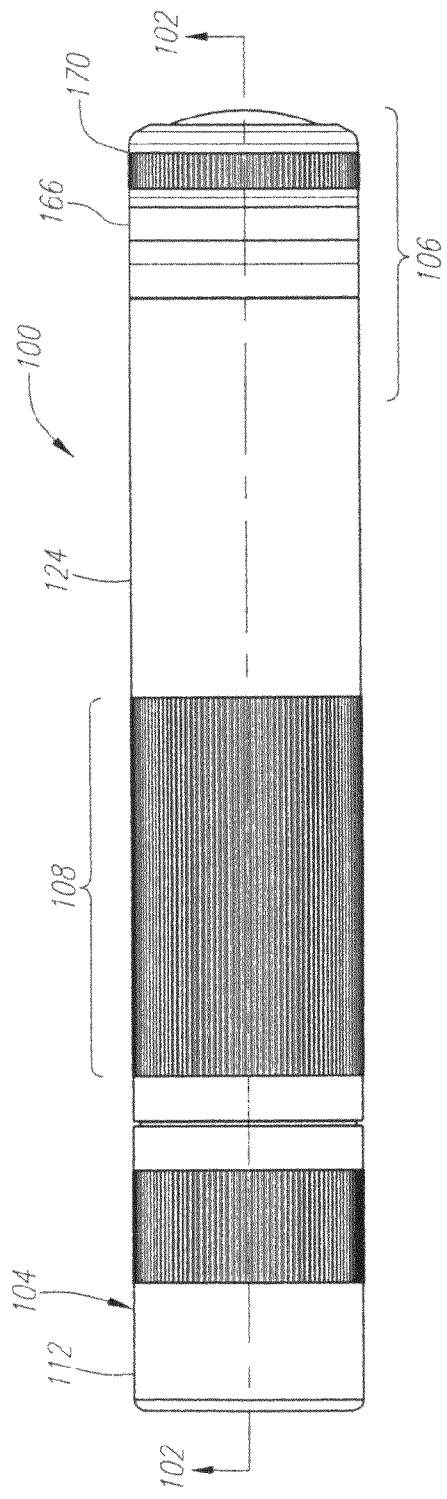
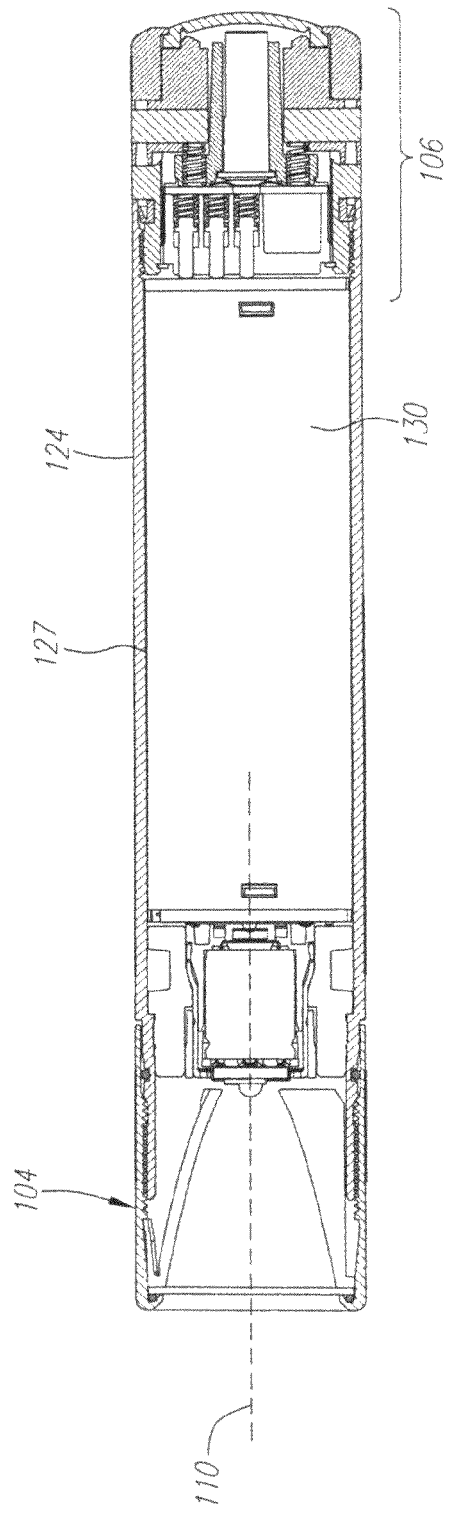
FIG. 1
FIG. 2

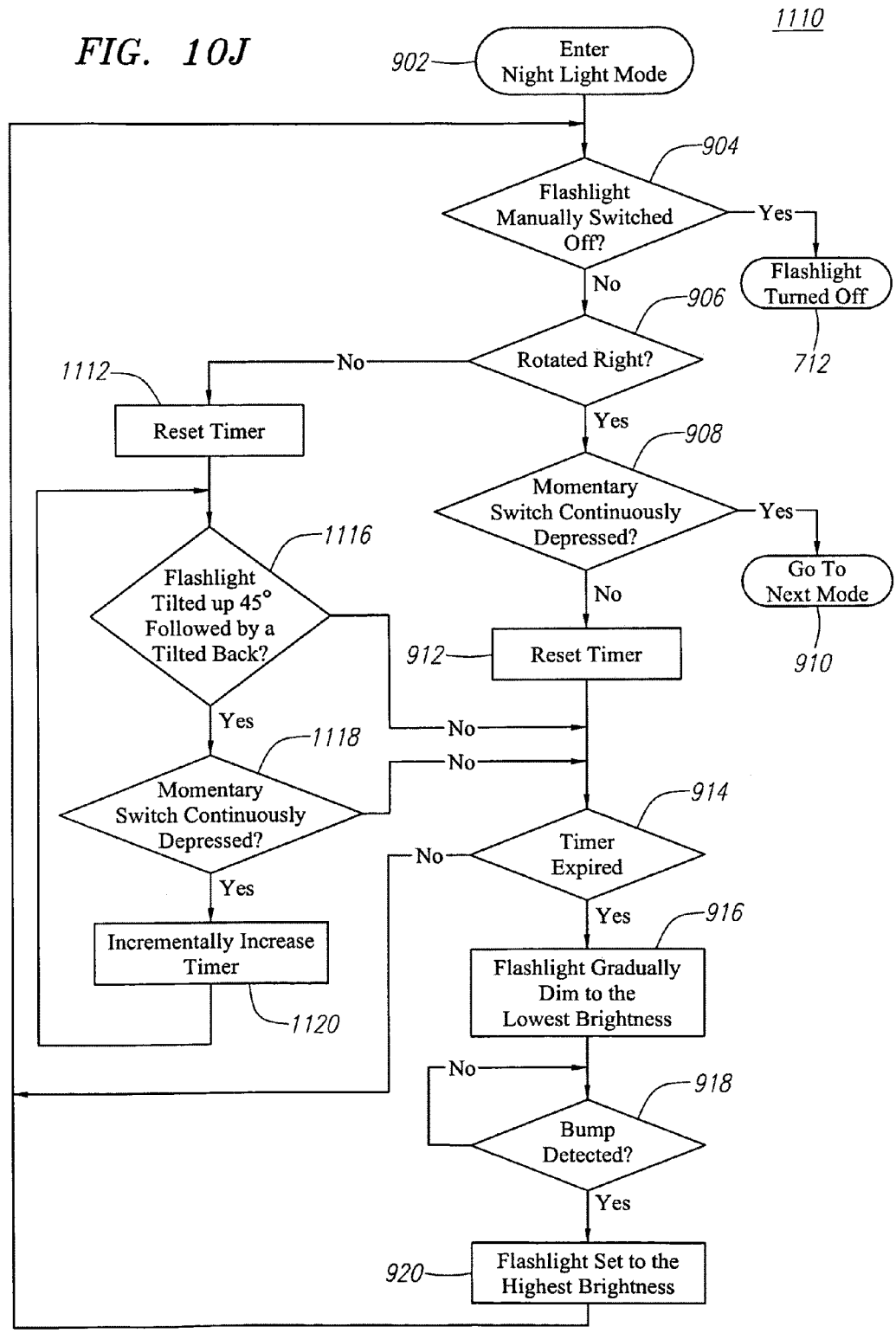

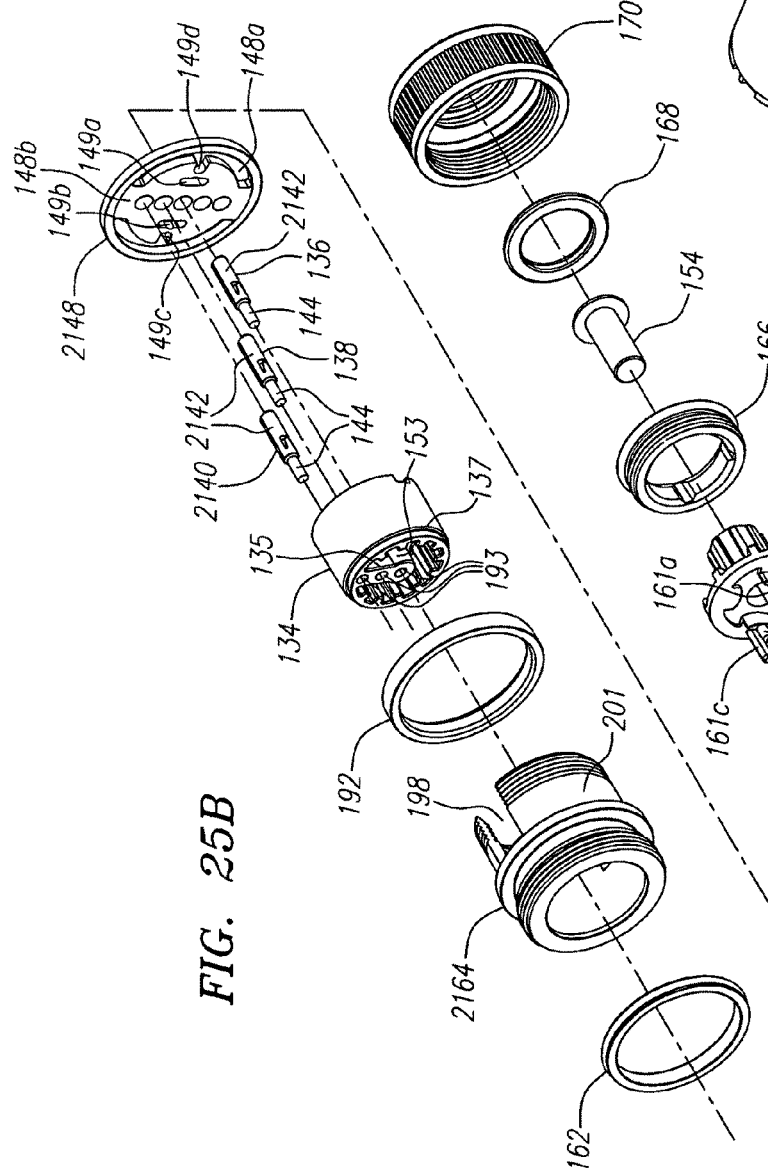
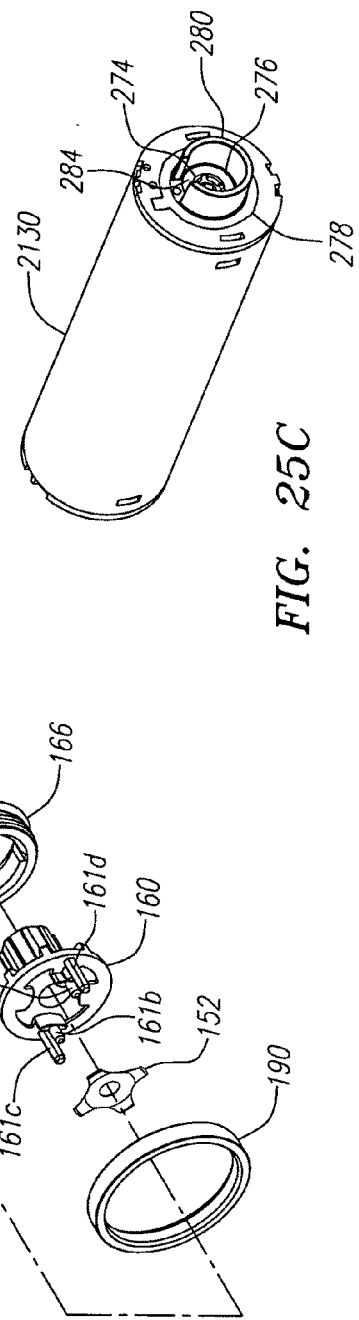
FIG. 25B
FIG. 25C

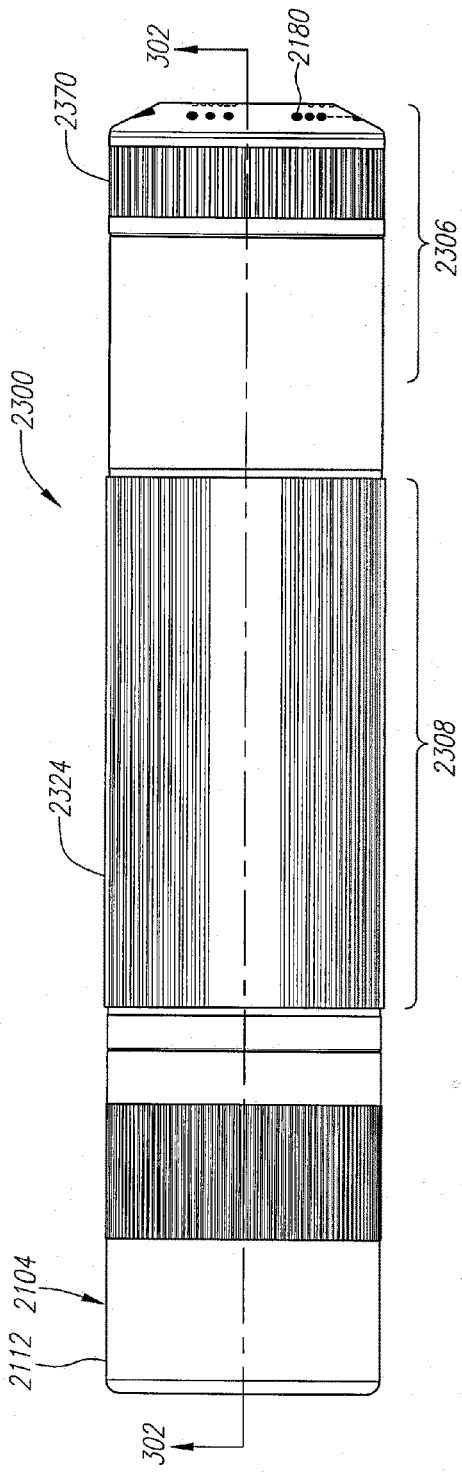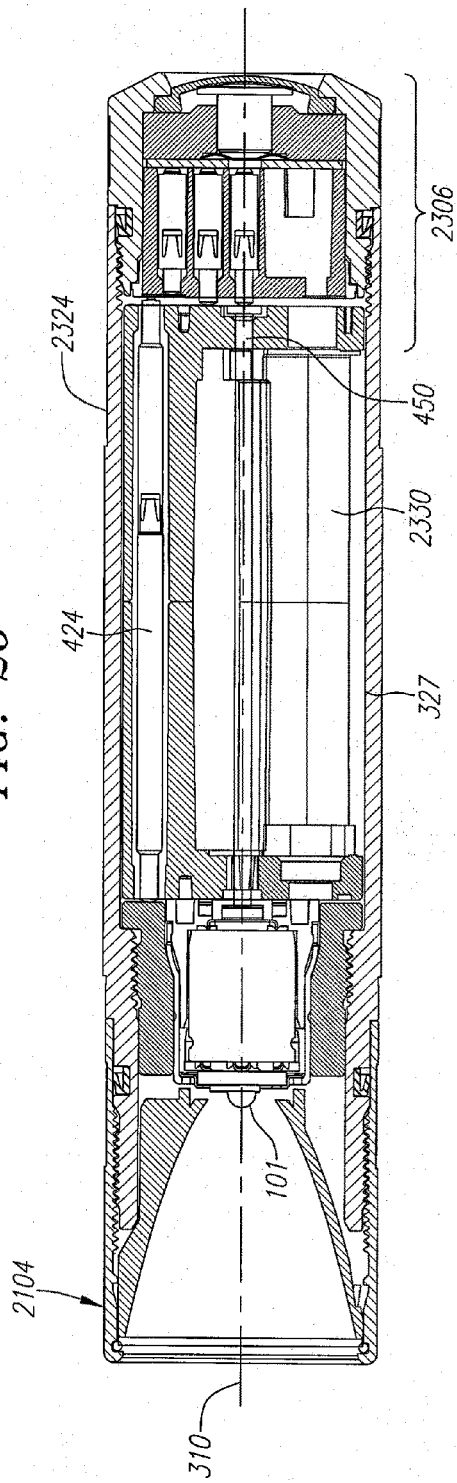

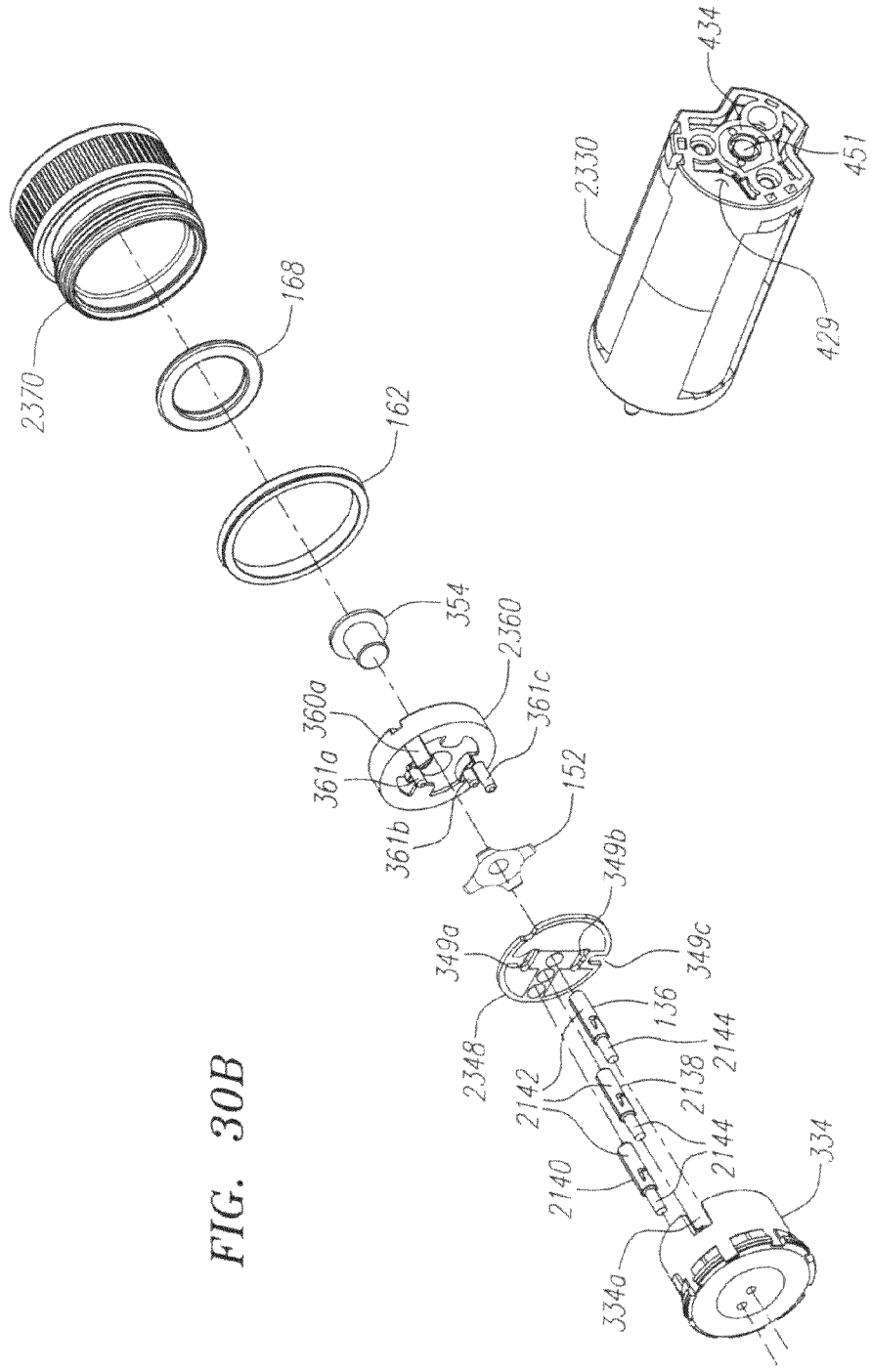

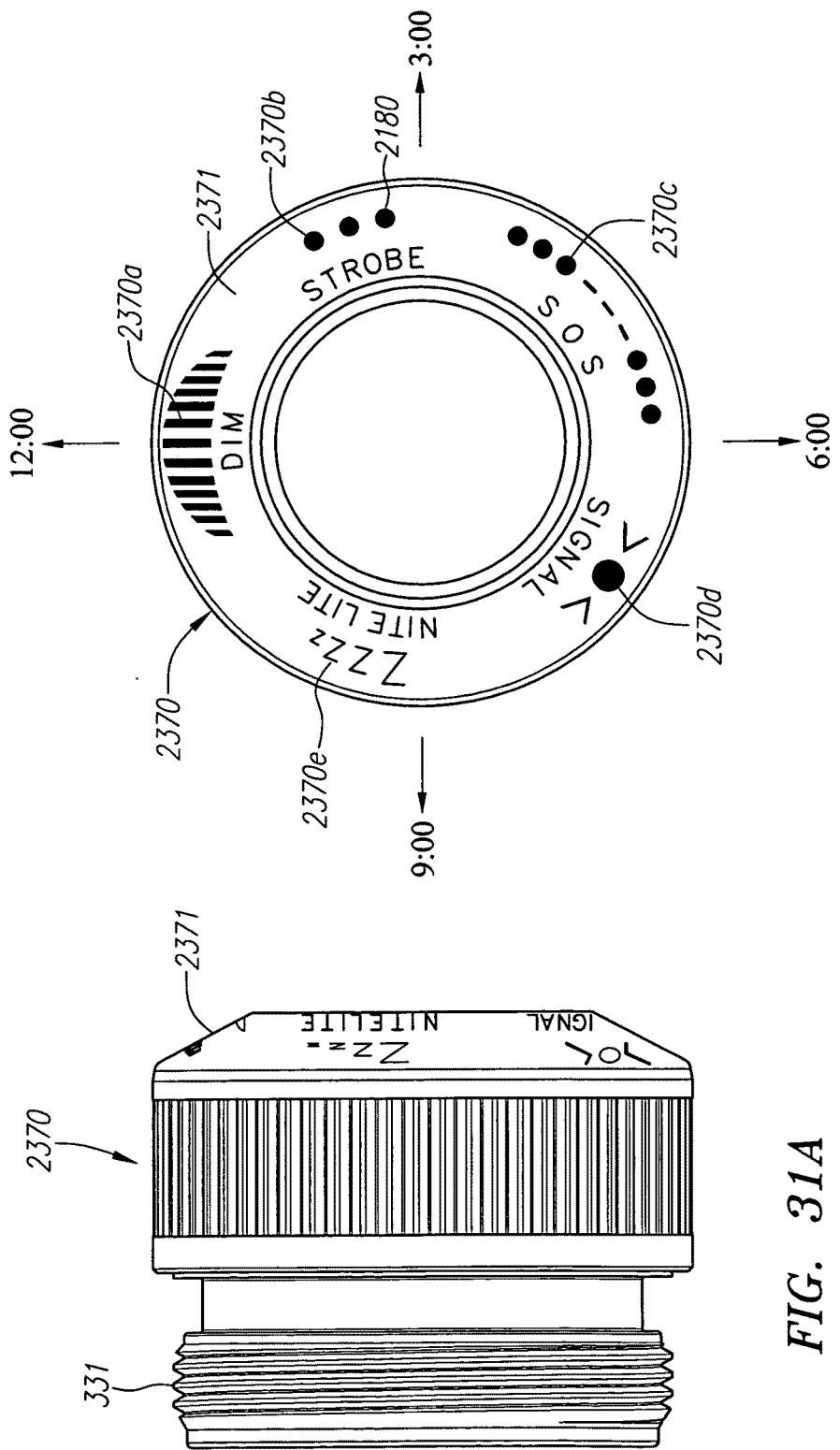

PORTABLE LIGHTING DEVICES

CROSS REFERENCE TO RELATED APPLICATIONS

This application is based on and claims priority to U.S. Provisional Application Ser. No. 61/145,120, filed Jan. 16, 2009, the disclosure of which is incorporated by reference as if fully set forth herein. This application is also a continuation-in-part, and is based on and claims priority to U.S. application Ser. Nos. 12/505,555, filed Jul. 20, 2009, which in turn is a continuation-in-part of U.S. application Ser. No. 12/502,237, filed Jul. 14, 2009, the disclosures of which are incorporated by reference as if fully set forth herein.

TECHNICAL FIELD

The current inventions generally relate to the field of portable lighting devices, including for example, flashlights, lanterns and headlamps, and their circuitry.

BACKGROUND

Various hand held or portable lighting devices, including flashlights, are known in the art. Such lighting devices typically include one or more dry cell batteries having positive and negative electrodes. The batteries are arranged electrically in series or parallel in a battery compartment or housing. The battery compartment also sometimes functions as the handle for the lighting device, particularly in the case of flashlights where a barrel contains the batteries and is also used to hold the flashlight. An electrical circuit is established from a battery electrode through conductive means which are electrically coupled with an electrode of a light source, such as a lamp bulb or a light emitting diode ("LED"). After passing through the light source, the electric circuit continues through a second electrode of the light source in electrical contact with conductive means, which in turn are in electrical contact with the other electrode of a battery. The circuit includes a switch to open or close the circuit. Actuation of the switch to close the electrical circuit enables current to pass through the lamp bulb, LED, or other light source—and through the filament, in the case of an incandescent lamp bulb—thereby generating light.

Some advanced portable lighting devices provide multiple modes of operation for different needs. For example, in addition to the normal "full power" or "standard power" mode, a power reduction mode, blink mode and/or an SOS mode have been implemented in portable lighting devices, such as flashlights. In such portable lighting devices, the user typically elects the desired mode of operation by manipulation of a user interface, typically a main switch. For example, when the portable lighting device is in the normal mode or the power save mode of operation, the portable lighting device may be transitioned to another mode of operation, such as an SOS mode, by manipulating the main switch to momentarily turn "off" and then turn back "on" the portable lighting device. In other devices, the main switch may be required to be depressed and held a certain period of time to cause the lighting device to index to the next operational mode. Portable lighting devices that include advanced functionality may include an electronic power switch controlled by a microcontroller or microprocessor to provide the desired functionality.

One potential problem of the portable lighting devices with multiple functions described above is that a user needs to manipulate the main switch in some manner in order to enter into a new mode of operation. If the main switch is located on the barrel of, for example, a flashlight, the sequence of pushing and releasing the main switch may cause the flashlight under operation to point away from the area of intended illumination.

Another problem associated with the use of the main switch as the user interface to enter a new mode of operation is that the required manipulation sequence is often complicated or simply takes too long to index through the different modes of operation. Yet another problem associated with the main switch approach is that the frequent manipulation of the main switch to index through the different modes of operation may cause the mechanical parts of the switch to prematurely wear out, shortening the useful life of the portable lighting device.

Accordingly, a need exists for a portable lighting device with an improved user interface that does not require the repeated or complicated manipulation of a mechanical switch to index through the various modes of operation that the portable lighting device may provide.

Flashlights and other portable lighting devices have conventionally employed a mechanical power switch in the main power circuit of the flashlight to turn "on" and turn "off" the portable lighting device. When the user turns "on" the portable lighting device, the user typically presses down or otherwise manipulates the mechanical power switch to mechanically connect two contacts to close the switch and complete the power circuit, thereby allowing current to flow from the positive terminal of the batteries, through the light source and to the negative terminal of the batteries. When the user turns "off" the portable lighting device, the user again manipulates the mechanical switch to disconnect the two contacts of the switch and thereby open the switch and break the power circuit. The mechanical power circuit in such devices, therefore, acts as a conductor in completing the power circuit, and thus conducts current throughout the operation of the portable lighting device.

Because mechanical power switches form part of the circuit of the lighting device, the contacts of such switches tend to be fairly heavy duty. Accordingly, such switches tend to require a significant amount of force in order to close and open their contacts. As a result, using a portable lighting device having a mechanical power switch as a signaling device over a prolonged period may be difficult. For example, the force required to manipulate the switch between the "on" and "off" positions may fatigue the user after a prolonged period of using the portable lighting device in a signaling application. Further, with some mechanical power switches, it may simply take too much time to close and open the mechanical power switch in order to turn "on" and "off" the portable lighting device to perform certain signaling applications.

Another problem with using the portable lighting device's main switch to implement a user implemented signaling mode is that the repeated manipulation of the main switch to turn "off" and then turn back "on" the lighting device may cause the mechanical parts of the switch to prematurely wear out, shortening the life of the lighting device.

Some switches employed in portable electronic lighting devices may require less force to manipulate because they typically do not form part of the main power circuit of the lighting device and are thus not as heavy duty. While this is potentially beneficial from a user fatigue standpoint in a signaling application, multi-mode portable electronic devices present their own set of problems for user implemented signaling modes.

For example, in multi-mode electronic portable lighting devices, the various modes of operation may be selected by a user turning off the lighting device for less than a predetermined period of time, such as 1 to 2 seconds, and then turning the lighting device back on again. In response to this short turn off period, the lighting device indexes to the next mode.

It would therefore be difficult to use a multi-mode portable electronic lighting device configured in this manner for a user implemented signaling mode. This is because the user must wait more than the predetermined period of time before turning the lighting device back on, otherwise it will automatically index to the next mode of operation, thereby interfering with the user's intended signaling operation. In other words, the user would be precluded from signaling with short alternating periods of light and no light to communicate through, for example, Morse code.

Accordingly, a need exists for an improved portable electronic lighting device that may be used in a user implemented signaling mode without the manipulation of a mechanical switch to repeatedly turn the lighting device "on" and "off."

A compass is useful in a variety of outdoor sports or hobbies, including, for example, backpacking, hiking, mountain climbing, boating, etc. A traditional magnetic compass includes a magnetized needle to indicate the direction of the Earth's magnetic north. In the dark, however, the direction in which the magnetized needle is pointing may be hard to see without the assistance of a light source. In some compasses, the needle and portions of the compass face are coated with a fluorescent material to improve night viewing and use. In very dark conditions, however, such fluorescent coatings may be inadequate. Some advanced compasses are provided with a built-in light source to be turned on when desired. Such compasses, however, tend to be more expensive and are more likely to be owned by a smaller group of true outdoor enthusiasts. Further, many situations arise where individuals would benefit from having a compass, but for a variety of reasons simply do not have a compass, although they do have a flashlight or other portable lighting device in their possession.

Accordingly, a need exists for a portable lighting device, such as a flashlight or headlamp, that provides a compass function. It would be beneficial if the device could be used both during the day and the night. Such a device would be useful to a broad class of individuals, including the outdoor enthusiast, as well as the outdoor novice.

Night lights that plug into the wall are conventionally known. These night lights are not portable, however, thus making a night light required in multiple rooms to provide adequate safety. Some individuals use flashlights or other portable lighting devices as an alternative or in addition to the conventional wall plug-in nightlights. However, if a conventional flashlight or portable lighting device is left on over night to provide constant light, the batteries of the lighting device may be quickly drained.

Alternatively, if the portable lighting device is turned off to save battery power, locating the lighting device in the dark can be problematic. In some situations it could even lead to injury, particularly in emergency situations, as the user searches for the portable lighting device.

Accordingly, a need exists for a portable lighting device that has improved functionality as a night light.

In multi-mode portable electronic lighting devices, the electronics of the lighting device may include a number of preprogrammed functions. Such modes may include a "standard power" mode, power reduction mode, a blink mode and an SOS mode. The various individual modes of such conventional multi-mode devices, however, cannot be adjusted. As a result, the user of the portable lighting device must simply select the particular mode of operation that best fits his or her needs.

One approach to solving this problem has been to program additional modes of operation into the lighting device. For example, instead of having a single power reduction mode, the portable lighting device may be provided with two discrete power reduction modes, such as a 75% power reduction mode and a 50% power reduction mode. This discrete approach to the problem may not be very practical, however, because as each new mode of operation is added to the portable lighting device, more time is required to index through the different discrete modes of operation, thus making it less likely that a user will even use the advanced functionality of the lighting device. A user interface, such as a single switch, also does not provide a practical option for including a number of modes of operation. Indeed, for some designs, it would be cumbersome to attempt to access over, for example, four or five discrete modes of operation.

Accordingly, a need exists for a multi-mode portable lighting device that enables user adjustable modes of operation.

When a portable lighting device, such as a flashlight or headlamp, is turned on, battery power is consumed. As a result, if the lighting device is left "on" inadvertently, battery power, or battery life in the case of dry-cell batteries, may be wasted. This unfortunately may render the portable lighting device useless or of decreased performance when it may actually be needed. To mitigate this issue, some portable lighting devices have been provided with an auto-off feature, which automatically turns the lighting device off after a predetermined period of time has lapsed. Implemented in this fashion, however, an auto-off feature can be dangerous because the portable lighting device may automatically turn "off" when the user still requires illumination from the lighting device.

Accordingly, a need exists for a portable lighting device with an improved auto-off feature.

Because modern portable electronic lighting devices typically employ switches that require less force to activate than flashlights employing conventional mechanical power switches, such electronic lighting devices may be susceptible to being inadvertently turned "on" during storage. This can lead to complete battery drainage. While some portable electronic lighting devices are provided with an auto-off feature as noted above, this is not a completely satisfactory solution to the foregoing problem because some battery power will be lost before the lighting device is automatically turned off. Furthermore, if the portable lighting device is again jostled in a manner to cause the main switch to activate the lighting device, the lighting device may again be turned "on" until the auto off feature again turns the device off, resulting in additional battery drain.

Accordingly, a need exists for an improved portable electronic lighting device that can reduce the likelihood that the lighting device will be inadvertently turned "on."

In many existing portable lighting devices, the batteries are contained in the device's housing, e.g., the flashlight barrel. In the case of rechargeable flashlights, the rechargeable battery(ies) may be contained in a battery pack. Other attempts have been made to create battery packs or cassettes that contain all the batteries used to power the lighting device, in order to allow easy insertion and removal of the batteries all at once. However, such battery packs and cassettes often comprise a housing that requires multiple threaded fasteners to assemble, resulting in a complicated and costly battery pack or cassette. Further, in the case of rechargeable battery packs, if any electronics are used in connection with recharging, the electronics may not be contained in the battery pack. Accordingly, extra connections are typically required that may increase manufacturing cost and design complexity.

Accordingly, there is a need for improved battery packs in both the non-rechargeable and rechargeable contexts.

SUMMARY

A number of portable lighting devices and methods of operating same are provided. In general, the portable lighting devices may be any type of portable lighting device, including, for example, flashlights, headlamps, lanterns, etc.

As an example, a portable lighting device configured to operate using a portable source of power is provided in which the portable lighting device comprises a main power circuit, an inertial sensor and a controller. The main power circuit includes a light source, an electronic power switch, and is configured to electrically connect the light source to the portable source of power. The inertial sensor has at least one signal output. The controller is electrically connected to the electronic power switch in a manner to permit the controller to control the flow of power through the electronic power switch and light source in the main power circuit. The controller is also electrically connected to at least one output from the inertial sensor. The controller is programmed to control the flow of power through the light source based on one or more signals received from at least one output of the inertial sensor. In addition, for example, the controller may be programmed to enter into a new mode of operation based on input received from at least one output of the inertial sensor.

One potential method of operating a portable lighting device, such as a flashlight or headlamp, involves moving the lighting device in a first predetermined manner to cause the lighting device to enter a new mode of operation. The method may further include moving the lighting device in a second predetermined direction to adjust the mode of operation. For example, the portable lighting device may be rotated in a first direction about a principal axis of projection of the light source to cause it to enter a new mode of operation. Further, rotation about the principal axis of projection in the opposite direction may be used to adjust a selected mode. The above methods are advantageous in that a new mode of operation may be selected without a press and release sequences of the main switch. Likewise, the methods will also enable the adjustment of a selected mode without implementing a complicated press and release sequence of the main switch. The movement in the first and second predetermined manners may also comprise movements other than rotating around the principal axis of projection. For example, they may comprise a certain shaking sequence.

As an example, a portable lighting device configured to operate using a portable source of power is provided in which the portable lighting device comprises a main power circuit, a magnetic sensor and a controller. The main power circuit includes a light source and an electronic switch and is configured to electrically connect the light source to the portable source of power. The magnetic sensor has at least one signal output. The controller is also electrically connected to the electronic power switch in a manner to permit the controller to control the flow of power through the electronic power switch and light source in the main power circuit. The controller is also electrically connected to at least one output from the magnetic sensor, wherein the controller is configured to output a control signal based on input received from at least one output of the magnetic sensor. In one embodiment, the control signal is communicated to the electronic switch to control the flow of power through the light source and generate a predetermined visual response. In another embodiment, the control signal is communicated to an audio device to generate a predetermined audio response. Yet in another embodiment, the control signal is communicated to an electric motor to generate a predetermined vibrating response. A different command signal may be generated as a coordinate marker on the lighting device is rotated to align with different cardinal coordinates so as to cause a different visual, audible, or vibrating response by the light source or audio device, respectively. In one embodiment, the coordinate marker comprises a principal axis of projection of the light source of the portable lighting device. In other embodiments, the coordinate marker comprises a physical mark on an exterior portion of the portable lighting device.

One potential method of operating a portable lighting device, such as a flashlight having a compass feature, may involve rotating the portable lighting device around an axis of rotation that is substantially normal to a coordinate marker of the lighting device to cause the flashlight or portable lighting device to output a visual, audio and/or vibrating response when the coordinate marker of the lighting device is facing toward the Earth's magnetic north pole. In one embodiment, the coordinate marker comprises a principal axis of projection of the light source. In another embodiment, the coordinate marker comprises a physical mark on an exterior portion of the portable lighting device.

In one embodiment, the lighting device becomes incrementally brighter as the coordinate marker is rotated toward the Earth's magnetic north pole and turns incrementally dimmer as the coordinate marker is rotated away from the Earth's magnetic north pole toward the Earth's magnetic south pole. Therefore, the portable lighting device is able to provide the function of a compass by providing different visual responses based on the light source when the flashlight or portable lighting device is pointing toward different direction.

As an example, the brightness of the light source can be increased when the flashlight or portable lighting device is facing forward the magnetic north coordinates of the Earth and the light source provides the brightest light when the flashlight or portable lighting device is facing at the magnetic north coordinates of the Earth.

As an example, the light source produces a blink signal when the principal axis of projection of the flashlight or portable lighting device is within a 5° angle of one of the magnetic cardinal coordinates of the Earth.

As an example, a portable lighting device can be configured to operate using a portable source of power, the portable lighting device comprising a main power circuit including a light source, an inertial sensor, and a controller. The main power circuit can be configured to electrically connect the light source to the portable source of power. The inertial sensor can have a plurality of signal outputs. The controller can be electrically connected to the main power circuit in a manner to permit the controller to control the flow of power through the light source in the main power circuit. The controller can also be electrically connected to the outputs of the inertial sensor, wherein the controller is programmed to control the flow of power through the light source in a variety of levels based on signals received from the outputs of the inertial sensor.

One potential method of operating a flashlight or a portable lighting device is by rotating the flashlight or portable lighting device right (or left depending on the user configuration) along the principal axis of projection of the light source to turn the flashlight or portable lighting device on while by rotating the flashlight or a portable lighting device left (or right depending on the user configuration) along the principal axis of projection of the light source to turn the flashlight or portable lighting device off. Therefore, the push button is not necessary when the flashlight or portable lighting device is turned on or off.

As another example, one potential method of operating a flashlight or a portable lighting device is by rotating the flashlight or a portable lighting device right (or left depending on the user configuration) along the principal axis of projection of the light source to turn the flashlight or portable lighting device brighter while by rotating the flashlight or portable lighting device left (or right depending on the user configuration) along the principal axis of projection of the light source to turn the flashlight or portable lighting device dimmer. Therefore, a push button is not required when the flashlight or portable lighting device is turned in a variety of brightness.

As another example, one potential method of operating a flashlight or a portable lighting device is by rotating the flashlight or portable lighting device right (or left depending on the user configuration) along the principal axis of projection of the light source to turn the flashlight or portable lighting device in a higher blinking rate while by rotating the portable lighting device left (or right depending on the user configuration) along the principal axis of projection of the light source to turn the flashlight or portable lighting device in a lower blinking rate. Therefore, the push button is not necessary when the flashlight or portable lighting device is turned in a variety of blinking rate.

As an example, a portable lighting device can be configured to operate using a portable source of power, the portable lighting device comprising: a main power circuit including a light source, an inertial sensor, and a controller. The main power circuit can be configured to electrically connect the light source to the portable source of power. The inertial sensor can have a plurality of signal outputs. The controller can be electrically connected to the main power circuit in a manner to permit the controller to control the flow of power through the light source in the main power circuit. The controller can also be electrically connected to the outputs of the inertial sensor, wherein the controller is programmed to start the flow of power through the light source based on signals received from the outputs of the inertial sensor.

One potential method of operating a flashlight or portable lighting device is by setting the flashlight or portable lighting device in a night light mode so that when movement is detected by the flashlight or portable lighting device, it automatically becomes brighter.

As an example, a portable lighting device can be configured to operate using a portable source of power, the portable lighting device comprising: a main power circuit including a light source, an inertial sensor, and a controller. The main power circuit can be configured to electrically connect the light source to the portable source of power. The inertial sensor can have a plurality of signal outputs. The controller can be electrically connected to the main power circuit in a manner to permit the controller to control the flow of power through the light source in the main power circuit. The controller also being electrically connected to the outputs of the inertial sensor, wherein the controller stores an adjustable parameter in a memory based on signals received from the outputs of the inertial sensor.

One potential method of configuration of a flashlight or a portable lighting device is by pointing the flashlight or portable lighting device up and rotating the flashlight or portable lighting device right along the principal axis of projection of the light source to set the flashlight or portable lighting device to a right-handed configuration while by pointing the flashlight or portable lighting device up and rotating the portable lighting device left along the principal axis of projection of the light source to set the portable lighting device to a left-handed configuration. Therefore, the flashlight or other portable lighting device can be readily adapted to use by either right or left-handed users based on a configuration process performed by the user.

As an example, a portable lighting device can be configured to operate using a portable source of power, the portable lighting device comprising: a main power circuit including a light source, an inertial sensor, and a controller. The main power circuit can be configured to electrically connect the light source to the portable source of power. The inertial sensor can have a plurality of signal outputs. The controller can be electrically connected to the main power circuit in a manner to permit the controller to control the flow of power through the light source in the main power circuit. The controller can also be electrically connected to the outputs of the inertial sensor, wherein the controller is programmed to stop the flow of power through the light source based on signals received from the outputs of the inertial sensor.

One potential method of operating a flashlight or a portable lighting device is that when the flashlight or portable lighting device is not moved for a predefined period of time, it automatically turns off. As another example, the auto off feature can be activated or deactivated by a user.

In a further aspect, a rechargeable battery pack is provided. The rechargeable battery pack includes a housing having a front end and rear end, a rechargeable battery located within the housing, a circuit board located within the housing and including front circuit board electrical contacts, a front end cap assembly mounted at the front end of the housing and including a plurality of front end cap electrical contacts coupled to the front circuit board electrical contacts, and a rear end cap assembly mounted at the rear end of the housing and including a plurality of rear end cap electrical contacts coupled to the rear circuit board electrical contacts.

In still another aspect, a rechargeable battery pack is provided that includes a housing, a rechargeable battery, and an accelerometer.

In still another aspect, a portable lighting device comprising a rechargeable battery pack of the type described above is provided.

In a further aspect, a rechargeable battery pack, including a housing, a rechargeable battery, and a magnetron to provide a compass function is provided.

In a further aspect, a battery cassette is provided, the battery cassette includes a front housing, a rear housing, at least one rear housing electrical contact that provides a negative electrode at an end of the battery cassette, and a central connector that couples the front housing and rear housing, and that provides a positive electrode at both ends of the battery cassette. The plurality of bays are formed when the front housing and rear housing are joined.

According to another aspect, a portable lighting device comprising a battery cassette is provided.

Further aspects, objects, and desirable features, and advantages of the invention will be better understood from the following description considered in connection with the accompanying drawings in which various embodiments of the disclosed invention are illustrated by way of example. It is to be expressly understood, however, that the drawings are for the purpose of illustration only and are not intended as a definition of the limits of the invention.

BRIEF DESCRIPTION OF THE DRAWINGS

FIG. 1 is a plan view of an exemplary flashlight.

FIG. 2 is a cross-sectional view of the flashlight of FIG. 1 taken along the plane indicated by 102-102.

FIGS. 10A-K are flow diagrams illustrating the operations of a flashlight according to different aspects of the invention.

FIG. 25B is an exploded perspective view of the switch and tail cap assembly portion of the flashlight of FIG. 21.

FIG. 25C is a perspective view of a rechargeable battery pack.

FIG. 26 is a plan view of another exemplary flashlight.

FIG. 27 is a cross-sectional view of the flashlight of FIG. 26 taken along the plane indicated by 302-302.

FIG. 30B is an exploded perspective view of the switch and tail cap assembly portion of the flashlight of FIG. 26.

FIG. 30C is a perspective view of a battery cassette.

FIG. 31A is a side view of a tail cap assembly.

FIG. 31B is a rear view of a tail cap assembly showing icons.

DETAILED DESCRIPTION

Figure 3:
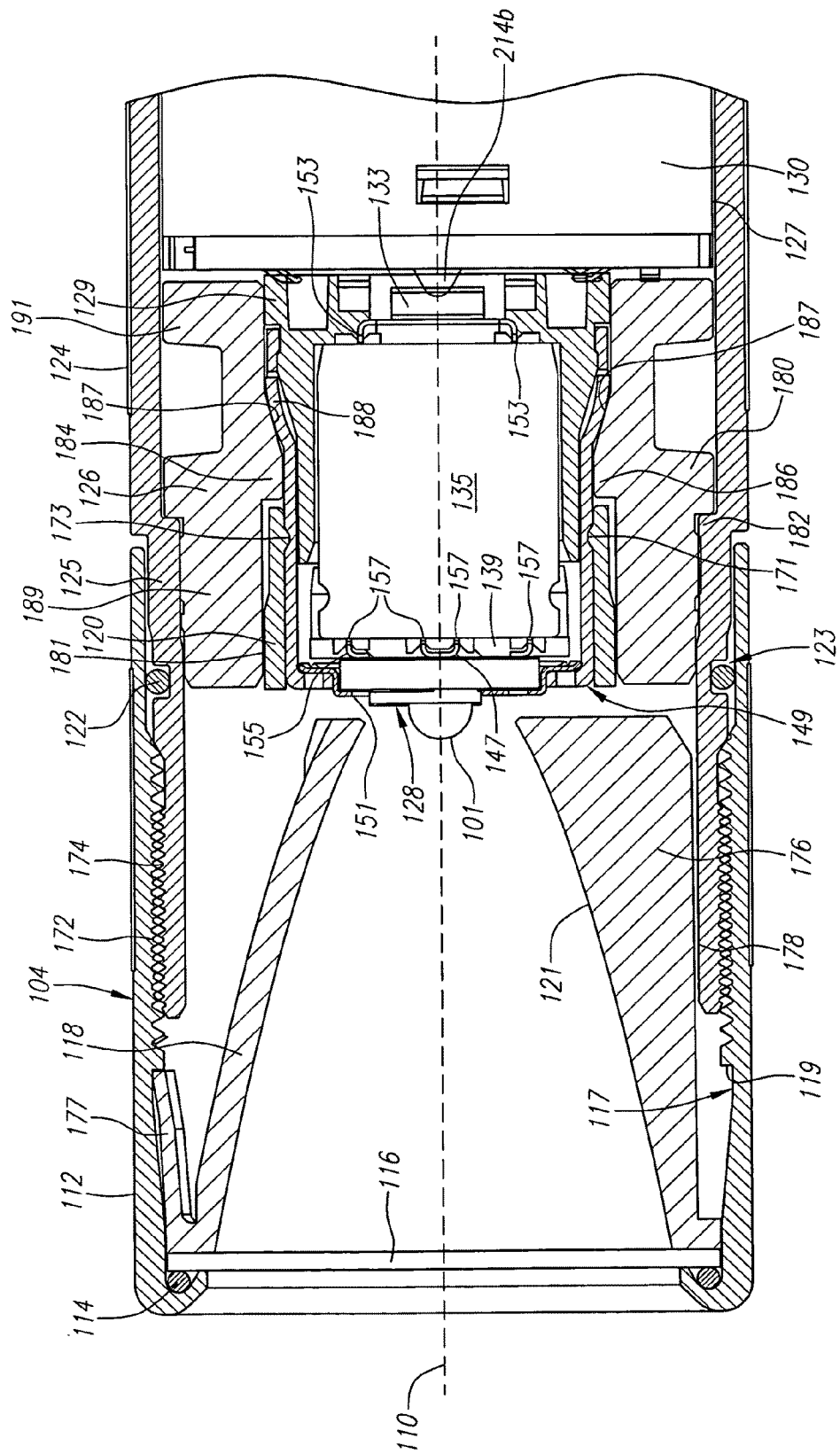
FIG. 3 is an enlarged cross-sectional view of the forward section of the flashlight of FIG. 1 taken through the plane indicated by 102-102.

Embodiments will now be described with reference to the drawings. To facilitate the description, any reference numeral representing an element in one figure will represent the same element in any other figure. Further, in the following description, references to the front, forward or forward facing side of a component shall generally mean the side of the component that faces toward the front end of the flashlight or other portable lighting device. Similarly, references to the aft, back, rear or rearward facing side of a component shall generally mean the side of the component facing the rear of the portable lighting device, e.g., the direction in which the tail cap is located in the case of a flashlight.

Exemplary flashlights 100, 300 are described in connection with FIGS. 1-10I and 11-19D. Each of the exemplary flashlights 100, 300 incorporate a number of distinct aspects. While these distinct aspects have all been incorporated into flashlights 100, 300 in various combinations, the scope of the present invention is not restricted to flashlights 100, 300 described herein. Rather, the present invention is directed to each of the inventive features of flashlights 100, 300 described below both individually as well as in various combinations. Further, as will become apparent to those skilled in the art after reviewing the present disclosure, one or more aspects of the present invention may also be incorporated into other portable lighting devices, including, for example, head lamps and lanterns.

FIG. 1 shows an exemplary flashlight 100. The exemplary flashlight 100 generally includes barrel 124, head assembly 104 located at the forward end of barrel 124, and switch and tail cap assembly 106 located at the rear end of barrel 124. The head assembly 104 is disposed about the forward end of the barrel 124, and the switch and tail cap assembly 106 encloses the aft end of barrel 124.

FIG. 2 is a partial cross-sectional view of flashlight 100 of FIG. 1 taken along the plane indicated by 102-102. FIG. 3 is an enlarged partial cross-sectional view of the forward section of flashlight 100 of FIG. 1 taken through the plane indicated by 102-102. (The portions of FIGS. 2-4 that relate to the battery pack 130 are not shown in cross-section.)

Referring to FIGS. 2 and 3, a light source 101 is mounted to the forward end of the barrel 124. In the present embodiment, the light source 101 is mounted so that it is disposed at the aft end of reflector 118. In other embodiments, the reflector 118 may be omitted, or its shape changed.

Barrel 124 is a hollow, tubular structure suitable for housing a portable source of power, such as, for example, rechargeable battery pack 130. Thus, barrel 124 serves as a housing for receiving a portable source of power having a positive and a negative electrode.

In the illustrated embodiment, barrel 124 is sized to accommodate a battery pack 130, which contains a single Li-Ion battery cell. In other embodiments, however, one or more alkaline dry cell or other types of rechargeable batteries of various sizes may be used instead of the rechargeable battery pack 130. To this end, barrel 124 may be sized to accommodate the desired size battery pack or other power source. Further, if a plurality of batteries are employed, depending on the implementation, they may be connected electrically in parallel or series. Further, other suitable portable power sources, including, for example, high capacity storage capacitors may also be used.

In the illustrated embodiment, barrel 124 includes a forward portion 125 that extends beneath combined head and face cap 112 so that the outer surface of the head assembly 104 is generally flush with that of the barrel 124. The inner diameter of the forward portion 125 is smaller than the inner diameter of the rest of barrel 124. Also, the outer diameter of the forward portion 125 may be smaller than the outer diameter of the rest of barrel 124, so that when flashlight 100 is assembled, the outer portion of combined head and face cap 112 and the outer portion of barrel 124 may form a substantially uniform, cylindrical surface. Alternatively, the combined head and face cap 112 and barrel 124 may have different shapes.

Barrel 124 is preferably made out of aluminum but other suitable materials may be used. In certain embodiments where the barrel forms part of the conductive path of the flashlight, it is preferred that barrel 124 and other components comprise a conductive material, or include a conductive path. In other embodiments, such as that described in conjunction with flashlight 100 below, barrel 124 need not form part of the main power circuit. In this embodiment, barrel 124 may be made out of metal or non-metal (e.g., plastic) materials.

Figure 4:
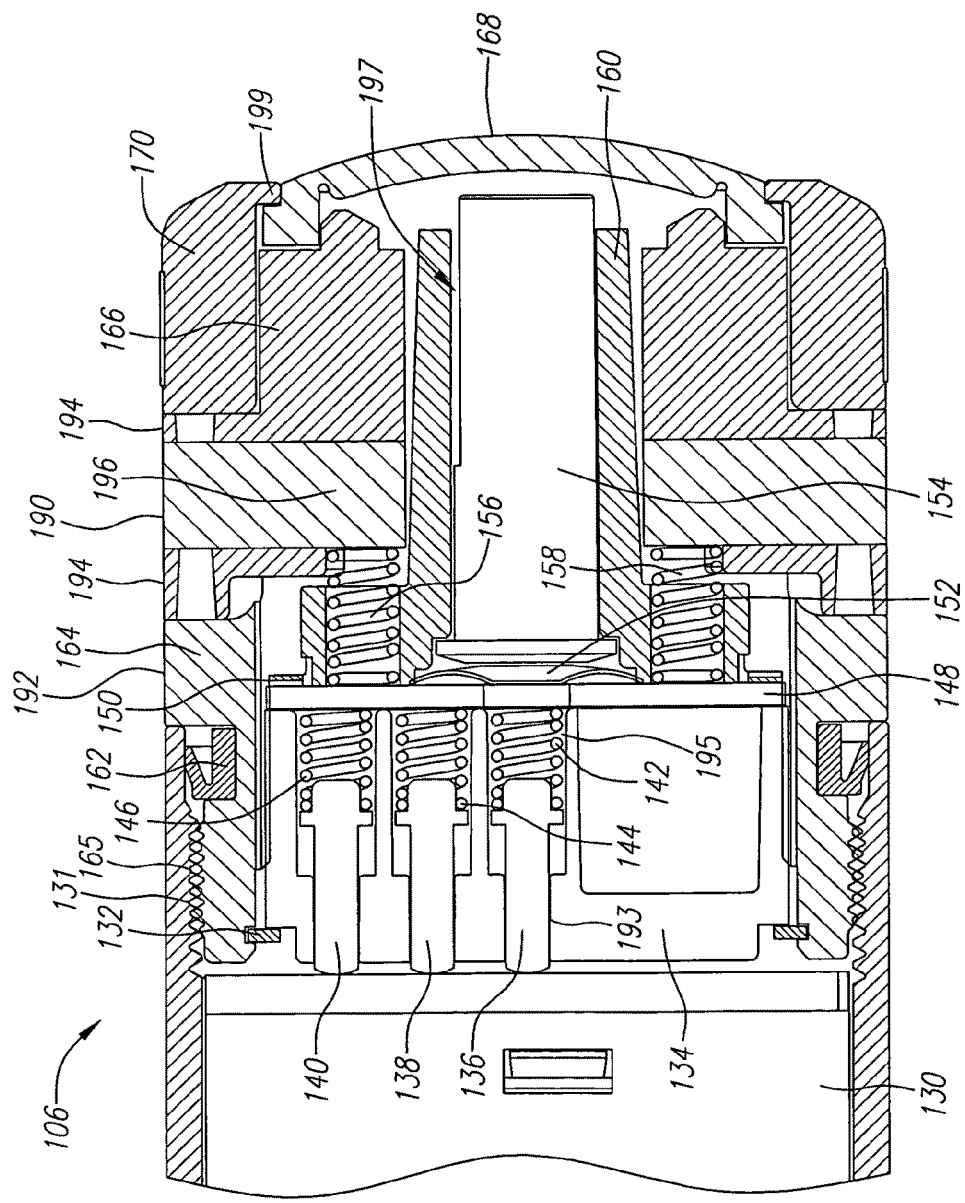
FIG. 4 is an enlarged cross-sectional view of the rearward section of the flashlight of FIG. 1 taken through the plane indicated by 102-102.

In the illustrated embodiment, barrel 124 includes external threads 174 on the outer diameter of its forward portion 125, and internal threads 131 on the inside diameter of its aft end (best seen in FIG. 4). The barrel 124 of the present embodiment also includes an annular shoulder 182 formed at the aft end of the forward portion 125. Annular shoulder 182 acts as a stop to shoulder ring 126 disposed in the forward end of the barrel 124.

Barrel 124 may include a textured surface 108 or surfaces along a portion of its length. The textured surface may aid the user to grip barrel 124. In the present embodiment, textured surface 108 may be provided by broaching, or alternatively, may be formed from machined knurling or other process. Any desired pattern may be used for textured surface 108.

Figure 5A:
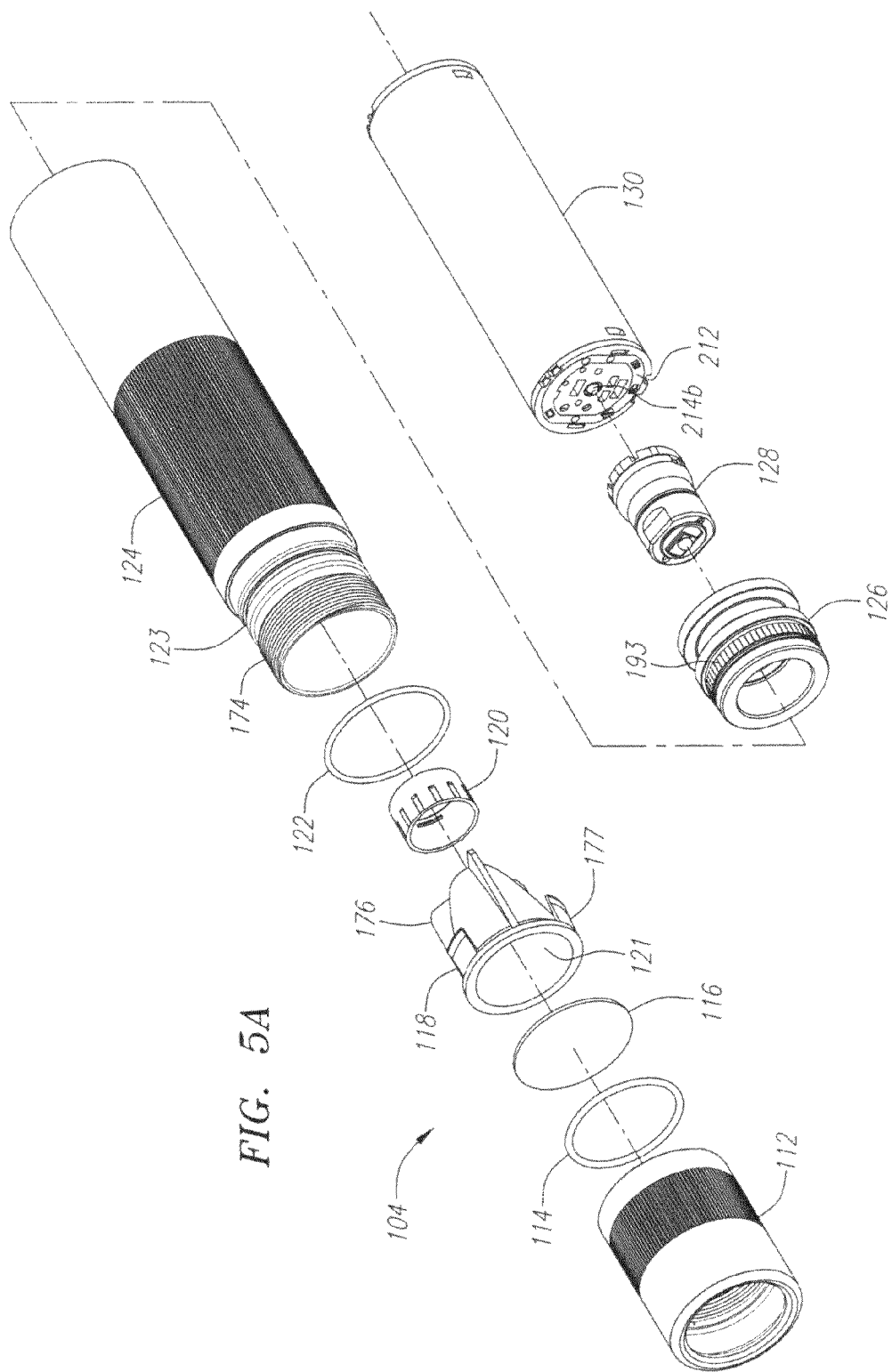
FIG. 5A is an exploded perspective view of the head assembly and a portion of the barrel of the flashlight of FIG. 1.

FIG. 5A is an exploded perspective view of head assembly 104, barrel 124 and other components of flashlight 100 of FIG. 1.

Referring to FIGS. 3 and 5A, head assembly 104 of the present embodiment includes combined head and face cap 112, lens 116, and reflector 118.

The internal surface of combined head and face cap 112 may be used to house certain components, including, for example, lens 116 and reflector 118. The reflector 118 and lens 116 are operatively mounted to the inner diameter of the combined head and face cap 112. In the present embodiment, reflector 118 includes spring clips 177 extending from its front end so that reflector 118 may snap into a corresponding annular recess 117 formed near the forward end of the inner portion of combined head and face cap 112. An annular shoulder 119 is provided at the aft end of annular recess 117 to attach reflector 118 to the combined head and face cap 112 once spring clips 177 expand into annular recess 117. Lens 116 is interposed between a forward facing flange of reflector 118 and an inwardly turned lip of the combined head and face cap 112. In this manner, reflector 118 and lens 116 are locked within the combined head and face cap 112.

Reflector 118 may include fins 176 distributed around the outer perimeter of reflector 118 to provide structural integrity to reflector 118 and to help properly align reflector 118 within the internal surface of the forward portion 125 of barrel 124.

Combined head and face cap 112 may include internal threads 172 which are configured to engage with external threads 174 on the forward end of barrel 124. In other implementations, however, other forms of attachment may be adopted. Combined head and face cap 112 is preferably made from anodized aluminum, though other suitable materials may be used.

A sealing element, such as an o-ring 114, may be located at the interface between combined head and face cap 112 and lens 116 to provide a watertight seal. Other water resistant means, such as a one-way valve, may also be used. O-ring 114 may comprise rubber or other suitable material.

As best seen in FIGS. 3 and 5A, the reflective profile 121 of the reflector 118 is preferably a segment of a computer-generated optimized parabola that is metallized to ensure high precision optics. In one embodiment, the profile 121 may be defined by a parabola having a focal length of less than 0.080 inches, and more preferably between 0.020-0.050 inches. Further, the distance between the vertex of the parabola defining the profile 121 and the aft opening of the reflector 121 may be 0.080-0.130 inches, and more preferably 0.105-0.115 inches. The opening of the forward end of the reflector 118 may have a diameter of 0.7-0.8 inches, and more preferably 0.741-0.743 inches, and the opening of the aft end of the reflector 118 may have a diameter of 0.2-0.3 inches, and more preferably 0.240 to 0.250 inches. Further, the ratio between the distance from the vertex to the opening of the aft end of the reflector 118 and the focal length may be in the range of 1.5:1 and 6.5:1, and more preferably 3.0:1 to 3.4:1. Moreover, the ratio between the distance from the vertex to the opening of the forward end of the reflector 118 and the focal length may be in the range of 20:1 and 40:1, and more preferably 26:1 to 31:1. It should be noted that these are examples only, and other values are provided later.

Reflector 118 preferably comprises an injection molded plastic, though other suitable materials may be used.

Referring back to FIG. 3, although the embodiment disclosed herein illustrates a substantially planar lens 116, the flashlight 100 may instead include a lens that has curved surfaces to further improve the optical performance of the flashlight 100. For example, the lens may include a biconvex profile or a plano-convex profile in the whole or part of the lens surface.

Referring to FIGS. 3 and 5A, an o-ring 122 may be located in an annular groove 123 provided in the outer surface of the barrel 124 at the interface between combined head and face cap 112 and forward portion 125 of barrel 124 to provide a watertight seal. Other water resistant means such as a one-way valve or lip seal may also be used.

Flashlight 100 of the present embodiment includes a lamp module 128 mounted within the shoulder ring 126 at the forward end of barrel 124 so that light source 101 is disposed at the aft and of reflector 118. Lamp module 128 may have a principal axis 110 of projection which may coincide with the reflector axis and/or the longitudinal axis of flashlight 100. In view of the foregoing arrangement, the focus of light emitted from lamp module 128 may be adjusted by twisting head assembly 104 relative to barrel 124, which may be provided by mating threads 172, 174. The light source 101 of lamp module 128 includes a first, positive electrode in electrical communication with a compressible positive contact 133 (see FIGS. 3 and 20) via second circuit board 135 and a second, negative electrode in electrical communication with the heat sink housing 188, which also acts as the negative contact of lamp module 128.

The light source 101 may be any suitable device that generates light. For example, the light source 101 can be an LED lamp, an incandescent lamp, or an arc lamp. In the illustrated embodiment, the light source 101 is an LED lamp and lamp module 128 is an LED module. LED 137 (FIG. 20) of lamp module 128 preferably substantially radiates light at a spherical angle of less than 180°. In other embodiments, LEDs with other angles of radiation may be used, including LEDs that radiate at an angle greater than 180°.

The structure of an LED module that may be used for lamp module 128 is described in detail in co-pending U.S. patent application Ser. No. 12/188,201, by Anthony Maglica, the contents of which are hereby incorporated by reference.

Figure 20:
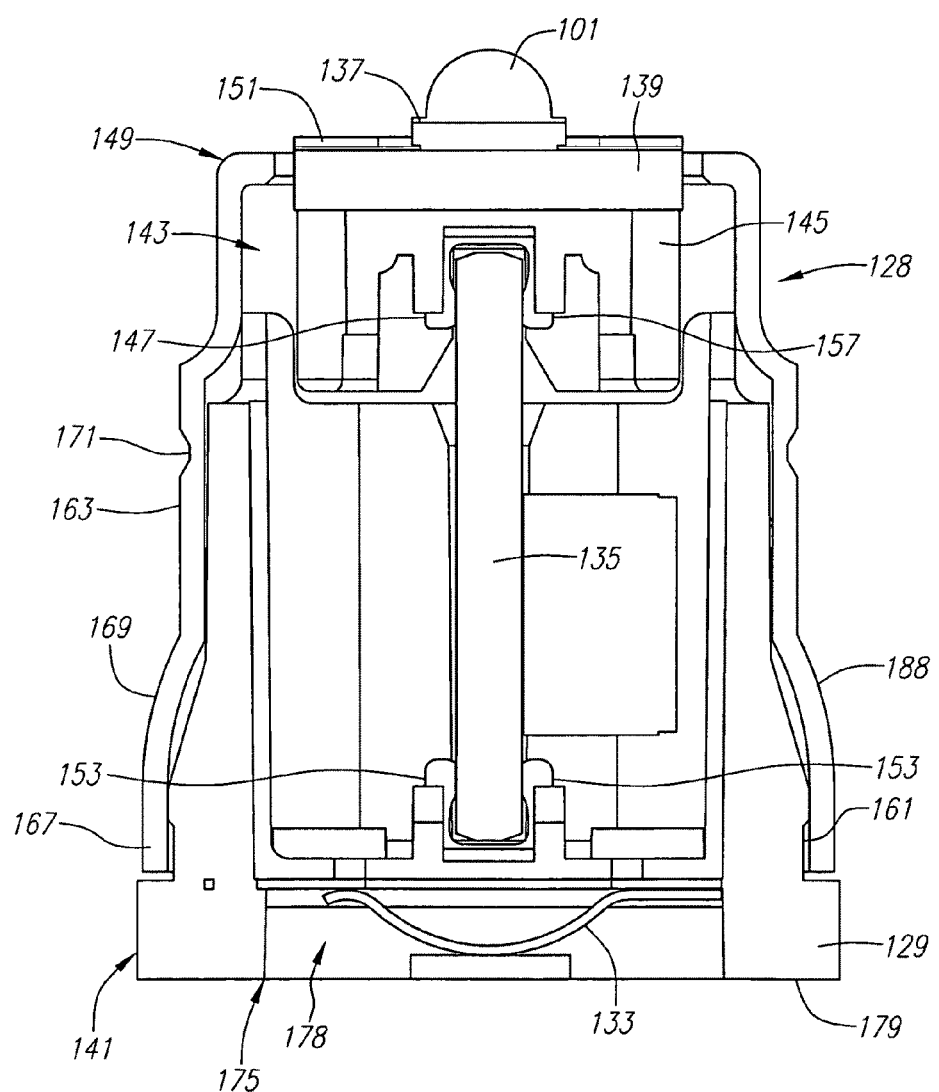
FIG. 20 is a cross-sectional view of a lamp module of the flashlight of FIG. 1 taken at 90° from the cross-section included in FIG. 3.

FIG. 20 is a cross-sectional view of the lamp or LED module 128 in isolation. The cross-sectional view shown in FIG. 20 is taken at 90° to the cross-sectional view shown in FIG. 3. The lamp module 128 of the present embodiment includes an LED 137 as light source 101, a first circuit board 139, a lower assembly 141 formed by compressible positive contact 133 and a lower insulator 129, the second circuit board 135, an upper assembly 143 formed by an upper insulator 145 and an upper positive contact 147 and an upper negative contact 155 (see FIG. 3), and a heat sink 149 formed by the outer heat sink housing 188 and a contact ring 151, which are preferably made out of metal.

Referring to FIGS. 3 and 20, for redundancy, the compressible positive contact 133 preferably includes two clips 153 for making electrical contact with second circuit board 135, one of the clips 153 being displaced before the page in the cross-sectional view provided in FIG. 20. The second circuit board 135 is in electrical contact with upper positive contact 147 and an upper negative or ground contact 155 (see FIG. 3), which are preferably solder connected to the bottom side of the first circuit board 139. For redundancy, the upper positive contact 147 preferably includes two clips 157, one of which is displaced before the page in the view provided in FIG. 20. The upper ground contact also includes two clips 157 for making electrical contact with the second circuit board 135, one of which is displaced behind the clip 157 of the upper positive contact shown in FIG. 20 and one of which is displaced before the page in the view provided in FIG. 20. The upper positive contact 147 is in electrical communication with the positive electrode of LED 137 via first circuit board 139 and the upper ground contact is in electrical communication with the heat sink 149 via the first circuit board 139.

The LED 137 and the heat sink 149 are affixed to the first circuit board 139, preferably via a solder connection. The first circuit board 139, which preferably is a metal clad circuit board having a plurality of thermally conductive layers connected by thermal vias, promotes the rapid and efficient transfer of heat from the LED 137 to the heat sink 149.

The LED 137 can be any light emitting diode that can be soldered to a printed circuit board. Preferably the LED 137 can be soldered to the first circuit board 139 using a screen applied solder paste and a reflow oven. More preferably, the LED 137 is the LUXEON® Rebel product commercially available from Philips Lumileds Lighting Company, LLC.

The second circuit board 135 includes the circuitry for driving LED 137. In the present embodiment, the second circuit board 135 includes a linear buck regulating circuit to reduce driving voltage to the lamp module 128, because the voltage delivered by assembled circuit board 240 is much higher than the operating voltage of LED 137. In other implementations, however, the second circuit board 135 may include a linear boost regulating circuit for providing an adequate voltage to LED 137 when the driving voltage to the lamp module 128 is lower than the operating voltage of one or more LEDs 137 that are to be driven. In other words, the second circuit board 135 may provide a buck or a boost operation depending on the needs of the load and the battery voltage. If the battery voltage is high, the buck operation would be performed. On the other hand, if the battery voltage is low, the boost operation would be performed. In some implementations, a buck operation may be performed initially, while a boost operation is provided after the voltage of the batteries had dropped below a certain level.

The lower assembly 141 is preferably formed by co-molding compressible positive contact 133 and a lower insulator 129 together. Likewise, upper assembly 143 is preferably formed by co-molding upper insulator 145 and an upper positive contact 147 and an upper negative contact 155 together. Thus, the upper and lower insulator are preferably formed from an injection moldable plastic with suitable structural and thermal qualities for the application.

The upper positive and negative contacts of the upper assembly 143 are soldered to the bottom of the first circuit board 139, the front side of which is in turn soldered to contact ring 151, which can be press fit and/or soldered to heat sink housing 188. Thus, the upper assembly 143 is firmly held within heat sink housing 188 in the present embodiment. Further, the circumference of heat sink housing 188 is crimped into an annular recess 161 of the lower insulator 129. The crimping of heat sink housing 188 into annular recess 161 holds lower insulator 129 and hence the lower assembly 141 within heat sink housing 188.

When flashlight 100 is in the ON state, the heat sink housing 188 thermally and electrically couples the light source 101 and the shoulder ring 126. In addition, the heat sink housing 188 electrically couples the ground path of the second circuit board 135 to the shoulder ring 126. The heat sink housing 188 therefore acts as the negative, or ground, contact for the lamp module 128. Further, by arranging the heat sink housing 188 as shown in FIG. 3 so that it is in good thermal contact with the shoulder ring 126, which in turn, as more fully explained below, is in good thermal contact with barrel 124, when the flashlight 101 is ON, heat that is generated by the light source 101 is efficiently absorbed and/or dissipated by the first circuit board 139 to contact ring 151, the heat sink housing 188, shoulder ring 126, and finally barrel 124. Thus flashlight 101 is able to effectively protect the light source 101 from being damaged due to heat. Preferably, the heat sink housing 188 is made from a good electrical and thermal conductor, such as aluminum.

The heat sink housing 188 is formed so that it flares in a region 169 toward the back or bottom of the lamp module 128 from a first region 163 having a first diameter to a second region 167 having a second, larger diameter. The diameter of the first region 163 is sized so that it can closely fit within an annular lip 186 of shoulder ring 126 while at the same time, making thermal contact therewith. An aft facing surface of the annular lip 186 forms a contact surface 187. The outer diameter of the lower insulator 129 and heat sink housing 188 are sized so that there is little or no play in the radial direction between the inner wall of the shoulder ring 126 and the lower insulator 129 and heat sink housing 188. In this way, when lamp module 128 is pushed far enough forward within shoulder ring 126 so that the flared region 169 of the heat sink housing 188 comes into contact with the contact surface 187 of the annular lip 186, the heat sink housing 188 will be in thermal and electrical contact with shoulder ring 126 in the first, second and flared regions 163, 167, 169, respectively.

The outer surface of the heat sink housing 188 also includes an annular recess 171 in the region 163 of the first diameter. The annular recess 171 is generally perpendicular to the axis of the heat sink and the barrel 124. In addition, the annular recess 171 is positioned to receive locking tabs 173 (see FIG. 20A) of retaining collar 120 when the lamp module 128 is mounted within the forward end of barrel 124 in shoulder ring 126.

The flared region 169 of the heat sink housing 188 is preferably shaped to mate with contact surface 187 along as much surface area as possible to facilitate electrical and thermal communication between the lamp module 128 and the shoulder ring 126. The flared region 169 of the heat sink housing 188 is also sized so that once disposed in the shoulder ring 126, the axial movement of the heat sink housing 188, and, consequently, the lamp module 128, in the forward direction will be limited by the annular lip 186 of the shoulder ring 126.

The lower insulator 129 includes at its back face 175 a recess 178, which is surrounded by an annular shoulder 179 so that the recess is centrally located. The recess 178 is dimensioned to be deeper than the height of the positive top contact 214b of battery pack 130. However, as shown in FIGS. 2 and 3, when the battery pack 130 is urged forward against the back face 175 of the lower insulator 129, the positive top contact 214b of battery pack 130 engages with the compressible positive contact 133. In this way, the lamp module 128 provides a simple configuration that enhances the electrical coupling between components even when the flashlight is jarred or dropped, which may cause the battery pack 130 to suddenly displace axially within the barrel 124. Further, because the compressible positive contact 133 may absorb impact stresses due to, for example, mishandling, and recess 178 is deeper than the positive top contact 214b of battery pack 130, the battery pack 130 and its electronics, which are discussed below, are well protected from physical damage during use of the flashlight 100.

Also, because compressible positive contact 133 is disposed forward of the shoulder 179 of back face 175, if a battery pack 130 is inserted backwards into the barrel 124, no electrical coupling with compressible positive contact 133 is formed. Accordingly, the configuration of the lamp module 128 and its arrangement within barrel 124 will help to protect the flashlight's electronics from being affected or damaged by reverse current flow.

The retaining collar 120 attaches to the heat sink housing 188 of the lamp module 128 and, among other things, limits axial movement of the lamp module 128 in the rearward direction when battery pack 130 is removed from flashlight 100. The retaining collar 120 attaches to the lamp module 128 at the annular recess 171 of the heat sink housing 188.

Figure 20A:
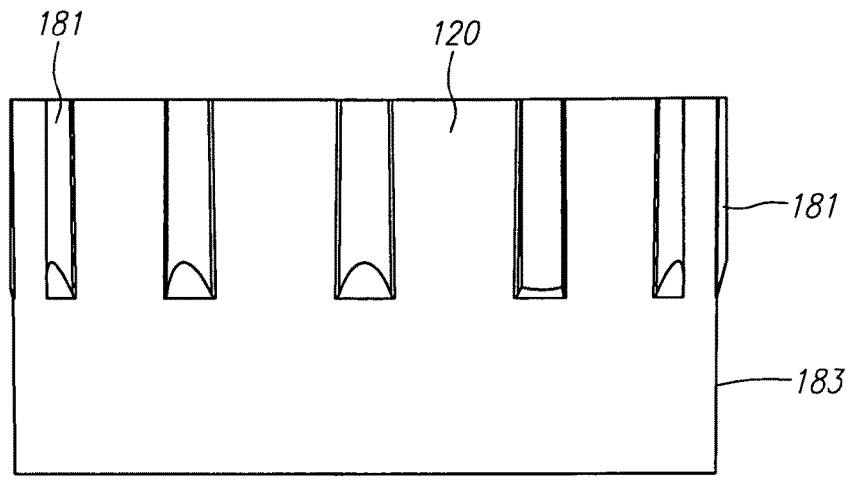
FIG. 20A is a side view of a retaining collar.
Figure 20B:
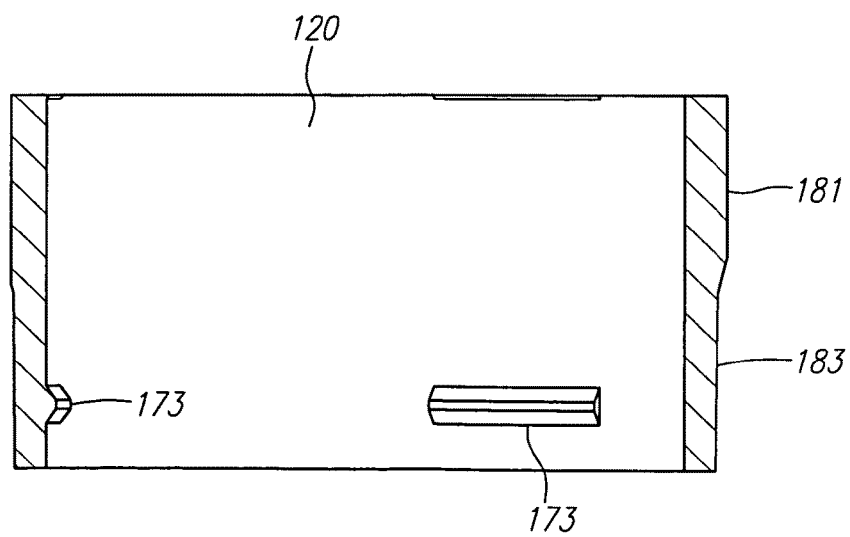
FIG. 20B is a longitudinal cross-sectional view through the retaining collar.

Referring to FIGS. 3, 20A and 20B, the retaining collar 120 includes circumferential locking tabs 173, which project inwardly from the inner surface of the retaining collar 120, and ribs 181, which project outwardly from the outer surface of the retaining collar 120. Referring to FIG. 3, each of the locking tabs 181 is sized to fit into the annular recess 171 on the exterior of the heat sink housing 188. A plurality of ribs 181 are preferable spaced equally around the exterior circumference of the retaining collar 120 so as to generally extend in the axial direction of the retaining collar 120. The ribs 181 preferably extend from the front of the retaining collar to slightly over half the axial length of retaining collar 120. The ribs 181 are dimensioned so as to limit the amount of radial play between the forward end of the lamp module 128 and the inner diameter of the shoulder ring 126 to a desirable amount. The ribs 181 are also preferably dimensioned to project outwardly from retaining collar 120 by the same or a greater distance than the locking tabs 173 project inwardly. By only having the ribs extend to about the middle of the retaining collar 120, the aft end 183 of the retaining collar 120 can expand sufficiently over the outer surface of the heat sink housing 188 within the shoulder ring 126 until circumferential locking tabs 173 snap into annular recess 171 (see FIG. 3). Once the circumferential locking tabs 173 are snapped into annular recess 171, the rearward movement of the lamp module 128 is confined by the annular lip 186. Thus, by securing the retaining collar 120 to the lamp module 128, which is disposed in the shoulder ring 126, the retaining collar 120 keeps the lamp module 128 from falling to the rear of barrel 124, and potentially out the back end of the flashlight 100, in the absence of battery pack 130 being installed in the flashlight 100. In a preferred embodiment, the retaining collar 120 is made from an insulator such as, for example, plastic.

Referring to FIG. 3, the shoulder ring 126 forms a large heat sink. Moreover, because it has a mass that is substantially greater than that of lamp module 128, it quickly draws heat away from heat sink 149 of lamp module 128. Ultimately, the heat drawn away by shoulder ring 126 is efficiently drawn into barrel 124 because barrel 124 and shoulder ring 126 are preferably in intimate metal to metal contact in the forward region 189 of reduced diameter of shoulder ring 126. Shoulder ring 126 may be made out of metal, and more preferably nickel plated aluminum for enhanced thermal, electrical and corrosion resistance properties.

Shoulder ring 126 includes shoulder 180 formed at the interface of the forward region 189 of reduced diameter and an aft region 191 of increased diameter. The forward region 189 includes a plurality of splines 193, as best seen in FIG. 5A. Splines 193 are preferably spaced equally around the circumference of a portion of the forward region 189 of shoulder ring 126 so as to generally extend in the axial direction of the shoulder ring 126. The outer diameter of the forward region 189 of shoulder ring 126 is dimensioned so that it will provide an interference fit with the inner wall of the forward portion 125 of barrel 124 and so that splines 193 will cut into the inner wall of the forward portion 125 of barrel 124 when shoulder ring 126 is press fitted into the forward portion 125 of the barrel 124.

When shoulder ring 126 is press fitted into the forward portion 125 of barrel 124, the splines 193 will splay and cut into metal on the inner diameter of the forward portion 125 of barrel 124. Annular relief grooves are provided adjacent the forward and aft ends of splines 193 on shoulder 126 to receive metal from barrel 124 that is displaced during the press fitting operation. In this way, shoulder ring 126 is permanently locked in metal to metal contact with the forward portion 125 of barrel 124.

The diameter of the aft region 191 of shoulder ring 126 is slightly smaller than the inner diameter of the aft portion of barrel 124 so that it can readily slide within barrel 124 without damaging any protective coating, such as that resulting from an anodizing treatment process.

The above arrangement is also desirable because the splines 193 will cut through any anodized coating provided on the interior of barrel 124, thereby providing the possibility of using the barrel as a ground path as described, for example, in connection with flashlight 300 described below without having to make a skin cut to remove anodizing or mask the contacting area before an anodizing treatment as has been conventionally required with aluminum flashlights.

While shoulder ring 126, lamp module 128, and head assembly 104 do not form part of a mechanical switch for flashlight 100 in the present embodiment, in other embodiments they could as described, for example, in U.S. patent application Ser. No. 12/353,396, filed Jan. 14, 2009, by Stacey West, the contents of which are hereby incorporated by reference.

Lamp module 128 is electrically coupled to flashlight 100 as follows. Flashlight 100 may include rechargeable battery pack 130 that includes positive top contact 214*b* which is electrically coupled to compressible positive contact 133 of lamp module 128. After the current passes through the light source, a ground connection extends from the negative electrode of the light source through heat sink housing 188, which acts as the negative contact of lamp module 128 and shoulder ring 126, which in turn is electrically coupled to outer ring top contact 212 which functions as the negative electrode of battery pack 130.

Figure 5B:
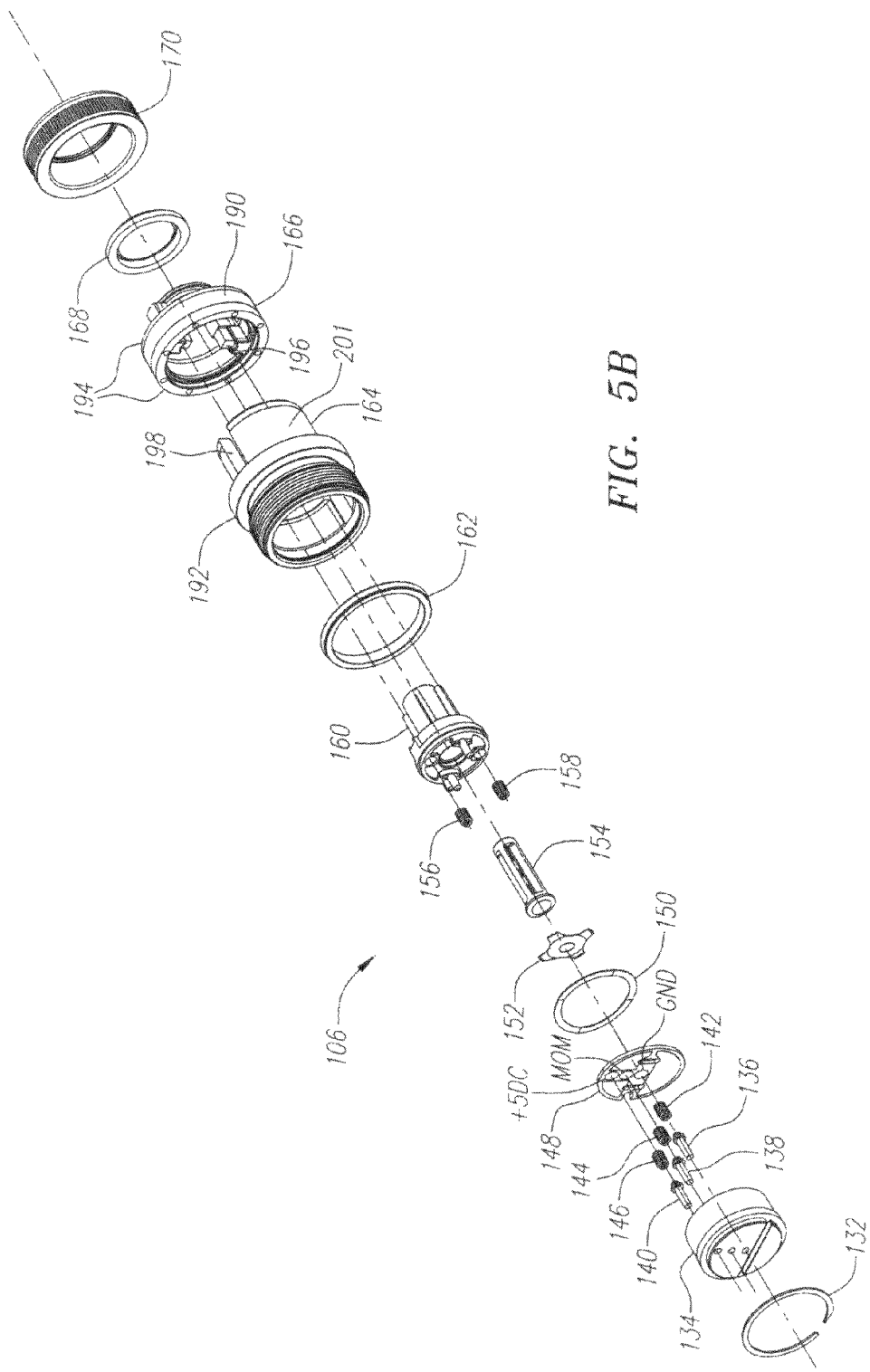
FIG. 5B is an exploded perspective view of the switch and tail cap assembly portion of the flashlight of FIG. 1.

FIG. 4 is an enlarged partial cross-sectional view of the rearward section of flashlight 100 of FIG. 1 taken through the plane indicated by 102-102. (In FIG. 4, however, battery pack 130 is not shown in cross-section.) The rearward section of flashlight 100 generally comprises switch and tail cap assembly 106. FIG. 5B is an exploded perspective view of switch and tail cap assembly 106.

Referring to FIGS. 4 and 5B, switch and tail cap assembly 106 of the present embodiment preferably includes snap ring 132, lower switch housing 134, contact pins 136, 138, 140, contact pin springs 142, 144, 146, 156, 158, circuit board 148, wave spring 150, snap dome 152, actuator 154, upper switch housing 160, lip seal 162, inner tail cap section 164, charging ring 166, switch port seal 168, and outer tail cap section 170.

Lower switch housing 134 preferably includes three cylindrical channels 193 opened to the forward end of lower housing 134 for receiving and holding one of contact pins 136, 138, 140. Each of the channels is connected to a cylindrical chamber 195 which is axially aligned with the channel 193. The diameter of each cylindrical chamber 195 is larger than the channel diameter so that each chamber may receive and house one of contact pin springs 142, 144, 146 in compression between a shoulder on contact pins 136, 138, 140 and circuit board 148 as shown. Springs 142, 144, 146 serve to push contact pins 136, 138, 140 forward until their respective shoulders engage the end wall of its respective chamber 195. In the present embodiment, lower switch housing 134 preferably comprises a non-conductive material, such as plastic, but other suitable materials may be used. Contact pins 136, 138, 140 and contact pin springs 142, 144, 146 are preferably made out of metal so as to form part of the electrical paths of flashlight 100 to be described later. In the present embodiment, contact pins 136, 138, 140 may comprise a conductive metal, such as aluminum while contact pin springs 142, 144, 146 may comprise a suitable conductive spring metal, such as music wire.

The channels 193 of lower switch housing 134 are configured to align with contacts on the bottom of battery pack 130. When battery pack 130 is installed, contact pin 136 may be aligned with a bottom central contact 274*b* (FIG. 6) of battery pack 130, contact pin 138 may be aligned with a bottom middle ring contact 276 (FIG. 6) of battery pack 130, and contact pin 140 may be aligned with a bottom outer ring contact 278 (FIG. 6) of battery pack 130. In this configuration, as best seen in FIG. 5B, contact pin 136 is electrically coupled to GND connection on the printed circuit board 240 in the battery pack 130 to be described below. Similarly, as shown in FIG. 5B, contact pin 138 is electrically coupled to a MOM contact, and contact pin 140 is electrically coupled to +5VDC contact of printed circuit board 240 of battery pack 130.

Circuit board 148 preferably includes contacts on both of its sides. Circuit board 148 may also include conductive vias routed through board 148 to couple contacts on opposite sides. The front side of circuit board 148 (which is facing lower switch housing 134) includes three contact pads (labeled GND, MOM, and +5VDC in FIG. 7) that are electrically coupled to contact pin springs 142, 144, 146, respectively. The rear side of circuit board 148 (which is facing the upper switch housing 160) includes three corresponding contact pads that correspond to GND, MOM and +5VDC and that are located at designated locations. Each pair of the corresponding contacts on the front side and rear side of circuit board 148 are electrically connected through conductive vias provided in circuit board 148, or alternatively routing wires.

Upper switch housing 160 includes a cylindrical channel 197 that allows actuator 154 to slide within. An annular rim of switch port seal 168 is held between an annular lip 199 of outer tail cap 170, which is located at the rear end of flashlight 100, and charging ring 166. When a user presses on switch port seal 168, actuator 154 is moved forward within channel 197 and engages snap dome 152 such that the MOM and GND contact pads on the rear side of circuit board 148 are electrically coupled through snap dome 152. When the user releases switch port seal 168, the MOM and GND contact pads on the rear side of circuit board 148 are no longer electrically coupled through snap dome 152.

In the present embodiment, upper switch housing 160 and actuator 154 preferably comprise a non-conductive material such as plastic. Switch port seal 168 preferably comprises a flexible non-conductive material, such as rubber. Snap dome 152 preferably comprises a conductive spring metal. Other suitable material may be used.

Charging ring 166 is configured to include an exposed charging contact 190, made out of metal, and preferably nickel plated, for contacting the positive contact of an external charging unit such as a charging cradle. The metal charging contact 190 may be electrically connected to two ears 196 radially extending into slots 198 of the inner tail cap section 164. Ears 196 preferably comprise metal so as to form part of the conductive path of the recharging circuit.

Two insulating rings 194, preferably comprising a non-conductive material or a non-conductive coating over a conductive material, may be located on either side of metal charging contact 190 to prevent the conductive portions of charging ring 166, namely metal charging contact 190 and ears 196, from electrically contacting inner tail cap section 164 or outer tail cap 170. In the present embodiment, insulating rings 194 are molded plastic, preferably co-molded with the charging contact 190.

Ears 196 electrically contact the rear end of coil springs 156, 158 that are retained within channels formed in upper switching housing 160. The forward end of coil springs 156, 158 are electrically connected to the +5VDC contact pad on the rear side of circuit board 148. As previously described, the +5VDC contact on the rear side of circuit board 148 is further connected to the +5VDC contact pad on the front side of circuit board 148. The +5VDC contact pad on the front side of circuit board 148 is in contact with contact pin spring 146 retained in lower switch housing 134. Therefore, charging contact 190 is electrically coupled to the +5VDC outer ring contact 212 on the bottom of battery pack 130 through ears 196 of charging ring 166, springs 156, circuit board 148, contact pin spring 146 and contact pin 140.

In the present embodiment, the negative contact of the charging circuit is provided by charging contact 192 on inner tail cap section 164. The inner tail cap section 164, including the charging contact 192, is preferably nickel plated. Although provided on inner tail cap section 164, as seen in FIG. 4, charging contact 192 forms a part of the external surface of flashlight 100. Inner tail cap section 164 is electrically coupled to the GND contact pad on the rear side of circuit board 148 through wave spring 150. Therefore, negative charging contact 192 is electrically coupled to the GND central contact 274b on the bottom of battery pack 130 through inner tail cap section 164, wave spring 150, circuit board 148, contact spring 142 and contact pin 136.

As best seen from FIGS. 4 and 5B, charging contacts 190, 192 serve as the interface between an external recharging unit and rechargeable battery pack 130 of flashlight 100. Although not depicted here, those skilled in the art will appreciate that the cradle of the recharging unit should be fashioned in a way to make electrical contact with external charging contacts 190, 192 and hold flashlight 100 in place while charging takes place. Because charging contacts 190, 192 preferably extend around the entire external circumference of flashlight 100, a recharging unit having a simple cradle design may be used. For example, a cradle design that permits flashlight 100 to be placed into the recharging unit in any radial orientation relative to its longitudinal axis and still be able to make contact with the recharging unit's charging contacts may be used. Thus, flashlight 100 does not need to be pressed into the charging unit so that hidden plugs or tabs are inserted into flashlight 100 in order to make contact with the charging contacts of the recharging unit.

Charging contacts 190, 192 of the present embodiment are preferably in the form of charging rings to simplify the recharging procedure, i.e., to allow placing flashlight 100 in a cradle at any radial orientation. However, other forms of charging contacts may also be used.

In the present embodiment snap ring 132 may be placed between the front edge of lower switch housing 134 and inner tail cap section 164 to prevent lower switch housing 134 from moving forward.

Wave spring 150 may be provided between the rear edge of circuit board 148 and an annular lip of inner tail cap section 164 to provide a compressible spring contact between the two. Wave spring 150 also applies a biasing force to circuit board 148, which in turn applies the biasing force to lower switch housing 134, thereby serving to press cover switch housing 134 against snap ring 132.

Inner tail cap section 164 preferably includes threads 165 on the front outer surface of inner tail cap section 164 for mating with threads 131 on the rear inner surface of barrel 124.

The outer diameter of the aft end 201 of inner tail cap section 164 and the inner diameter of the outer tail cap section 170 are preferably sized so that outer tail cap 170 may be permanently press fitted onto the aft end 201 of inner tail cap section 164 thereby forming an integral switch and tail cap assembly 106.

Inner tail cap section 164 preferably comprises a conductive material such as aluminum.

A one-way valve, such as a lip seal 162, may be provided at the interface between barrel 124 and switch and tail cap assembly 106 to provide a watertight seal while simultaneously allowing overpressure within flashlight 100 to vent to the atmosphere. However, other forms of sealing elements, such as an o-ring, may be used instead of one-way valve 162 to form a watertight seal. Lip seal 162 preferably comprises a non-conductive material such as rubber.

Other configurations of switch and tail cap assembly 106 may be used. For example, the switch function may be included in a side, push button switch or in an internal rotating head assembly switch such as that employed in U.S. patent application Ser. No. 12/353,396, filed Jan. 14, 2009.

Figure 6:
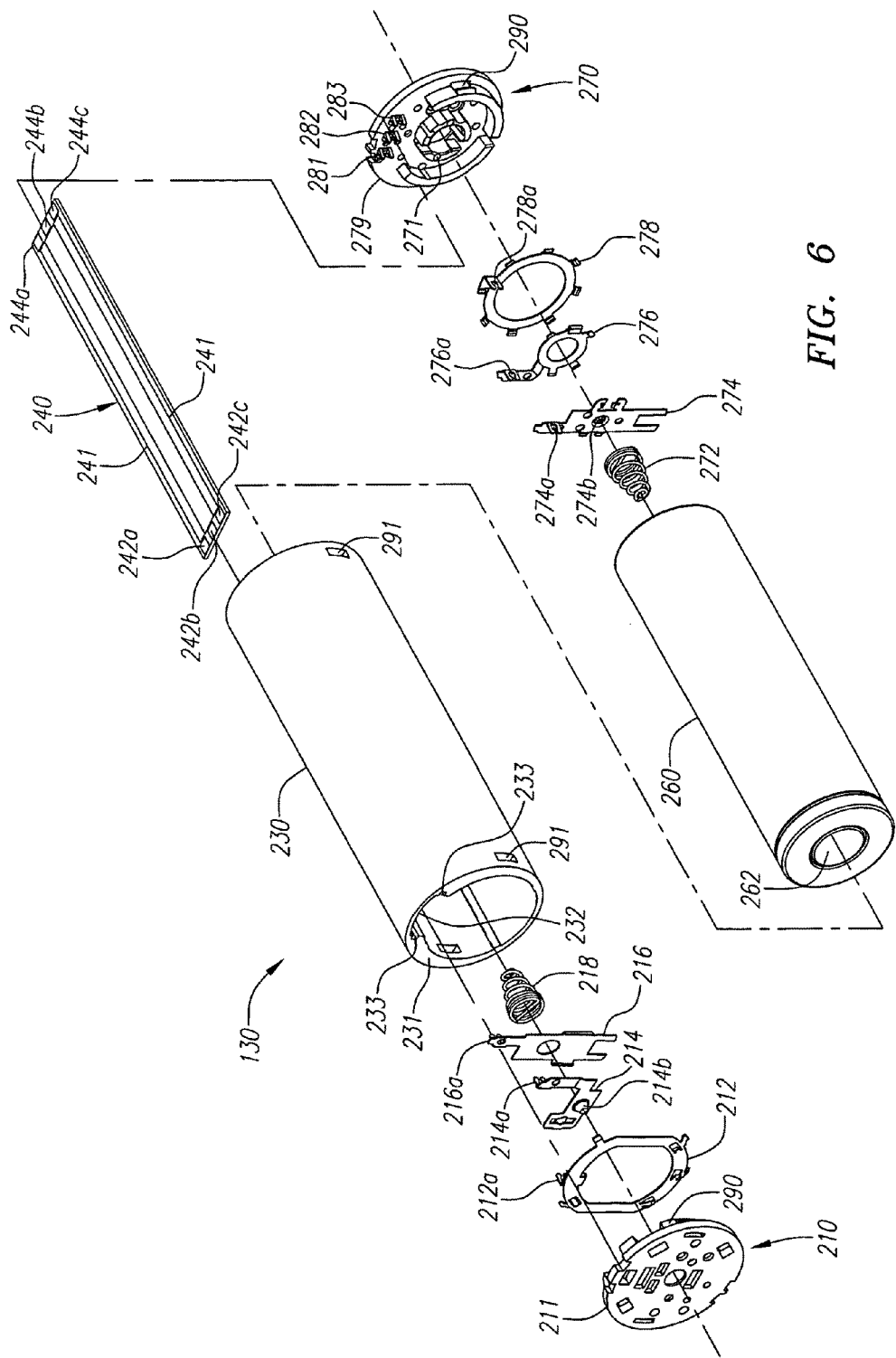
FIG. 6 is an exploded perspective view of a rechargeable battery pack.
Figure 7:
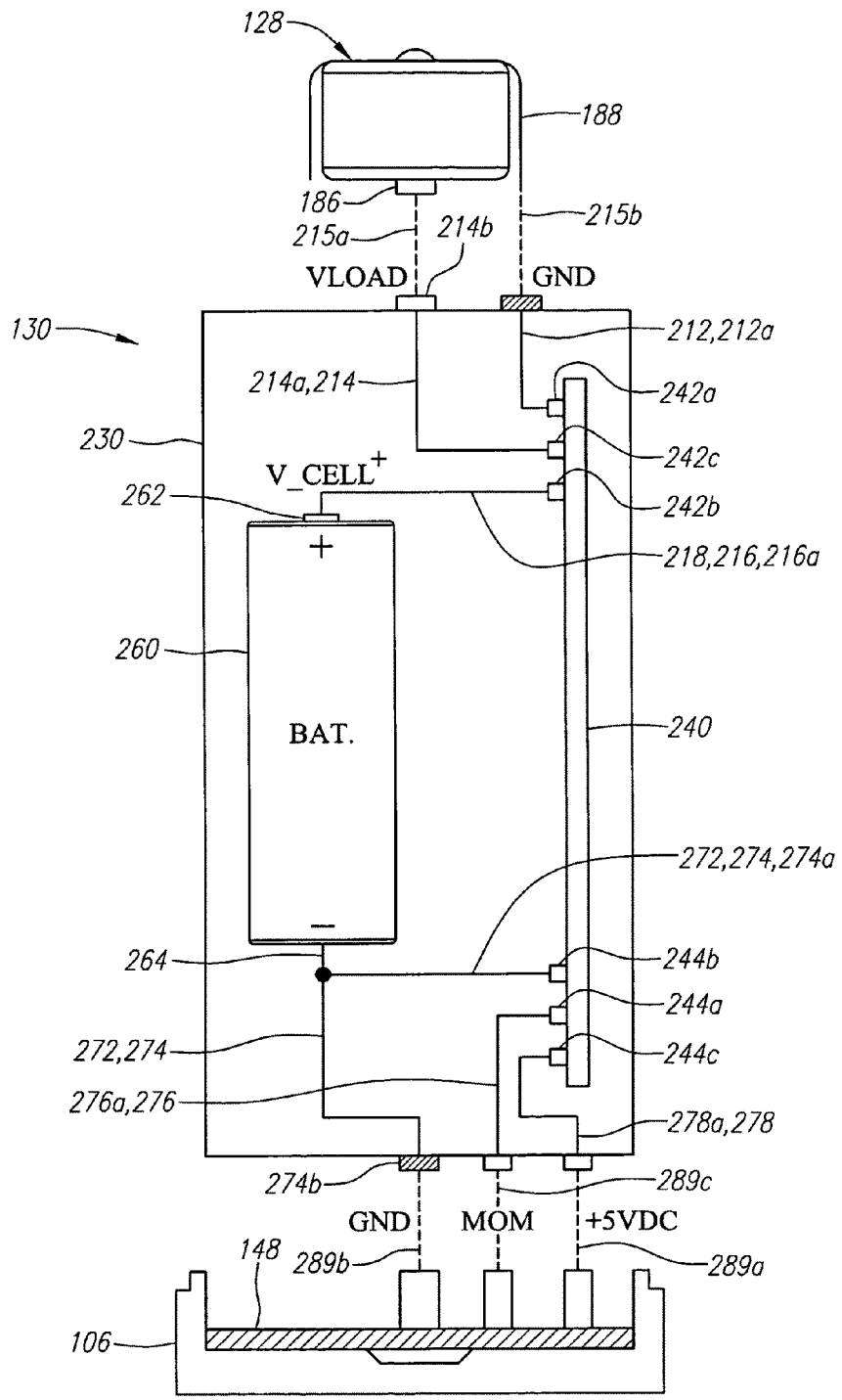
FIG. 7 is a schematic diagram illustrating the internal and external electrical connections of the battery pack of FIG. 6.

Referring now to FIGS. 5A, 6 and 7, the rechargeable battery pack 130 is now further described. In general, battery pack 130 preferably includes a rechargeable battery, a circuit board containing electronics such as recharging circuit and/or circuits for other functions and contacts to electrically connect battery pack 130 to the rest of the flashlight 100 or other lighting device. As such, battery pack 130 may generally represent a self-contained unit that may be inserted into battery compartment 127 of barrel 124 along with the other components shown in FIG. 5A. It is also preferred that battery pack 130 provides protection for the electronics and other components therein.

As shown in FIG. 6, battery pack 130 includes front or lamp end cap assembly 210, battery housing 230, assembled circuit board 240, battery 260 and rear or tail cap assembly 270. These components are discussed in turn below.

In the present embodiment, front or lamp end cap assembly 210 includes front end cap 211, outer ring top contact 212, universal positive top contact 214, positive top contact 216 and battery pack spring 218. Each contact 212, 214, 216 preferably includes a circuit board clip as shown by clips 212a, 214a, 216a. When assembled, outer ring top contact 212 is located on the outside or forward side of front end cap 211, while contacts 214, 216 and battery pack spring 218 are located on the inside or rear side of front end cap 211.

Front end cap assembly 210 is preferably manufactured in a manner that reduces the number of steps needed to assemble its components. To this end, front end cap 211 may be formed by injection molding from a plastic or other suitable material. This injection molding process preferably includes the co-molding of one or more of contacts 212, 214, 216 along with end cap 211. That is, contacts 212, 214, 216 may be positioned in the injection molding machine so that they become encompassed or otherwise held in place relative to each other by the injected material as it solidifies. Thus, the contacts are preferably located in the injection molding machine so that they end up in the appropriate positions to form end cap assembly 210 and the relevant parts of the electrical path as described later. Contacts 212, 214, 215 may also include circuit board clips similar to that of the contacts included in the front end cap 211. Though the foregoing co-molding process is preferred, front end cap 211 and contacts 212, 214, 216 may be assembled by other suitable means. Thereafter, spring 218 may be press fitted between a plurality of retaining walls provided on the rear side of front end cap 211, like the retaining walls 271 shown in FIG. 6 on rear end cap 279.

After front end cap assembly 210 is assembled, it may be press fit into the front or lamp end of housing 230. Preferably end cap 211 and housing 230 are provided with mutually cooperating features to lock end cap 211 to housing 230. Such features may include for example opposing tabs 290 and holes 291. Other embodiments may employ other suitable means.

Rear or tail end cap assembly 270 of the present embodiment includes battery pack spring 272, bottom negative contact 274, inner ring contact 276, outer bottom ring contact 278 and rear end cap 279. Each contact 274, 276, 278 may include a circuit board clip as shown by clips 274a, 276a, 278a. When assembled, battery pack spring 272 and bottom negative contact 274 may be located on the forward or inner side of end cap 279, while inner ring contact 276 and outer bottom ring contact 278 may be located on the rear or outer side of end cap 279.

Rear end cap 279 and one or more of contacts 274, 276, 278 may be co-molded as described above, so that the contacts are appropriately located relative to each other to form end cap assembly 270 and the relevant parts of the electrical path described later. Alternatively, contacts 274, 276, 278 may be assembled by other suitable means. Thereafter, spring 272 may be press fitted between a plurality of retaining walls 271 provided on the forward side of rear end cap 279.

When rear end cap assembly 270 is assembled, it may be press fit into the rear or tail cap end of housing 230. Preferably rear end cap 279 and housing 230 are provided with mutually cooperating features to lock rear end clip 279 to housing 230 such as opposing tabs 290 and holes 291. This may occur through tabs, on rear end housing 270 that correspond to holes in housing 230, or by other suitable means.

Front end cap 211 and rear end cap 279 may also include electrical contact guides that are located on the inner side of each end cap 211, 279. FIG. 6 shows guides 281, 282, 283 on the inner side of rear end cap 279. Though not shown in FIG. 6, front end cap 211 may include guides 281, 282, 283 on its inner surface. As discussed later, these guides provide structural support to and help position circuit board clips 212a, 214a, 216a, 274a, 276a, and 278a of the electrical contacts 212, 214, 216, 274, 276, 278 so that the clips properly engage assembled circuit board 240. Guides 281, 282, 283 may be formed contiguously with end caps 211, 279 during the injection molding process, or may be attached to the end cap by other suitable means.

Battery housing 230 preferably has an outer diameter to fit within the inner diameter of flashlight barrel 124. Though battery housing 230 and battery pack 130 depicted in the figures are cylindrical to accommodate flashlight barrel 124, battery pack 130 may be configured in other shapes to accommodate different types of lighting device housings, e.g., square or rectangular lanterns.

As shown in FIG. 6, housing 230 preferably includes a wall 231 of suitable thickness that extends around its circumference or perimeter. The thickness of wall 231 is preferably sufficient to provide structural integrity to the overall battery pack 130 and thereby protect the electronics and other contents contained therein. Similarly, housing 230 is preferably constructed of a plastic or other sufficiently strong material that provides such protection.

Wall 231 preferably includes recess 232 which may extend axially along the length of housing 230. Recess 232 may include grooves or notches 233 that may also extend axially along the length of housing 230. Recess 232 and notches 233 are preferably configured to receive assembled circuit board 240, such as by a slip fit.

Because assembled circuit board 240 is contained within housing 230, battery 260 is located off-center in the present embodiment to conserve space. This may be seen in FIG. 6 by the variation in the thickness of wall 231 of housing 230. As shown, the thickness of wall 231 increases near the location where assembled circuit board 240 is located. The additional thickness allows recess 232 and notches 233 to be formed in wall 231. This additional thickness also permits the inner surface of wall 231 to be cylindrical to correspond with the outer surface of battery 260 and provide for a snug fit. And as shown, the outer surface of housing 230 is also cylindrical to correspond with the inner diameter of flashlight barrel 124.

As noted above, in other embodiments, battery pack 130 may be formed in non-cylindrical configurations to accommodate non-cylindrical lighting devices. If so, housing 230 and its wall 231 may be differently configured to accommodate a battery circuit board 240 as well as the shape of such alternate lighting devices.

The active area of assembled circuit board 240, i.e., that part of assembled circuit board 240 which generally contains the electronics, preferably does not extend to the board edge areas 241. When assembled circuit board 240 is fitted within housing 230, edge areas 241 preferably fit within notches 233 thereby securing assembled circuit board 240 within housing 230.

Assembled circuit board 240 includes front electrical contacts 242a, 242b, 242c and rear electrical contacts 244a, 244b, 244c. When battery pack 130 is assembled, these electrical contacts are electrically coupled to the circuit board clips included on each contact of the front and rear end cap assemblies 210, 270 to form part of the conductive path of battery pack 130. More specifically the following circuit board clip/circuit pad connections are formed in battery pack 230 of the present embodiment: 212a/242a, 216a/242b, 214a/242c and 276a/244a, 274a/244b and 278a/244c. As shown in FIG. 6, each circuit board clip comprises prongs that grip the assembled circuit board 240. Guides 281, 282, 283 (and similar guides on the inner side of front end cap guides on the inner side of front end cap 211) may help position and support the tabs to ensure that these electrical connections are made and that the circuit board clips are not damaged.

The electrical conductive paths of battery pack 130 are now described with reference to FIGS. 6 and 7. As shown, rechargeable battery 260 includes positive terminal 262 and negative terminal 264.

Positive terminal 262 is coupled to assembled circuit board 240 through battery pack spring 218, positive top contact 216 and circuit board clip 216a that is formed as part of positive top contact 216. Circuit board clip 216a is preferably coupled to contact pad 242b on assembled circuit board 240. (It should be noted that in FIG. 7, the reference numerals do not show the physical components but instead are used to schematically indicate the electrical connection provided thereby.)

This positive path continues on circuit board 240 to contact pad 242c which is coupled to circuit board clip 214a that is formed as part of universal positive top contact 214. This path extends through contact 214 to the top positive central contact 214b; in the present embodiment, a knub that may be formed as part of contact 214. Knub 214b preferably extends to the exterior of battery pack 130 and forms the positive electrode which contacts the positive compressible contact 133 of the lamp module 128. This connection is represented as dotted line 215*a* in FIG. 7.

The heat sink housing 188 of lamp module 128 is then grounded to battery pack 130 through shoulder ring 126 which is in turn in contact with the outer ring top contact 212 forming the negative electrode of battery pack 130. This connection is represented by dotted line 215*b* in FIG. 7. Circuit board clip 212*a* then is coupled to contact pad 242*a* on assembled circuit board 240.

The negative terminal 264 of battery 260 may be electrically coupled to assembled circuit board 240 through battery pack spring 272, bottom negative contact 274 and circuit board clip 274*a* that is formed as part of contact 274. Circuit board clip 274*a* preferably extends through guide 282 and engages contact pad 244*b* on assembled circuit board 240.

Further, knub 274*b* of bottom negative contact 274 extends to the exterior of battery pack 130 and forms a negative electrode or a knub 274*b* for making external contact with the ground contact pad on the circuit board 148 through contact pin 136 and pin spring 142. This connection is represented by the dotted line shown as 289*b* in FIG. 7.

An electrical path for the momentary switch may also extend from assembled circuit board 240 to the switch and tail cap assembly 106 as follows. Electrical contact pad 244*c* on assembled circuit board 240 is coupled to circuit board clip 278*a* that is formed as part of outer bottom ring contact 278 and that extends through guide 283. Outer ring contact 278 forms the external positive charging contact for battery pack 130. It is coupled to the +5VDC contact pad on circuit board 148 contained within the switch and tail cap assembly 106 through contact pad 140 and pin spring 146. This circuit path is represented by dotted line 289*a* in FIG. 7.

Another electrical path extends from assembled circuit board 240 as follows. Electrical contact pad 244*a* on assembled circuit board 240 is coupled to circuit board clip 276*a* that is formed as part of inner ring contact 276. Inner ring contact 276 may then be coupled to the MOM circuit pad on circuit board 148 contained within the switch and tail cap assembly 106 through contact pin 138 and pin spring 144. This electrical path couples the momentary switch to the assembled circuit board 240.

The electrical circuits of flashlight 100 and the functions they serve are now further described. The electrical circuits of flashlight 100 include a main power circuit to power the light source 101, a controller circuit for powering the controller and other electronics on assembled circuit board 240 and a charging circuit for recharging rechargeable battery 260.

The main power circuit for the light source extends from positive electrode 262, through spring 218, positive top contact 216, circuit board clip 216*a*, contact pad 242*b*, assembled printed circuit board 240, contact pad 242*c*, circuit board clip 214*a*, universal positive contact 214 to the LED or other light source through the circuit path described above represented by dotted line 215*a*. The LED or other light source is then grounded to battery pack 130 via the negative electrode formed by outer ring top contact 212 through the circuit path described above represented by dotted line 215*b*. The circuit then extends through circuit board clip 212*a*, contact pad 242*a*, assembled printed circuit board 240, contact pad 244*b*, circuit board clip 274*a*, bottom negative contact 274, and spring 272 to negative terminal 264 of rechargeable battery 260.

This circuit differs from circuits found in certain existing flashlights, in that it is generally self-contained within the battery pack. For example, certain existing flashlights use the barrel as part of the grounding connection in the circuit used to power the light source. However, the main power circuit of the current embodiment does not rely on an electrical path that includes the barrel, head, or tail cap as part of the main power circuit to power light source 101. This is advantageous because where the barrel is used to complete the circuit, a manufacturing step is typically required to remove or machine the barrel surface to provide a good conductive path. However, the self-contained nature of the power circuit of the current invention avoids any such step which may reduce manufacturing costs and complexity.

The circuit to power the controller of assembled circuit board 240 may extend from positive electrode 262, through spring 218, positive top contact 216, circuit board clip 216*a* and contact pad 242*b* of assembled circuit board 240 where it may be directed as necessary. The return ground path to the negative electrode of battery 260 includes contact pad 244*b*, circuit board clip 274*a*, bottom negative contact 274 and spring 272 to negative electrode 264. This circuit is also advantageous in that the circuit needed to power assembled circuit board 240 is provided completely within battery pack 130 and does not require an external circuit path which could add further cost and manufacturing complexity.

The high side of the circuit to recharge battery 260 extends from positive charging ring 190, to coil spring 156, 158, printed circuit board 148, pin spring 146, contact pin 140, into battery back 130 via outer bottom ring contact 278, and then through circuit board clip 278*a*, contact pad 244*c*, assembled circuit board 240, contact pad 242*b*, circuit board clip 216*a*, positive top contact 216, spring 218 and finally to positive terminal 262 of battery 260. The circuit may then return from negative terminal 264 of battery 260 to spring 272, bottom negative contact 274 to contact pin 136 via knub 274*b*, pin spring 142, circuit board 148, wave springs 150, 158, ground charge ring 192.

When battery pack 130 is installed into battery compartment 127 of barrel 124, a completed electrical path for the light source 101 (or electrical load) may be formed from the positive terminal of rechargeable battery 260 through the input pad 242*b* on assembled circuit board 240 as described above. The input pad 242*b*, which corresponds to V_CELL+ in FIG. 7, is coupled to load switches 558, 572 (see FIGS. 9B, 9C) on assembled circuit board 240. When load switches 558, 572 are closed (or conductive), output pad 242*c* on the assembled circuit board 240 is energized. Because output pad 242*c* is coupled to the top positive central contact 214*b* of battery pack 130, current passes from top positive central contact 214*b* of battery pack 130 to positive contact 133 of lamp module 128 and through the light source. This electrical path then extends from heat sink housing 188 of lamp module 128 to the outer ring top contact 212 of battery pack 130. The outer ring top contact 212 of battery pack 130 is electrically coupled to the negative electrode 264 of the rechargeable battery 260 as described above.

Figure 8:
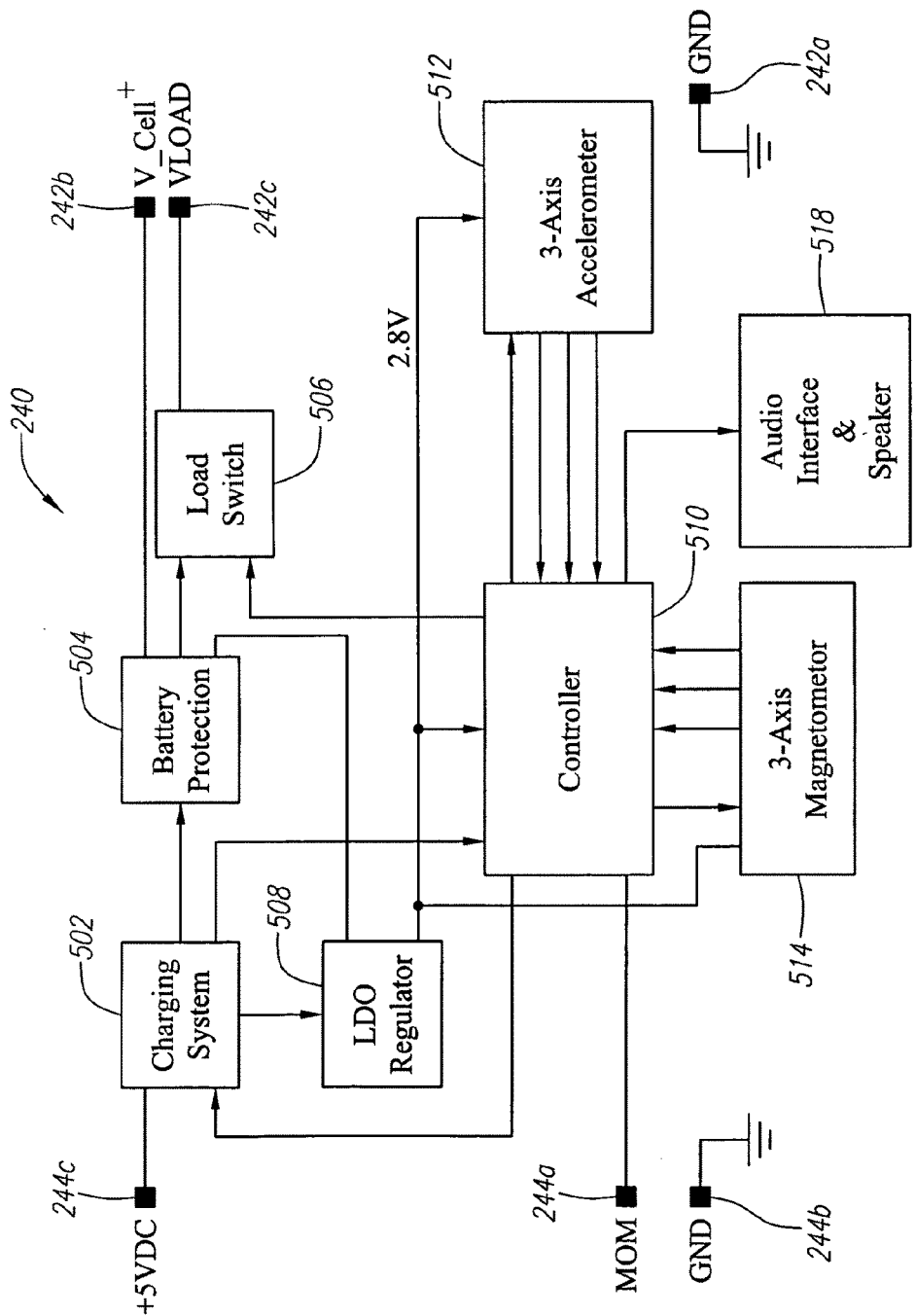
FIG. 8 is a circuit diagram illustrating the relationship between the electronic circuitry according to one embodiment of the invention.

FIG. 8 is a block diagram illustrating the relationship of the electronic circuitry of a preferred embodiment of assembled circuit board 240 for a portable lighting device such as the flashlight illustrated and discussed in connection with FIGS. 1-7. However, the circuitry and motion sensitive user interface provided thereby may be employed in flashlights other than flashlight 100 as well as other portable lighting devices such as head lamps or lanterns. Assembled circuit board 240 preferably includes charging system 502, battery protection circuit 504, MOSFET driver and load switch circuit 506, LDO linear regulator circuit 508, controller circuit 510, accelerometer circuit 512, and magnetometer circuit 514. In other embodiments, one or more of these components may be omitted if its functionality is not desired in the particular application of the invention.

As indicated above, the assembled circuit board 240 includes electrical contacts, preferably in the form of I/O pads. As reflected in the detailed circuit schematics of assembled circuit board 240 shown in FIGS. 9A-G, the I/O pads may include +5VDC 244c, MOM 244a, bottom GND 244b, V_CELL+ 242b, VLOAD 242c, and top GND 242a.

Figure 9A:
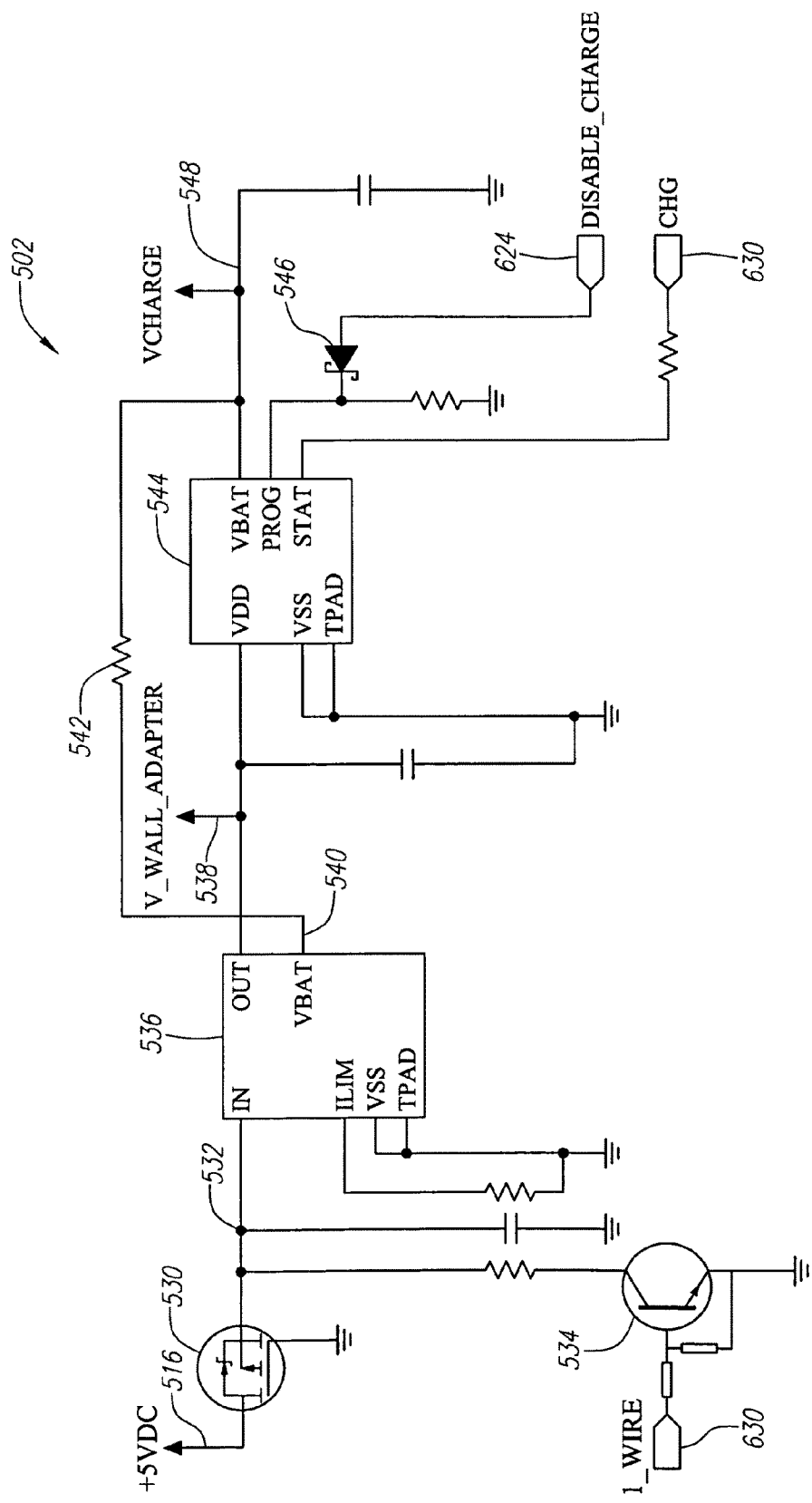
FIGS. 9A-G are schematic circuit diagrams of different components of the circuit shown in FIG. 8.

FIG. 9A shows a circuit schematic diagram of charging system 502. The +5VDC signal line 516 may be electrically coupled to +5VDC input pad 244c on assembled circuit board 240 of battery pack 130. As previously mentioned, the +5VDC input pad 244c may be electrically coupled to charging ring 166. The +5VDC signal line 516 is coupled to p-channel metal-oxide-semiconductor field-effect transistor (PMOS) 530.

The gate of PMOS 530 may be coupled to ground so that PMOS 530 may turn on if the +5VDC I/O pad 516 is coupled to a positive voltage supply such as a charging cradle. If the +5VDC I/O pad 516 is coupled to a negative voltage supply accidentally, such as where flashlight 100 is placed in the charging cradle in reverse, PMOS 530 will be turned off to protect the remainder of the circuitry on assembled circuit board 240 from reverse polarity damage.

Source 532 of PMOS 530 may be coupled to charge protection circuit 536 to provide protection to battery 260 in battery pack 130 from failures due to charging circuit 544, which will be described in more detail later.

Signal line 532 may be coupled to the collector of a bipolar transistor 534 while the base of the bipolar transistor 534 may be coupled to signal line 1_WIRE 630, which in turn is an output of controller circuit 510.

Charge protection circuit 536 may include output V_WALL_ADAPTER 538, which may be coupled to charging circuit 544.

Charge protection circuit 536 may be used to continuously monitor input voltage +5VDC 516, the input current, and battery voltage 540. In the case where an excessive input voltage may be experienced, e.g., where flashlight 100 is placed in a charging cradle that provides a +12V DC input, charge protection circuit 536 may remove power from charging circuit 536 by turning off an internal switch in charge protection circuit 536. In case of an excessive current situation, charge protection circuit 536 may limit the system current at a threshold value. If the excessive current situation persists, charge protection circuit 536 may switch the pass element OFF after a blanking period.

In a preferred embodiment, a commercially available device, e.g., BQ24314 manufactured by Texas Instruments, may be used to protect against excessive voltage and current, as well as protect the battery charger front-end.

Charging circuit 544 may be powered by V_WALL_ADAPTER 538 and may be used for charging rechargeable battery 260 located within battery pack 130. In charging system 502, charging circuit 544 may include current-sensitive circuitry and thermal-regulation circuitry to limit the charge current. Charging circuit 544 may have an output, VCHARGE 538, which may eventually couple to the positive electrode of rechargeable battery 260.

In a preferred embodiment, a commercially available stand-alone charge manager controller, e.g., MCP73832 manufactured by Microchip Technology, may be used.

Signal line DISABLE CHARGE 624 from controller circuit 510 may be used to disable charging circuit 544. In this situation, V_WALL_ADAPTER 538 displays a high impedance so that flashlight 100 communicates with an external charging cradle through signal line 1_WIRE 630 and +5VDC 516.

Signal line CHG 630 may be used to indicate the charging status which information may be used by controller circuit 514. When an overpower situation is detected, although charge protection circuit 536 may be used to protect the components on assembled circuit board 240 from further damage, it would be advantageous to transmit this information to the charging cradle.

In the present embodiment, when an overpower situation is detected, controller 602 may utilize signal line 1_WIRE 630 to send sequential signals to the charging cradle as a warning sign. Signal line 1_WIRE 630 may be pulled high by controller 602 so that the collector of NPN bipolar transistor 534 may be pulled low. Therefore, signal line 530 as well as +5VDC 516 may be pulled low. In accordance, +5VDC 516 may be converted from a power input line to a signal output line, from the flashlight's point of view. When a high signal on +5VDC is desired, signal line 1_WIRE 630 may be pulled low by controller 602 so that the collector of NPN bipolar transistor 534 as well as signal line 530 will no longer be pulled low. Therefore, controller 602 may treat +5VDC 616 as a serial port for sending a sequence of high or low signals.

The battery voltage may also be monitored by charge protection circuit 536 at signal line 540 which is fed back from VCHARGE 548.

Charging systems other than charging system 502 described above may also be used.

Figure 9B:
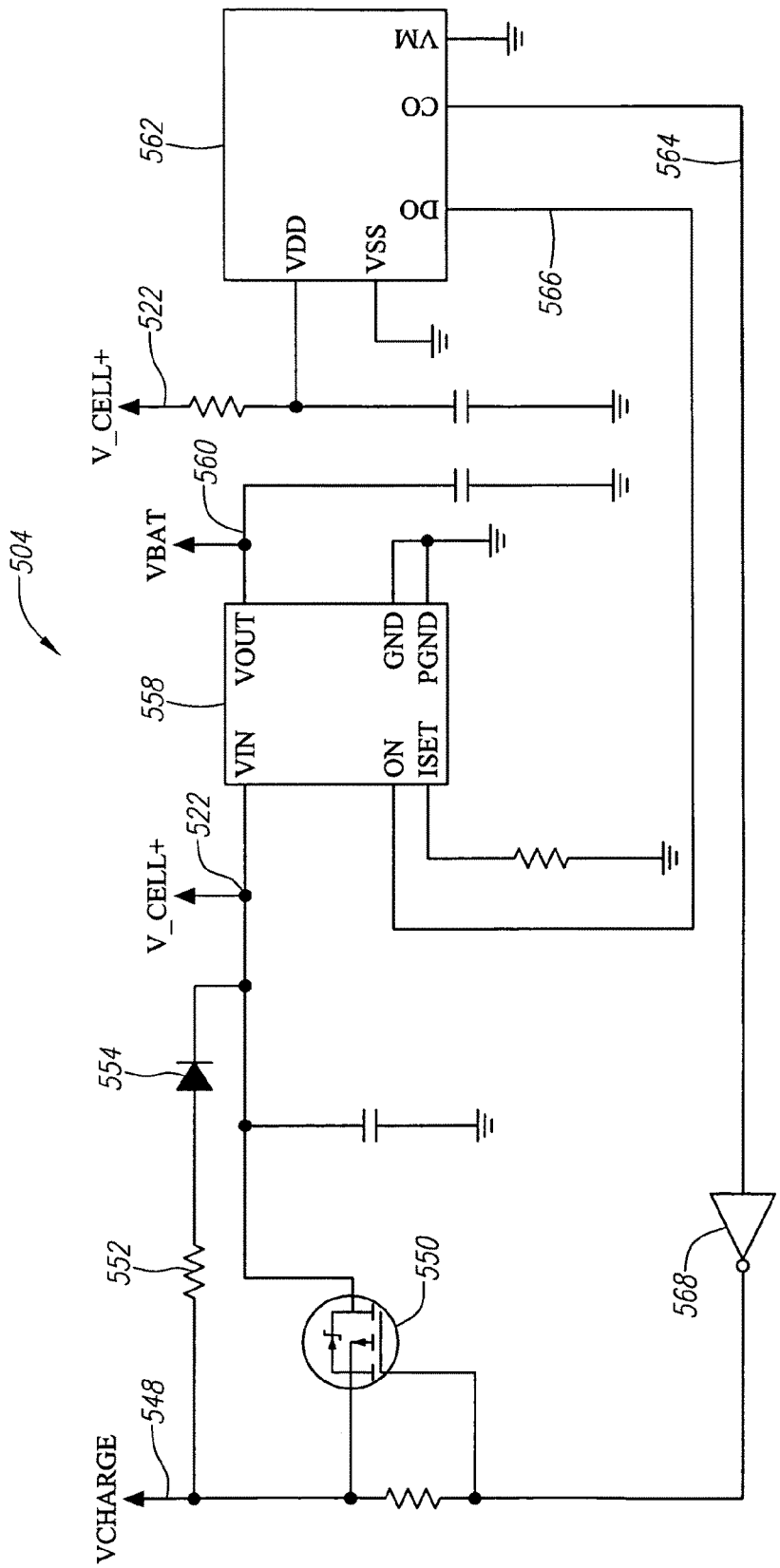

FIG. 9B shows a circuit schematic diagram of battery protection circuit 504. Battery protection circuit 504 may include an input, VCHARGE 548, which extends from charging system 502 in the present embodiment. This input signal line, VCHARGE 548, is coupled to the source of a PMOS 550. The gate of PMOS 550 is coupled to input signal line VCHARGE 548 through a resistor. Also the gate of PMOS 550 may be driven by an internal signal line CO 564 through an inverter 568. The drain of PMOS 550 may be coupled to a signal line V_CELL+ 522 which may be further coupled to I/O pad V_CELL+ 242b on assembled circuit board 240. As described above, I/O pad V_CELL+ 242b is coupled to the positive electrode of rechargeable battery 260 in the battery pack 130. Signal line V_CELL+ 522 may also be driven by signal line VCHARGE 548 via a diode 554.

Signal line V_CELL+ 522 is coupled to an input of load switch 558 while the output of load switch 558 is coupled to internal voltage supply signal VBAT 560 which in turn is coupled to the positive contact 133 of lamp module 128 through signal line VLOAD 524 (shown in FIG. 9C) and I/O pad VLOAD 242c. When a short circuit is detected on the load, for example, lamp module 128, load switch 558 will turn off to protect the circuit. In a preferred embodiment, a commercially available load switch, e.g., FPF2163 manufactured by Fairchild Semiconductor, may be used.

Voltage protection circuit 562 may be used to further protect rechargeable battery 260 in battery pack 130 from over charging, over discharging or from excessive current. In one embodiment, a commercially available voltage protection circuit, e.g., S-8241ABSPG manufactured by Seiko Instruments, may be used.

Battery protection circuits other than battery protection circuit 504 described above may also be employed.

Figure 9C:
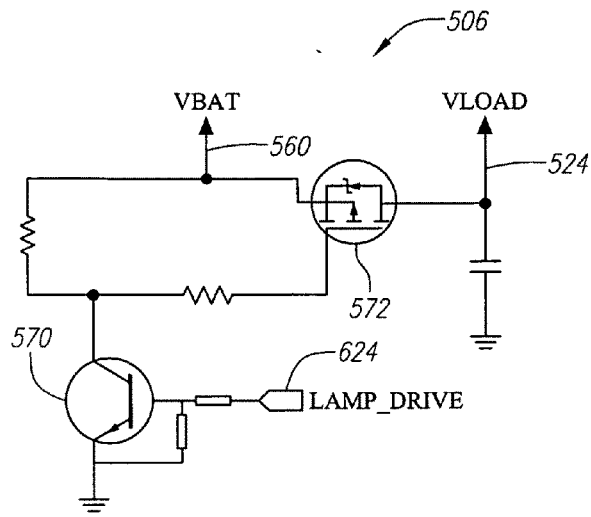

FIG. 9C shows a circuit schematic diagram of a preferred MOSFET driver and load switch circuit 506. In the embodiment of FIG. 9C, load switch circuit 506 is implemented by PMOS 572 which may have a source coupled to the internal voltage supply signal VBAT 560 from battery protection circuit 504, and a drain coupled to signal line VLOAD 576. Signal line VLOAD 524 is coupled to I/O pad VLOAD 242c of assembled circuit board 240. As previously described, the I/O pad VLOAD 242c is coupled to the top central contact 214b of battery pack 130 and may then be coupled to the compressible positive contact 133 of lamp module 128.

The gate of PMOS 572 may be coupled to a MOSFET driver, which may be implemented by an NPN bipolar transistor 570. The gate of PMOS 572 may also be pulled high to internal voltage supply signal VBAT 560 by resistors. In accordance, when the base of bipolar transistor 570 is driven high by signal LAMP_DRIVE 624, bipolar transistor 570 conducts as does PMOS 572. Therefore, electric power may flow from internal voltage supply VBAT 560 to voltage output pad VLOAD 242c to form a portion of a complete loop of electric current that may turn on lamp module 128.

In other embodiments, controller 510 may directly drive load switch 572. Additionally, other forms of driver circuits may be employed. Similarly, other types of load switches may be employed for load switch 506. In general, load switch 506 should be an electronic switch of some form such as a field effect transistor or a bi-polar junction transistor.

Figure 9D:
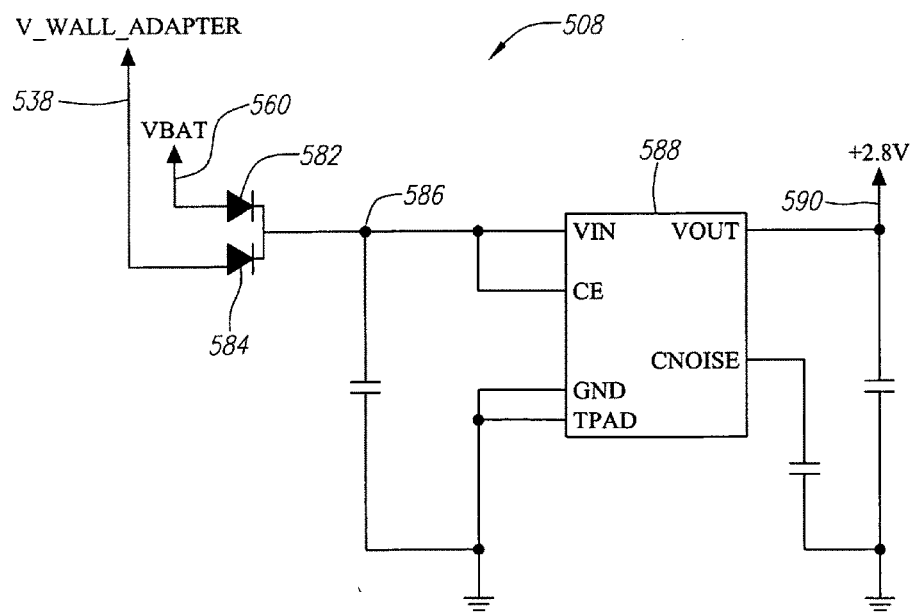

FIG. 9D shows a circuit schematic diagram of a preferred low dropout (or LDO) linear regulator circuit 508. LDO linear regulator circuit 508 may include a low dropout regulator 588, which may be implemented by a DC linear voltage regulator operated with a small input-output differential voltage. Signal line 586 forms an output from two diodes 582, 584 which is driven by signal lines V_WALL_ADAPTER 538 and VBAT 560, respectively. This configuration preferably allows the higher voltage from signal lines V_WALL_ADAPTER 538 or VBAT 560 to supply low dropout regulator 588.

In a preferred embodiment, the output of low dropout regulator 588 may be set to +2.8V on output line 590 to be used as a power supply source to other components, e.g., controller circuit 514, accelerometer 512, and magnetometer 514. In a preferred embodiment, a commercially available LDO regulator, e.g., NCP700 manufactured by ON Semiconductor, may be used.

Linear regulator circuits other than linear regulator circuit 508 described above may also be employed.

Figure 9E:
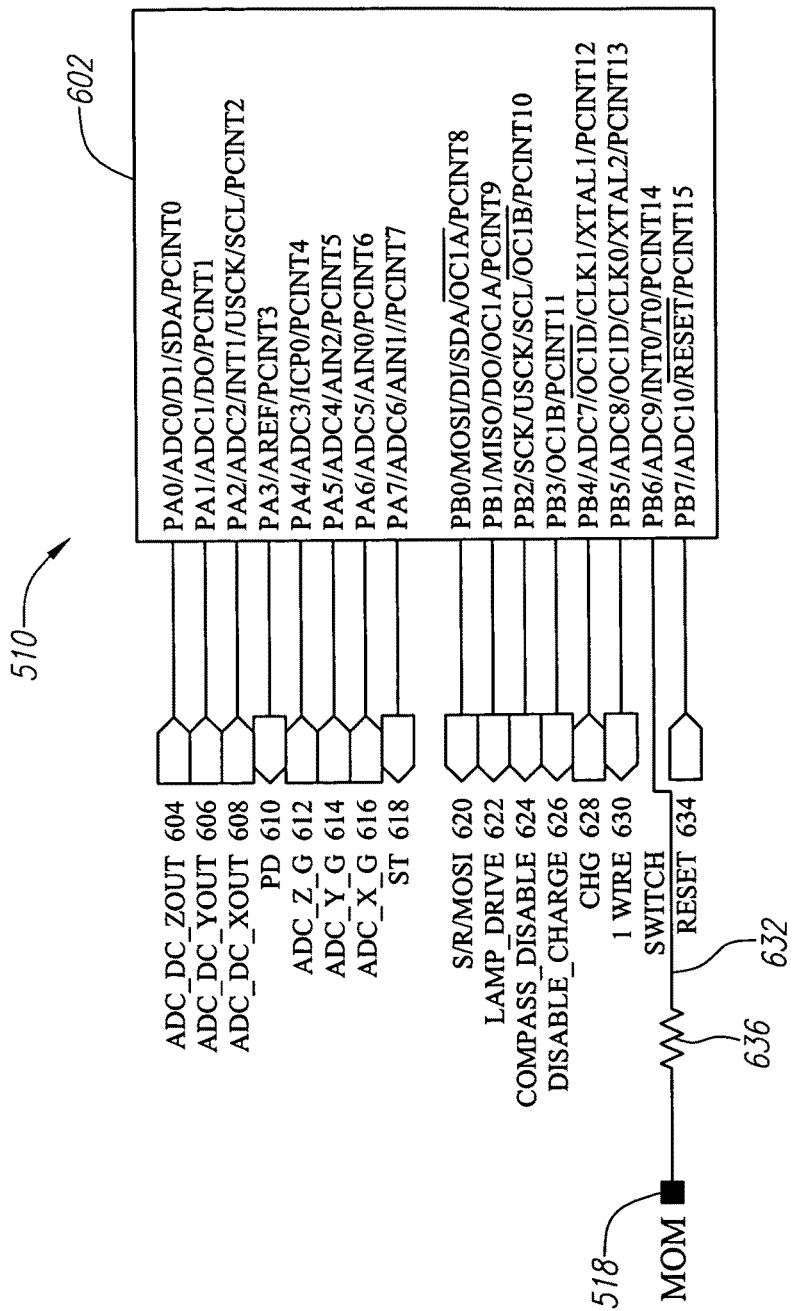

FIG. 9E is a schematic diagram of a preferred controller circuit 510. Controller circuit 510 may include a controller 602 having input and output connections. Controller 602 may receive input signals through signal lines ADC_DC_XOUT 608, ADC_DC_YOUT 606, ADC_DC_ZOUT 604, ADC_X-G 612, ADC_Y-G 614, ADC_Z-G 616, CHG 628 and RESET 634. Controller 602 may also deliver output signals through signal lines PD 610, ST 618, SW_ON 630, S/R/MOSI 620, LAMP_DRIVE_MISO 622, DISABLE_COMPASS 624, CHARGE_DISABLE 626 and 1_WIRE 630. The power supply VCC (not shown) of controller 602 is supported by the +2.8V power supply signal provided by output line 590 of the LDO regulator 508.

In a preferred embodiment, controller 602 is commercially available microcontroller having embedded memory, e.g., ATtiny861 which is an 8-bit microcontroller manufactured by Atmel Corporation. In another embodiment, controller 602 may be a microprocessor. Yet in other embodiments, controller 602 may be discrete circuits. Those skilled in the art will understand that other types of controller circuits may also be employed.

Figure 9F:
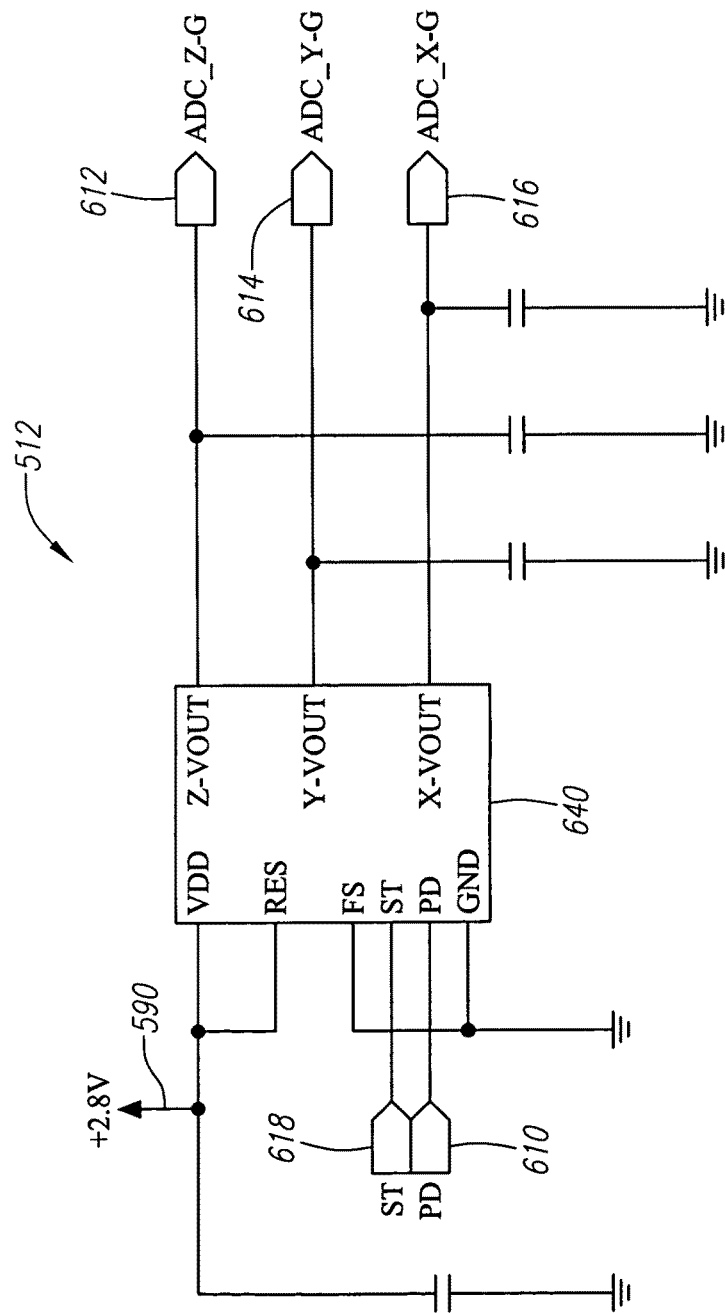

FIG. 9F shows a circuit schematic diagram of a preferred exemplary accelerometer circuit 512. Accelerometer circuit 512 is preferably a 3-axis accelerometer. However, in other embodiments a single axis or a two axis accelerometer may be used. Accelerometer circuit 512 of the preferred embodiment includes outputs ADC_X-G 616, ADC_Y-G 614 and ADC_Z-G 612 corresponding to signals representing movement in each of the x, y, and z directions. These three signals are coupled to controller circuit 510 for further processing.

Accelerometer circuit 512 preferably includes an inertial sensor 640 that receives information from internal sensing elements and provides analog signals. In other embodiments inertial sensor 640 may convert the analog signals it generates to digital signals. Inertial sensor 640 is used in the present embodiment to measure the Earth's static gravitational field by providing acceleration information in three axes, e.g., mutually orthogonal axes, namely X, Y and Z. The power supply VDD of 3-axis accelerometer circuit 512 may be supported by the +2.8V power supply signal on output line 590 from LDO regulator 508.

If the Z axis of inertial sensor 640 is pointing towards the center of the Earth, then X and Y will have an acceleration of zero. Z, however, will experience an acceleration of −1G due to the gravity of the Earth. If inertial sensor 640 was flipped 180° so that Z is pointing away from the Earth, X and Y will remain at zero, but Z will have an acceleration of +1G.

Inertial sensor 640 is attached to assembled circuit board 240 so that the X, Y and Z axes are fixed relative to flashlight 100. In a preferred embodiment, inertial sensor 640 is oriented on board 240 so that the Y axis extends along the longitudinal axis of flashlight 100. As such, when flashlight 100 is positioned horizontally, the Y axis also extends horizontally. In this position, when X and Z are rotated left or right about the longitudinal axis of the flashlight 100, corresponding gravity information on X and Z will be sent to controller 602 through ADC_X-G 616 and ADC_Z-G 612, respectively, as the magnitudes of the acceleration in the X and Z axes change during rotation. Relative angular rotation may, therefore, be computed by controller 602. Controller 602 may use the information on ADC_X-G 616 and ADC_Z-G 612 to determine whether there is a rotation about the longitudinal axis of flashlight 100, and in which direction.

In a preferred embodiment, the switch for flashlight 100 is located in switch and tail cap assembly 106. When the switch is initially activated, the starting orientation of the X and Z axes are unknown to controller 602. Thus, controller 602 calculates a starting angle or position based on measurements of the Earth's gravitational field in the X and Z axes in the starting orientation. Once their starting orientation is established, subsequent angular measurements may be made to track the rotation of flashlight 100. To this end, measurements may be made to determine whether the angle is increasing or decreasing relative to the starting orientation so as to calculate rotational changes.

In another embodiment, the two axes of the portable lighting device may be known. For example, in a flashlight with a push button switch, the starting position of both the X and Z axes would be known, assuming that the switch is pointing up as dictated by the shape of a user's hand with the thumb above the switch. In this case, only one axis (either the X or Z) may be used to calculate rotational changes, and hence a single axis accelerometer could be used.

In both embodiments above, it is preferred that flashlight 100 be positioned approximately horizontally for the user to obtain higher resolution when rotating, i.e., better sensing of the rotation of the X and Z axes. As the Y axis tilts farther from horizontal, rotational errors may occur. Thus, in operation, it is preferred that flashlight 100 be held to +/−30° from horizontal. If the tilting is greater than 30°, it is preferred that the Y axis be monitored and the rotational input ignored until flashlight 100 is tilted back within the +/−30° window. In other implementations, however, more sophisticated vector calculations may be employed so that the 3 axis are combined such that the user's intent may be determined regardless of the horizon.

Inertial sensor 640 may include an input, PD 610, which may be an output from controller circuit 514. PD 610 may be used as an indication that there is no need for the inertial sensor 640 to operate by pulling PD 610 low. When PD 610 is pulled low, inertial sensor 640 may stay in a power down situation. This configuration may be used to save battery power. The inertial sensor 640 may also include an input ST 618 which may be an output from controller circuit 514 to indicate that a self-test is desired.

In a preferred embodiment, inertial sensor 640 may be a commercially available micro-electro-mechanical systems (MEMS), e.g., LIS394AL, which is a 3-axis accelerometer manufactured by ST Microelectronics. Those skilled in the art will appreciate that other types of inertial sensor circuits may also be employed.

Figure 9G:
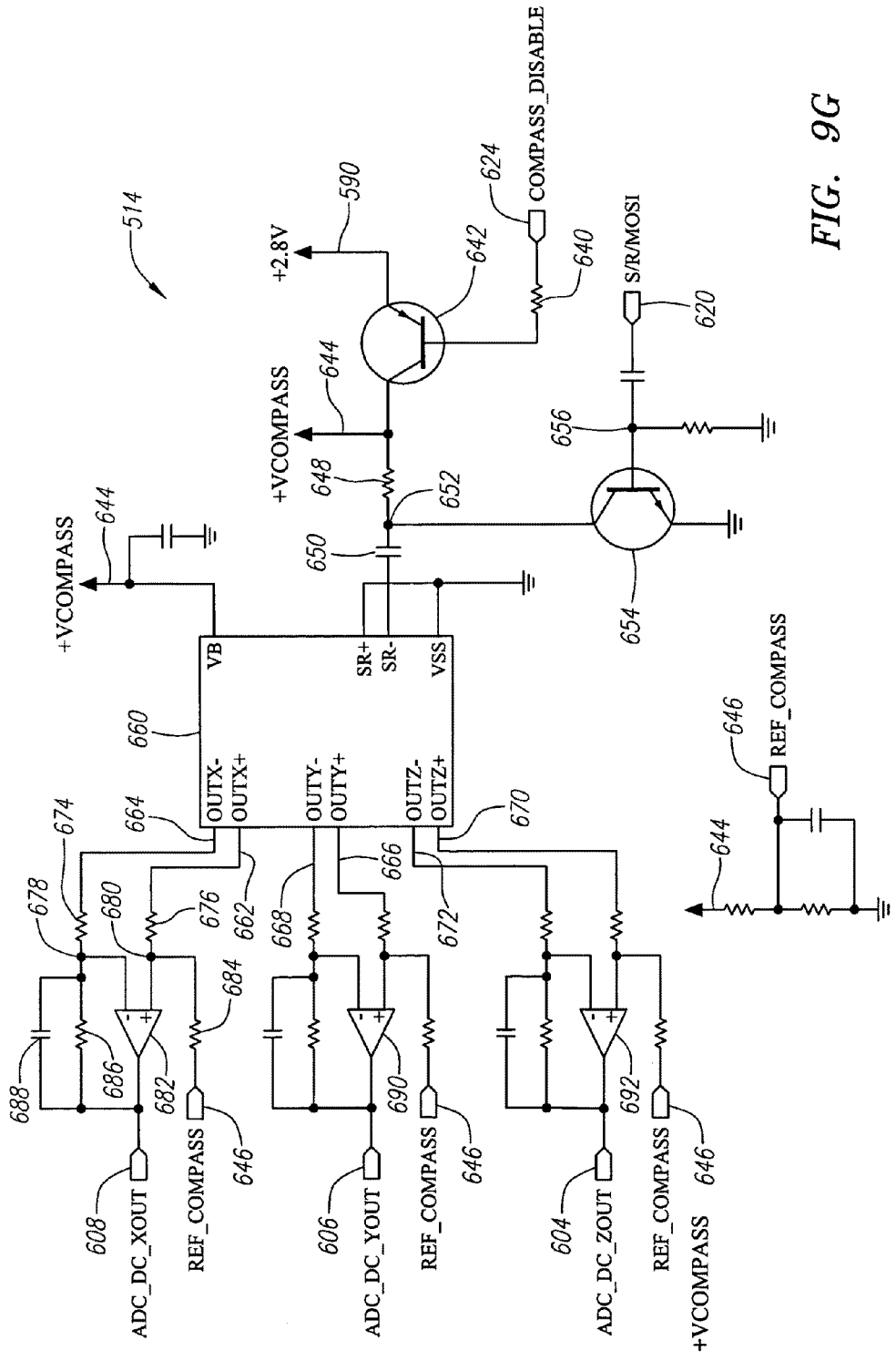

FIG. 9G shows a schematic diagram of magneto resistive sensor circuit 514. Magneto resistive sensor circuit 514 may include inputs COMPASS_DISABLE 624 and S/R/MOSI 620 which may be outputs from controller circuit 512. Exemplary magneto resistive sensor circuit 514 may also include outputs ADC_DC_XOUT 608, ADC_DC_YOUT 606 and ADC_DC ZOUT 604 that may be coupled to controller circuit 512 for further processing.

When the input signal COMPASS_DISABLE 624 is driven low, the +2.8V power supply may be used to support magneto resistive sensor circuit 514. When controller 602 determines that there is no need for magneto resistive sensor circuit 514 to operate, the input signal COMPASS_DISABLE 624 may be pulled high by controller 602. The +2.8V power supply may then shut down from supporting magneto resistive sensor circuit 514. This configuration may be used to save battery power.

A primary component of magneto resistive sensor circuit 514 is a magnetometer 660. Magnetometer 660 may comprise three sets of Wheatstone bridges placed at orthogonal axes to measure direction and magnitude of the Earth's magnetic fields in each of the axes and convert these measurements to differential voltage outputs. In other embodiments, a single or double axis magnetometer may be used.

In a preferred embodiment, the Y-axis is set as the longitudinal axis 110 of flashlight 100. In other words, a change in output ADC_DC_YOUT 606 may be interpreted as a direction change of the longitudinal axis 110 of flashlight 100.

Magnetometer 660 may be a commercially available magnetometer, e.g., HMC1043 which is a 3-axis magnetometer manufactured by Honeywell.

The power supply (denoted by VB) for the Wheatstone bridges in magnetometer 660 may be supported by signal line +VCOMPASS 644 which in turn may be derived from the +2.8V power supply signal provided on output 590 of the LDO regulator 508. The emitter of a PNP bipolar transistor 642 is coupled to +2.8V 590 power supply while the collector of bipolar transistor 642 is coupled to signal line +VCOMPASS 644. The base of bipolar transistor 642 may be coupled to signal line COMPASS_DISABLE 624 which may be an output from controller circuit 512.

The set/reset (SR-) input of magnetometer 660 may be provided by two sources. The first source may be signal line +VCOMPASS 644. The second source may be derived from signal line S/R/MOSI 620 which may be an output from controller circuit 510. Signal line S/R/MOSI 620 may be coupled to the base of an NPN bipolar transistor 654 having its emitter coupled to ground. Signal line 652, which may be coupled to the collector of bipolar transistor 654, may also be the second source to the set/reset (SR-) input of magnetometer 660.

Outputs of magnetometer 660 may be grouped into three sets of differential voltage outputs: OUTX+ 662 and OUTX- 664; OUTY+ 666 and OUTY- 668; and OUTY+ 670 and OUTY- 672. OUTX+ 662, OUTX- 664 may be respectively coupled to the positive and negative inputs of operational amplifier 682 which may generate an output ADC_DC_X-OUT 608 which may be coupled to controller circuit 510 for further processing. Output ADC_DC_XOUT 608 may be fed back to negative input 678 of operational amplifier 682 through resistor 686 and capacitor 688 connected in parallel. In addition, the positive input of operational amplifier 680 may be coupled to a reference voltage REF_COMPASS 646 which may be generated by a voltage divider from +VCOMPASS 644.

Similarly, the other sets of differential voltage outputs may be used to generate ADC_DC_YOUT 606 and ADC_DC_ZOUT 604 which may also have a similar configuration as that of ADC_DC_XOUT 608 which has been described previously.

In the embodiments described above, flashlight 100 may be operated as an electronic compass. In this mode of operation, a visual, audible, or tactile response may be provided depending on which direction flashlight 100 points. For example, the lighting intensity (or brightness) of lamp module 128 of flashlight 100 may be varied depending on the direction in which flashlight 100 points. In one embodiment, when flashlight 100 is pointing at magnetic north, the lighting intensity may be brighter, e.g., at a maximum brightness. As the user rotates flashlight 100 either clockwise or counter-clockwise towards magnetic south, the lighting intensity may decrease and may be set at a lower level, e.g., minimum brightness, when pointing due south. In an alternative embodiment, the brightness levels may be reversed. It is preferred that flashlight 100 be kept substantially horizontal, i.e., that rotation of flashlight 100 occur about an axis that is substantially vertical to the ground. In this manner, flashlight 100 may be used as a compass, and the user may determine the directions of due north, due south and directions in between based on the varying intensity of the lamp module 128.

In addition to varying the brightness, the lamp module 128 may be made to blink when flashlight 100 is pointed at or near one or more of north, south, east and west to provide further directional information to the user. For example, the blink may be programmed to occur when flashlight 100 is pointed in a direction that is within a certain angle from north, south, east or west, e.g., within +/−5°.

In addition to the visual responses discussed above, flashlight 100 may be configured to provide audible or tactile responses in addition to the visual response or in the alternative. For example, controller 510 may be programmed to output a certain sequence of beeps or provide beeps of different tones depending on the direction in which the flashlight is pointing. Further, the flashlight may say "North", "South", "East", or "West" when the flashlight is pointed in those directions. Such audible responses would be provided through the audio interface and speaker 518 (see FIG. 8), which is in communication with controller 510.

Alternatively, controller 510 may be connected to a vibrator instead of audio interface and speaker 518 to provide tactile responses that varies depending on the direction flashlight 100 is pointing. The vibrator may, for example, be a simple electric motor with an eccentric weight.

As noted above, it is preferred that the user maintain flashlight 100 in a substantially horizontal position while using flashlight 100 as a magnetic compass. If flashlight 100 is not so maintained, an error may occur in compass operation. It is preferred that this error may be corrected by measuring the flashlight's angle of tilt by using the Y axis of accelerometer circuit 512 described previously in connection with FIG. 9F, and then using this information to correct the compass operation. Those skilled in the art will appreciate that other types of magneto resistive sensor circuits may be employed.

Figure 10A:
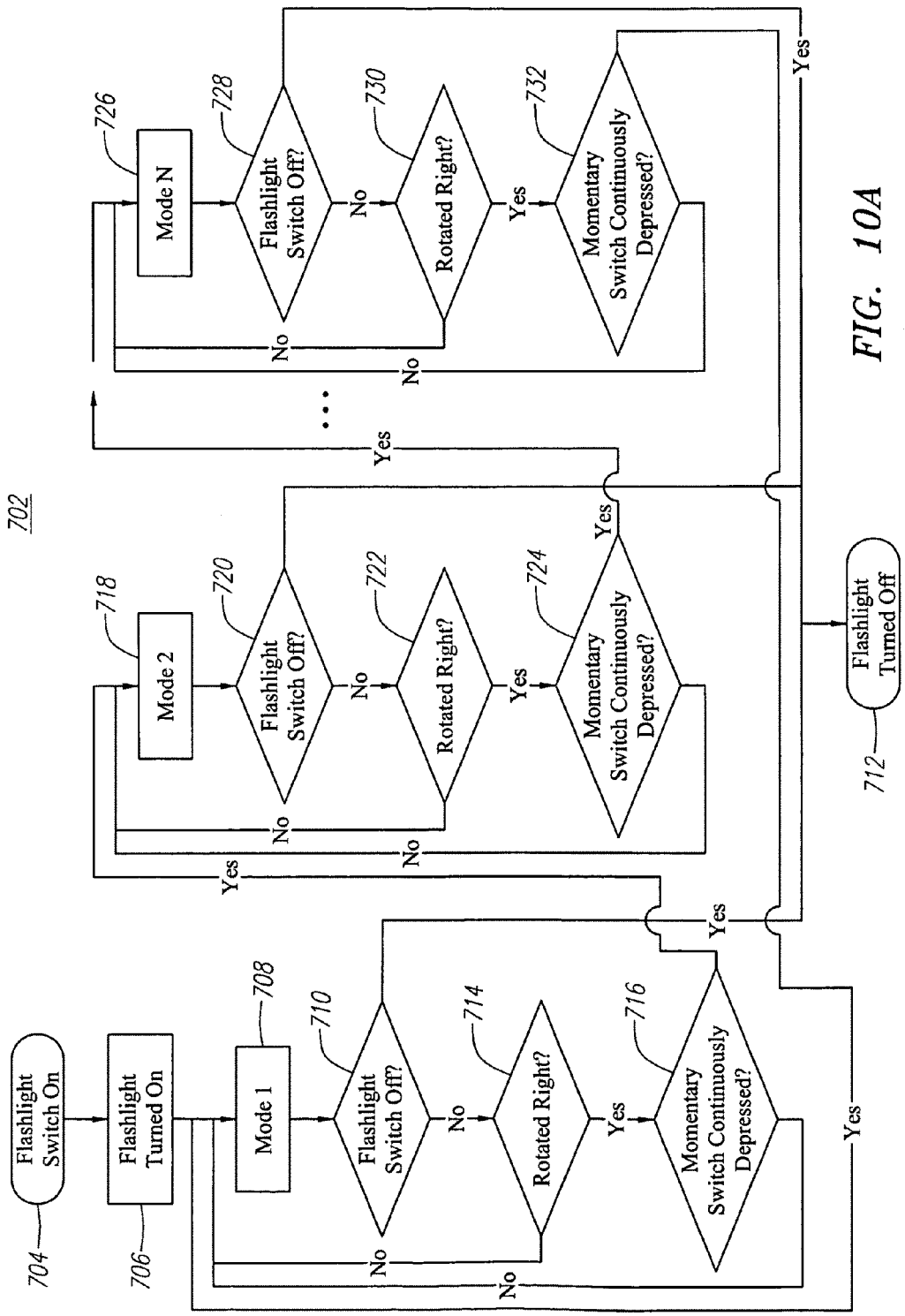

As indicated above, it is preferred that flashlight may operate in multiple modes. The operation and accessing of these modes are now further discussed. FIG. 10A is a flow diagram illustrating a preferred manner of operation 702 in which flashlight 100 may access and perform various modes.

The user may initially activate switch 168 of flashlight 100 with a press and release sequence as in step 704. Flashlight 100 is thus turned on in step 706 and may start producing light and may enter a first mode, or mode 1, of operation as in step 708. In a preferred embodiment, the first mode of operation 708 may be a normal or standard operating mode where lamp module 128 provides a steady beam of light.

At this stage, if the user performs another press and release sequence on switch 168, flashlight 100 may recognize this sequence as a switch off command 710 and flashlight 100 may be turned off as in step 712. If there has been no switch off command, the user may enter a second mode of operation 718. This may be accomplished by the user rotating flashlight 100 to the right 714 about its principal axis of projection 110 while keeping switch 168 continuously depressed 716.

While flashlight 100 is in the first mode of operation 708 (without switching off 710), if there is no detection of rotation to the right 714 along about its principal axis of projection 110, or if there is a detection of right rotation 714 about its principal axis of projection 110 but switch 168 is not continuously depressed 716, flashlight 100 remains in the first mode of operation 708.

Once flashlight 100 is in the second mode of operation 718, it may be switched off with another press and release sequence as in step 720. If flashlight 100 is not turned off, but is instead rotated right 722 about its principal axis of projection 110 while switch 168 is continuously depressed 724, flashlight 100 may enter into a third mode of operation. In FIG. 10A, this is represented by mode N 726. This represents that flashlight 100 may preferably follow the foregoing sequence to access any number of operating modes. But in a preferred embodiment, there are five modes of operation.

While flashlight 100 is in the second mode of operation 718 (without switching off 720), if there is no detection of right rotation 722 along its principal axis of projection 110, or if there is a detection of right rotation 722 about its principal axis of projection 110 but switch 168 is not continuously depressed 724, flashlight 100 remains in the second mode of operation 718.

When flashlight 100 is in the last mode of operation 726 it may be switched off 728 with a press and release sequence. When flashlight 100 is in the last mode of operation (without switching off 728), if flashlight 100 is rotated right 730 about its principal axis of projection 110 while switch 168 is continuously depressed 732, flashlight 100 may return back to the first mode of operation 708.

When flashlight 100 is in the last mode of operation 726 (without switching off 728), if there is no detection of right rotation 730 about its principal axis of projection 110, or if there is a detection of right rotation 730 about its principal axis of projection 110 but switch 168 is not continuously depressed 732, flashlight 100 remains in the last mode of operation 726.

Therefore, in a preferred embodiment, flashlight 100 may enter additional modes of operation by rotating right about its principal axis of projection 110 while keeping switch 168 continually depressed. This operation allows flashlight 100 to enter into a new mode of operation without using the sequence of pressing and releasing of a switch button.

While there are various modes of operation that are within the scope of the current invention, in a preferred embodiment, steady lighting with variable brightness may be set as the first mode of operation 708. A blinking lighting with variable brightness may be set as the second mode of operation 718. Other modes of operation may include an SOS mode with variable brightness, a motion sensitive signal mode, an electronic compass mode and a night light mode. These modes of operation may be assigned in an arbitrary order or as the user desires. To that end, if the user believes he or she will use a certain mode or modes more often than others, the user may set the first few modes accordingly.

As previously described in connection with FIG. 9F, 3-axis accelerometer circuit 512 may include outputs ADC_X-G 616, ADC_Y-G 614 and ADC_Z-G 612, that may be coupled to controller circuit 510. Accelerometer circuit 512 may be mounted on assembled circuit board 240 with its Y-axis pointing along the longitudinal axis of flashlight 100. Therefore, when flashlight 100 is placed horizontally, if flashlight 100 is rotated clockwise or counter-clockwise along the longitudinal axis of flashlight 100, the magnitudes of the acceleration in the X and Z axis would be changed, and the gravity information on X and Z may be sent to controller 602 through ADC_X-G 616 and ADC_Z-G 612, respectively. Controller 602 may use the information on ADC_X-G 616 and ADC_Z-G 612 to determine whether there is a rotation along the longitudinal axis of flashlight 100. Therefore, flashlight 100 may use the rotation about its longitudinal axis (or the information change on ADC_X-G 616 and ADC_Z-G 612) as a command decision point so as to determine whether to enter into a new mode of operation or not.

The operation flow 702 shown in FIG. 10A may be implemented by software stored in memory on controller 602. Controller 602 may thus be programmed to control the sequence of operation based on signals received from the outputs of 3-axis accelerometer circuit 512. In other words, when controller 602 receives information from ADC_X-G 616 and ADC_Z-G 612, controller 602 may change its sequence of execution based on the information received from the outputs of 3-axis accelerometer circuit 512.

Controller 602 may also be programmed to control the flow of electrical power through lamp module 128 based on signals received from the outputs of 3-axis accelerometer circuit 512. That is, when controller 602 receives information on ADC_X-G 616 and ADC_Z-G 612, controller 602 may change some of its output signals based on the execution of software stored in controller 602. For example, controller 602 may pull its output signal LAMP_DRIVE 624 to a high state so that bipolar transistor 570 and PMOS 572 conduct. In this manner, electric power may flow from internal voltage supply VBAT 560 to voltage output pad VLOAD 576 to form a portion of a loop of electrical current that may be used to turn on lamp module 128.

Those skilled in the art will appreciate that the flow diagram 702 in FIG. 10A is an example only, and that other types of operation can also be employed. For example, the command for entering into a new mode of operation may be implemented when flashlight 100 is rotated left about its principal axis of projection 110 while keeping switch 168 depressed.

Alternatively, other types of movement of flashlight 100 by the user that may cause a change in outputs ADC_X-G 616, ADC_Y-G 614 or ADC_Z-G 612 of 3-axis accelerometer circuit 512 may also be used for flashlight 100 to enter into a new mode of operation.

Examples of different modes of operation contemplated by the current invention, as well as how each mode may be adjusted, are now more specifically described with reference to FIGS. 10B-10L Those skilled in the art will appreciate that modes of operation beyond those described above are within the scope of the invention.

Figure 10B:
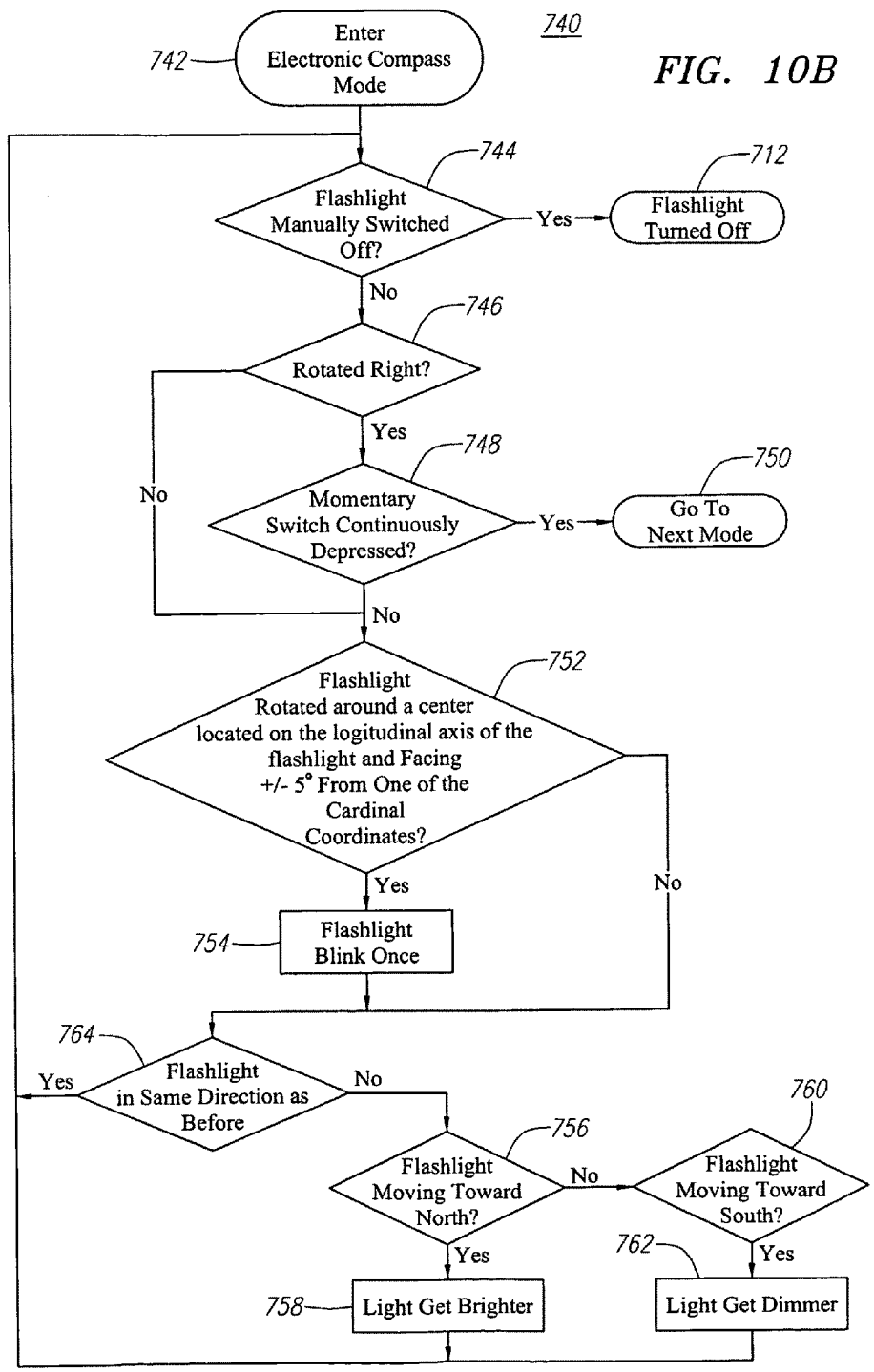

FIG. 10B is a flow diagram illustrating an electronic compass operation 740 that may be performed by flashlight 100. As previously described in connection with FIG. 10A, flashlight 100 may perform a plurality of modes of operation. It is preferred that flashlight 100 may switch from one mode of operation to another by rotating flashlight 100 about its principal axis of projection 110 while switch 168 is continuously depressed. When flashlight 100 has entered into the electronic compass mode 742, the light source of flashlight 100 may initially produce a steady standard stream of light.

Following the steps of operation 740, flashlight 100 may be turned off 712 by a designated method, e.g., the user performs a switch off command 744 such as a press and release of switch 168.

While flashlight 100 is in the electronic compass mode 742 (without switching off 744), if flashlight 100 is rotated right 746 about its principal axis of projection 110 while switch 168 is continuously depressed 748, flashlight 100 may enter into the next mode of operation 750.

The next mode of operation may be designated as any one of the following examples: a steady lighting with variable brightness, a blinking lighting with variable brightness, an SOS mode with variable brightness, a motion sensitive signal mode or a night light mode. Alternatively, the next mode 750 may be different than those listed above.

The user may remain in the electronic compass mode 742 as follows. If there is no detection of right rotation 746 about its principal axis of projection 110, or if there is a detection of right rotation 746 about its principal axis of projection 110 but switch 168 is not continuously depressed 748, flashlight 100 may remain in the electronic compass mode 742.

In step 752, the compass mode may provide a blinking capability to alert the user that the flashlight is pointed at or near any of the four cardinal magnetic coordinates, i.e., north, south, east or west. To help describe this feature, it should be noted that flashlight 100 generally has a midpoint or center-point along its longitudinal axis. And if a vertical axis is extended through this midpoint, flashlight 100 may be rotated by the user about this centerpoint. In other words, flashlight 100 may have a rotating center. Here, if flashlight 100 is rotated about this centerpoint, or rotated around its rotating center, so that its longitudinal axis is pointing in a direction that falls within a 10° angle with one of the cardinal magnetic coordinates 752, flashlight 100 will blink. In other embodiments, this blink may occur if flashlight 100 is pointed in a direction that is within 5° on either side of the cardinal magnetic coordinate. The user is thus alerted that he or she is generally facing a cardinal magnetic coordinate. The included angular range within which a blink is superimposed may also be an angular range other than +/−5°.

Another feature within compass mode 742 is also available with the current invention. While flashlight 100 is rotated about its center, if the front end of flashlight 100 is facing toward the Earth's magnetic north as in step 756, lamp module 128 may get brighter as in step 758, e.g., it may attain its brightest setting. Conversely, while flashlight 100 is rotated about its center so that its front end is facing toward the Earth's magnetic south as in step 760, lamp module 128 may be set dimmer 762, e.g., to its dimmest setting.

In another embodiment, flashlight 100 may be programmed oppositely. That is, while flashlight 100 is rotating around its center, if the front end of flashlight 100 is facing toward the Earth's magnetic south, lamp module 128 may get brighter. And while flashlight 100 is rotated around its rotating center, if the front end of flashlight 100 is facing toward the magnetic north of the Earth, Lamp module 128 can be set dimmer.

As previously described in connection with FIG. 9G, a preferred magneto resistive sensor circuit 514 may include a magnetometer 660 which may produce output signals ADC_DC_XOUT 608, ADC_DC_YOUT 606 and ADC_DC_ZOUT 604 that may be coupled to controller circuit 512.

When the longitudinal axis of flashlight 100 is horizontal and rotated around its center, the values on ADC_DC_YOUT 606 will be changed if the longitudinal axis 110 of flashlight 100 is changed because the Y-axis is set to be coincident with the longitudinal axis 110 of flashlight 100.

The other two outputs ADC_DC_XOUT 608 and ADC_DC_ZOUT 604 could be changed when the longitudinal axis 110 of flashlight 100 is changed depending on their vector components projected on the horizontal plane. Since flashlight 100 may be rotated about its longitudinal axis, either the X-axis or Z-axis may point toward the Earth. When this occurs, the vector component projected on the horizontal plane for that axis is zero and the output of that axis would not have any change when flashlight 100 is placed horizontally and rotated around the rotating center. If none of the X-axis or Z-axis is facing toward the Earth, then, outputs of both X-axis and Z-axis can be changed when flashlight 100 is placed horizontally and rotated around the rotating center depending on their vector components projected on the horizontal plane. The magnetic information would be sent to controller 602 through ADC_DC_YOUT 606, ADC_DC_XOUT 608 and ADC_DC_ZOUT 604.

Controller 602 may use information on ADC_DC_YOUT 606, ADC_DC_XOUT 608 and ADC_DC_ZOUT 604 to determine whether and how much of a rotation flashlight 100 had made around its rotating center. Therefore, flashlight 100 may use the rotation around its rotating center (or the information on ADC_DC_YOUT 606, ADC_DC_XOUT 608 and ADC_DC_ZOUT 604) to determine the brightness on lamp module 128 or whether a blink on lamp module 128 is required.

The brightness on lamp module 128 may be determined by changing the duty cycle on lamp module 128 with a frequency that is higher than a human's eye can detect. A duty cycle on lamp module 128 may be produced by a sequence of high and low states on LAMP_DRIVE 624 signal, which is driven by controller 602. This sequence of high and low states on signal LAMP_DRIVE 624, together with other components on the load electrical path, may cause bipolar transistor 570 and PMOS 572 to be conductive and non-conductive alternately. As the percentage of cycle time that the switch conducts increases, lamp module 128 will become brighter. On the other hand, as the percentage of cycle time that the switch conducts is reduced, lamp module 128 will become dimmer. Methods of adjusting brightness of the light source other than through modulating the duty cycle may also be used, including, for example, adjusting the voltage, current, and/or power delivered to the light source.

The operation flow 740 shown in FIG. 10B may be implemented by software stored in the memory of controller 602. Controller 602 may be programmed to control the flow of electrical power through lamp module 128 based on signals received from outputs of magneto-resistive sensor circuit 514. When controller 602 receives information on ADC_DC_YOUT 606, ADC_DC_XOUT 608 and ADC_DC_ZOUT 604, controller 602 may change some of its output signals, e.g., LAMP_DRIVE 624, based on the execution of software stored in controller 602.

Figure 10C:
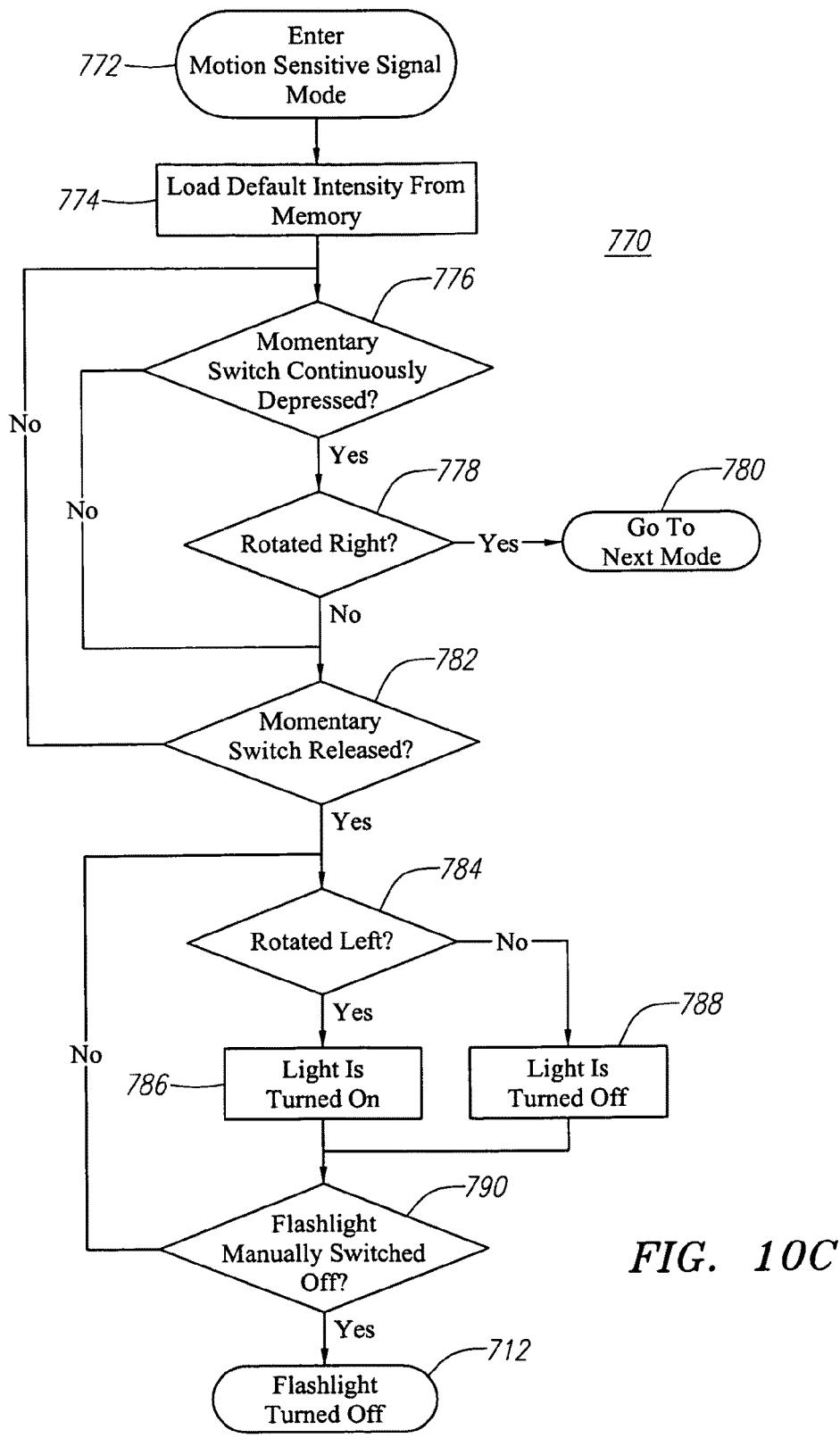

FIG. 10C is a flow diagram illustrating an exemplary motion sensitive operation 770 of a preferred flashlight 100.

When flashlight 100 has entered into the motion sensitive signal mode 772, information on a default intensity may be loaded from memory 774 for controller 602 to provide a control signal to control the brightness on lamp module 128. In the present embodiment, the memory may be an EEPROM embedded in controller 602. The default intensity information may be a predetermined setting, for example the minimum intensity. Alternatively, the default intensity information may be the intensity of the last usage before flashlight 100 is turned off. Other intensities may be predetermined.

As previously described in connection with FIG. 10A, flashlight 100 may perform a plurality of modes of operation. It is preferred that flashlight 100 may switch from one mode of operation to another by rotating flashlight 100 about its principal axis of projection 110 while switch 168 is continuously depressed. After the default intensity information is loaded from memory 774, if flashlight 100 is rotated right 778 about its principal axis of projection 110 while switch 168 is continuously depressed 776, flashlight 100 may enter into the next mode of operation 780.

The next mode of operation can be designated as one of the following examples: a steady lighting with variable brightness, a blinking lighting with variable brightness, an SOS mode with variable brightness, an electronic compass mode or a night light mode.

On the other hand, if switch 168 is released 782, the motion sensitive signal operation may be performed by detecting whether there is a left rotation 784 along the principal axis of projection 110 of flashlight 100. If a left rotation 784 is detected, then flashlight 100 can be turned on 786. If the flashlight 100 is turned back to the previous position, then flashlight 100 can be turned off 788. In other words, flashlight 100 can be toggled between on and off by rotating it left and then rotating it back.

Flashlight 100 may be turned off 712 by a designated method. For example, if switch 168 is depressed and then released, flashlight 100 may recognize this sequence as a switch off command 790 and flashlight 100 will be turned off 712.

Figure 10D:
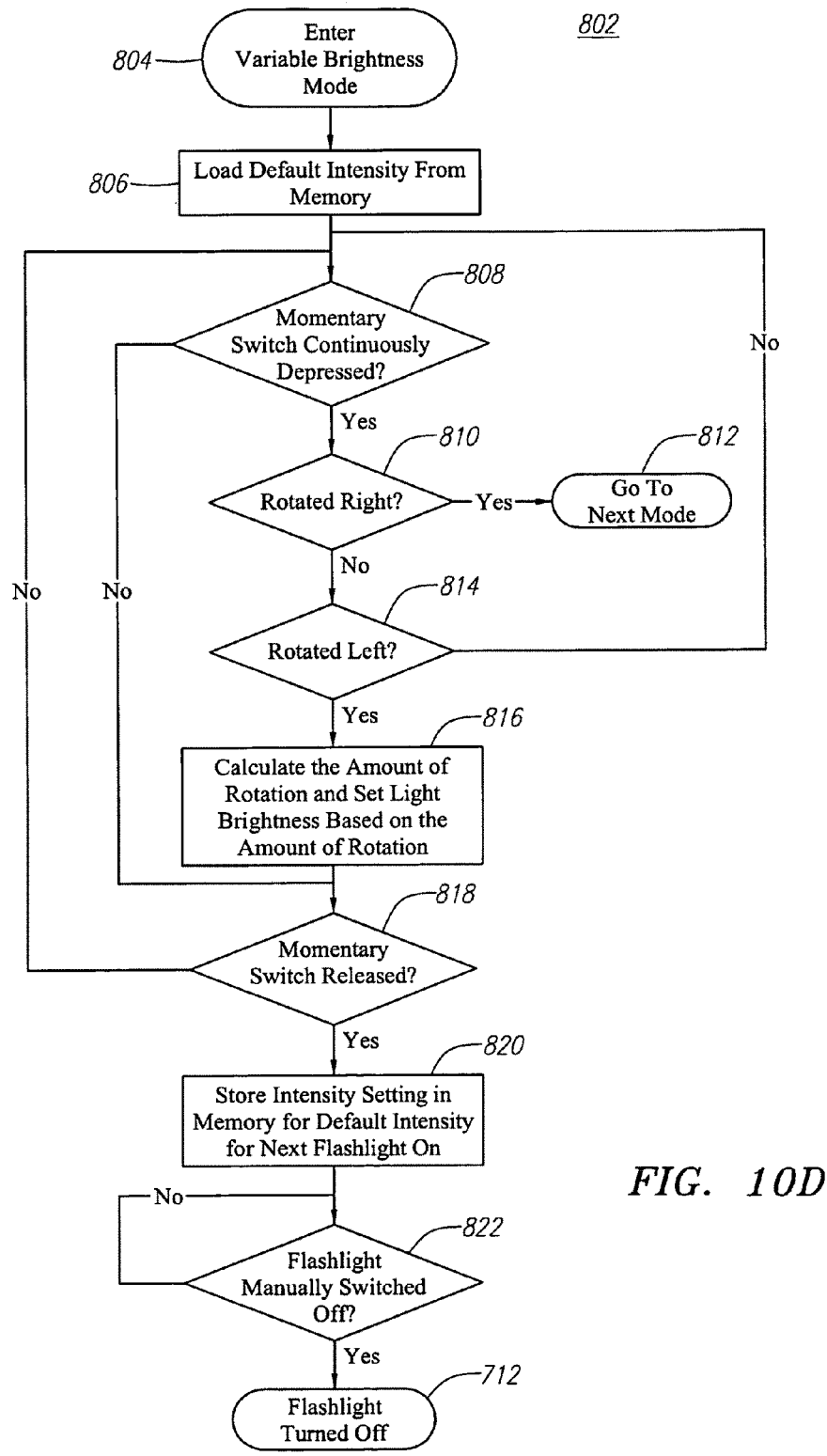

FIG. 10D is a flow diagram illustrating a preferred variable brightness mode of operation 802 for flashlight 100.

When flashlight 100 has entered into the variable brightness mode 804, a default intensity information may be loaded from a memory 806 for controller 602 to provide a control signal to control the brightness on lamp module 128. In a preferred embodiment, the memory may be an EEPROM embedded in controller 602. The default intensity information may be a predetermined setting, for example, the maximum intensity. Alternatively, the default intensity information can be the intensity of the last usage before flashlight 100 is turned off. Other intensities may be predetermined.

After the default intensity information is loaded from memory 806, if flashlight 100 is rotated right 810 about its principal axis of projection 110 while switch 168 is continuously depressed 808, flashlight 100 can enter into the next mode of operation 812.

The next mode of operation can be designated as one of the following examples: a motion sensitive signal mode, a blinking light with variable brightness, an SOS mode with variable brightness, an electronic compass mode or a night light mode.

If flashlight 100 is rotated left 814 about its principal axis of projection 110 while switch 168 is still continuously depressed 808, the amount of rotation can be calculated by controller 602 and the flashlight brightness may be varied based on the calculated amount of rotation 816. In a preferred embodiment, before the flashlight 100 is rotated, the flashlight brightness is set to the maximum, while when the flashlight 100 is rotated left 45° and beyond, the flashlight brightness is set to the minimum. In other words, when the flashlight 100 is rotated left from 0° to 45°, the flashlight brightness can change linearly from maximum to minimum.

If a suitable brightness is found while flashlight 100 is rotating left 814, the switch 168 may be released 818 and the brightness existing at that time may be stored in a memory 820. Flashlight 100 may retain that level of brightness until it is turned off.

Flashlight 100 may be turned off 712 by a designated method. For example, if switch 168 is depressed and then released, flashlight 100 may recognize this sequence as a switch off command 822 and flashlight 100 will be turned off 712.

Figure 10E:
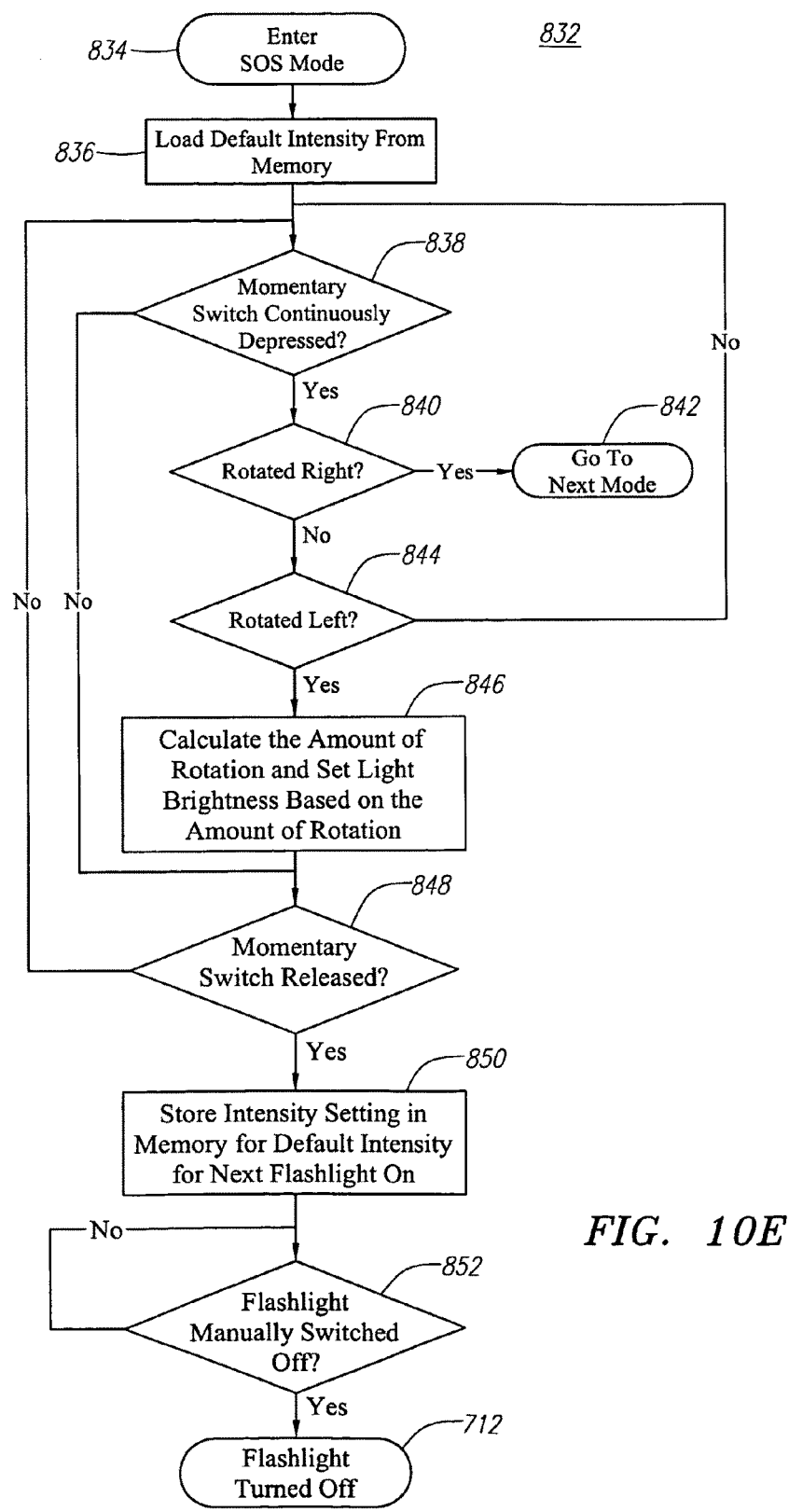

FIG. 10E is a flow diagram illustrating a preferred SOS mode of operation 832 of the exemplary flashlight 100. The exemplary SOS mode of operation 832 may be similar to the preferred variable brightness mode of operation 802 shown in FIG. 10D. A difference between the two may be that while in the SOS mode of operation 832, an SOS code may be generated instead of steady brightness.

Figure 10F:
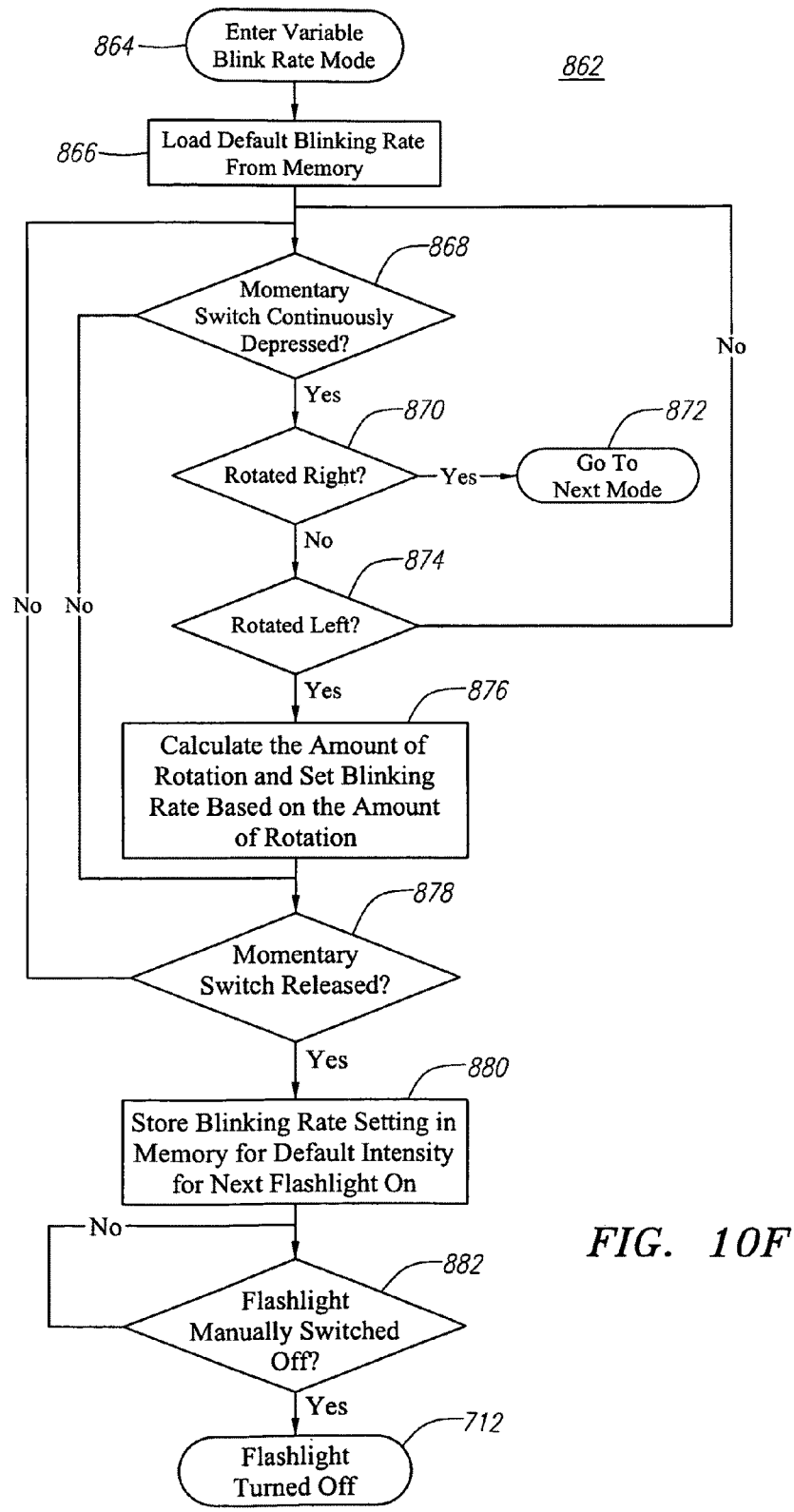

FIG. 10F is a flow diagram illustrating an exemplary variable blinking rate mode of operation 862 of the exemplary flashlight 100.

When flashlight 100 has entered the variable blinking rate mode 864, a default blinking rate information may be loaded from memory 866 for controller 602 to provide a control signal to control the blinking rate on lamp module 128. In a preferred embodiment, the memory may be an EEPROM embedded in controller 602. The default blinking rate information may be a predetermined setting, for example, the maximum blinking rate. Alternatively, the default intensity information can be the blinking rate of the last usage before flashlight 100 is turned off. Other predetermined settings may be used.

After the default blinking rate information is loaded from memory 866, if flashlight 100 is rotated right 870 about its principal axis of projection 110 while switch 168 is continuously depressed 868, flashlight 100 may enter into the next mode of operation 872.

The next mode of operation may be designated as one of the following examples: a motion sensitive signal mode, a steady lighting with variable brightness, an SOS mode with variable brightness, an electronic compass mode or a night light mode.

If flashlight 100 is rotated left 874 about its principal axis of projection 110 while switch 168 is still continuously depressed 868, the amount of rotation may be calculated by controller 602 and the flashlight blinking rate may be set based on the calculated amount of rotation 816. In a preferred embodiment, before flashlight 100 rotated, the flashlight blinking rate is set to the maximum, while when the flashlight 100 is rotated left 45° and beyond, the flashlight blinking rate is set to the minimum. In other words, when the flashlight 100 is rotated left from 0° to 45°, the flashlight blinking rate may change linearly from maximum to minimum.

It is desirable that the highest blinking rate be set to a value that is detectable by a human eye, for example, a 4 blinks per second rate can be predetermined as the maximum blinking rate, while a 0.5 blinks per second rate can be predetermined as the minimum blinking rate. Other blinking rates may be set.

If a suitable blinking rate is determined while flashlight 100 is rotating left 874, the switch 168 may be released 878 and the determined blinking rate may be stored in a memory 880. Flashlight 100 may keep the determined blinking rate until it is turned off.

Flashlight 100 may be turned off 712 by a designated method. For example, if switch 168 is depressed and then released, flashlight 100 may recognize this sequence as a switch off command 882 and flashlight 100 will be turned off 712.

As previously described in connection with FIG. 9F, 3-axis accelerometer circuit 512 has outputs, ADC_X-G 616, ADC_Y-G 614 and ADC_Z-G 612, that are also coupled to controller circuit 510. Accelerometer circuit 512 may be mounted on the assembled circuit board 240 with its Y-axis extending along the longitudinal axis of flashlight 100. Therefore, when flashlight 100 is placed horizontally, if flashlight 100 is rotated clockwise or counter-clockwise along the longitudinal axis of flashlight 100, the magnitudes of the acceleration in the X and Z axis may be changed, and the gravity information on X and Z may be sent to the controller 602 through ADC_X-G 616 and ADC_Z-G 612, respectively. Controller 602 may use information on ADC_X-G 616 and ADC_Z-G 612 to determine whether there is rotation about the longitudinal axis 110 of flashlight 100. Flashlight 100 may use the rotation about its longitudinal axis (or the information on the change in ADC_X-G 616 and ADC_Z-G 612) as a status to decide whether a condition exists to change to a different feature within the same mode of operation.

The variable brightness on lamp module 128 may be determined by changing the duty cycle on lamp module 128 with a frequency that is higher than a human's eye can detect. A duty cycle on lamp module 128 may be produced by a sequence of high and low states on the LAMP_DRIVE 624 signal, which is driven by controller 602. This sequence of high and low states on signal LAMP_DRIVE 624, together with other components on the electrical load path may cause bipolar transistor 570 and PMOS 572 to be conductive and non-conductive alternately. If the time period of conductive is longer, lamp module 128 is brighter. On the other hand, if the time period of conductive is shorter, lamp module 128 is dimmer.

The variable blinking rate on lamp module 128 can also be determined by changing the duty cycle on lamp module 128 but with a frequency that is detectable by a human's eye. The circuits that supports the variable blinking rate can be the same as that supports variable brightness described previously.

As a combination, the SOS mode with variable brightness or a blinking lighting with variable brightness on lamp module 128 may be produced by making a duty cycle on lamp module 128 with a frequency that is detectable by a human's eye. During the low cycle, lamp module 128 is off while during the high cycle, lamp module 128 can have a duty cycle with a frequency that is higher than a human's eye can detect. In other words, there is a high frequency duty cycle within the high period of a low frequency duty cycle. This function can be performed by controller 602.

The operation flow 770 shown in FIGS. 10C-10F can be implemented by software stored in a memory of controller 602. Thus, controller 602 can be programmed to control the sequence of operation based on signals received from the outputs of 3-axis accelerometer circuit 512. When controller 602 receives information from ADC_X-G 616 and ADC_Z-G 612 the 3-axis accelerometer circuit 512, controller 602 may change its sequence of execution based on such information.

Controller 602 may also be programmed to control the flow of electrical power through lamp module 128 based on signals received from the outputs of 3-axis accelerometer circuit 512. When controller 602 receives information from ADC_X-G 616 and ADC_Z-G 612, controller 602 may change some of its output signals based on the execution of software stored in the controller 602.

Those skilled in the art will appreciate that the flow diagrams illustrated in FIG. 10C-10F are examples, and that other types of operations may also be employed. For example, the condition for turning off flashlight 100 may occur when flashlight 100 is rotated left about its principal axis of projection 110 while keeping switch 168 depressed. And the condition for turning on flashlight 100 may occur when flashlight 100 is rotated right about its principal axis of projection 110 while keeping switch 168 depressed. Also, the variability feature in the variable brightness mode, variable blinking rate mode or SOS mode with variable brightness may be obtained by rotating flashlight 100 in an opposite direction as illustrated in FIGS. 10C-10F.

Other types of movements of flashlight 100 that may cause a change in the outputs of the 3-axis accelerometer circuit 512 may also be used as a command for flashlight 100 to change features. Accordingly, the current invention is not limited to the movements described herein for interfacing with controller 602.

Figure 10G:
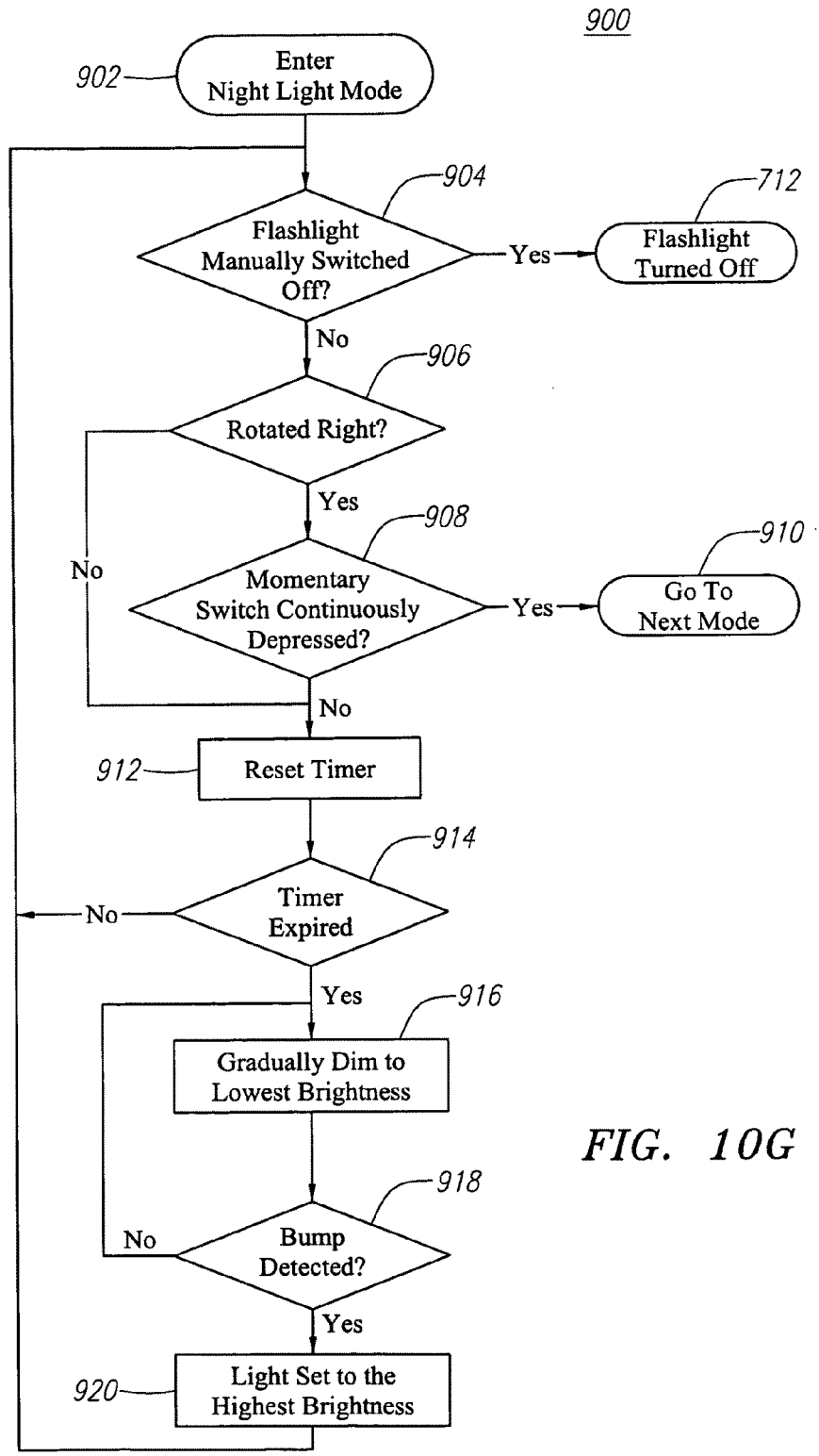

FIG. 10G is a flow diagram showing a preferred night light operation 900 of flashlight 100. As previously described in connection with FIG. 9, flashlight 100 may preferably operate in a plurality of modes, and flashlight 100 may switch from one mode of operation to another by rotating flashlight 100 about its principal axis of projection 110 while switch 168 is continuously depressed. When flashlight 100 has entered into the night light mode 902, the light source of flashlight 100 may be set to a steady lighting.

Flashlight 100 may be turned off 712 by a designated method. For example, if switch 168 is depressed and then released, flashlight 100 may recognize this sequence as a switch off command 904 and flashlight 100 may be turned off 712.

While flashlight 100 is in the night light mode 900 (without switching off 904), if flashlight 100 is rotated right 906 about its principal axis of projection 110 while switch 168 is continuously depressed 908, flashlight 100 may enter into the next mode of operation 910.

The next mode of operation may be designated as one of the following examples: a steady lighting with variable brightness, a blinking lighting with variable brightness, an SOS mode with variable brightness, an electronic compass mode or a motion sensitive signal mode.

While flashlight 100 is in the night light mode 900 without switching off 904, if there is no detection of right rotation 906 about its principal axis of projection 110 or if there is a detection of right rotation 906 about its principal axis of projection 110 but switch 168 is not continuously depressed 908, flashlight 100 remains in the night light mode 900. A timer may be reset 912 to allow a user to change into a new mode of operation if desired. If there is no indication of changing into a new mode of operation before the timer is expired 914, flashlight 100 may start the night light function by setting flashlight 100 to the lowest brightness 916. In a preferred embodiment, the timer may be set to expire in 30 seconds at which point flashlight 100 may gradually dim until reaching its lowest brightness. In another embodiment, flashlight 100 may dim and eventually turn completely off. Once flashlight 100 starts operating in the night light mode, it may continuously provide the lowest (or other pre-set) brightness until flashlight 100 detects a bump 918 at which point flashlight 100 may be set to the highest (or other) brightness 920 and the routine goes back to step 904.

In operation, when a user plans to sleep in a dark environment, he/she may set flashlight 100 to night light mode 902. In response, flashlight 100 will dim to a predetermined brightness level after a set time, such as 30 seconds. Preferably the brightness level is set at a very low level, such as 5 to 10% of its normal duty cycle, so that the power drain on the battery is extremely low. Despite the low power output, the flashlight will remain visible so that the user can easily locate it in a dark environment. When the user needs flashlight 100, all he or she needs do is move flashlight 100 and the detection of this movement by flashlight 100 may immediately turn flashlight 100 to its highest (or other pre-set) brightness. The user may then have a predefined window, such as 30 seconds, to turn off flashlight 100 or make flashlight 100 enter into a new mode of operation.

The 30 second time period may be adjusted and other time periods, for example, one minute, may be employed.

As previously described in connection with FIG. 9F, 3-axis accelerometer circuit 512 has outputs ADC_X-G 616, ADC_Y-G 614 and ADC_Z-G 612 that may also be coupled to controller circuit 510. Accelerometer circuit 512 may be mounted on assembled circuit board 240 with its Y-axis extending along the longitudinal axis of flashlight 100. When flashlight 100 is in a horizontal position, if flashlight 100 is rotated clockwise or counter-clockwise about its longitudinal axis 110, the magnitudes of the acceleration in the X and Z axes may change, and the gravity information on X and Z may be sent to controller 602 through ADC_X-G 616 and ADC_Z-G 612, respectively. Controller 602 may use information from ADC_X-G 616 and ADC_Z-G 612 to determine whether there is a rotation about the longitudinal axis 110 of flashlight 100. Flashlight 100 may detect a bump or rolling (or the information change on ADC_X-G 616 and ADC_Z-G 612) and use this information to determine whether flashlight 100 should remain as a night light.

The brightness on lamp module 128 may be determined by changing the duty cycle on lamp module 128 to a frequency above which a human eye may detect. A duty cycle on lamp module 128 may be produced by a sequence of high and low states on the LAMP_DRIVE 624 signal which is driven by controller 602. This sequence of high and low states on signal LAMP_DRIVE 624, together with other components on the load electrical path, may cause bipolar transistor 570 and PMOS 572 to be conductive and non-conductive alternately. When the percentage of conduction time in each cycle is at 100%, lamp module 128 will be at its brightest. On the other hand, as the percentage of conduction time in each cycle approaches 0%, lamp module 128 will be at its lowest brightness.

The operation flow 900 shown in FIG. 10G may be implemented by software stored in a memory of controller 602. Controller 602 may be programmed to control the sequence of operation based on signals received from outputs of 3-axis accelerometer circuit 512. When controller 602 receives information from ADC_X-G 616 and ADC_Z-G 612 of the 3-axis accelerometer circuit 512, controller 602 may change its sequence of execution based on the information.

Controller 602 may also be programmed to control the flow of electrical power through lamp module 128 based on signals received from outputs of 3-axis accelerometer circuit 512. When controller 602 receives information from ADC_X-G 616 and ADC_Z-G 612, controller 602 may change some of its output signals based on the execution of software stored in controller 602.

Figure 10H:
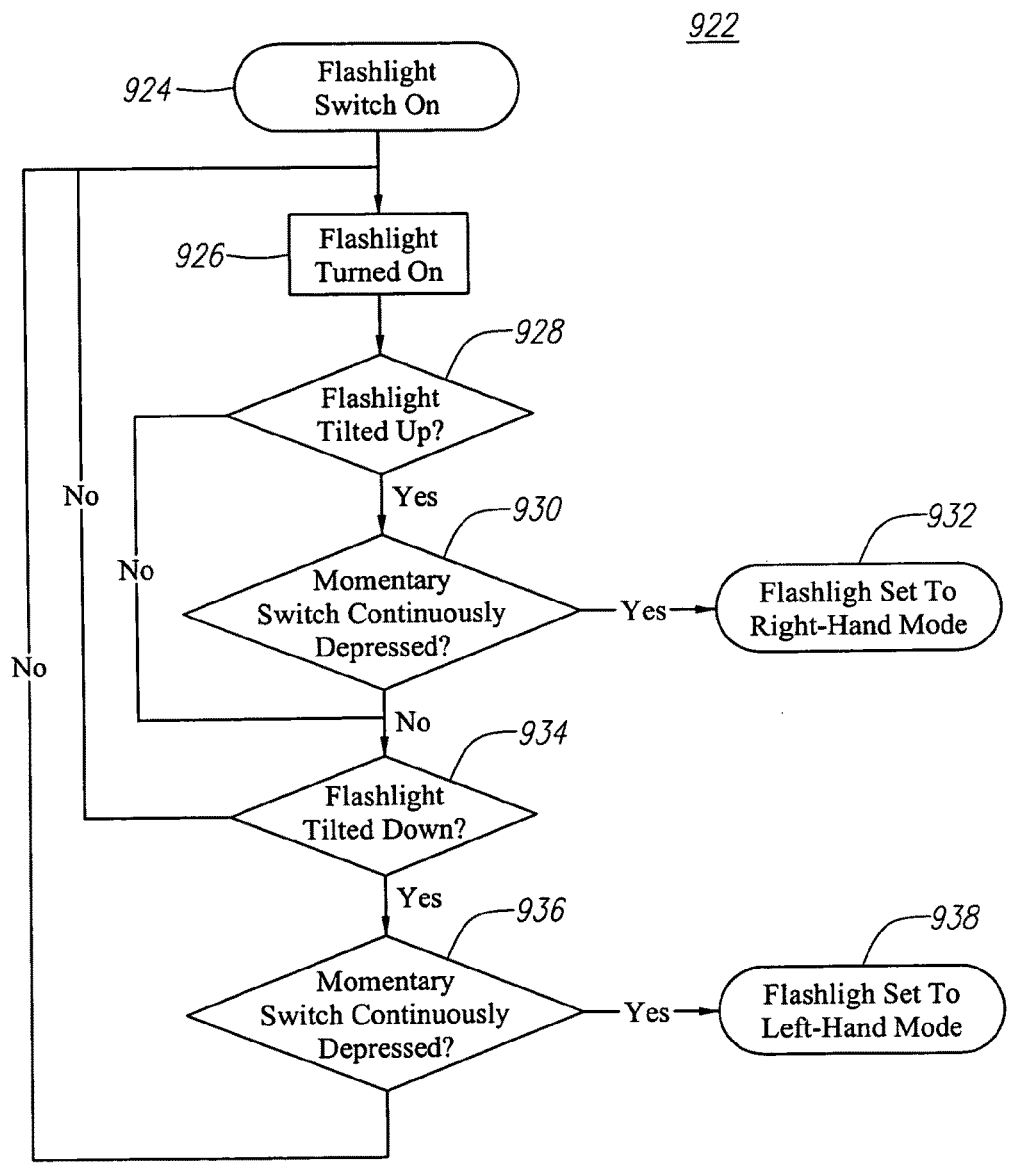

FIG. 10H is a flow diagram illustrating a preferred adjustable mode of operation 922 of flashlight 100. As previously described in connection with FIG. 10A, flashlight 100 preferably operates in a plurality of modes and flashlight 100 may switch from one mode of operation to another by rotating flashlight 100 about the principal axis of projection 110 while switch 168 is continuously depressed. However, some users are right-handed while some are left-handed. Therefore, it is desired that the direction of rotation of flashlight 100 about its principal axis of projection 110 may be set by a user according to the procedure 922 shown in FIG. 10H.

After flashlight 100 is switched on 924 by a press and release sequence on switch 168, the light source of flashlight 100 may start producing light 926 and flashlight 100 may enter into a first mode of operation 708.

If the principal axis of projection 110 is pointed up 928 in a substantially vertical direction while switch 168 is continuously depressed 930, flashlight 100 may be set to a right-handed mode 932. If the principal axis of projection 110 is pointed down 934 in a substantially vertical direction while switch 168 is continuously depressed 936, flashlight 100 may be set to a left-handed mode 938 of operation. The controller may also be configured so that if it receives a predefined command, either through the tail cap switch or via the motion sensitive user interface, the controller will return to default settings provided during manufacturing.

The foregoing adjustments may be accomplished by other methods. For example, a right-handed mode may be set by pointing down flashlight 100 while switch 168 is continuously depressed, or by pointing flashlight 100 up while rotating flashlight 100 right about its principal axis of projection 110.

In a preferred embodiment, when in the right-handed mode 932, a new mode of operation may be entered by rotating flashlight 100 right about its principal axis of projection 110 while switch 168 is continuously depressed. Also when in the right-handed mode, the feature brightness may be varied in different modes by rotating the flashlight 100 left about its principal axis of projection 110. This may occur, for example, to vary the brightness in the steady lighting mode, the blinking light mode or the SOS mode. When in the left-handed mode 938, the foregoing results may be achieved by rotating flashlight 100 about its principal axis 100 in the opposite direction as in the right-handed mode 932.

Alternatively, other types of movements of flashlight 100 that may cause a change in outputs ADC_X-G 616, ADC_Y-G 614 or ADC_Z-G 612 of 3-axis accelerometer circuit 512 may also be used as a command for flashlight 100 to adjust the user's mode.

As previously described in connection with FIG. 9F, 3-axis accelerometer circuit 512 may include outputs ADC_X-G 616, ADC_Y-G 614 and ADC_Z-G 612 that may be coupled to controller circuit 510. Accelerometer circuit 512 may be mounted on assembled circuit board 240 with its Y-axis extending along the longitudinal axis of the flashlight 100. When flashlight 100 is pointed up vertically, the magnitude of the acceleration in the Y axis would be −1G. When flashlight 100 is pointed down vertically, the magnitude of the acceleration in the Y axis would be +1G. The gravity information on Y may be sent to controller 602 through ADC_Y-G 614.

Controller 602 may use the information on ADC_Y-G 614 to determine whether flashlight 100 is pointing up or down to determine whether a left- or right-handed user mode is desired.

The operation flow 922 shown in FIG. 10H may be implemented by software stored in the memory of controller 602. Controller 602 may be programmed to control the sequence of operation based on signals received from the outputs of 3-axis accelerometer circuit 512. When controller 602 receives information from ADC_Y-G 614 of 3-axis accelerometer circuit 512, controller 602 may change a user's preference (or parameter setting) based on this information.

Although the previous description in determining whether flashlight 100 is pointed vertically involves the information from outputs ADC_X-G 616, ADC_Y-G 614 and ADC_Z-G 61 from 3-axis accelerometer circuit 512, it is contemplated that outputs ADC_DC_XOUT 608, ADC_DC_YOUT 606 and ADC_DC_ZOUT 604 from the magneto resistive sensor circuit 514 may also be used to determine whether flashlight 100 is pointing vertically.

As previously described in connection with FIG. 9G, the preferred magneto resistive sensor circuit 514 may include a magnetometer 660 which may produce output signals ADC_DC_XOUT 608, ADC_DC_YOUT 606 and ADC_DC_ZOUT 604 that may also be coupled to controller circuit 512. When flashlight 100 is placed vertically, the values from ADC_DC_YOUT 606 may be zero because in the present embodiment, the Y-axis may be set to be coincident with the longitudinal axis of flashlight 100. This information may be combined with other conditions to determine which user's mode is desired.

Figure 10I:
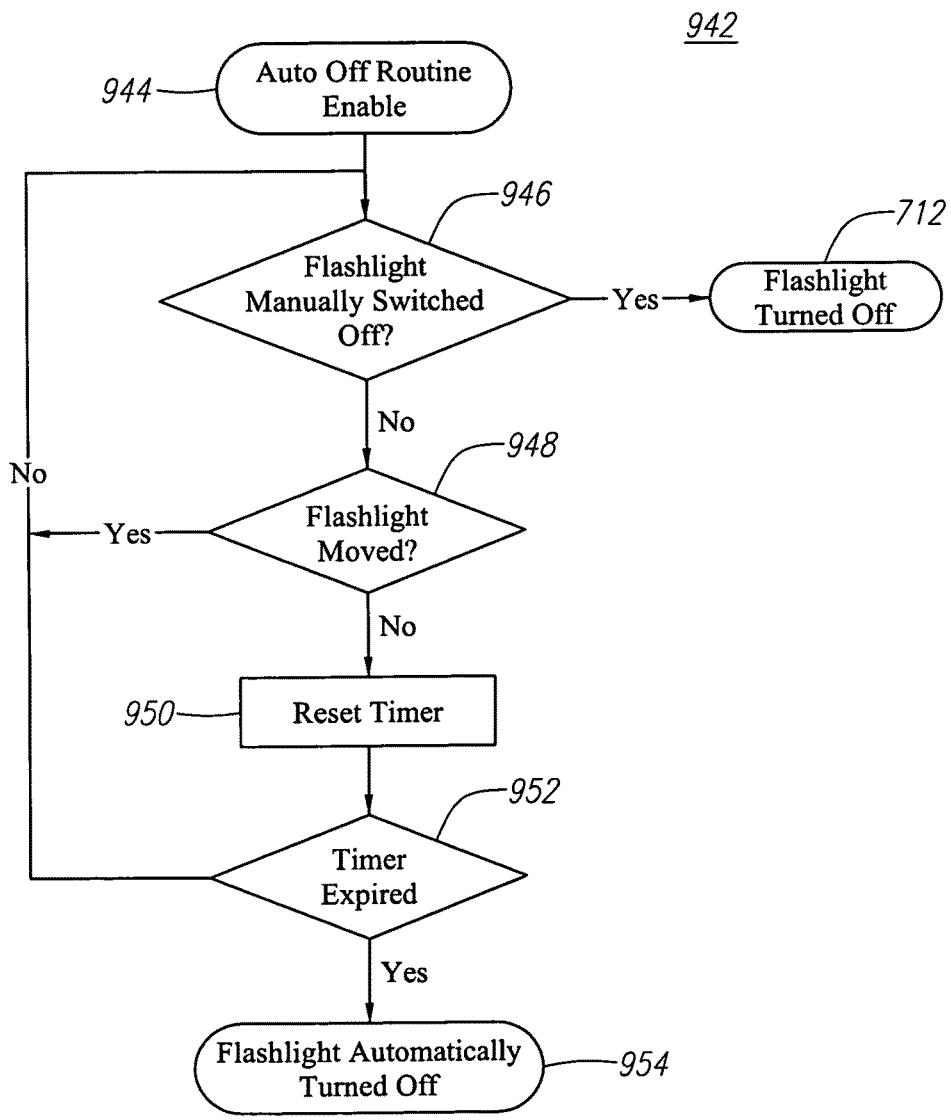

FIG. 10I is a flow diagram illustrating a preferred automatic turn off operation 942 of flashlight 100. As previously described in connection with FIG. 10A, it is preferred that flashlight 100 may operate in a plurality of modes. While flashlight 100 is in any mode of operation, if the automatic turn off feature is enabled 944, flashlight 100 may access the automatic turn off routine 942.

Flashlight 100 may be turned off 712 by a designated method. For example, if the switch 168 is depressed and then released, flashlight 100 may recognize this sequence as a switch off command 946 and flashlight 100 will be turned off 712.

While the automatically turned off feature is enabled 944 without switching off 946, if flashlight 100 is not moved 948, a timer may be reset 950 for automatically turning off flashlight 100 after a certain amount of time. When this timer lapses 952, flashlight 100 may be automatically turned off 954. Before the timer expires, however any movement on flashlight 100 may cause the timer to reset.

In a preferred embodiment, the timer may be set to be expire in 5 minutes. However, the timer may be set to expire at other times, e.g. 10 minutes.

The expiration time may comprise a software timer implemented by a software program, e.g., a counting routine, executed by controller 602. Alternatively, the timer may comprise a hardware timer implemented by electronic circuits.

Flashlight 100 may be automatically turned off when there is inactivity, e.g., no movement on flashlight 100 for a period of time. Battery power may thus be saved by this automatic turn off feature. In a preferred embodiment, the automatic turn off feature may be activated or deactivated by the user.

As previously described in connection with FIG. 9F, 3-axis accelerometer circuit 512 may include outputs, ADC_X-G 616, ADC_Y-G 614 and ADC_Z-G 612 that may also be coupled to controller circuit 510. Accelerometer circuit 512 may be mounted on assembled circuit board 240 with its Y-axis extending along the longitudinal axis 110 of flashlight 100. When flashlight 100 is positioned horizontally, if flashlight 100 is rotated clockwise or counter-clockwise about its longitudinal axis 110 the magnitudes of the acceleration in the X and Z axes may change, and the gravity information on X and Z may be sent to controller 602 through ADC_X-G 616 and ADC_Z-G 612 respectively. Controller 602 may use the information from ADC_X-G 616 and ADC_Z-G 612 to determine whether there is a rotation about the longitudinal axis 110 of flashlight 100. In this manner, flashlight 100 may detect movement (or the information change on ADC_X-G 616 and ADC_Z-G 612) and use this information to determine whether the timer should be reset.

The operation flow 942 shown in FIG. 10I may be implemented by software stored in the memory of controller 602. Controller 602 may be programmed to control the sequence of operation based on signals received from outputs of 3-axis accelerometer circuit 512. That is, when controller 602 receives information from ADC_X-G 616 and ADC_Z-G 612 of 3-axis accelerometer circuit 512, controller 602 may change its sequence of execution based on the information.

Controller 602 may be programmed to control the flow of electrical power through lamp module 128 based on signals received from the outputs of 3-axis accelerometer circuit 512. That is, when controller 602 receives information on ADC_X-G 616 and ADC_Z-G 612, controller 602 may change some of its output signals based on the execution of software stored in controller 602.

FIG. 10J is a flow diagram showing a preferred night light mode of flashlight 100. Flashlight 100 may preferably operate in a plurality of modes, and may enter night light mode 902 as discussed above. Flashlight 100 may be turned off 712 by a designated method. For example, if switch 168 is depressed and then released, flashlight 100 may recognize this sequence as a switch off command 904 and turn flashlight 100 off 712.

While flashlight 100 is in the night light mode 1110, without switching off 904, if flashlight 100 is rotated right 906 about its principal axis 110 while switch 168 is continuously depressed 908, flashlight 100 may enter into the next mode of operation 910. The next mode of operation may be those discussed above, or other modes.

While flashlight 100 is in the night light mode without switching off 904, if there is no detection of right rotation 906, or if there is a detection of right rotation but switch 168 is not continuously depressed 908, flashlight 100 remains in the night light mode. A reset timer function 912, 1112 may be experienced. In the case of reset timer 1112, if the flashlight is tilted up 45 degrees followed by a tilted back movement 1116, and if the momentary switch is continuously depressed 1118, the timer may be incrementally increased. If not, the timer may expire 914 and the flashlight may gradually dim to the lowest brightness 916, or some other brightness. Thereafter, if a bump is detected 918, the flashlight may be set to the highest brightness 920, or some other brightness.

Figure 10K:
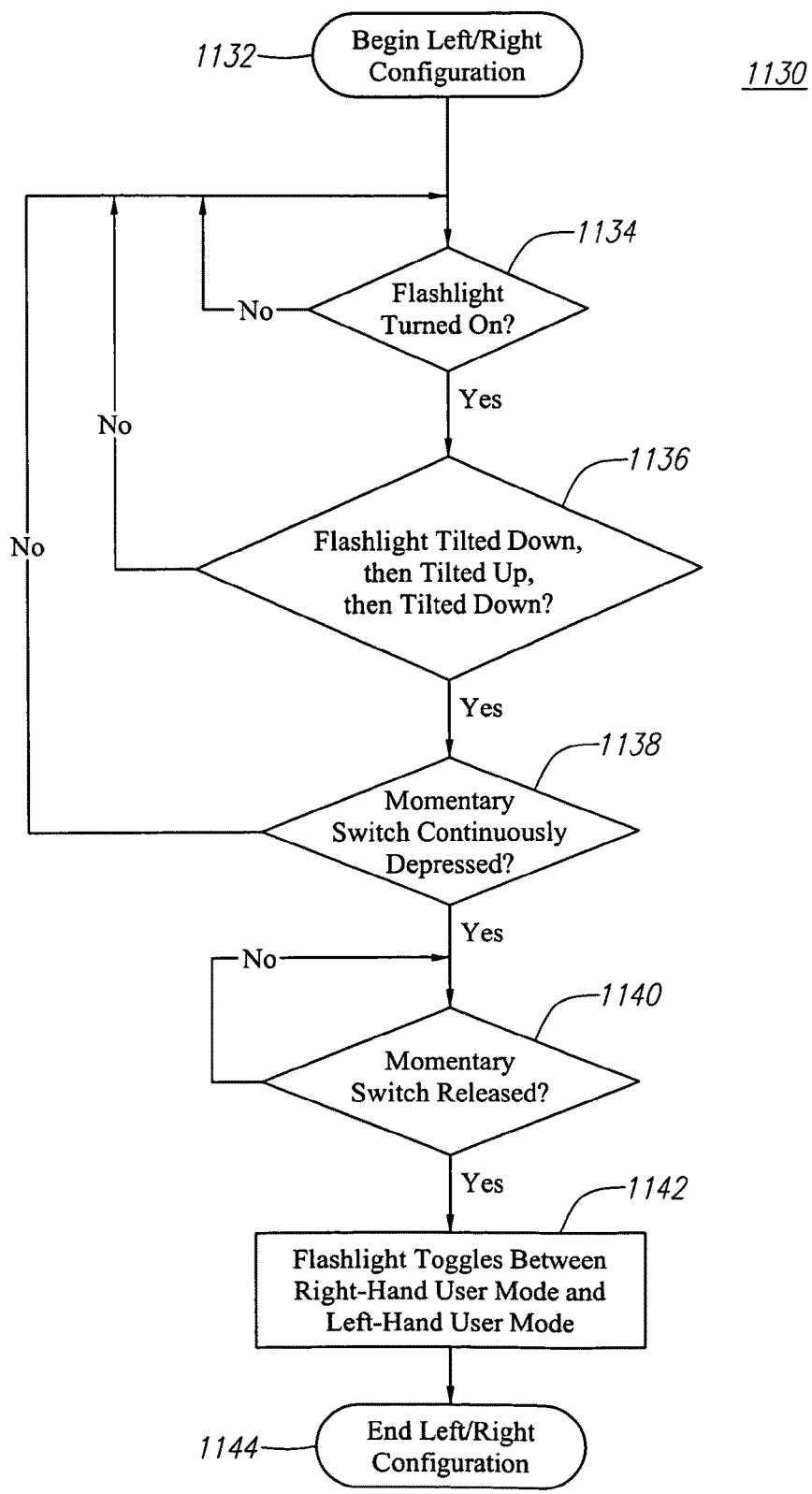

FIG. 10K is a flow diagram for beginning a left or right configuration 1132, i.e., left or right handed operation. Here, if flashlight 100 is turned on 1134, and flashlight 100 is tilted down, then tilted up and then tilted down, and the momentary switch 168 is continuously depressed 1138, and if the momentary switch 168 is then released 140, flashlight 100 may toggle between a right-hand user mode and a left-hand user mode 1142, in configuration 1144. In other embodiments, flashlight 100 may be ambidextrous.

Another preferred flashlight embodiment 300 is now described with reference to FIG. 11. As shown, flashlight 300 generally includes barrel 324, head assembly 104 located at the forward end of barrel 324, and switch and tail cap assembly 306 located at the rear end of barrel 324. The head assembly 104 is disposed about the forward end of the barrel 324, and the switch and tail cap assembly 306 encloses the aft end of barrel 324.

Figure 11:
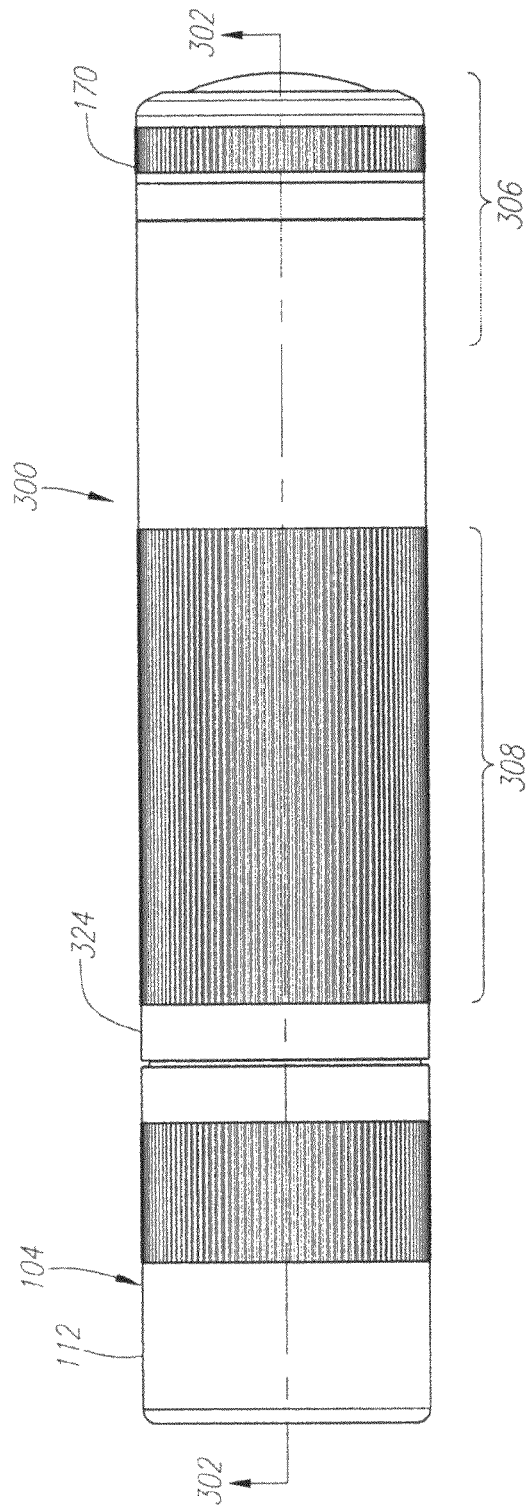
FIG. 11 is a plan view of another exemplary flashlight.
Figure 12:
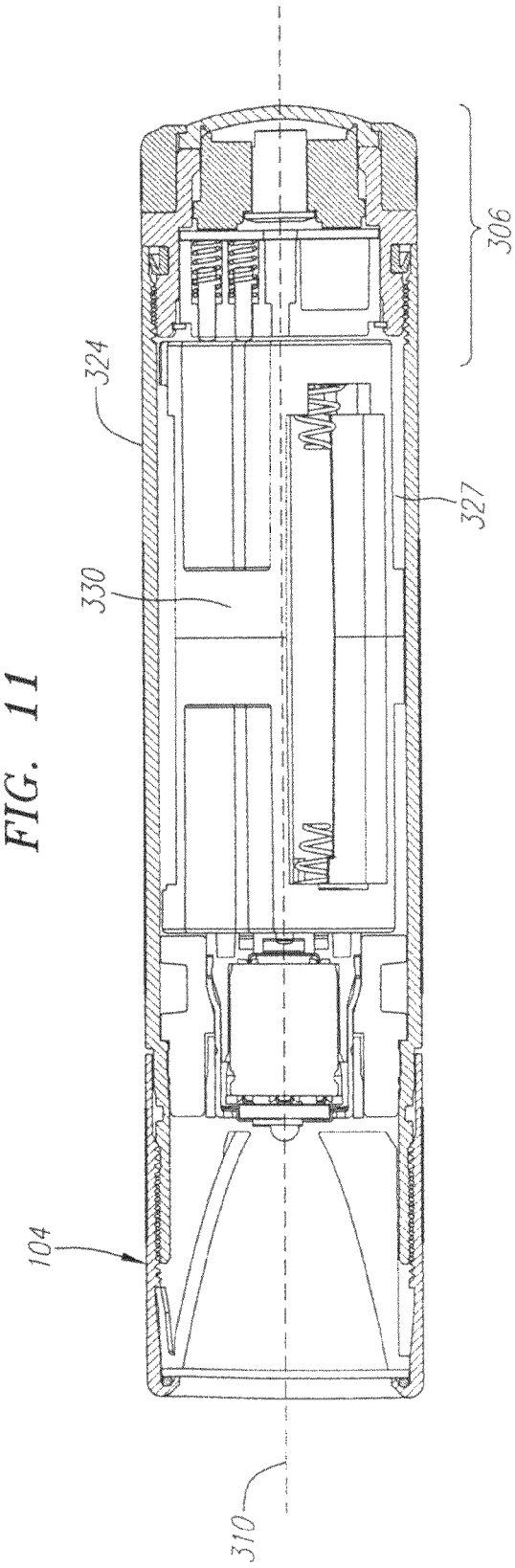
FIG. 12 is a cross-sectional view of the flashlight of FIG. 11 taken along the plane indicated by 302-302.
Figure 13:
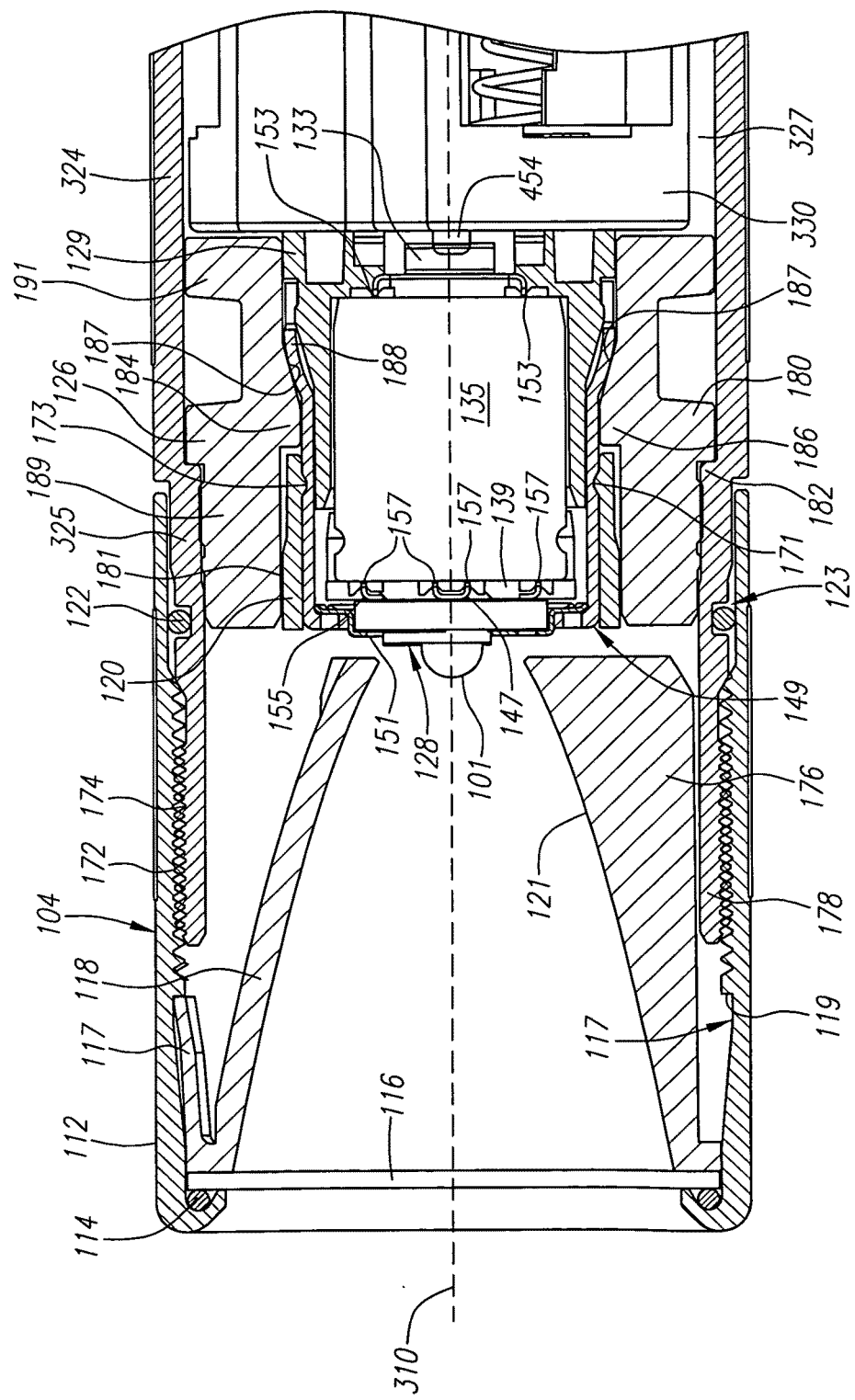
FIG. 13 is an enlarged cross-sectional view of the forward section of the flashlight of FIG. 11 taken through the plane indicated by 302-302.
Figure 15A:
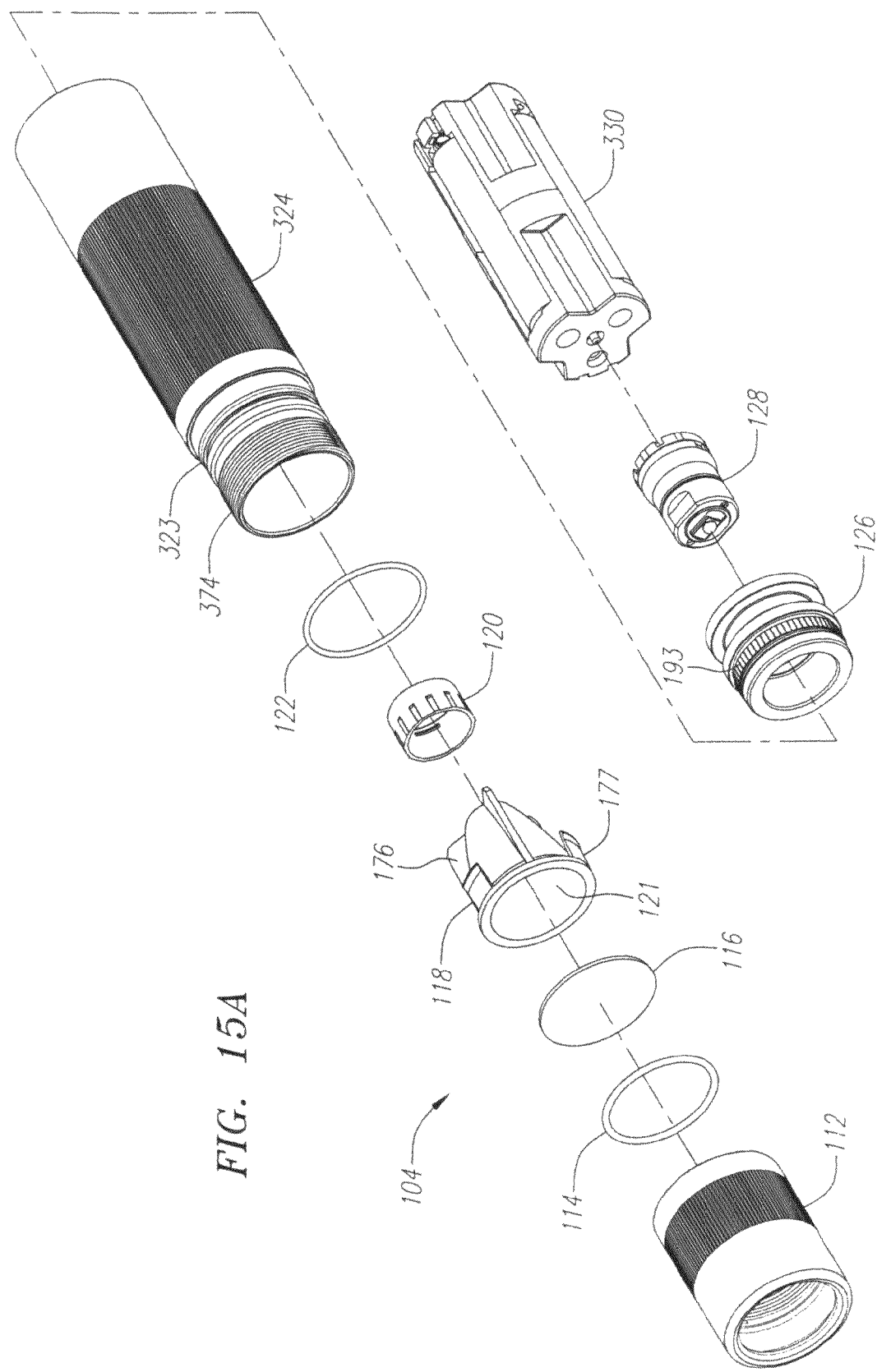
FIG. 15A is an exploded perspective view of the head assembly and a portion of the barrel of the flashlight of FIG. 11.

FIG. 12 is a partial cross-sectional view of flashlight 300 of FIG. 11 taken along the plane indicated by 302-302. FIG. 13 is an enlarged partial cross-sectional view of the forward section of flashlight 300 of FIG. 11 taken through the plane indicated by 302-302. (The portions of FIGS. 12, 13 that relate to the battery cassette 330 are not shown in cross-section.) FIG. 15A is an exploded perspective view of head assembly 104, barrel 324 and other components of flashlight 300 of FIG. 11.

Referring to FIGS. 13 and 15A, head assembly 104 may generally include combined head and face cap 112, lens 116, reflector 118, retaining collar 120, shoulder ring 126, lamp module 128, lower insulator 129 and o-rings 114, 122. Head assembly 104 and components including combined head and face cap 112, lens 116, reflector 118, retaining collar 120, shoulder ring 126, lamp module 128, lower insulator 129 and o-rings 114, 122 have been fully described in connection with FIGS. 3, 5A, 20, 21A and 21B.

Other configurations of the head assembly 104 may also be used. For example, in other embodiments, head assembly 104 may form a part of a mechanical switch means to provide a user interface.

Referring to FIG. 13, lamp module 128 is electrically coupled to flashlight 300 as follows. Flashlight 300 of the present embodiment includes a battery cassette 330 that includes positive electrode 454 which is electrically coupled to compressible positive contact 133 of lamp module 128. After the current passes through the light source, a ground connection extends from the negative electrode of the light source through heat sink housing 188, which acts as the negative contact of lamp module 128, and shoulder ring 126, which in turn is electrically coupled to barrel 324. The ground path continues to inner tail cap section 364, wave spring 150, and to circuit board 348 which includes a negative contact that is coupled to a negative electrode on battery cassette 330 thereby completing the circuit.

In the present embodiment, barrel 324 is used as a portion of the ground path from the negative contact of lamp module 128 to the negative electrode of battery cassette 330. As previously described in connection with FIGS. 3 and 5A.

Referring to FIGS. 13 and 15A, the forward region 189 of shoulder ring 126 includes a plurality of splines 193 (best seen in FIG. 15A) that are preferably spaced equally around the circumference of a portion of the forward region 189 of shoulder ring 126 so as to generally extend in the axial direction of the shoulder ring 126. The outer diameter of the forward region 189 of shoulder ring 126 is dimensioned so that it will provide an interference fit with the inner wall of the forward portion 325 of barrel 324 and so that splines 193 will cut into the inner wall of the forward portion 325 of barrel 324 when shoulder ring 126 is press fitted into the forward portion 325 of the barrel 324.

When shoulder ring 126 is press fitted into the forward portion 325 of barrel 324, the splines 193 will splay and cut into metal on the inner diameter of the forward portion 325 of barrel 324. Annular relief grooves are provided adjacent the forward and aft ends of splines 193 on shoulder 126 to receive metal from barrel 324 that is displaced during the press fitting operation. In this way, shoulder ring 126 is permanently locked in metal to metal contact with the forward portion 325 of barrel 324.

Splines 193 can cut through any anodized coating provided on the interior of barrel 324, thereby providing the possibility of using the barrel as a ground path without having to make a skin cut to remove anodizing or mask the contacting area before an anodizing treatment as has been conventionally required with aluminum flashlights.

Figure 14:
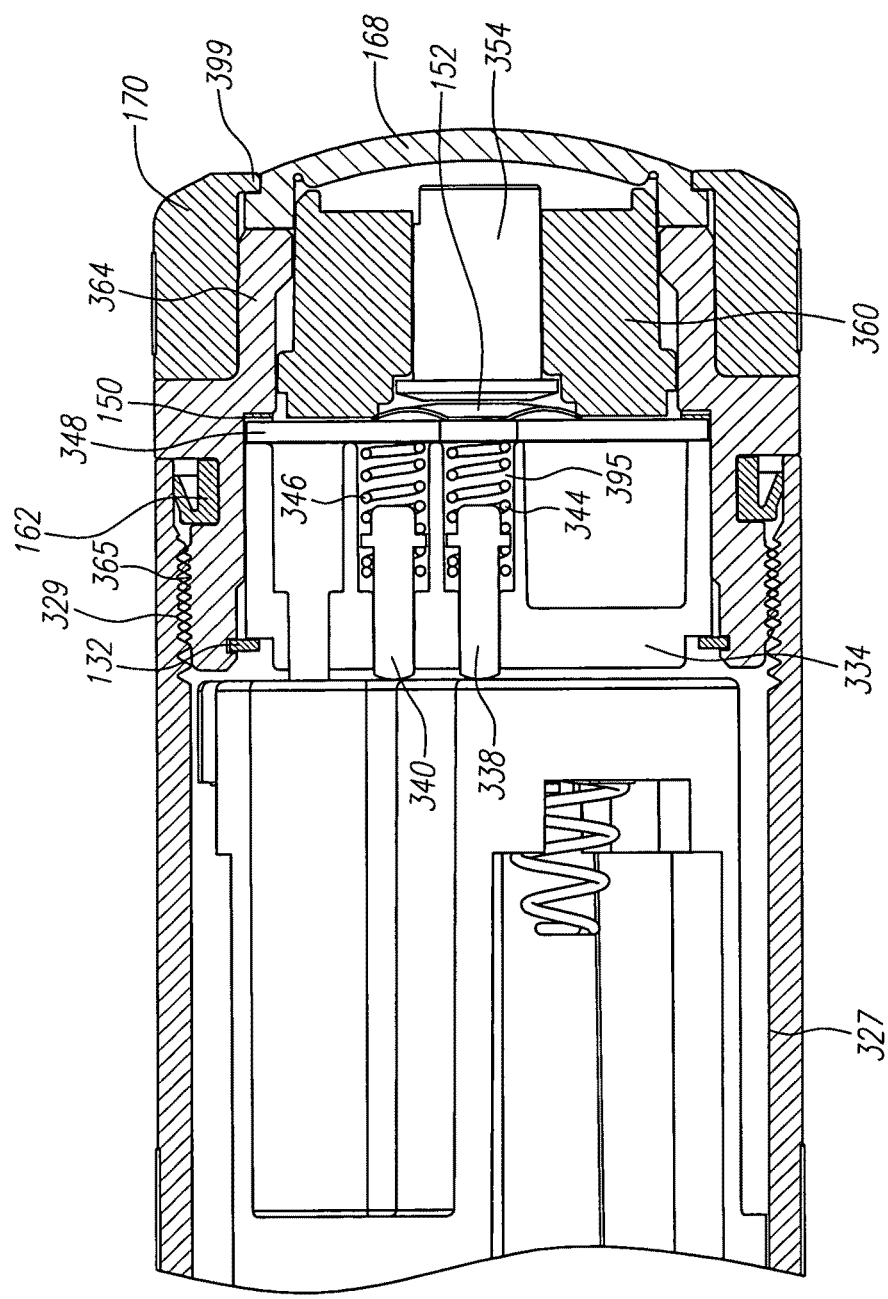
FIG. 14 is an enlarged cross-sectional view of the rearward section of the flashlight of FIG. 11 taken through the plane indicated by 302-302.
Figure 15B:
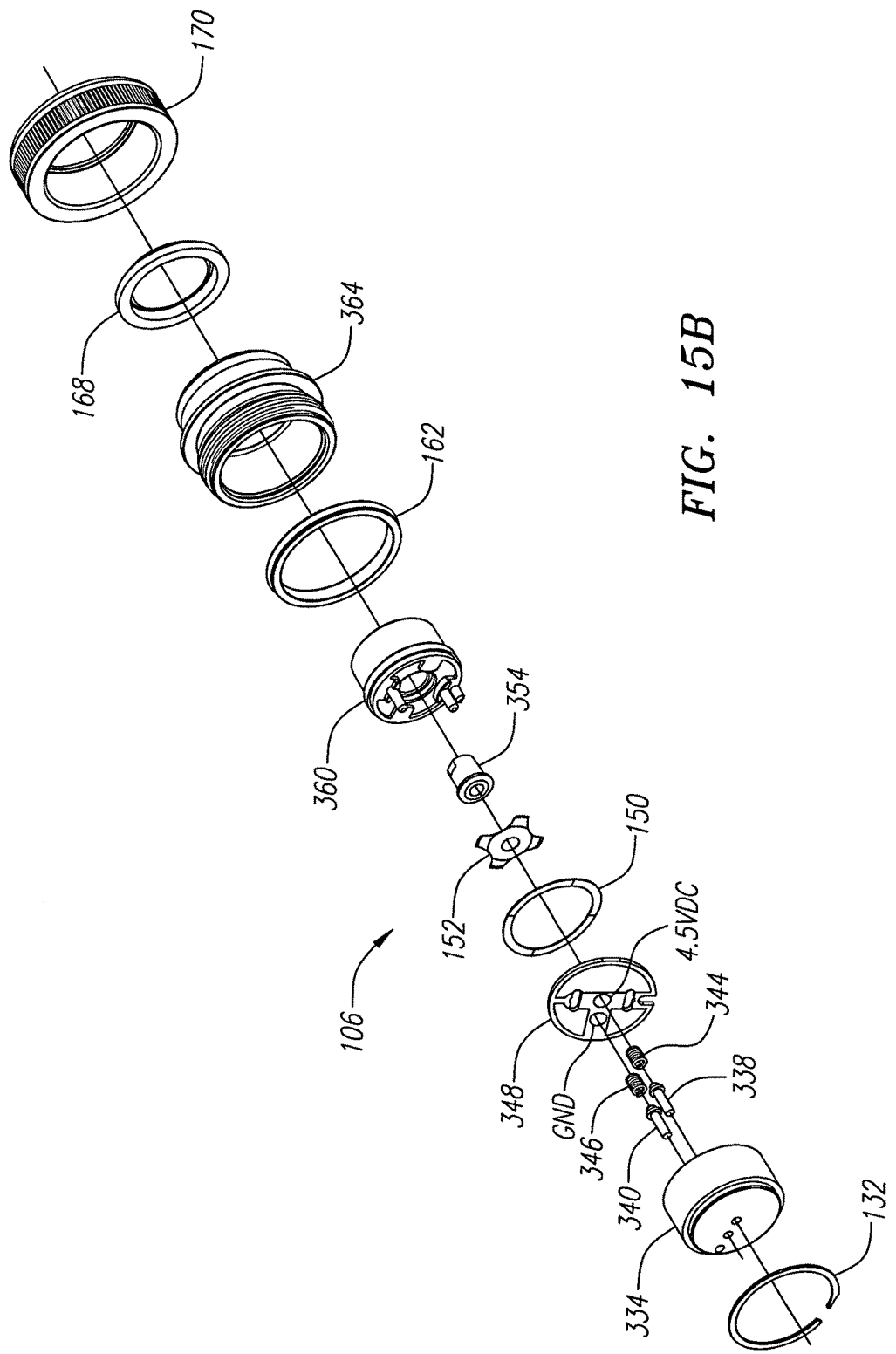
FIG. 15B is an exploded perspective view of the switch and tail cap assembly portion of the flashlight of FIG. 11.

FIG. 14 is an enlarged partial cross-sectional view of the rearward section of flashlight 300 of FIG. 11 taken through the plane indicated by 302-302. (In FIG. 14, however, battery cassette 330 is not shown in cross-section.) The rearward section of flashlight 300 generally comprises switch and tail cap assembly 306. FIG. 15B is an exploded perspective view of switch and tail cap assembly 306.

Referring to FIGS. 14 and 15B, switch and tail cap assembly 306 of the present embodiment preferably includes snap ring 132, lower switch housing 334, contact pins 338, 340, contact pin springs 344, 346, circuit board 348, wave spring 150, snap dome 152, actuator 354, upper switch housing 360, lip seal 162, inner tail cap section 364, switch port seal 168, and outer tail cap section 170.

Lower switch housing 334 may be similar to lower switch housing 134 as described above in connection with FIG. 4. To this end, lower switch housing 334 may also include three cylindrical channels and chambers. However, in the present embodiment, only the inner two channels are provided with contact pins 338, 340 to slide in and out of the front surface of lower switch housing 334. Contact pin springs 344, 346 may be installed in the two chambers and may in turn engage a shoulder on contact pins 338, 340 as shown. Springs 344, 346 serve to push contact pins 338, 340 forward until their respective shoulders engage the end wall of its respective chamber. Contact pins 338, 340 and contact pin springs 344, 346 are preferably made out of metal so as to form part of the electrical paths described later. In the present embodiment, contact pins 338, 340 may comprise a metal, such as, aluminum while contact pin springs 344, 346 may comprise a spring, such as, music wire.

Figure 17:
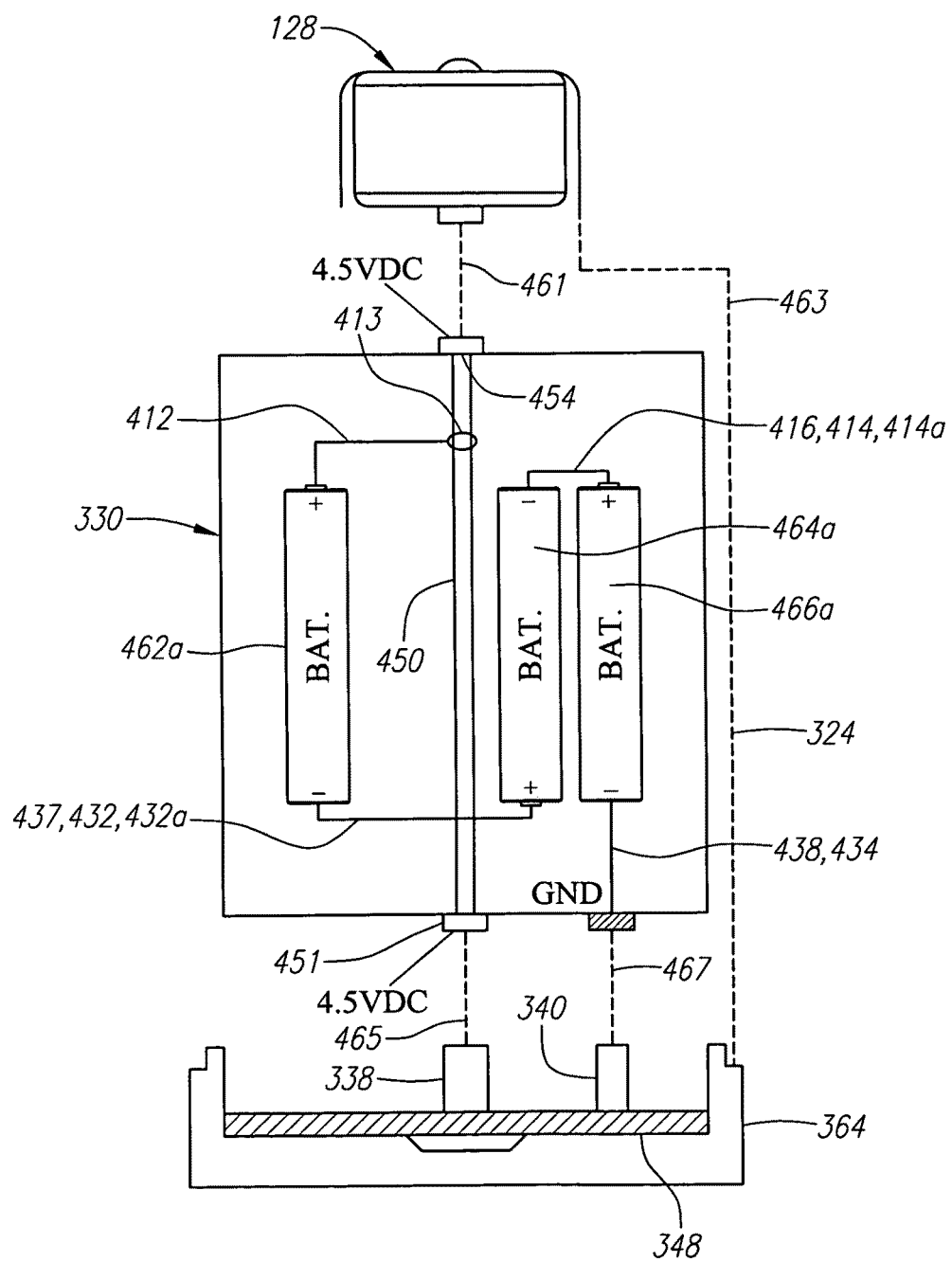
FIG. 17 is a schematic diagram illustrating the internal and external electrical connections of the battery cassette of FIG. 16.

The channels of lower switch housing 334 are configured to align with contacts on the bottom of battery cassette 330. When battery cassette 330 is installed, contact pin 338 may be aligned and make contact with the bottom central contact (4.5VDC) of battery cassette 330, and contact pin 340 may be aligned and make contact with the bottom outer ring (GND) of battery cassette 330. Both contacts are shown in FIG. 17.

Circuit board 348 preferably includes contacts on both sides. Circuit board 348 may also include conductive vias routed through board 348 to couple the contacts on opposite sides. Alternatively, wires may be routed around board 348 to couple contacts on opposite sides. Circuit board 348 may also include electronic components installed thereon. The forward side of circuit board 348 (which is facing the lower switch housing 334) includes two contacts (labeled GND and 4.5VDC as shown in FIG. 17) that are electrically couple to contact pin springs 344, 346, respectively. The rear side of circuit board 348 (which is facing the upper switch housing 360) includes three contact pads that correspond to GND, MOM and 4.5VDC and that are located at designated locations. Each pair of the corresponding contacts on the front side and rear side of circuit board 348 may be electrically connected through conductive vias provided in circuit board 348, or alternatively routing wires. The electronic components and their function assembled on circuit board 348 will be described later in this specification.

Upper switch housing 360 includes a cylindrical channel that allows actuator 354 to slide within. An annular rim of switch port seal 168 is held between an annular lip 399 of outer tail cap 170, which is located at the rear end of flashlight 300, and inner tail cap section 364. When a user presses on switch port seal 168, actuator 354 is moved forward and engages snap dome 152 to close a switch formed by snap dome 152 and two contact pads on circuit board 348. When the user releases switch port seal 168, the switch is open.

In the present embodiment, upper switch housing 360 and actuator 354 preferably comprise a non-conductive material, such as plastic. Switch port seal 168 also preferably comprises a non-conductive material, such as rubber. Snap dome 152 preferably comprises a conductive material such as metal. Other suitable materials may be used.

In the present embodiment, snap ring 132 is placed between the front edge of lower switch housing 334 and inner tail cap section 364 to prevent lower switch housing 334 from moving forward.

Wave spring 150 may be provided between the rear edge of circuit board 348 and inner tail cap section 364 to provide a compressible spring contact between the two. Wave spring 150 also applies a biasing force to circuit board 348, which in turn applies the biasing force to lower switch housing 334, thereby serving to press cover switch housing 334 against snap ring 132.

Inner tail cap section 364 preferably includes threads 365 on the front outer surface of inner tail cap section 364 for mating with threads 329 on the rear inner surface of barrel 324.

In the present embodiment, the outer diameter of the aft end of inner tail cap section 364 and the inner diameter of the outer tail cap section 170 are preferably sized so that tail cap 170 may be permanently press fitted onto the aft end of inner tail cap section 364 thereby forming an integral switch and tail cap assembly 306.

Inner tail cap section 364 preferably comprises a conductive material such as aluminum. Inner tail cap section 364 may also be nickel plated.

A one-way valve, such as a lip seal 162, may be provided at the interface between barrel 324 and the switch and tail cap assembly 306 to provide a watertight seal while simultaneously allowing overpressure within the flashlight to expel or vent to atmosphere. However, other forms of sealing elements, such as an o-ring, may be used instead of one-way valve 162 to form a watertight seal. Lip seal 162 is preferably made out of non-conductive material, such as rubber.

Other configurations of switch and tail cap assembly 306 may be used. For example, the switch function may be included in a side, push button switch or in an internal rotating head assembly switch such as that employed in U.S. patent application Ser. No. 12/353,396, filed Jan. 14, 2009.

Referring now to FIGS. 15A, 16A, 16B and 17, the battery cassette 330 is now further described. As mentioned above, battery cassette 330 preferably contains the batteries used to power the flashlight 300 or other lighting device. After the batteries are inserted into battery cassette 330, it may be inserted into flashlight barrel 324 along with the other components of flashlight 300 as shown in FIGS. 15A and 15B.

Figure 16A:
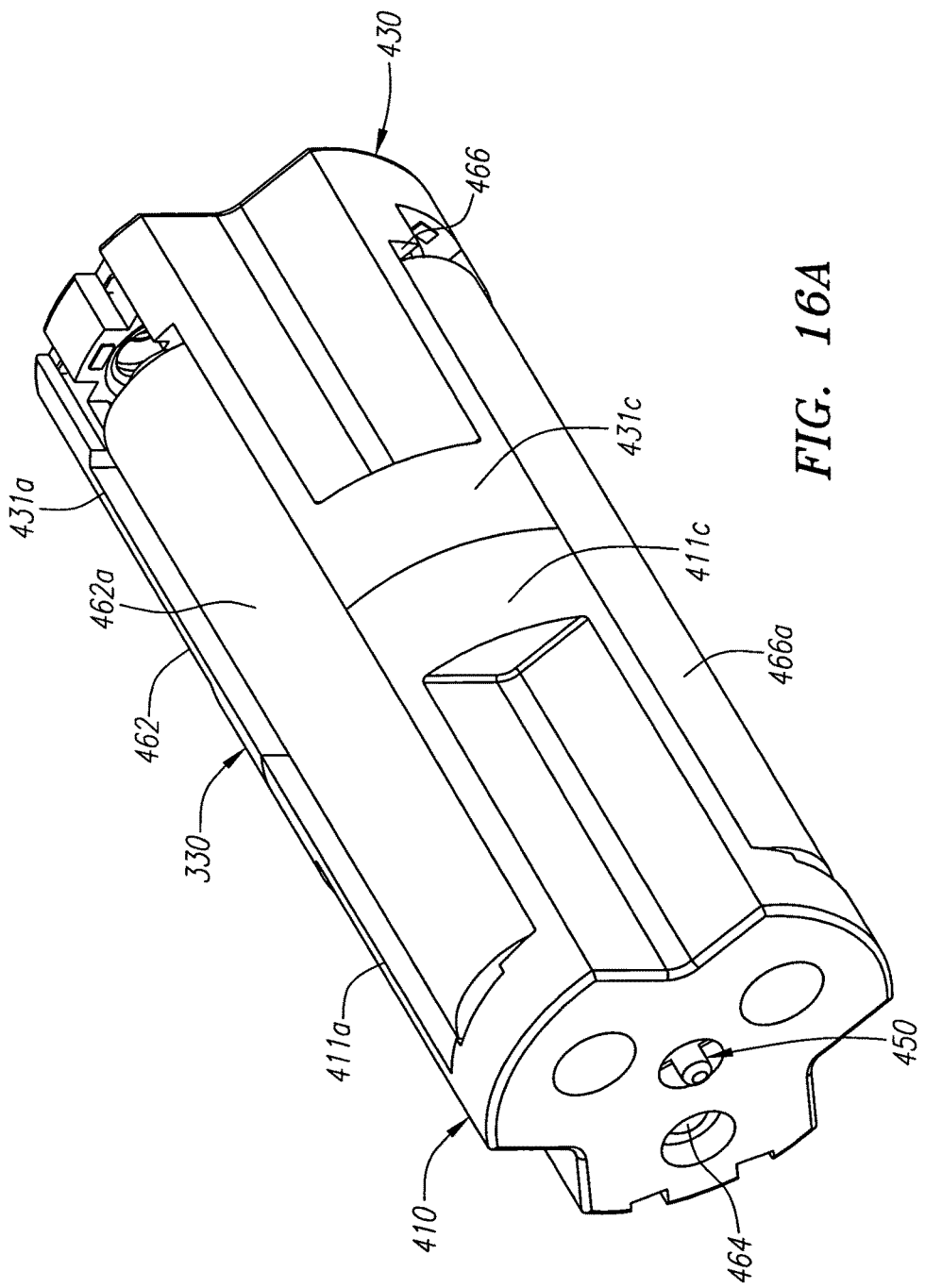
FIG. 16A is a perspective view of a battery cassette.

As shown in FIG. 16A, battery cassette 330 may include front or lamp end housing assembly 410 and rear or tail end housing assembly 430. These two housings may be held together by center connector 450 as both shown in FIG. 16B which is an exploded view of the components comprising cassette 330.

Figure 16B:
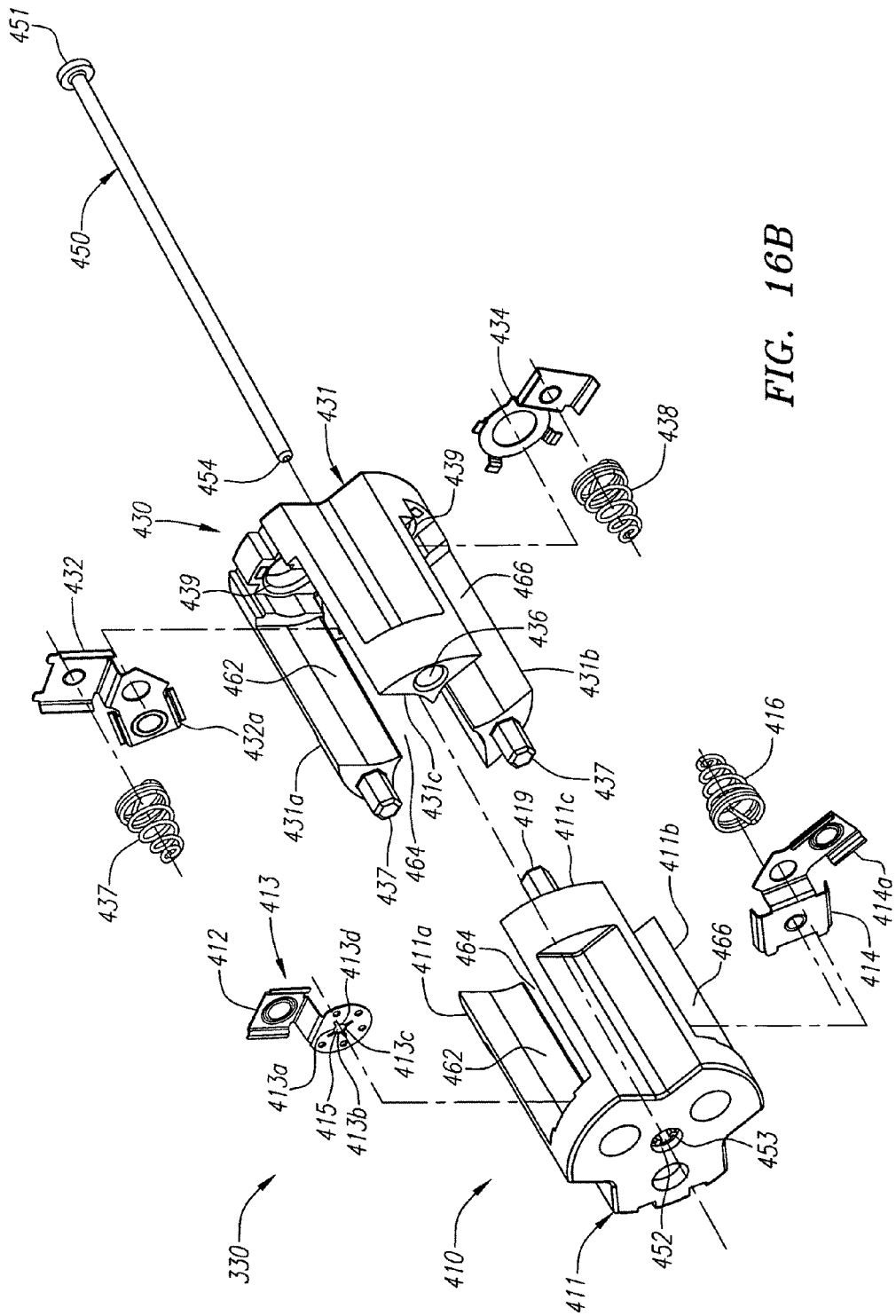
FIG. 16B is an exploded perspective view of the battery cassette of FIG. 16A.

As also shown in FIG. 16B, front or lamp end housing assembly 410 may include front housing 411 which may be formed in a configuration to include prongs 411a, 411b, 411c. Front housing assembly 410 may also include positive lamp contact 412, which itself includes tab 415, which in turn includes flaps 413a, 413b, 413c, 413d. Flaps 413 are sized so that hole 414 preferably exists in the center thereof. As discussed later, these tabs are in electrical contact with center connector 450. Front housing assembly 410 may also include front crossover contact 414 and spring 416. Contacts 412, 414 and spring 416 preferably comprise an electrical conducting material.

Front housing assembly 410 is preferably manufactured in a manner that reduces the number of steps needed to assemble its components. To this end, front housing 411 may be injection molded from a plastic or other suitable material. This injection molding process preferably includes the co-molding of positive lamp contact 412 and front crossover contact 414 with housing 411. That is, contacts 412, 414 are preferably positioned within the injection molding machine so that they become encompassed or otherwise held in place by the injected material as it solidifies. They are located in the injection molding machine so that they end up being in the appropriate positions to form parts of the electrical path as described later. In this manner, separate manufacturing steps whereby contacts 412, 412 would be attached to housing 411 may be avoided.

Though co-molding is preferred other means may be used to assemble contacts 412, 414 with housing 411. After housing 411 and contacts 412, 414 are co-molded or otherwise assembled, spring 416 may be press fit into housing 411 so that it is in contact with front crossover contact 414. For example, spring 416 may be press into a recess between housing prongs 411a, 411b. Though this recess is not shown in FIG. 16B, similar recesses 439 are shown in rear housing 431. In any event, other means may be used to assemble spring 416 with housing 411.

Rear or tail end housing assembly 430 may include rear housing 431 which may be formed in a configuration to include prongs 431a, 431b, 431c that correspond to front housing prongs 411a, 411b, 411c when the two housing assemblies 410, 430 are coupled together. Rear housing 430 may also include rear crossover contact 432, outer ring contact 434 and springs 417, 418. Contacts 432, 434 and springs 437, 438 preferably comprise an electrical conducting material.

Rear housing assembly 430 may be manufactured similarly to front housing assembly 410 so as to reduce the number of assembly steps. That is, rear crossover contact 432 and outer ring contact 434 may be co-molded along with rear housing 431 during an injection molding process so that they are appropriately located to form parts of the electrical paths as discussed later. Though co-molding is preferred, other means may be used to assemble contacts 432, 434 with rear housing 431.

Springs 437, 438 may then be press fit into rear housing 431 so that they are in electrical contact with contacts 432, 434, respectively. For example, spring 437, 438 may be press fit into recesses 439 in housing 431. Other means may be used to assemble springs 437, 438 with housing 431.

As shown in FIG. 16A, front and rear housing assemblies 410, 430 are coupled to one another to form cassette 330. To facilitate this coupling, as shown in FIG. 16B, front housing 411 may include pin 419 on prong 411c that may engage hole 436 formed in prong 431c of rear housing 431. Similarly, back housing 431 may include pins 437 on prongs 431a, 431b that may engage holes (not shown) in prongs 411a, 411b of front housing 411.

Both housings 411, 431 preferably include a central hole 452 through which center connector 450 may extend. Center connector 450 preferably holds housings 411, 431 together and also comprises part of the electrical path. Center connector may include rear disk or contact 451. To combine housings 411, 431, they may first be placed together by corresponding pins and holds, and center connector may then be slid through the center holes 452. Tab 413 of positive lamp contact 412 may reside at the forward end of central hole 452 in front housing 411. Tab 413 may include flaps 413*a, b, c, d*. Flaps 413 are preferably flexible so that when center connector is pushed through housings 411, 431, and through hole 415, its forward end 454 may protrude through hole 415 and push flaps 413 forward until rear contact 451 engages the rear surface of rear housing 431. The center connector 450 is then held in place by a friction fit with flaps 413*a, b, c, d* which are bent in a forward position.

The current invention's use of pins and holes to readily couple housing assemblies 410, 430 along with pushing the center connector 450 through the central holes 452 represents an advance over earlier systems that use threads as the means to couple different parts of a device intended to house batteries. That is, housing assembly 410, 430 may simply be pressed on to each other and held in place by center connector 450 without having to screw on one housing to another. This preferably eases manufacturing.

Though the figures show corresponding pronged housing assemblies 410, 430, the current invention is not limited to this embodiment. Other configurations for the housing assemblies may be used. To this end, other housing configurations for front and rear housings 411, 431 may be used but it is preferred that any alternate housings have corresponding configurations so that they may be joined together to form cassette 330 that may contain batteries.

When housings 410, 430 are joined together to form cassette 330 as shown in FIG. 16A, the housing prongs 411, 431 come together to form battery bays 462, 464, 466. More specifically, battery bay 462 is formed between prongs 411*c*/431*c* and 411*a*/431*a*, bay 464 is formed between prongs 411*a*/431*a* and 411*b*/431*b* and bay 466 is formed between prongs 411*b*/431*b* and 411*d*/431*c*. These bays are preferably sized to receive the desired size battery, e.g., AAA battery or other size. As shown in FIG. 16B, the cross section of the prongs is preferably curved so that the batteries may fit snugly in each bay. FIG. 16A shows battery 426*a* in bay 462, and battery 466*a* in bay 466.

Each bay preferably includes electrical contacts to engage the positive and negative ends of a battery. For example, battery bay 462 may include positive lamp contact 412 to engage the positive terminal of battery 462*a*, and spring 437 and rear crossover contact 432 to engage the negative terminal of battery 462*a* As such, in bay 462, the positive end of battery 462*a* is directed to the front of the cassette 330.

Rear crossover contact 432 preferably includes tab 432*a* which extends to battery bay 464 and may serve as the contact to the positive end of the battery located in bay 464. Front crossover contact 414 and spring 416 may engage the negative terminal of the battery in bay 464. As such, the positive end of battery 464*a* directed to the rear of cassette 330.

Front crossover contact 414 may include tab 414*a* which extends to bay 466 where it may engage the positive terminal of battery 466*a* located therein. The negative terminal of battery 466*a* in bay 466 may be engaged by spring 438 which is coupled to outer ring contact 434. Accordingly, the positive end of battery 466*a* is directed to the front of cassette 330.

The manner in which cassette 330 may contain the batteries is now further described. As shown in FIG. 16A, battery 462*a* is housed in bay 462, battery 464*a* is housed in bay 464 and battery 466*a* corresponds to the battery housed in bay 466. As shown in FIG. 17, the batteries 462*a*, 464*a*, 466*a* are electrically connected in series. However, the batteries are physically located side by side or in parallel relative to each other in their respective bays as shown in FIG. 16A. (It should be noted that FIG. 17 is more directed to showing the electrical conductive path between the batteries and does not show the contemplated physical location of the batteries.)

This battery arrangement is advantageous in that the power provided by three batteries may be attained without having to physically locate them end to end as with many other flashlights having a series electrical connection. This provides the benefit that the length of the flashlight barrel or other lighting device housing need not be dictated by the number of batteries mounted end to end. More specifically, for example, a flashlight with a certain number of batteries may be shorter which may be advantageous in certain applications.

The electrical conductive path of the batteries in cassette 330 is now further described starting with battery 462*a*. The negative terminal of battery 462*a* is coupled to the positive terminal of battery 464*a* through spring 437 and then rear crossover contact 432 and tab 432*a*. (In FIG. 17, reference numerals 437, 432 and 432*a* represent the electrical path provided by these components as opposed to physically showing them.) The negative terminal of battery 464*a* is coupled to the positive terminal of battery 466*a* through spring 416 and then front crossover contact 414 and tab 414*a*. The negative terminal of battery 466*a* is coupled to spring 438 and then outer ring contact 434.

As shown in FIG. 17, the positive terminal of battery 462*a* is electrically coupled to center connector 450 via positive lamp contact 412 with its tab 413 and flaps 413*a-d*. The electrical conductive path then continues through center connector 450 to its forward end 454 to the positive electrode of the lamp module 128 as represented by the dotted line 461. (It should be noted that a bulb may also be used.) From the lamp module 128 or other lighting device, the conductive path may then continue through components of the flashlight that form part of the conductive electrical path as represented by the dotted line 463 in FIG. 17. In one embodiment, the dotted line may comprise the flashlight's barrel 324. And from there, the conductive path may extend through tail cap 364 and to circuit board 348

As shown in FIG. 17, circuit board 348 may be coupled to two contact pins 338, 340 which are electrically coupled to battery cassette 330 as represented by the dotted lines 465, 467. The positive connection between battery cassette 330 and circuit board 348 occurs through contact 451 of center connector 450.

As such, center connector 450 provides a positive contact at both ends of cassette 330, i.e., the positive contact at its forward end 454 to lamp module 128 and the positive contact at contact 451 to circuit board 348. The negative connection between battery cassette 330 and circuit board 348 occurs through outer ring contact 434.

When battery cassette 330 is installed into battery compartment 327, in the present embodiment, an electrical path for the light source (or electrical load) may be formed from the central electrode or forward end 454 of center connector 450 of battery cassette 330 to the compressible positive contact 133 of lamp module 128, and then from heat sink 188 of lamp module 128 to the conductive inner surface of barrel 324, then from rear thread 329 on barrel 324 to thread 365 on conductive inner tail cap section 364 and conductive inner tail cap section 364 itself, then through wave spring 150 to the ground pad on the rear side of circuit board 348, then to a load switch on circuit board 348, ground pad on the front side of circuit board 348, contact pin spring 346, contact pin 340 and then finally to the negative electrode 434 of battery cassette 330.

As noted above, the positive terminal of battery 462*a* may be electrically coupled to the front of cassette 330. However, the positive end of battery 462 may also be electrically coupled to the rear of cassette again through its connection with center connector 450. That is, center connector extends to its rear contact 451 at the rear of cassette 330.

Figure 18:
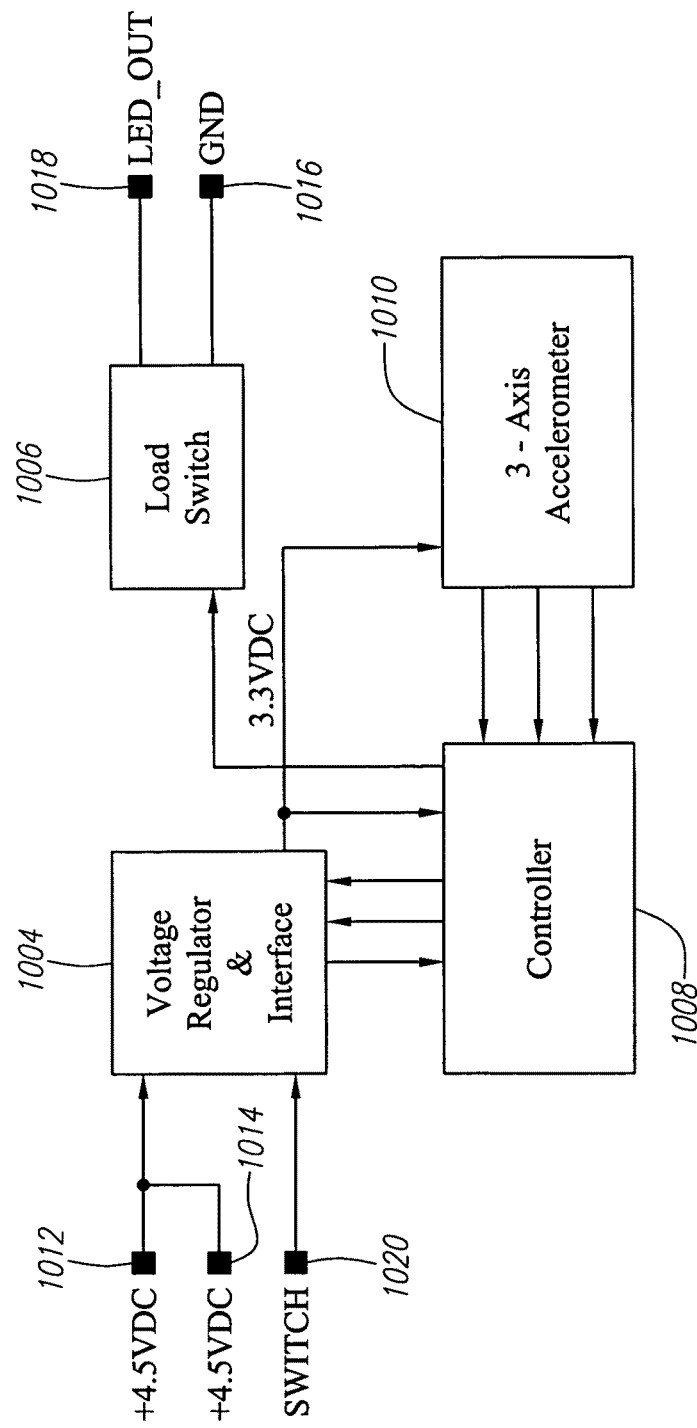
FIG. 18 is a circuit diagram illustrating the relationship between the electronic circuitry according to another embodiment of the invention.

FIG. 18 is a block diagram illustrating electronic components of an exemplary circuit board 348 for a flashlight such as that illustrated and discussed in connection with FIGS. 11-17. The circuit board 348 may include voltage regulator circuit 1004, load switch circuit 1006, controller circuit 1008, and 3-axis accelerometer circuit 1010.

The circuit board 348 may include I/O pads to engage external devices. I/O pads may include top +4.5VDC 1012, bottom +4.5VDC 1014, GND 1016, LED_OUT 1018 and SWITCH 1020.

The I/O pads top +4.5VDC 1012 and GND 1016 may be coupled to the central contact 451 and the outer ring contact 434 of battery cassette 330, respectively. I/O pads bottom +4.5VDC 1014 and SWITCH 1018 may be coupled to snap dome 152. When a user presses on switch port seal 168, actuator 354 may be pushed forward to engage snap dome 152 to close the switch between SWITCH 1020 and +4.5VDC 1012. When the user releases switch port seal 168, the switch is open and SWITCH 1020 is no longer coupled to +4.5VDC 1012.

Detailed electrical circuit schematics of an embodiment of circuit board 348 are shown in FIGS. 19A-D.

Figure 19A:
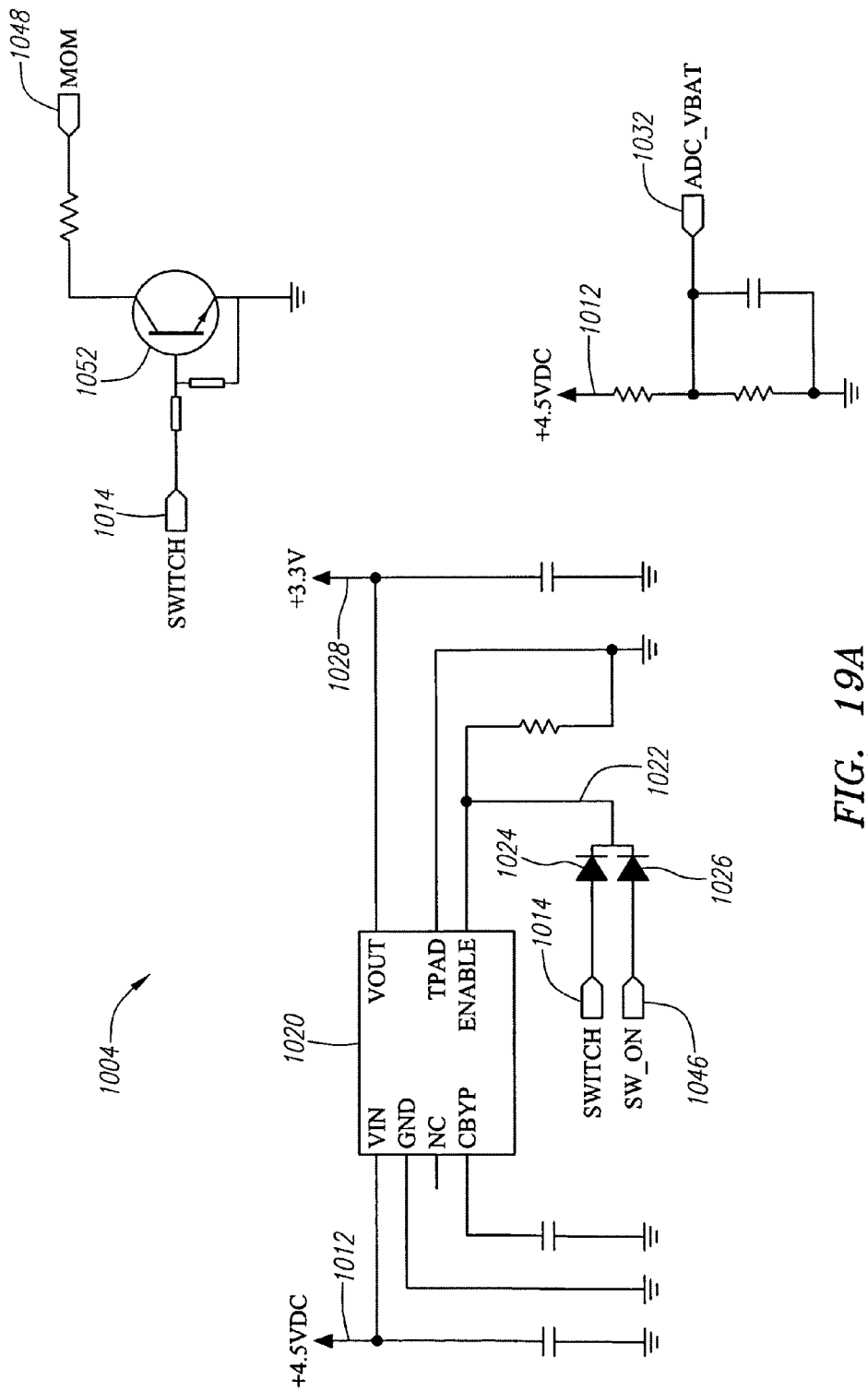
FIGS. 19A-D are schematic circuit diagrams of different components of the circuit shown in FIG. 18.

FIG. 19A shows a circuit schematic diagram of a preferred voltage regulator circuit 1004. Voltage regulator circuit 1004 may include a low dropout regulator 1020, which may be implemented by a DC linear voltage regulator operated with a small input-output differential voltage. Signal line 1022 is an output from two diodes 1024, 1026 which may be driven by signal lines SWITCH 1014 and SW_ON 1046, respectively. This configuration preferably allows the higher voltage from signal lines SWITCH 1014 or SW_ON 1046 to enable low dropout regulator 1020.

In a preferred embodiment, the output of low dropout regulator 1020 may be set to +3.3V 1028 for use as a power supply source to other components, for example, controller circuit 1008. In one embodiment, a commercial stand-alone LDO regulator, e.g., ISL9003AIRUNZ manufactured by Intersil Coperation, may be used. It should be understood that other types of linear regulator circuits may also be employed.

The voltage supply level from battery (i.e. +4.5VDC 1012) may be monitored by controller circuit 1008 through signal line ADC_VBAT 1032. Signal line ADC_VBAT 1032 may be generated by a voltage divider from +4.5VDC 1012.

The I/O pad SWITCH 1014 may be used to generate signal MOM 1048 for sending to controller circuit 1008 as an indication that a user is pressing on switch port seal 168 when MOM 1048 is low. MOM 1048 may be generated by NPN bipolar transistor 1052.

Figure 19B:
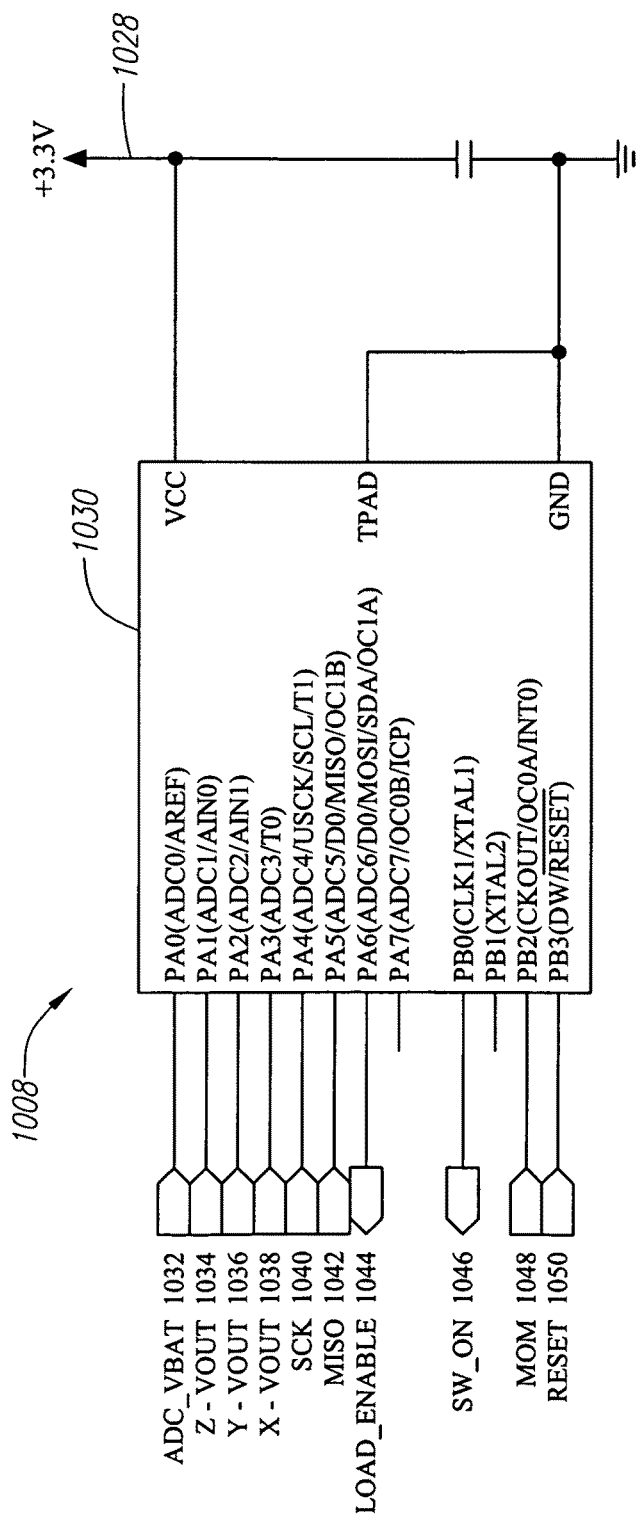

FIG. 19B is a circuit schematic diagram of a preferred controller circuit 1008. Controller circuit 1008 may include controller 1030 with input and output connections. Controller 1030 may receive input signals through signal lines ADC_VBAT 1032, Z-VOUT 1034, Y-VOUT 1036, X-VOUT 1038, SCK 1040, MISO 1042, MOM 1048 and RESET 1050. Controller 1030 may also deliver output signals through signal lines LOAD_ENABLE 1044 and SW_ON 1046. The power supply of controller 1030 may be supported by the +3.3V 1028 power supply.

In one embodiment, controller 1030 is a commercially available controller having embedded memory, e.g., an ATtiny24 which is an 8-bit controller manufactured by Atmel Corporation. In another embodiment, controller 1030 may be a microprocessor. Yet in other embodiments, controller 1030 may be discrete circuits. Those skilled in the art will appreciate that other types of controller circuits may also be employed.

Figure 19C:
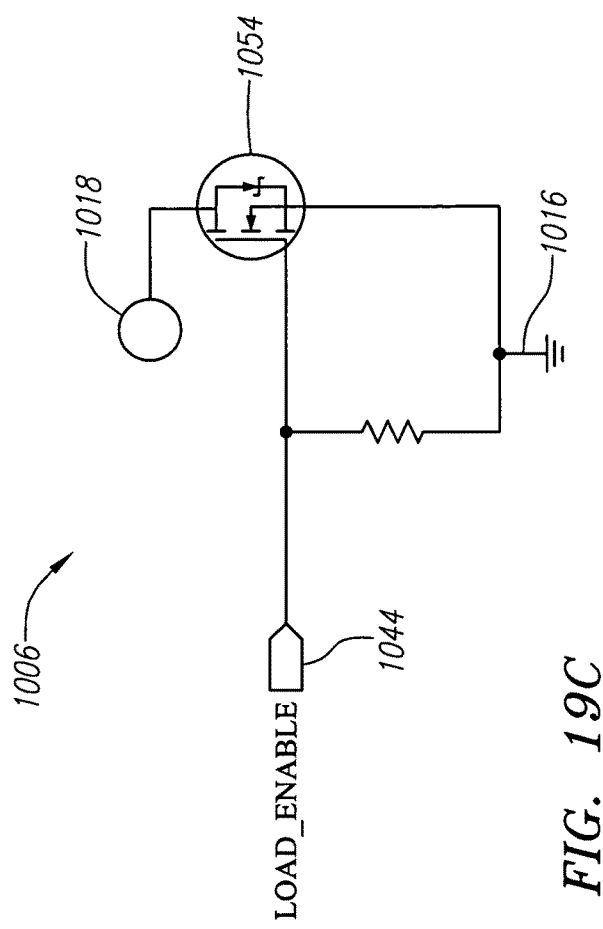

FIG. 19C shows a circuit schematic diagram of a preferred load switch circuit 1006. In the embodiment of FIG. 19B, the load switch may be implemented by NMOS 1054. The source of PMOS 1054 may be coupled to top GND 1016 while the drain of NMOS 1054 may be coupled to LED_OUT 1018. The gate of NMOS 1054 may be coupled to LOAD_ENABLE 1044. Electric power may flow from LED_OUT 1018 to GND 1016 to form a portion of a loop of electrical current that may turn on lamp module 128.

Those skilled in the art will appreciate that other types of driver and load switch circuits can also be employed.

Figure 19D:
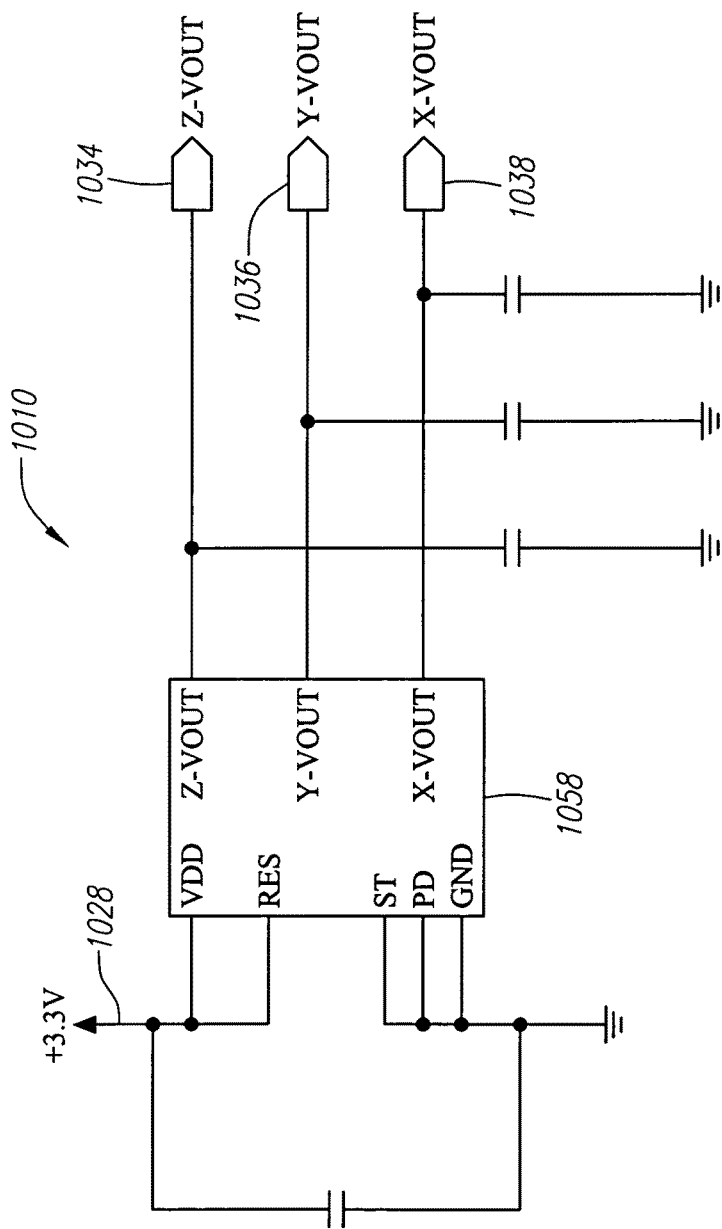

FIG. 19D shows a circuit schematic diagram of a preferred 3-axis accelerometer circuit 1010. 3-axis accelerometer circuit 1010 may include outputs Z-VOUT 1034, Y-VOUT 1036 and X-VOUT 1038 that may also be coupled to the controller circuit 1008 for further processing.

3-axis accelerometer circuit 1010 preferably includes an inertial sensor 1058 that may receive information from its internal sensing elements and that may provide analog signals according to the measurements from the internal sensing elements. Inertial sensor 1058 may be used to measure the Earth's static gravity field by providing acceleration information in three axes, e.g., mutually orthogonal axes, namely X, Y and Z. The power supply VDD of 3-axis accelerometer circuit 1010 may be supported by the +3.3V 1028 power supply.

If the Z axis of inertial sensor 1058 is pointing towards the center of the Earth, then X and Y will have an acceleration of zero. Z, however, will experience an acceleration of −1G due to the gravity of the Earth. If inertial sensor 640 was flipped 180° so that Z is pointing away from the Earth, X and Y will remain at zero, but Z will have an acceleration of +1G.

Inertial sensor 1058 may be attached to circuit board 348 so that the X, Y and Z axes are fixed relative to flashlight 300. In a preferred embodiment, inertial sensor 1058 is oriented on board 348 so that the Z axis extends along the longitudinal axis of flashlight 300. As such, when flashlight 300 is positioned horizontally, the Z axis also extends horizontally. In this position, when X and Y are rotated left or right about the longitudinal axis of the flashlight 300, as the magnitudes of the acceleration in the X and Y axes change during rotation, gravity information on X and Y may be sent to controller 1030 through X-VOUT 1038 and Y-VOUT 1036, respectively. Relative angular rotation may be computed by controller 1030. Controller 1030 may use the information on X-VOUT 1038 and Y-VOUT 1036 to determine whether there is a rotation about the longitudinal axis of flashlight 300.

In a preferred embodiment, the switch for flashlight may be located in switch and tail cap assembly 106. In this arrangement, the starting orientation of the X and Y axes are unknown, so a starting may be calculated based on the Earth's gravitational field in the X and Y axes in the starting orientation. Once their starting orientation is established, subsequent angular measurements may be made to track the rotation of flashlight 300.

In another embodiment, the switch can be placed on the barrel. In this arrangement, the starting position of the X and Y axes are known, assuming that the switch is pointing up as dictated by the shape of a user's hand with the thumb above the switch. In this case, only one axis (either the X or Y) may be used to calculate rotational changes.

In both embodiments above, it is preferred that flashlight 300 be positioned approximately horizontally for the user to obtain higher resolution when rotating, i.e., better sensing of the rotation of the X and Y axes. As the Z axis tilts farther from horizontal, rotational errors may occur. In operation, it is preferred that flashlight 300 be held to +/−a30° from horizontal. If the tilting is greater than 30°, it is preferred that the Z axis be monitored and the rotational input ignored until flashlight 300 is tilted back within the +/−30° window.

In a preferred embodiment, inertial sensor 1058 may be a commercially available micro-electro-mechanical systems (MEMS), e.g., LIS394AL which is a 3-axis accelerometer manufactured by ST Microelectronics. Those skilled in the art will appreciate that other types of inertial sensor circuits may also be employed.

The operational functions provided by the exemplary flashlight 300 can be similar to that described previously in connection with FIGS. 10A and 10C-10I. In accordance, detailed descriptions would not be provided herewith.

Alternative preferred embodiments are now described below with reference to FIGS. 21-37. The embodiments described below share certain features that are similar to the foregoing embodiment. So as noted above, to facilitate the description, any reference numeral representing an element in one figure generally represents the same element in other figures.

Exemplary flashlights 2100, 2300 are described in connection with FIGS. 21-25B and 26-33, respectively. Each of the exemplary flashlights 2100, 2300 incorporate a number of distinct aspects. While these distinct aspects have all been incorporated into flashlights 2100, 2300 in various combinations, the scope of the present invention is not restricted to flashlights 2100, 2300. Rather, the present invention is directed to each of the inventive features of flashlights 2100, 2300 described below both individually as well as in various combinations. Further, as will become apparent to those skilled in the art after reviewing the present disclosure, one or more aspects of the present invention may also be incorporated into other portable lighting devices, including, for example, head lamps and lanterns.

Figure 21:
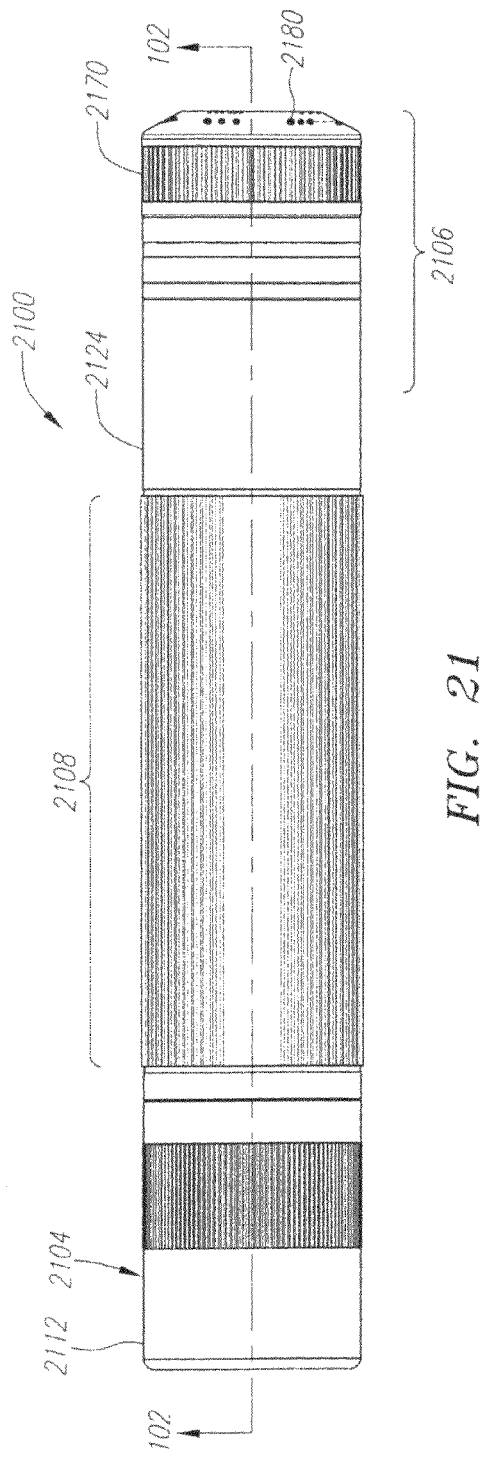
FIG. 21 is a plan view of an exemplary flashlight.

FIG. 21 shows an exemplary flashlight 2100. The exemplary flashlight 2100 generally includes barrel 2124, head assembly 2104 located at the forward end of barrel 2124, and switch and tail cap assembly 2106 located at the rear end of barrel 2124. The head assembly 2104 is disposed about the forward end of the barrel 2124, and the switch and tail cap assembly 2106 encloses the rear end of barrel 2124.

Barrel 2124 may include a textured surface 2108 along a portion of its length for a user to grip. In the present embodiment, textured surface 2108 may be provided by broaching. Alternatively, textured surface 2108 may comprise a knurled or machine surface. Any desired pattern may be used for textured surface 2108.

Figure 22:
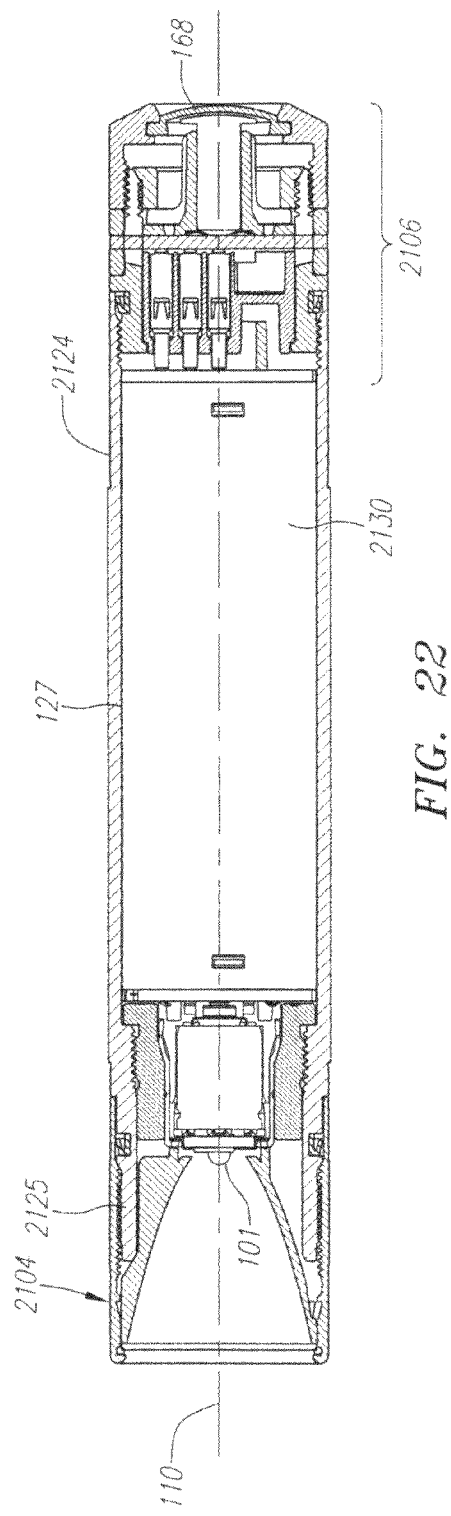
FIG. 22 is a cross-sectional view of the flashlight of FIG. 21 taken along the plane indicated by 102-102.
Figure 23:
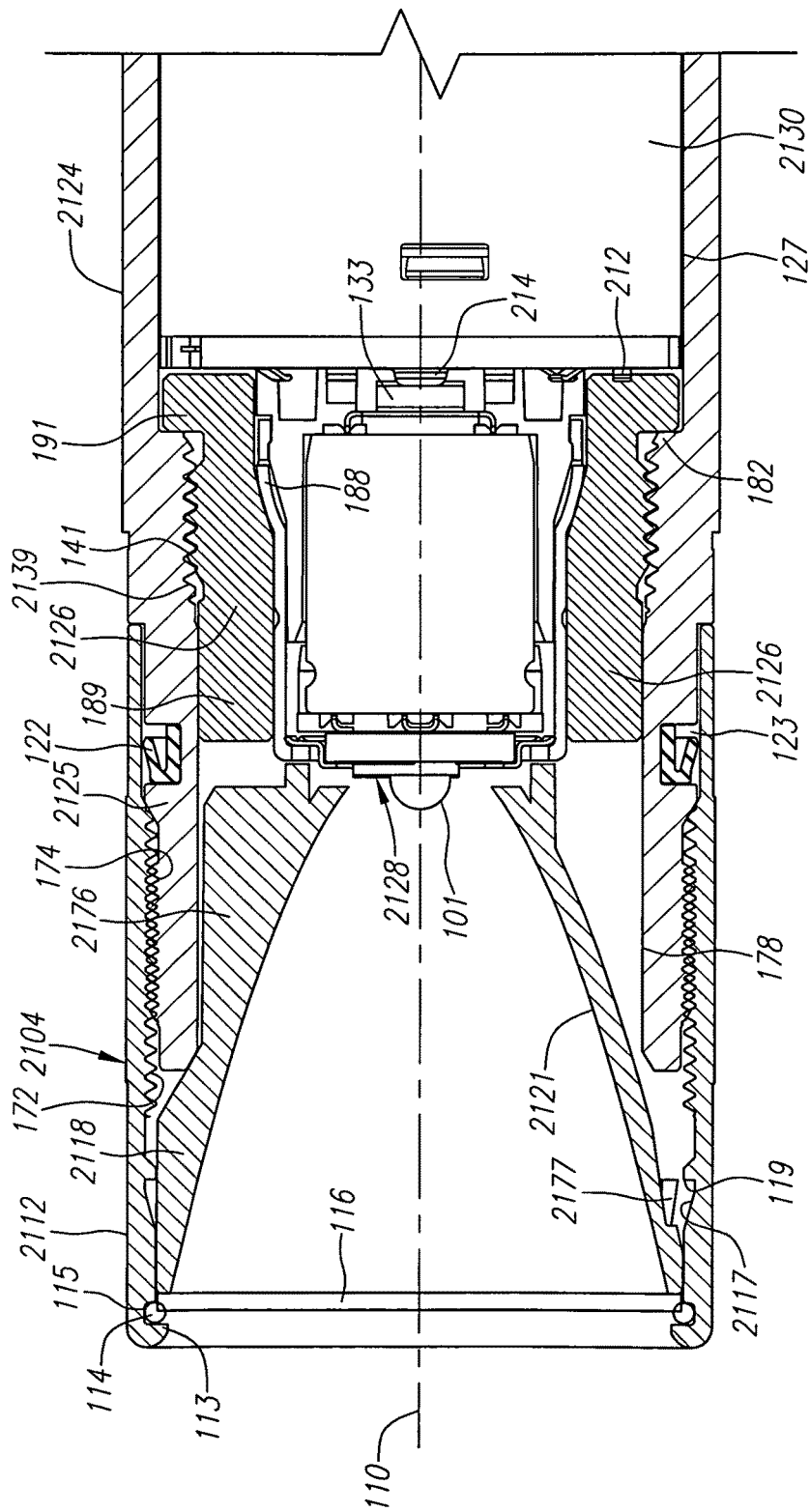
FIG. 23 is an enlarged cross-sectional view of the forward section of the flashlight of FIG. 21 taken through the plane indicated by 102-102.

FIG. 22 is a partial cross-sectional view of flashlight 2100 of FIG. 1 taken along the plane indicated by line 102-102. FIG. 23 is an enlarged partial cross-sectional view of a forward section of flashlight 2100 of FIG. 21 taken through the plane indicated by line 102-102. (The portions of FIGS. 22-24 that relate to the battery pack 2130 are not shown in cross-section.)

Referring to FIGS. 22 and 23, a light source 101 is mounted to the forward end of the barrel 2124. In the present embodiment, the light source 101 is mounted so that it is disposed at the aft end of reflector 2118. In other embodiments, the reflector 2118 may be omitted, or its shape changed.

Barrel 2124 is a hollow, tubular structure suitable for housing a portable source of power, such as, for example, rechargeable battery pack 2130. Thus, barrel 2124 serves as a housing for receiving a portable source of power having a positive and a negative electrode or terminal.

In the illustrated embodiment, barrel 2124 is sized to accommodate battery pack 2130, which contains a single Li-Ion battery cell. In other embodiments, however, the battery pack 2130 may be omitted and the barrel 2124 sized to accommodate one or more alkaline dry cell or rechargeable batteries of desired size and capacity. Further, if a plurality of batteries is employed, depending on the implementation, the batteries may be connected electrically in parallel or series. Other suitable portable power sources, including, for example, high capacity storage capacitors may also be used.

In the illustrated embodiment, barrel 2124 includes a forward portion 2125 that extends beneath combined head and face cap 2112 so that the outer surface of the head assembly 2104 is generally flush with that of the barrel 2124. The inner diameter of the forward portion 2125 is smaller than the inner diameter of the rest of barrel 2124. Also, the outer diameter of at least a portion of the forward portion 2125 may be smaller than the outer diameter of the rest of barrel 2124, so that when flashlight 2100 is assembled, the outer portion of combined head and face cap 2112 and the outer portion of barrel 2124 may form a substantially uniform, cylindrical surface. Alternatively, the combined head and face cap 2112 and barrel 2124 may have different shapes.

Barrel 2124 is preferably made out of aluminum, but other suitable metal or non-metal (e.g. plastic) materials may also be used. Although barrel 2124 is preferably made out of aluminum, in the embodiment of flashlight 2100 described below, barrel 2124 is not used as an electrical path for connecting either the light source 101 or circuit board 2148 to the battery pack 2130. As a result, barrel 2124 does not form part of the main power circuit for either the light source 101 or circuit board 2148. In other embodiments, however, the barrel 2124 may comprise part of the main power circuit for light source 101 and/or circuit board 2148, such as where one or more batteries are used in place of battery pack 2130. In such embodiments, barrel 2124 and other components preferably comprise a conductive material forming a conductive path.

Figure 24:
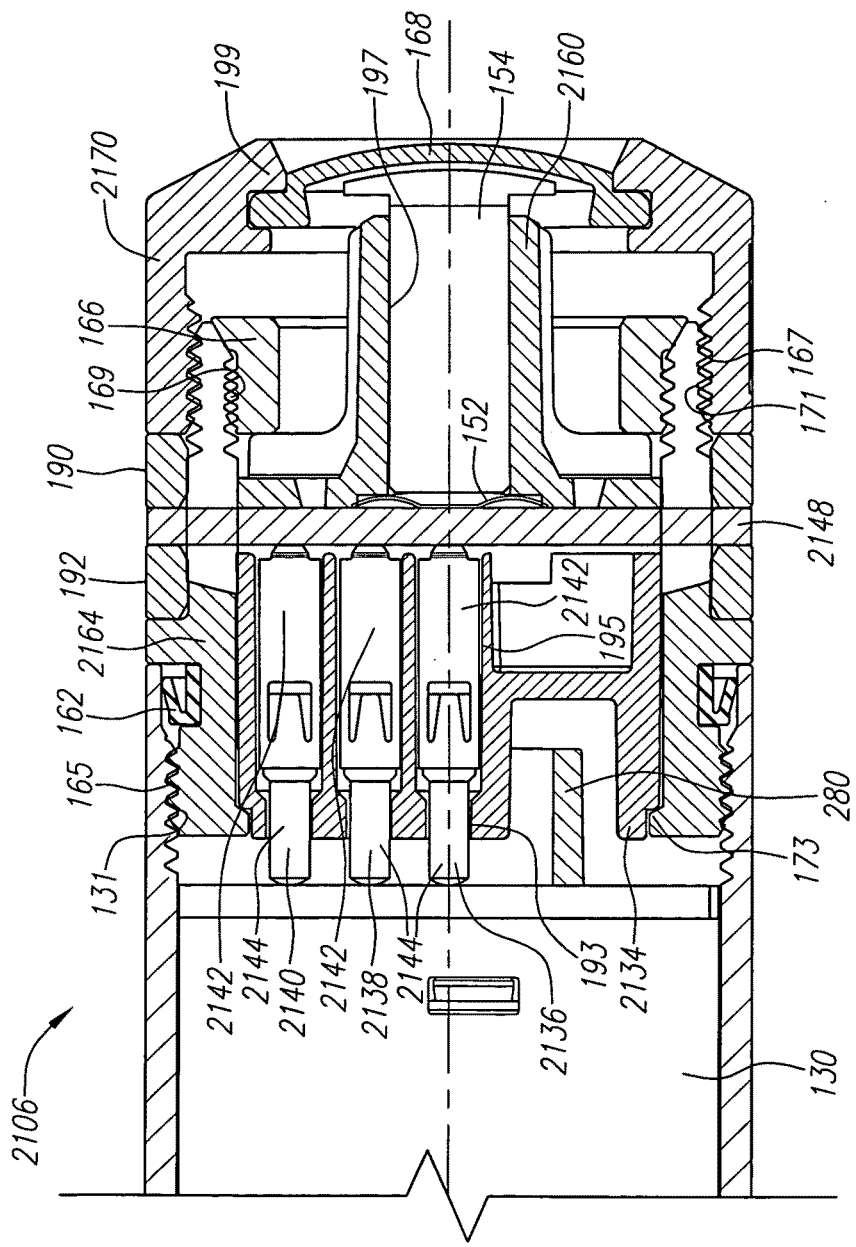
FIG. 24 is an enlarged cross-sectional view of the rearward section of the flashlight of FIG. 21 taken through the plane indicated by 102-102.

In the illustrated embodiment, barrel 2124 includes external threads 174 formed on the outer diameter of the forward portion 2125, internal threads 2139 formed on the inner diameter of the forward portion 125, and internal threads 131 formed on the inside diameter of its aft end (best seen in FIG. 24). The barrel 2124 of the present embodiment also includes an annular shoulder 182 formed at the aft end of the forward portion 125. Annular shoulder 182 acts as a stop for shoulder ring 2126 disposed in the forward end of barrel 2124.

Figure 25A:
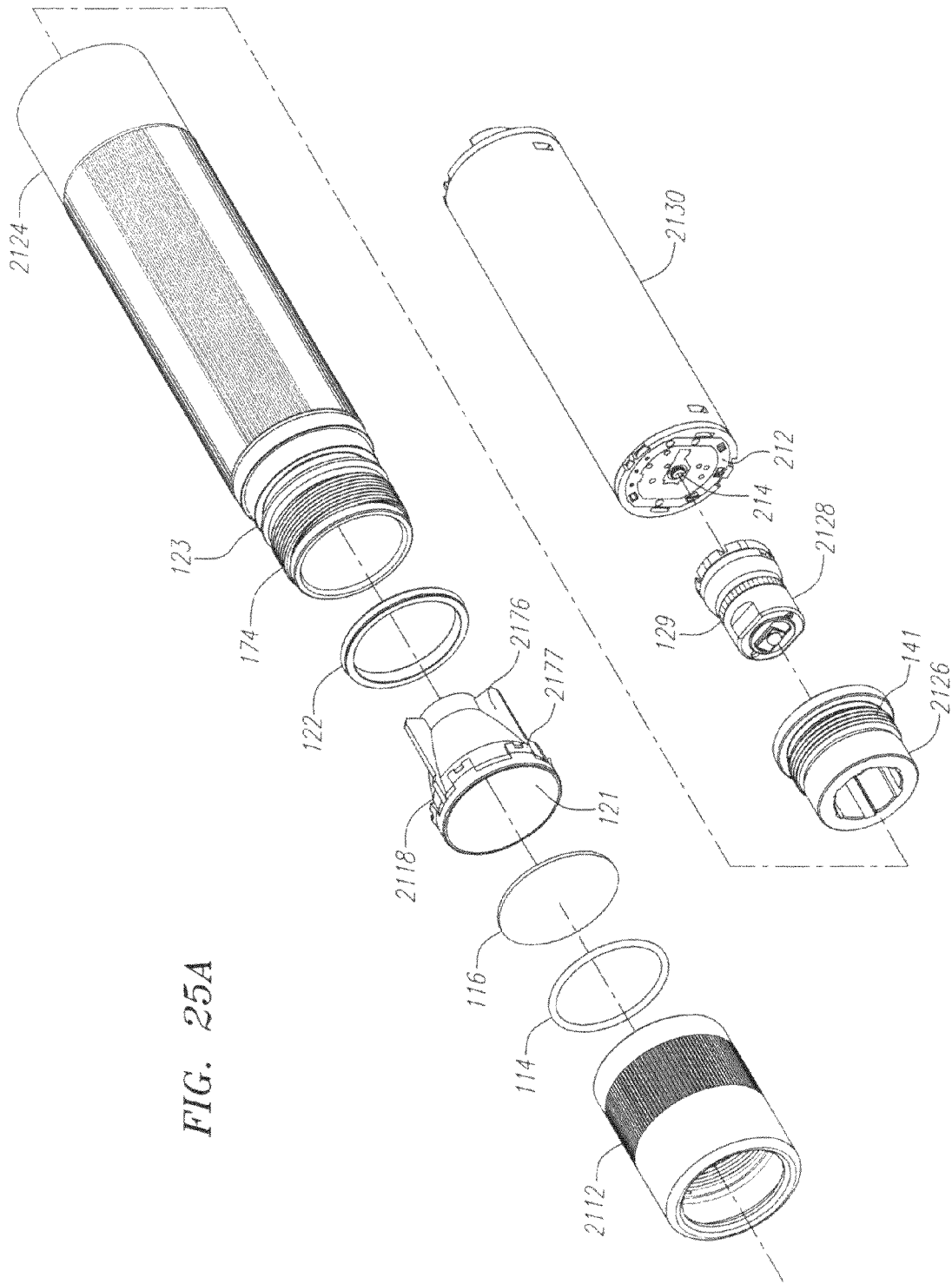
FIG. 25A is an exploded perspective view of the head assembly and a portion of the barrel of the flashlight of FIG. 21.

FIG. 25A is an exploded perspective view of head assembly 2104, barrel 2124, lamp module 2128, and battery pack 2130 of flashlight 2100 of FIG. 21. Referring to FIGS. 23 and 25A, head assembly 2104 of the present embodiment includes combined head and face cap 2112, lens 116, and reflector 2118. In other embodiments, however, head and face cap 2112 may comprise two or more separate component parts that may be assembled together, for example, with mating threads.

The internal surface of combined head and face cap 2112 may be used to house certain components, including, for example, lens 116 and reflector 2118. Reflector 2118 and lens 116 are operatively mounted to the inner diameter of the combined head and face cap 2112. In the present embodiment, reflector 2118 includes spring clips 2177 extending from its front end and distributed evenly around the outer circumference of reflector 2118 so that reflector 2118 may snap into a corresponding annular recess 2117 formed near the forward end of the inner portion of combined head and face cap 2112. In the present embodiment, six spring clips 2177 are employed. Other embodiments, however, may employ a different number of spring clips 2177 or another means altogether for attaching reflector 2118 to combined head and face cap 2112.

An annular shoulder 119 is provided at the aft end of annular recess 2117 to attach reflector 2118 to the combined head and face cap 2112 once spring clips 2177 expand into annular recess 2117.

Lens 116 is interposed between a forward facing flange of reflector 2118 and a lip 113. In this manner, reflector 2118 and lens 116 are locked within the combined head and face cap 2112. In one implementation, a sealing element, such as an o-ring 114, may be located at the interface between the lens 116 and lip 113. Other water resistant means, such as a one-way valve, may also be used. O-ring 114 may comprise rubber or other suitable material.

An annular groove 115 may be provided in the head and face cap 2112 so that it is disposed at the interface between the lens 116 and lip 113. The annular groove 115 is preferably sized to partially receive o-ring 114, thereby properly positioning o-ring 114 during the assembly process.

Reflector 2118 may include fins 2176 distributed around the outer perimeter of reflector 2118 to provide structural integrity to reflector 2118 and to help properly align reflector 2118 within the internal surface of the head and face cap 2112 and the forward portion 2125 of barrel 2124. In the present embodiment, three fins 2176 are employed. In other embodiments, a different number of fins 2176 may be used, or no fins at all may be used.

Combined head and face cap 2112 may include internal threads 172 configured to engage with external threads 174 on the forward portion 2125 of barrel 2124. In other implementations, however, other forms of attachment may be adopted. Further, combined head and face cap 2112 is preferably made from anodized aluminum, though other suitable materials may also be used.

As best seen in FIGS. 23 and 25A, the reflective profile 2121 of the reflector 118 is preferably a segment of a computer-generated optimized parabola that is metallized for reflectivity and to ensure high precision optics. Preferably the profile 2121 is defined by a parabola having a focal length of less than 0.080 inches, and more preferably between 0.040-0.050 inches. Further, the distance between the vertex of the parabola defining the profile 2121 and the aft opening of the reflector 121 is preferably 0.070-0.120 inches, more preferably 0.075-0.085 inches. The opening of the forward end of the reflector 2118 preferably has a diameter of 0.8-0.9 inches, more preferably 0.850-0.852 inches, and the opening of the aft end of the reflector 2118 preferably has a diameter of 0.2-0.3 inches, more preferably 0.240 to 0.250 inches. Further, the ratio between the distance from the vertex to the opening of the aft end of the reflector 2118 and the focal length is preferably in the range of 1.5:1 and 3.5:1, more preferably 1.6:1 to 1.8:1. Moreover, the ratio between the distance from the vertex to the opening of the forward end of the reflector 2118 and the focal length is preferably in the range of 20:1 and 35:1, more preferably 20:1 to 21:1.

Reflector 2118 preferably comprises an injection molded plastic, though other suitable materials may be used.

Referring back to FIG. 23, although the embodiment disclosed herein illustrates a substantially planar lens 116, the flashlight 2100 may instead include a lens that has curved surfaces to further improve the optical performance of the flashlight 2100. For example, the lens may include a biconvex profile or a plano-convex profile in the whole or part of the lens surface.

Referring to FIGS. 23 and 25A, a sealing element 2122 may be provided at the interface between combined head and face cap 2112 and forward portion 2125 of barrel 2124 to provide a watertight seal. Preferably sealing element 2122 is located in an annular groove 123 provided in the outer surface of the barrel 2124. The sealing element 2122 may be an O-ring or other suitable sealing device. In the illustrated embodiment, the sealing element 2122 is a one-way valve formed by a lip seal that is orientated so as to prevent flow from the outside into the interior of the flashlight 2100, while simultaneously allowing overpressure within the flashlight to escape or vent to the atmosphere.

The design and use of one-way valves in flashlights are more fully described in U.S. Pat. No. 5,003,440 issued to Anthony Maglica, which is hereby incorporated by reference.

Flashlight 2100 of the present embodiment includes a lamp module 2128 mounted within the shoulder ring 2126 at the forward end of barrel 2124 so that light source 101 is disposed at the aft end of reflector 2118. Lamp module 2128 may have a principal axis 110 of projection which may coincide with the reflector axis and/or the longitudinal axis of flashlight 2100. In view of the foregoing arrangement, the focus of light emitted from lamp module 2128 may be adjusted by twisting head assembly 2104 relative to barrel 2124, which may be accomplished via mating threads 172, 174, to cause translation of the head assembly 2104 away from or toward lamp module 2128.

The light source 101 of lamp module 2128 includes a first, positive electrode and a second, negative electrode. The first positive electrode is in electrical communication with a compressible positive contact 133 (see FIG. 23). The second, negative electrode is in electrical communication with the heat sink housing 188, which also acts as the negative contact of lamp module 2128.

The light source 101 may be any suitable device that generates light. For example, the light source 101 can be an LED lamp, an incandescent lamp, or an arc lamp. In the illustrated embodiment, the light source 101 is an LED lamp and lamp module 2128 is an LED module. The LED of lamp module 2128 preferably substantially radiates light at a spherical angle of less than 180°. In other embodiments, LEDs with other angles of radiation may be used, including LEDs that radiate at an angle greater than 180°.

The structure of an LED module that may be used for lamp module 2128 is described in detail in co-pending U.S. patent application Ser. No. 12/188,201, filed Aug. 7, 2008, by Anthony Maglica and U.S. Provisional Patent Application Ser. No. 61/145,120, filed Jan. 16, 2009, by Stacey West et al., the contents of both of which are hereby incorporated by reference.

Referring to FIG. 23, shoulder ring 2126 is configured to be in intimate contact with the barrel 2124. In the present embodiment, the outer diameter of a portion of shoulder ring 2126 is provided with external threads 141 which are sized to threadably mate with internal threads 139 of the forward portion 2125 of barrel 2124. In other embodiments, other means for attaching or mounting the shoulder ring 2126 to the interior surface of barrel 2124 may be employed, including, for example, press-fitting.

Lamp module 2128 is preferably mounted within shoulder ring 126 via a press-fit operation. Further, the outer surface of heat sink housing 188 is preferably shaped to mate with the inner surface of shoulder ring 2126 along as much surface area as possible to facilitate electrical and thermal communication between the lamp module 2128 and the shoulder ring 2126 and the interference fit between the two. A knurled surface 129, preferably arranged around the circumference of lamp module 2128, may also be provided to enhance the interference fit between the lamp module 2128 and shoulder ring 2126.

As shown in FIG. 23, the shoulder ring 2126 forms a large heat sink. Moreover, because it has a mass that is substantially greater than that of lamp module 2128, it quickly draws heat away from lamp module 2128 via heat sink 188. Ultimately, the heat drawn away by shoulder ring 2126 is efficiently drawn into barrel 2124 because barrel 2124 and shoulder ring 2126 are in intimate contact in the forward region 189 of shoulder ring 2126. Shoulder ring 2126 may be made out of metal, and more preferably nickel plated aluminum for enhanced thermal, electrical and corrosion resistance properties.

The outer diameter of the aft region 191 of shoulder ring 126 is slightly smaller than the inner diameter of the rear portion of barrel 2124. Therefore, during assembly, shoulder ring 2126 can readily slide within barrel 2124 without damaging any protective coating, such as that resulting from an anodizing treatment process. On the other hand, the outer diameter of the aft region 191 of shoulder ring 2126 is greater than the inner diameter of the forward portion 2125 of barrel 2124. Therefore, the aft region 191 of shoulder ring 2126 serves as a stop to limit the forward-most position of shoulder ring 2126 as the shoulder ring is threaded into internal threads 2139 of barrel 2124.

While shoulder ring 2126, lamp module 2128, and head assembly 2104 do not form part of a mechanical switch for flashlight 2100 in the present embodiment, in other embodiments they could as described, for example, in connection with U.S. patent application Ser. No. 12/353,396, Jan. 14, 2009, by Stacey West, the contents of which are hereby incorporated by reference.

Lamp module 2128 is electrically coupled to flashlight 2100 as follows. Flashlight 2100 may include rechargeable battery pack 2130 that includes positive top contact 214 which is electrically coupled to compressible positive contact 133 of lamp module 2128. After the current passes through the light source 101, a ground connection extends from the negative electrode of the light source 101 through heat sink housing 188, which acts as the negative contact of lamp module 2128 and shoulder ring 2126, which in turn is electrically coupled to the negative contact 212 of battery pack 2130.

FIG. 24 is an enlarged partial cross-sectional view of a rear section of flashlight 2100 of FIG. 21 taken through the plane indicated by line 102-102. (In FIG. 24, however, battery pack 2130 is not shown in cross-section.) The rearward section of flashlight 2100 generally comprises switch and tail cap assembly 2106. FIG. 25B is an exploded perspective view of switch and tail cap assembly 2106.

Referring to FIGS. 24 and 25B, switch and tail cap assembly 2106 of the present embodiment preferably includes sealing element 162, such as a one-way valve, inner tail cap section 2164, commutating rings 190, 192, lower switch housing 2134, spring probe assemblies 2136, 2138, 2140, circuit board 2148, snap dome 152, upper switch housing 2160, locknut 166, actuator 154, switch port seal 168, and outer tail cap section 2170.

Each spring probe assembly 2136, 2138, 2140 comprises a conductive plunger 144 slidably disposed within a conductive barrel 2142, and a spring (not shown) positioned between the plunger 2144 and barrel 2142 to bias the plunger 2144 away from the barrel 2142.

Lower switch housing 2134 preferably includes three cylindrical channels 193 opened to the forward end of lower housing 2134 for receiving and holding at least a portion of the plunger 144 of each spring probe assembly 2136, 2138, 2140. Each of the channels 193 is connected to a cylindrical chamber 195 which is axially aligned with the channel 193. The diameter of each cylindrical chamber 195 is larger than each channel diameter so that each chamber may receive and house the barrel 2142 of each spring probe assembly 2136, 2138, 2140. In the present embodiment, cylindrical channels 193 of lower switch housing 2134 are formed in an ear 135 projecting radially inward from the outer wall 137 of lower switch housing 2134. In the present embodiment, ear 135 is at least partially surrounded by a recess 153 for receiving a mating indexing feature 280 provided on the aft end of battery pack 2130. In other embodiments, a male indexing feature may be provided on the lower switching housing 2134 and a female indexing feature may be provided on the battery pack 2130.

In the present embodiment, lower switch housing 2134 preferably comprises a non-conductive material, such as plastic, but other suitable materials or materials systems may also be used.

In the present embodiment, the barrels 2142 and plungers 2144 of spring probe assemblies 2136, 2138, 2140 preferably comprise a conductive metal, such as a copper alloy or aluminum.

The channels 193 of lower switch housing 2134, and therefore, spring probe assemblies 2136, 2138, 2140, are configured to align with contacts on the bottom side of battery pack 2130. Referring also to FIG. 25C, when battery pack 2130 is installed, spring probe assembly 2136 may be aligned with a bottom central contact 274 of battery pack 2130, spring probe assembly 2138 may be aligned with a bottom middle ring contact 276 of battery pack 2130, and spring probe assembly 2140 may be aligned with a bottom outer ring contact 278 of battery pack 2130. In one embodiment, spring probe assemblies 2136, 2138, 2140 are electrically coupled to a GND, a MOM contact, and a +5VDC contact of battery pack 2130, respectively.

In the present embodiment, circuit board 2148 has slots 148a (shown in FIG. 25B) for receiving the rearward extending portion 201 of the inner tail cap portion 2164. On the other hand, the slots 198 formed by the rearward extending portion 201 of the inner tail cap portion 2164 are used to receive a solid portion 148b of circuit board 148, thereby holding circuit board 148 and the inner tail cap portion 2164 in desired relatively position.

Circuit board 2148 preferably includes contacts on both of its sides. Circuit board 2148 may also include conductive vias routed through board 2148 to couple contacts on opposite sides. In the present embodiment, the front side of circuit board 2148 (which is facing lower switch housing 2134) includes three contact pads that are electrically coupled to spring probe assemblies 2136, 2138, 2140, respectively. The rear side of circuit board 2148 (which is facing the upper switch housing 2160) includes three corresponding contact pads that are located at designated locations. Each pair of the corresponding contacts on the front side and rear side of circuit board 2148 are electrically connected through conductive vias provided in circuit board 2148, or alternatively routing wires.

Upper switch housing 2160 includes a cylindrical channel 197 that allows actuator 154 to slide within. An annular rim of switch port seal 168 is held between an annular lip 199 of outer tail cap 2170, which is located at the rear end of flashlight 2100. When a user presses on switch port seal 168, actuator 154 is moved forward within channel 197 and engages snap dome 152 such that MOM and GND contact pads on the rear side of circuit board 2148 are electrically coupled through snap dome 152. When the user releases switch port seal 168, the MOM and GND contact pads on the rear side of circuit board 2148 are no longer electrically coupled through snap dome 152. In other embodiments, non-mechanical switches, for example, capacitors, may be used.

Upper switch housing 2160 preferably includes a set of keys 161a, 161b, 161c and 161d (shown in FIG. 25B). These keys 161a, 161b, 161c and 161d may be used to plug into slots 149a, 149b, 149c and 149d, respectively, on circuit board 2148 to align upper switch housing 2160 and circuit board 2148 in desired relative position.

In the present embodiment, upper switch housing 2160 and actuator 154 preferably comprise a non-conductive material such as plastic. Switch port seal 168 preferably comprises a flexible non-conductive material, such as rubber. Snap dome 152 preferably comprises a conductive spring metal. Other suitable material may be used.

Commutating rings 190, 192 are provided at the middle of switch and tail cap assembly 2106. While commutating rings 190, 192 are provided in the present embodiment in the form of charging rings to simplify the recharging procedure, in other embodiments, commutating rings 190, 192 may take on other forms. In the present embodiment, circuit board 2148 is interposed between commutating rings 190, 192. Circuit board 2148 is configured to be in electrical communication with commutating rings 190, 192, while simultaneously isolating commutating rings 190, 192 from direct electrical communication with one another through a short circuit. Electrical communication between circuit board 2148 and commutating rings 190, 192 may be established by providing a conductive trace at the interface formed between circuit board 2148 and each of the commutating rings. Commutating rings 190, 192 are preferably aluminum rings.

As best seen from FIGS. 24 and 25B, commutating rings 190, 192 serve as the interface between an external recharging unit and rechargeable battery pack 2130 of flashlight 2100. Although not depicted here, those skilled in the art will appreciate that the cradle of the recharging unit should be fashioned in a way to make electrical contact with commutating rings 190, 192 and hold flashlight 2100 in place while charging takes place. Because commutating rings 190, 192 preferably extend around the entire external circumference of flashlight 2100, a recharging unit having a simple cradle design may be used. For example, a cradle design that permits flashlight 2100 to be placed into the recharging unit in any radial orientation relative to its longitudinal axis and still be able to make contact with the recharging unit's charging contacts may be used. Thus, flashlight 2100 does not need to be pressed into the charging unit so that hidden plugs or tabs are inserted into flashlight 2100 in order to make contact with the charging contacts of the recharging unit.

Inner tail cap section 2164 preferably includes threads 165 on the front outer surface of inner tail cap section 2164 for mating with threads 131 on the rear inner surface of barrel 2124. In addition, inner tail cap section 2164 preferably includes threads 167 on the aft outer surface of inner tail cap section 2164 for mating with threads 171 on the front inner surface of the outer tail cap section 2170.

The inner tail cap section 2164 of the present embodiment also includes an annular shoulder 173 formed at the front end of the inner tail cap section 2164. Annular shoulder 173 serves as a stop to prevent lower switch housing 2134 from moving forward.

Locknut 166 is preferably threaded into and mated with thread 169 on the aft inner surface of inner tail cap section 2164. Therefore, locknut 166, annular shoulder 173 of the inner tail cap section 2164, and threads 165, 131, 167, 171, 169 function together to integrate the switch and tail cap assembly 2106.

The construction of inner tail cap section 2164 should be such as to maintain the commutating rings 190, 192 in electrical isolation from one another. In other words, inner tail cap section 2164 should not provide a short circuit path between commutating rings 190, 192. Thus, for example, inner tail cap section 2164 may be constructed from anodized aluminum or some other electrically non-conductive material. Locknut 166 may be made from metal or plastic and is not required to be conductive as it does not form part of any electrical path in the present embodiment.

The rear end of the outer tail cap section 2170 preferably has a plurality of icons 2180 (best shown in FIG. 21B) to be used as indications for functional mode selection. The icons 2180 and their corresponding functional modes together with the operation procedures will be described in connection with the description of flashlight 2300 later.

A one-way valve, such as a lip seal 162, may be provided at the interface between barrel 2124 and inner tail cap section 2164 to provide a watertight seal while simultaneously allowing overpressure within flashlight 2100 to vent to the atmosphere. The design and use of one-way valves in flashlights are more fully described in U.S. Pat. No. 5,003,440 issued to Anthony Maglica, which is hereby incorporated by reference. However, other forms of sealing elements, such as an o-ring, may be used instead of lip seal 162 to form a watertight seal. Lip seal 162 preferably comprises a non-conductive material such as rubber.

Other configurations of switch and tail cap assembly 2106 may be used. For example, the switch function may be included in a side, push button switch or in an internal rotating head assembly switch such as that employed in U.S. patent application Ser. No. 12/353,396, filed Jan. 14, 2009.

Referring now to FIGS. 25A and 25C, the rechargeable battery pack 2130 is now further described. In general, battery pack 2130 preferably includes a rechargeable battery, a circuit board containing electronics such as recharging circuit and/or circuits for other functions and contacts to electrically connect battery pack 2130 to the rest of the flashlight 2100 or other lighting device. As such, battery pack 2130 may generally represent a self-contained unit that may be inserted into battery compartment 127 of barrel 2124 along with other components shown in FIG. 25A. It is also preferred that battery pack 2130 provides protection for the electronics and other components therein. In other embodiments, battery pack 2130 does not have a circuit board mounted with components such as accelerometer 1058, therefore, functions can be provided by circuit board 2148 in the switch and tail cap assembly 2106.

Referring to FIG. 25C, the rear end of battery pack 2130 includes a bottom central contact 274, a bottom middle ring contact 276, and a bottom outer ring contact 278. An indexing feature 280 formed from a rearward extending wall may be located on the aft end of battery pack 2130, such as between the bottom middle ring contact 276 and the bottom outer ring contact 278. A slot 284 provided in the indexing feature 280 is sized to receive the ear 135 of the lower switch housing 134 so that indexing feature 280 may be received within recessed area 153 surrounding ear 135 of the lower switch housing 2134, thereby, forming a plug and socket type connection. As a result, when the switch and tail cap assembly 2106 is rotated to screw it into barrel 2124, battery pack 2130 will also be rotated once indexing feature 280 is received within recess 153. Therefore, the desired orientation of the switch and tail cap assembly 2106 and an assembly circuit board (not shown)

in battery pack 2130 will remain aligned at all times. This feature is helpful when accelerometer 1058 discussed below is located in the assembly circuit board of battery pack 2130 so that the orientation of icons 2180 can be automatically detected based on the output of accelerometer 1058.

Battery pack 2130 provided by the exemplary flashlight 2100 is described in detail in co-pending U.S. Provisional Patent Application Ser. Nos. 61/145,120, filed Jan. 16, 2009, by Stacey West et al., the contents of which were incorporated by reference above.

The electrical circuits of flashlight 2100 and the functions they serve are now further described. The electrical circuits of flashlight 2100 include a load circuit to power the light source 101, a controller circuit for powering the controller and other electronics on circuit board 2148 and, if available, in battery pack 2130, and a charging circuit for recharging rechargeable battery in battery pack 2130.

When battery pack 2130 is installed into battery compartment 127 of barrel 2124 a completed electrical path for the light source 101 (or electrical load) may be formed from the top positive contact 214 of battery pack 2130 to the positive contact 133 of lamp module 2128 and through the light source. This electrical path then extends from heat sink housing 188 of lamp module 2128 to the shoulder ring 2126 and then to the top outer ring contact 212 of battery pack 2130.

The control circuit starts from a bottom outer ring positive contact of battery pack 2130 to spring probe assembly 2140 to circuit board 2148, and return from a ground pad of circuit board 2148 to spring probe assembly 2136 to central ground contact of battery pack 2130.

The high side of the charging circuit to battery pack 2130 extends from positive charging ring 190, to circuit board 2148, spring probe assembly 2140, into battery pack 2130 via an outer bottom ring contact 270 of battery pack 2130. The charging circuit may then return from a bottom negative contact 274 of battery pack 2130 to spring probe assembly 2136, circuit board 2148, to ground charge ring 192.

Another preferred flashlight embodiment 2300 is now described with reference to FIG. 26. As shown, flashlight 2300 generally includes barrel 2324, head assembly 2104 located at the forward end of barrel 2324, and switch and tail cap assembly 2306 located at the rear end of barrel 2324. The head assembly 2104 is disposed about the forward end of the barrel 2324, and the switch and tail cap assembly 2306 encloses the aft end of barrel 2324.

Barrel 2324 may include a textured surface 2308 along a portion of its length for a user to grip. Textured surface 2308 may be provided by broaching. Alternatively, textured surface 2308 may comprise a knurled or machine surface. Any desired pattern may be used for textured surface 2308.

Figure 28:
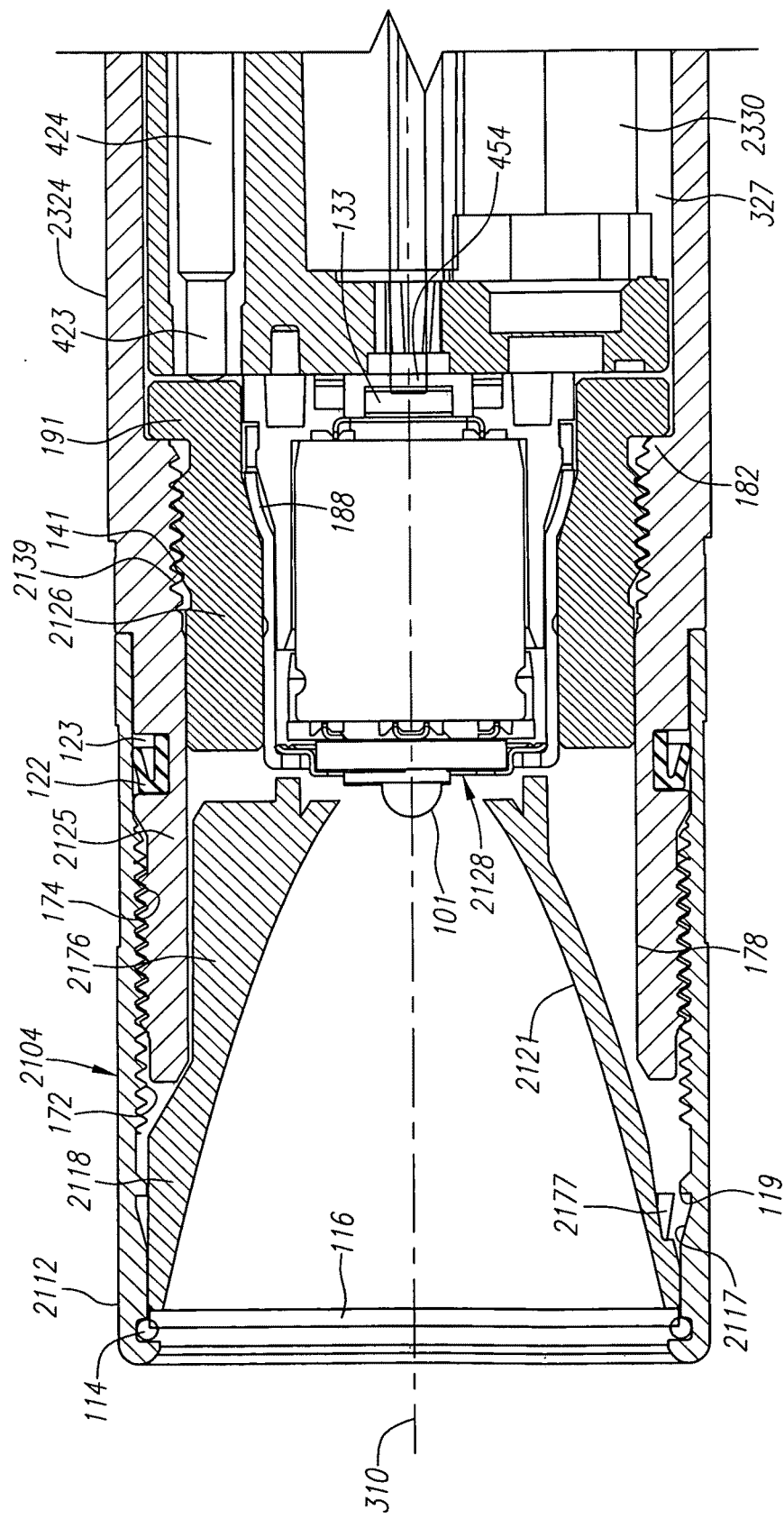
FIG. 28 is an enlarged cross-sectional view of the forward section of the flashlight of FIG. 26 taken through the plane indicated by 302-302.

FIG. 27 is a partial cross-sectional view of flashlight 2300 of FIG. 26 taken along the plane indicated by line 302-302. FIG. 28 is an enlarged partial cross-sectional view of a forward section of flashlight 2300 of FIG. 26 taken through the plane indicated by line 302-302. (The portions of FIGS. 27-29 that relate to the battery cassette 2330 are not shown in cross-section.)

Barrel 2324 is a hollow, tubular structure suitable for housing a portable source of power, such as, for example, battery cassette 2330. Thus, barrel 2324 serves as a housing for receiving a portable source of power having a positive and a negative electrode or terminal.

In the illustrated embodiment, barrel 2324 is sized to accommodate battery cassette 2330. In other embodiments, however, the battery cassette 2330 may be omitted and the barrel 2324 sized to accommodate one or more alkaline dry cell or rechargeable batteries of desired size and capacity.

Further, if a plurality of batteries is employed, depending on the implementation, the batteries may be connected electrically in parallel or series. Other suitable portable power sources, including, for example, high capacity storage capacitors may also be used.

In the illustrated embodiment, barrel 2324 includes a forward portion 2125 that extends beneath combined head and face cap 2112 so that the outer surface of the head assembly 2104 is generally flush with that of the barrel 2324. The inner diameter of the forward portion 2125 is smaller than the inner diameter of the rest of barrel 2324. Also, the outer diameter of at least a portion of the forward portion 2125 may be smaller than the outer diameter of the rest of barrel 2324, so that when flashlight 2300 is assembled, the outer portion of combined head and face cap 2112 and the outer portion of barrel 2324 may form a substantially uniform, cylindrical surface. Alternatively, the combined head and face cap 2112 and barrel 2324 may have different shapes.

Barrel 2324 is preferably made out of aluminum, but other suitable metal or non-metal (e.g. plastic) materials may also be used. Although barrel 2324 is preferably made out of aluminum, in the embodiment of flashlight 2300 described below, barrel 2324 is not used as an electrical path for connecting either the light source 101 or circuit board 2348 to the battery cassette 2330. As a result, barrel 2324 does not form part of the main power circuit for either the light source 101 or circuit board 2348. In other embodiments, however, the barrel 2324 may comprise part of the main power circuit for light source 101 and/or circuit board 2348, such as where one or more batteries are used in place of battery cassette 2330. In such embodiments, barrel 2324 and other components preferably comprise a conductive material, or include a conductive path.

Figure 29:
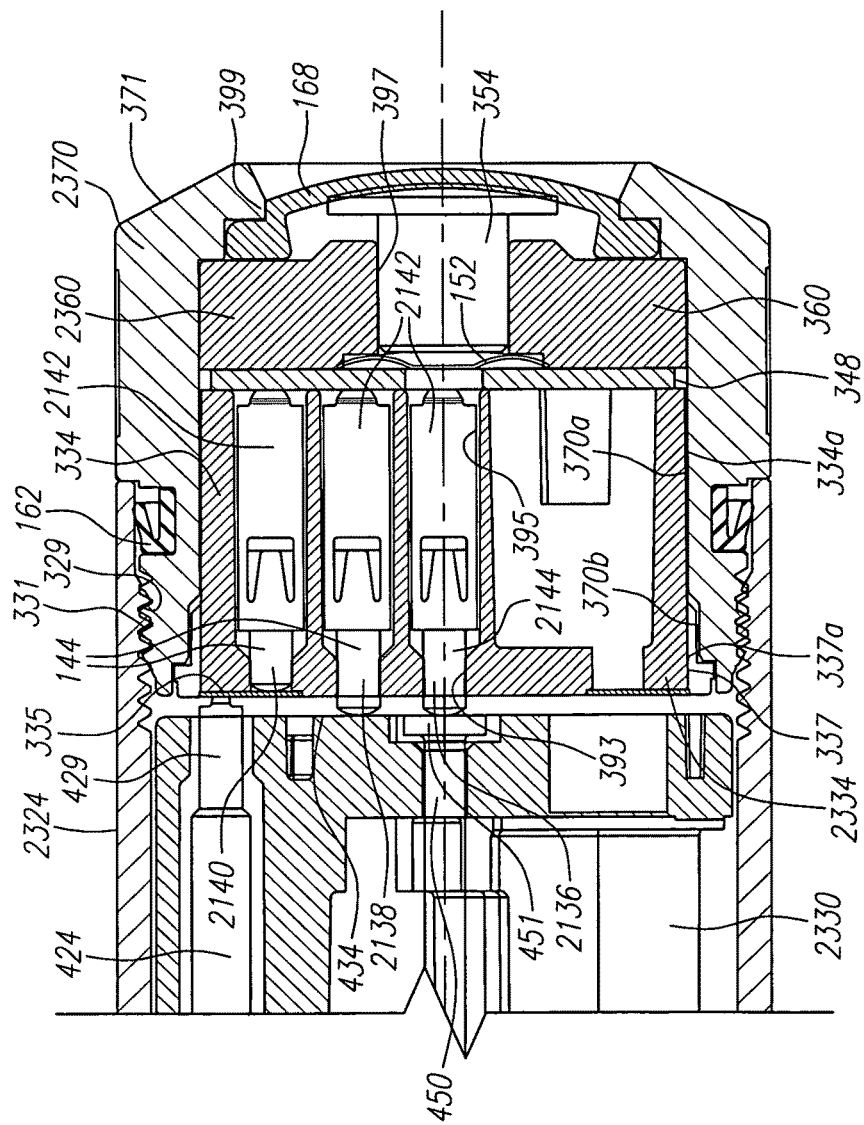
FIG. 29 is an enlarged cross-sectional view of the rearward section of the flashlight of FIG. 26 taken through the plane indicated by 302-302.

In the illustrated embodiment, barrel 2324 includes external threads 174 formed on the outer diameter of the forward portion 2125, internal threads 2139 formed on the inner diameter of the forward portion 2125, and internal threads 331 formed on the inside diameter of its aft end (best seen in FIG. 29). The barrel 2324 of the present embodiment also includes an annular shoulder 182 formed at the aft end of the forward portion 2125. Annular shoulder 182 acts as a stop for shoulder ring 2126 disposed in the forward end of barrel 2124.

Figure 30A:
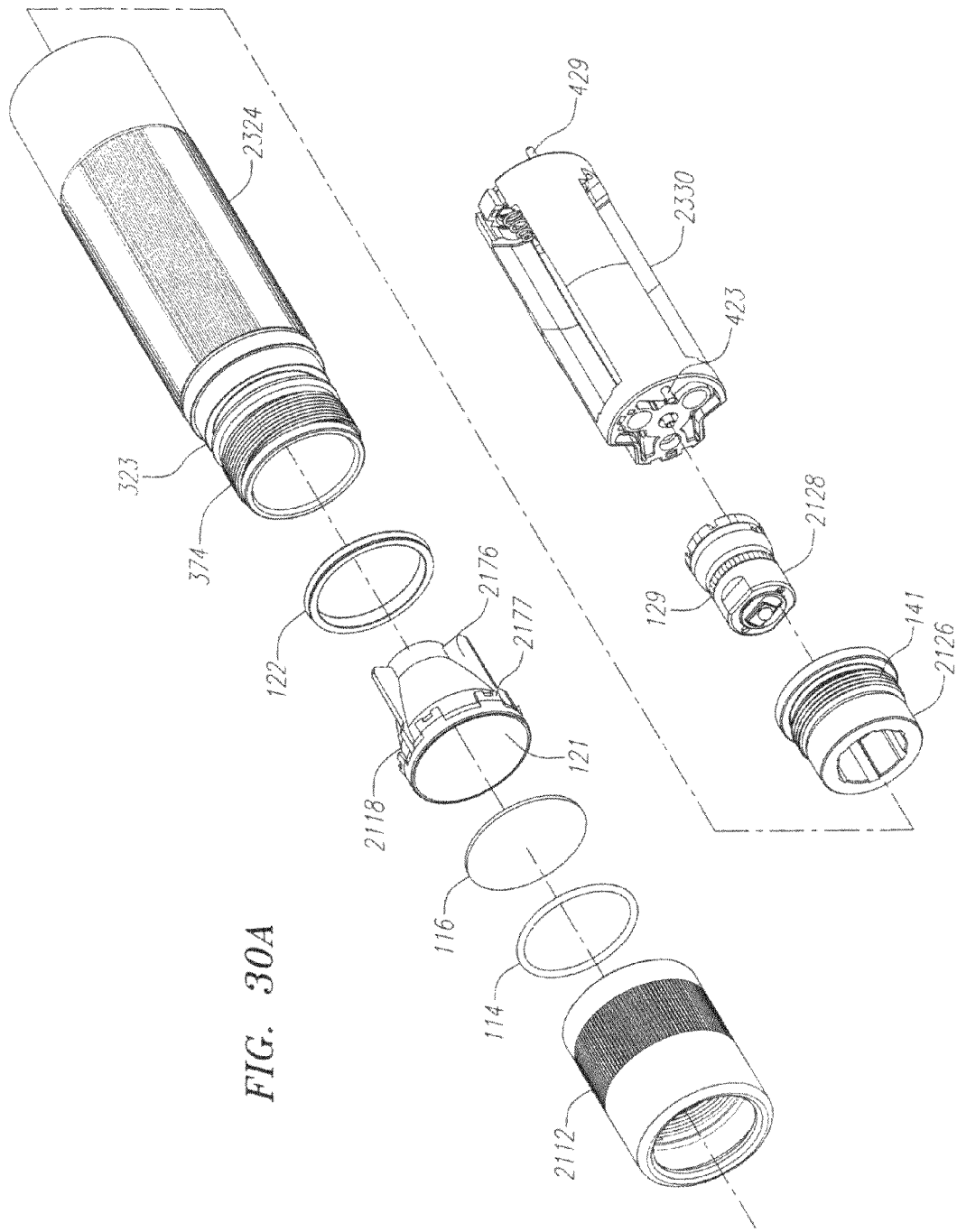
FIG. 30A is an exploded perspective view of the head assembly and a portion of the barrel of the flashlight of FIG. 26.

FIG. 30A is an exploded perspective view of head assembly 2104, barrel 2324, lamp module 2128, and battery cassette 2330 of flashlight 2300 of FIG. 26. Referring to FIGS. 28 and 30A, head assembly 2104 may generally include combined head and face cap 2112, lens 116 and reflector 2118. Head assembly 2104 and components including combined head and face cap 2112, lens 116, reflector 2118, shoulder ring 2126, lamp module 2128, o-rings 114, and lip seal 2122 have been fully described in connection with FIGS. 23 and 25A.

Other configurations of the head assembly 2104 may also be used. For example, in other embodiments, head assembly 2104 may form a part of a mechanical switch means to provide a user interface.

Referring to FIG. 28, lamp module 2128 is electrically coupled to flashlight 2300 as follows. Flashlight 2300 of the present embodiment includes a battery cassette 2330 that includes positive electrode 454 which is electrically coupled to compressible positive contact 133 of lamp module 2128. After the current passes through the light source, a ground connection extends from the negative electrode of the light source through heat sink housing 188, which acts as the negative contact of lamp module 2128, and shoulder ring 2126, which in turn is electrically coupled to a connector pin 424 of battery cassette 2330. The ground path continues to the conductive ring 335 of lower switch housing 2334 (best shown in FIG. 29), to spring probe assembly 2140, and to circuit board 2348 which includes a negative contact that is coupled to a negative electrode on battery cassette 2330 thereby completing the circuit.

FIG. 29 is an enlarged partial cross-sectional view of a rearward section of flashlight 2300 of FIG. 26 taken through the plane indicated by line 302-302. (In FIG. 29, however, battery cassette 2330 is not shown in cross-section.) The rearward section of flashlight 2300 generally comprises switch and tail cap assembly 2306 as reflected in FIGS. 26 and 27. FIG. 30B is an exploded perspective view of switch and tail cap assembly 2306.

Referring to FIGS. 29 and 30B, switch and tail cap assembly 2306 of the present embodiment preferably includes lower switch housing 2334, spring probe assemblies 2136, 2138, 2140, circuit board 2348, snap dome 152, actuator 354, upper switch housing 2360, sealing element 162, such as a one-way valve, switch port seal 168, and tail cap 2370. Spring probe assemblies 2136, 2138, 2140 have been fully described in connection with FIGS. 24 and 25B.

Lower switch housing 2334 preferably includes three cylindrical channels 393 opened to the forward end of lower switch housing 2334 for receiving and holding at least a portion of the plunger 2144 of each spring probe assemblies 2136, 2138, 2140. Each of the channels 393 is connected to a cylindrical chamber 395 which is axially aligned with the channel 393. The diameter of each cylindrical chamber 395 is larger than the channel diameter so that each chamber may receive and house the barrel 2142 of each spring probe assemblies 2136, 2138, 2140. In the present embodiment, lower switch housing 2334 preferably comprises a non conductive material, such as plastic, but other suitable materials or materials systems may also be used.

Spring probe assemblies 2136, 2138, 2140 also push forward until their front end engage with a contact described below. The channels 393 of lower switch housing 2334 and therefore, spring probe assemblies 2136, 2138, 2140 are configured to align with contacts on the bottom of battery cassette 2330. When battery cassette 2330 is installed, spring probe assembly 2136 may be aligned with a bottom central contact 451 of battery cassette 2330, and spring probe assembly 2138 may be aligned with a bottom outer contact 434 of battery cassette 2330. On the other hand, spring probe assembly 2140 may be aligned with a conductive ring 335 of lower switch housing 2334. The conductive ring 335 may be further aligned with a rear end 429 of connector pin 424 of battery cassette 2330.

In the present embodiment, lower switch housing 2334 preferably comprises a non-conductive material, such as plastic, but other suitable materials may be used. Spring probe assemblies 2136, 2138, 2140 are preferably made out of metal so as to form part of the electrical paths of flashlight 2300 to be described later.

Contact ring 335 (shown in FIGS. 29 and 30B), which is preferably made out of metal, may be co-molded with lower switch housing 2334 to provide an interface between the spring probe assembly 2140 and the rear end 429 of connector pin 424 of battery cassette 2330. Thus, a portion of the negative, or ground, path for the lamp module 2128 is formed.

Circuit board 2348 preferably includes contacts on both sides. Circuit board 2348 may also include conductive vias routed through board 2348 to couple the contacts on opposite sides. Alternatively, wires may be routed around board 2348 to couple contacts on opposite sides. Circuit board 2348 may also include electronic components installed thereon. In the present embodiment, the front side of circuit board 2348 (which is facing the lower switch housing 2334) includes three contact pads that are electrically couple to spring probe assemblies 2136, 2138, 2140, respectively. The rear side of circuit board 2348 (which is facing the upper switch housing 2360) includes contact pads that correspond to SWITCH 1020 and 4.5VDC 1014 and that are located at designated locations. Each pair of the corresponding contacts on the front side and rear side of circuit board 2348 are electrically connected through conductive vias provided in circuit board 2348, or alternatively routing wires. The electronic components and their function assembled on circuit board 2348 will be described later in this specification.

Upper switch housing 2360 includes a cylindrical channel 397 that allows actuator 354 to slide within. An annular rim of switch port seal 168 is held between an annular lip 399 of outer tail cap 2370, which is located at the rear end of flashlight 2300. When a user presses on switch port seal 168, actuator 354 is moved forward within channel 397 and engages snap dome 152 such that SWITCH contact pad 1020 and 4.5VDC contact pad 1014 on the rear side of circuit board 2348 are electrically coupled through snap dome 152. When the user releases switch port seal 168, the SWITCH contact pad 1020 and 4.5VDC contact pad 1014 on the rear side of circuit board 2348 are no longer electrically coupled through snap dome 152. In other embodiments, non-mechanical switches, for example, capacitors, may be used.

Upper switch housing 2360 preferably includes a set of keys 361a, 361b and 361c (shown in FIG. 30B). These keys 361a, 361b and 361c are intended to be plugged into slots 349a, 349b and 349c, respectively, on circuit board 2348 to align the upper switch housing 2360 and circuit board 2348 in a desired relative position. The configuration of a short key 361a on one side while a short key 361b and a long key 361c on the other side creates a polarized keying feature.

In the present embodiment, as best seen in FIG. 30B, upper switch housing 2360 preferably includes an alignment feature 360a projecting forward and received within a mating recess 334a on lower switch housing 2334. These mating features 360a, 334a may be used during assembly to help align keys 361a, 361b, 361c with their slots 349a, 349b, 349c formed in circuit board 2348 and mating holes (not shown) formed in the bottom of lower switch housing 2334. The mating holes formed in the bottom of the lower switch housing 2334 are preferably dimensioned to receive their respective key so as to form an interference fit. In other embodiments, a male alignment feature may be provided on the lower switch housing 2334 and a corresponding female feature may be provided on the upper switch housing 2360.

In the present embodiment, upper switch housing 2360 and actuator 354 preferably comprise a non-conductive material, such as plastic. Switch port seal 168 also preferably comprises a flexible non-conductive material, such as rubber. Snap dome 152 preferably comprises a conductive material such as metal. Other suitable materials may be used.

A one-way valve, such as a lip seal 162, may be provided at the interface between barrel 2324 and the switch and tail cap assembly 2306 to provide a watertight seal while simultaneously allowing overpressure within the flashlight to expel or vent to atmosphere. However, other forms of sealing elements, such as an o-ring, may be used instead of lip seal 162 to form a watertight seal. Lip seal 162 is preferably made out of non-conductive material, such as rubber.

Tail cap 2370 preferably includes threads 331 (shown in FIGS. 29 and 31A) on the front outer surface of tail cap 2370 for mating with threads 329 on the rear inner surface of barrel 2324.

Other configurations of switch and tail cap assembly 2306 may be used. For example, the switch function may be included in a side, push button switch or in an internal rotating head assembly switch such as that employed in U.S. patent application Ser. No. 12/353,396, filed Jan. 14, 2009.

Referring now to FIGS. 28, 29 and 30A, battery cassette 2330 preferably contains batteries used to power the flashlight 2300 or other lighting device. After the batteries are inserted into battery cassette 2330, it may be inserted into flashlight barrel 2324 along with other components of flashlight 2300. In the present embodiment, a center connector 450 is used to provide positive contact at both ends of battery cassette 2330, i.e., the positive contact at its top end 454 and the positive contact at its bottom central contact 451. In the present embodiment, a spring probe 424 is used to provide negative contact at both ends of battery cassette 2330, i.e., the negative contact at its top end 423 and the negative contact at its bottom 429.

Battery cassette 2330 included in the exemplary flashlight 2300 is described in detail in co-pending U.S. Provisional Patent Application Ser. Nos. 61/145,120, filed Jan. 16, 2009, by Stacey West et al., the contents of which were incorporated by reference above.

Figure 32:
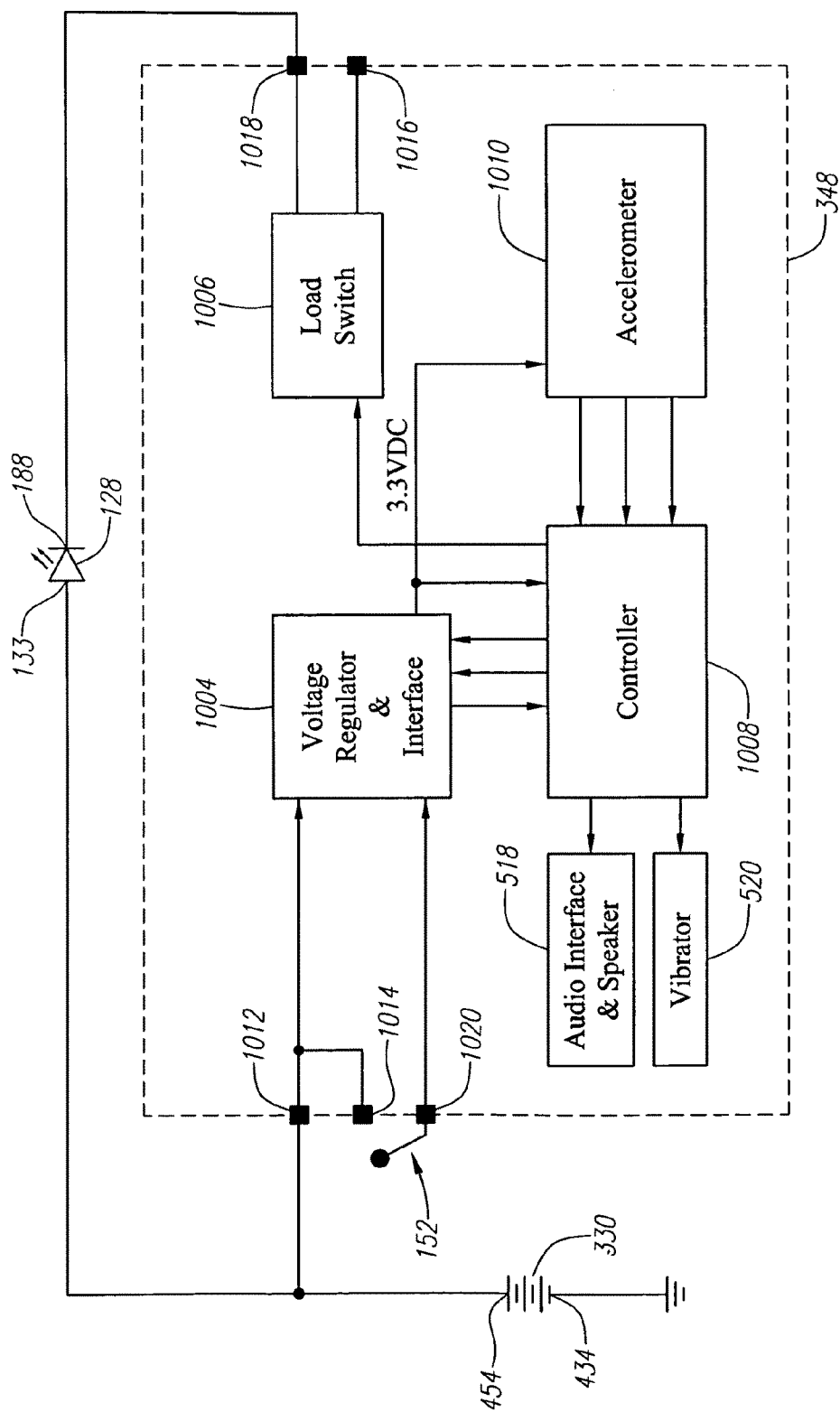
FIG. 32 is a circuit diagram illustrating the relationship between the electronic circuitry according to another embodiment of the invention.

Referring also to FIG. 32, when battery cassette 2330 is installed into battery compartment 327, in the present embodiment, an electrical path for the light source (or electrical load) may be formed from the central electrode or forward end 454 of battery cassette 2330 to the compressible positive contact 133 of lamp module 2128, and through the light source 101. The electric path continues from the light source 101 to heat sink 188 of lamp module 2128, to conductor pin 424 of battery cassette 2330, contact ring 335 of lower switch housing 2334, spring probe assembly 2140, a load switch 1006 on circuit board 2348, ground pad on the front side of circuit board 2348, spring probe assembly 2138, and finally to the negative electrode 434 of battery cassette 2330.

The functions and electrical circuit supporting the functions for flashlight 2300 will be described hereafter. The functions and electrical circuit supporting the functions for flashlight 2300 may also be used for flashlight 2100.

In the present embodiment, flashlight 2300 includes five predefined functional modes: a dim light with a variable brightness (DIM), a blinking light with a variable blinking frequency (STROBE), a SOS mode with variable brightness (SOS), a motion sensitive signal mode (SIGNAL), and a night light mode (NITE LITE). It is understandable that the modes presented in the present embodiment can be removed and/or other modes can be added to make a flashlight with desirable functions. In this description, blink and strobe are interchangeably used. Also, night light and NITE LITE are interchangeably used.

The rear end of the tail cap 2370 preferably has a plurality of icons 2180 to be used as indications for functional mode selection. As the example shown in FIG. 31B, tail cap 2370 has five mode associated icons 2370a, 2370b, 2370c, 2370d and 2370e evenly spaced around the rear circumference 2371 of tail cap 2370. The icon associated with the DIM mode 2370a is positioned at the 12:00 o'clock direction, the icon associated with the STROBE mode 2370b is positioned between the 12:00 o'clock and 3:00 o'clock direction, the icon associated with the SOS mode 2370c is positioned between the 3:00 o'clock and 6:00 o'clock direction, the icon associated with the SIGNAL mode 2370d is positioned between the 6:00 o'clock and 9:00 o'clock direction, and the icon associated with the NITE LITE mode 2370e is positioned between the 9:00 o'clock and 12:00 o'clock direction. The separation between each pair of adjacent icons is, therefore, 360° divided by 5 which is 72°. In other embodiments, icons 2370a, 2370b, 2370c, 2370d and 2370e do not need to be evenly spaced around the rear circumference 2371 of tail cap 2370. In other embodiments, the order of icons 2370a-e may be rearranged in FIG. 31C, or in some other order.

Flashlight 2300 may be turned on by pressing the momentary switch for a predetermined period of time while the flashlight is in horizontal position to cause it to enter a new mode of operation. The new mode of operation is determined by the position of the flashlight. In other words, the new mode of operation is determined by the icons which is facing at a predefined position. In the present embodiment, the mode associated with a specific icon 2180 facing at the 12:00 o'clock direction is selected as the new mode the flashlight 2300 enters. This interface with mode associated icons 2180 simplifies the mode selection procedure for the user. Any mode can be immediately selected without having to perform a sequence of operations.

In the present embodiment, icons 2180 are laser preferably engraved to provide high contrast for easily seen, even in poor lighting conditions. Other means for displaying icons 2180 can also be used. For example, icons 2180 can be painted, labeled, laminated, silkscreening, stamping, pad printing, mechanically engraving, or heat transfer/dye sublimation.

Figure 31D:
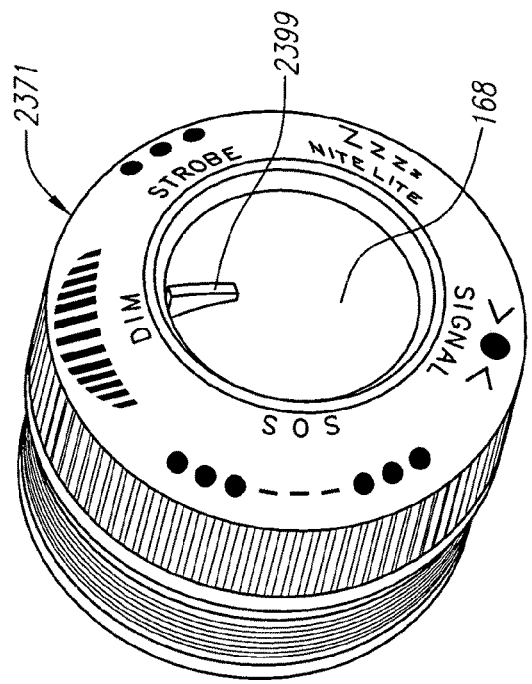
FIG. 31D is a tail cap assembly showing a bump on a switch.
Figure 31C:
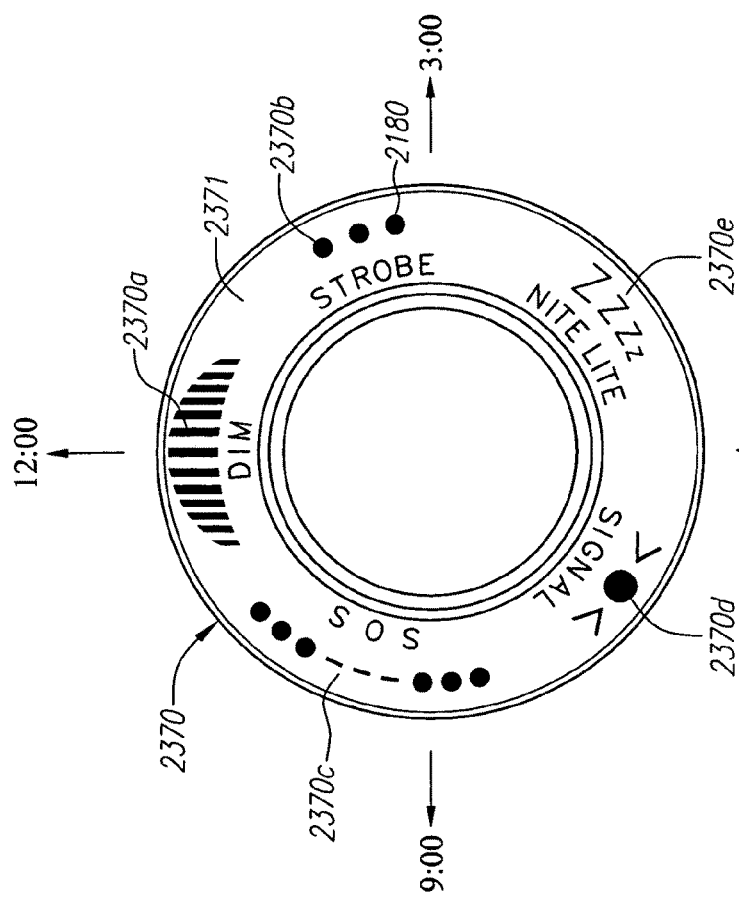
FIG. 31C is a rear view of an alternate tail cap assembly showing icons.

In addition, icons 2180 can be illuminated, for example, by phosphor ink, or other technique such as backlighting, to make icons 2180 glow in the dark. As a result, icons 180 can be visible in darkness. And as shown in FIG. 31D, seal 168 of tailcap 2370 may include a bump or rib 2399 that may be aligned with one of the icons 2180, e.g., the DIM icon 2370a to help the user locate particular icons 2370 in the dark.

Icons 2180 can be applied to flashlight 2300 after switch and tailcap assembly 2306 is assembled. If this is the case, the tips of spring probe assemblies 2136, 2138, 2140 can be used as indexing for orientation while icons 2180 are applied.

In other embodiments, icons 2180 can be placed other than the rear circumference 2371 of tail cap 2370. For example, icons 2180 can be placed on the middle outer circumference of tail cap 2370.

In other embodiments, more or less than five icons can be used depending on the number of functional modes desired.

Because icons 2180 are preferably engraved on the rear circumference 2371 of tail cap 2370, in the present embodiment, a keying feature between the upper switch housing 2360 and circuit board 2348 is used to hold the orientation of the circuit board 2348 to the laser engraved icons 2180.

Alternatively, if a keying feature is not used, a calibration routine can be performed to align the icons to circuit board 2348. If this is the case, the calibration can be performed during manufacturing. If unintended rotation occurs after manufacturing, a procedure can be performed by circuit board 2348 to re-align the icons with the circuit board 2348.

FIG. 32 is a block diagram illustrating an electric circuit for flashlight 2300. The electric circuit includes a power source 2330, a light source 2128, and a circuit board 2348. The circuit board 2348 may include voltage regulator circuit and interface 1004, load switch circuit 1006, controller circuit 1008, and accelerometer circuit 1010.

Circuit board 2348 may also include audio interface & speaker 518 and vibrator 520. This may be desirable, for example, where an audible or tactile response is desired in response to the entry of a command, such as selection of one or more modes as described below. Instead of locating the audio interface & speaker 518 and vibrator 520 on circuit board 2348, one or both of them may be located off board. In other words, audio interface & speaker 518 and/or vibrator 520 is not required to be mounted on circuit board 2348 but may be included elsewhere within flashlight 300.

The circuit board 2348 may include I/O pads to engage external devices. I/O pads may include top +4.5VDC 1012, bottom +4.5VDC 1014, GND 1016, LED_OUT 1018 and SWITCH 1020.

Referring also to FIG. 30C the I/O pads top +4.5 VDC 1012 and GND 1016 may be coupled to the central contact 451 and the outer contact 434 of battery cassette 2330, respectively. I/O pads bottom +4.5 VDC 1014 and SWITCH 1020 may be coupled to snap dome 152. When a user presses on switch port seal 168, actuator 354 may be pushed forward to engage snap dome 152 to close the switch between SWITCH 1020 and +4.5 VDC 1014. When the user releases switch port seal 168, the switch is open and SWITCH 1020 is no longer coupled to +4.5 VDC 1014.

Detailed electrical circuit schematics of an embodiment of circuit board 2348 are shown in FIGS. 33A-D.

Figure 33A:
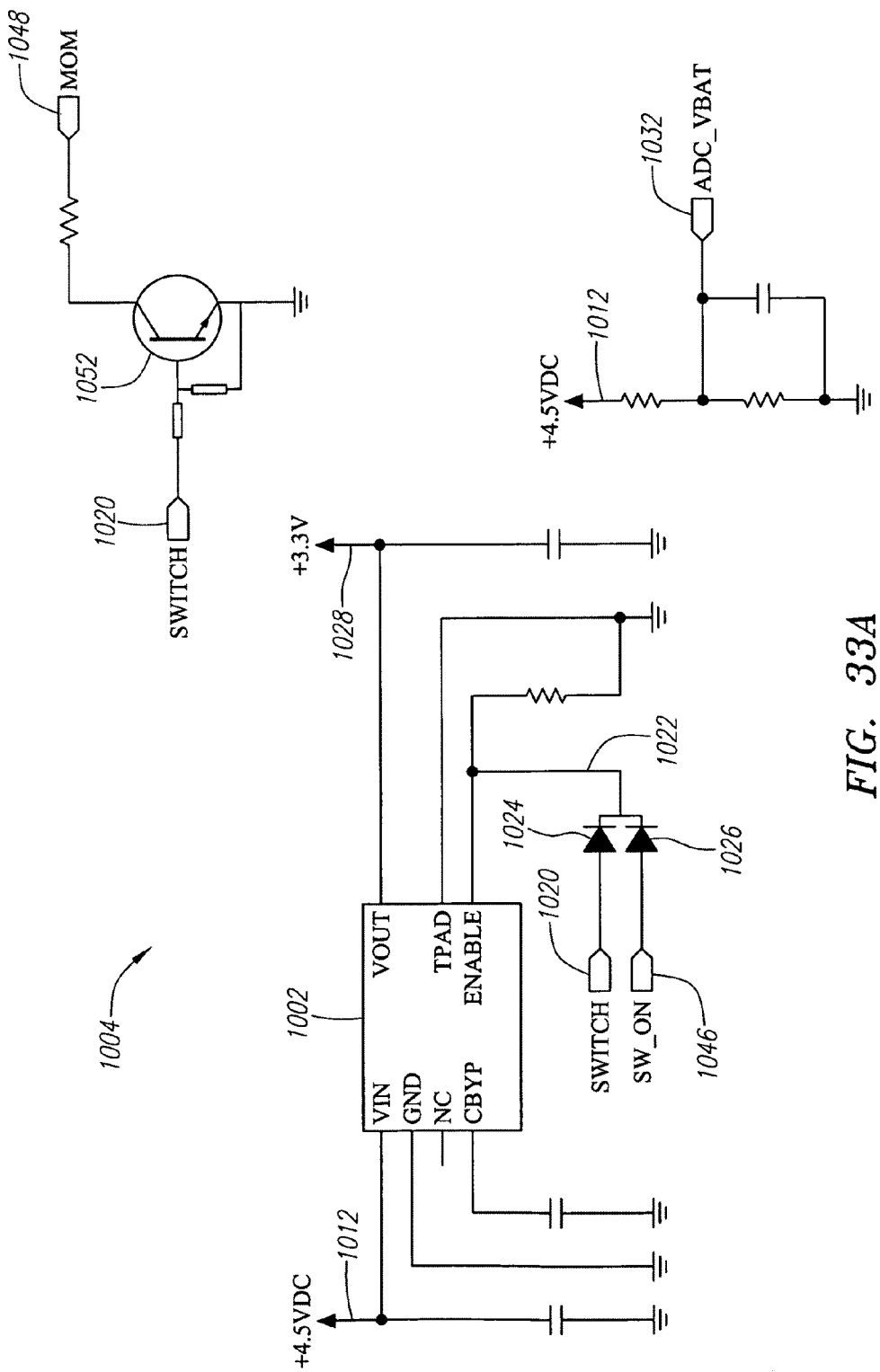
FIGS. 33A-D are schematic circuit diagrams of different components of the circuit shown in FIG. 32.

FIG. 33A shows a circuit schematic diagram of a preferred voltage regulator circuit 1004. Voltage regulator circuit 1004 may include a low dropout regulator 1002, which may be implemented by a DC linear voltage regulator operated with a small input-output differential voltage. Signal line 1022 is an output from two diodes 1024, 1026 which may be driven by signal lines SWITCH 1020 and SW_ON 1046, respectively. This configuration preferably allows the higher voltage from signal lines SWITCH 1020 or SW_ON 1046 to enable low dropout regulator 1002.

In a preferred embodiment, the output of low dropout regulator 1002 may be set to +3.3V 1028 for use as a power supply source to other components, for example, controller circuit 1008. In one embodiment, a commercial stand-alone LDO regulator, e.g., ISL9003AIRUNZ manufactured by Intersil Coperation, may be used. It should be understood that other types of linear regulator circuits may also be employed.

The voltage supply level from battery (i.e. +4.5VDC 1012) may be monitored by controller circuit 1008 through signal line ADC_VBAT 1032. Signal line ADC_VBAT 1032 may be generated by a voltage divider from +4.5VDC 1012.

The I/O pad SWITCH 1020 may be used to generate signal MOM 1048 for sending to controller circuit 1008 as an indication that a user is pressing on switch port seal 168 when MOM 1048 is low. MOM 1048 may be generated by NPN bipolar transistor 1052.

Figure 33B:
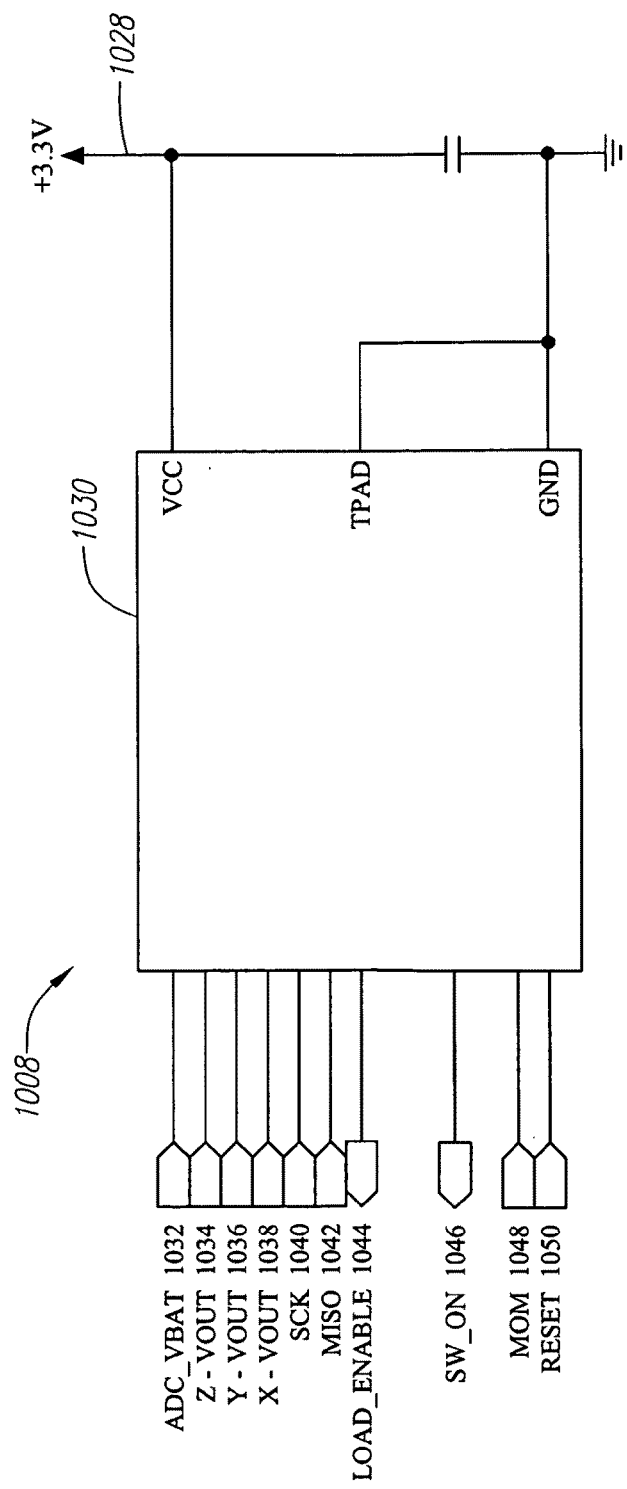

FIG. 33B is a circuit schematic diagram of a preferred controller circuit 1008. Controller circuit 1008 may include controller 1030 with input and output connections. Controller 1030 may receive input signals through signal lines ADC_VBAT 1032, Z-VOUT 1034, Y-VOUT 1036, X-VOUT 1038, SCK 1040, MISO 1042, MOM 1048 and RESET 1050. Controller 1030 may also deliver output signals through signal lines LOAD_ENABLE 1044 and SW_ON 1046. The power supply of controller 1030 may be supported by the +3.3V 1028 power supply.

In one embodiment, controller 1030 is a commercially available controller having embedded memory, e.g., an ATtiny24 which is an 8-bit controller manufactured by Atmel Corporation. In another embodiment, controller 1030 may be a microprocessor. Yet in other embodiments, controller 1030 may be discrete circuits. Those skilled in the art will appreciate that other types of controller circuits may also be employed.

Figure 33C:
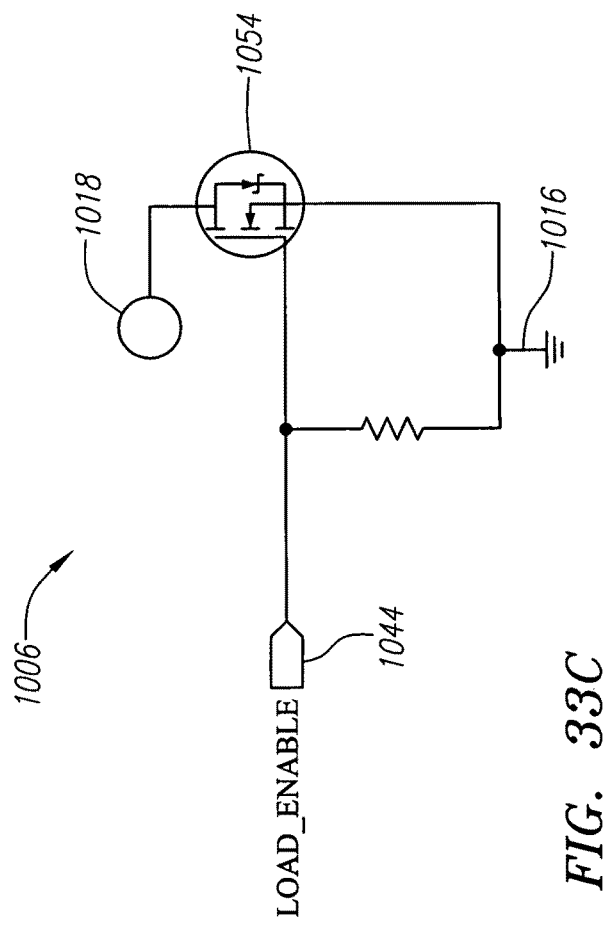

FIG. 33C shows a circuit schematic diagram of a preferred load switch circuit 1006. In the embodiment of FIG. 33C, the load switch may be implemented by NMOS 1054. The source of PMOS 1054 may be coupled to top GND 1016 while the drain of NMOS 1054 may be coupled to LED_OUT 1018. The gate of NMOS 1054 may be coupled to LOAD_ENABLE 1044. Electric power may flow from LED_OUT 1018 to GND 1016 to form a portion of a loop of electrical current that may turn on lamp module 2128.

Those skilled in the art will appreciate that other types of driver and load switch circuits can also be employed.

Figure 33D:
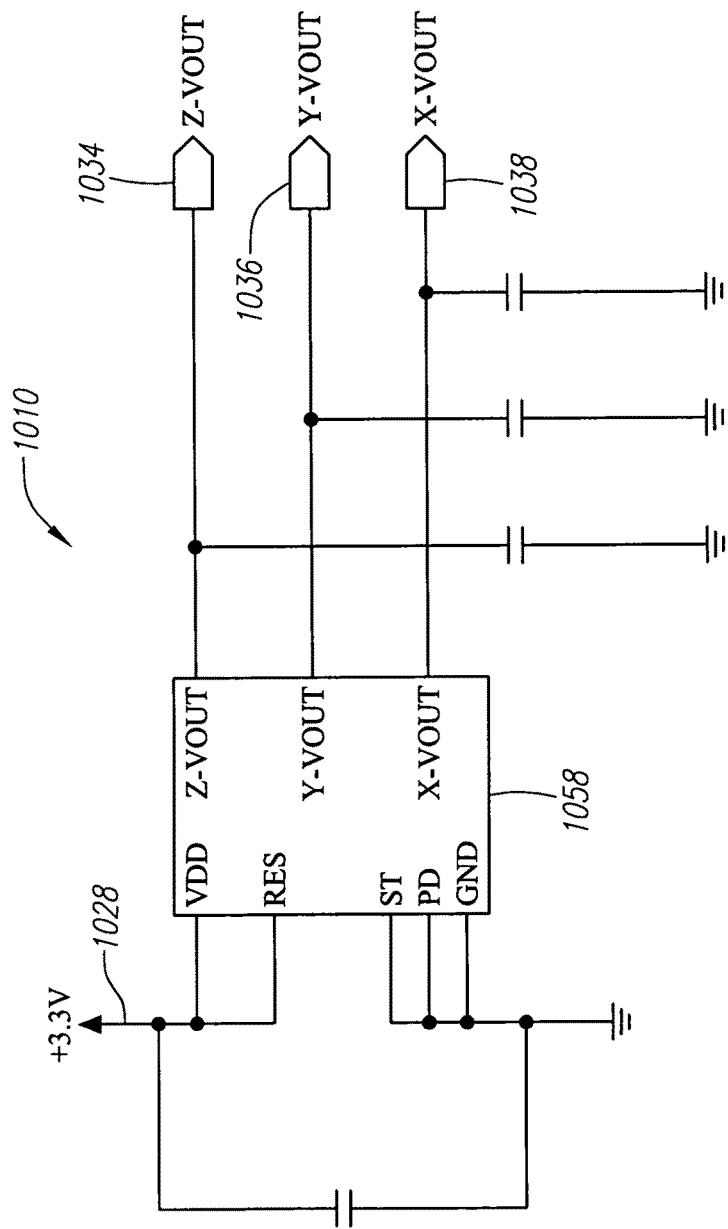

FIG. 33D shows a circuit schematic diagram of a preferred accelerometer circuit 1010. Accelerometer circuit 1010 may include outputs Z-VOUT 1034, Y-VOUT 1036 and X-VOUT 1038 that may also be coupled to the controller circuit 1008 for further processing.

Accelerometer circuit 1010 preferably includes an inertial sensor 1058 that may receive information from its internal sensing elements and that may provide analog signals according to the measurements from the internal sensing elements. Inertial sensor 1058 may be used to measure the Earth's static gravity field by providing acceleration information in three axes, e.g., mutually orthogonal axes, namely X, Y and Z. The power supply VDD of 3-axis accelerometer circuit 1010 may be supported by the +3.3V 1028 power supply.

If the Z axis of inertial sensor 1058 is pointing towards the center of the Earth, then X and Y will have an acceleration of zero. Z, however, will experience an acceleration of −1G due to the gravity of the Earth. If inertial sensor 1058 was flipped 180° so that Z is pointing away from the Earth, X and Y will remain at zero, but Z will have an acceleration of +1G.

Inertial sensor 1058 may be attached to circuit board 2348 so that the X, Y and Z axes are fixed relative to flashlight 2300. In a preferred embodiment, inertial sensor 1058 is oriented on board 2348 so that the Z axis extends along the longitudinal axis of flashlight 2300. As such, when flashlight 2300 is positioned horizontally, the Z axis also extends horizontally. In this position, when flashlight 2300 rotated left or right about the longitudinal axis of the flashlight 2300 to a different orientation, as the magnitudes of the acceleration in the X and Y axes change during rotation, gravity information on X and Y may be sent to controller 1030 through X-VOUT 1038 and Y-VOUT 1036, respectively to determine the orientation of flashlight 2300. In other words, the orientation of flashlight 2300 can be determined.

Relative angular rotation of flashlight 2300 may also be detected. When flashlight 2300 is positioned horizontally, the Z axis also extends horizontally. In this position, when X and Y are rotated left or right about the longitudinal axis of the flashlight 2300, as the magnitudes of the acceleration in the X and Y axes change during rotation, gravity information on X and Y may be sent to controller 1030 through X-VOUT 1038 and Y-VOUT 1036, respectively. Relative angular rotation may be computed by controller 1030. Controller 1030 may use the information on X-VOUT 1038 and Y-VOUT 1036 to determine whether there is a rotation about the longitudinal axis of flashlight 2300.

In a preferred embodiment, the switch for flashlight may be located in switch and tail cap assembly 2106. In this arrangement, the starting orientation of the X and Y axes are unknown, so a starting may be calculated based on the Earth's gravitational field in the X and Y axes in the starting orientation. Once their starting orientation is established, subsequent angular measurements may be made to track the rotation of flashlight 2300.

It is preferred that flashlight 2300 be positioned approximately horizontally for the user to obtain higher resolution when rotating, i.e., better sensing of the rotation of the X and Y axes. As the Z axis tilts farther from horizontal, rotational errors may occur. In operation, it is preferred that flashlight 2300 be held to an angle from horizontal. If the tilting is greater than 30°, it is preferred that the Z axis be monitored and the rotational input ignored until flashlight 2300 is tilted back within the +/−30° window. The above angles, however, may be decreased or increased in different implementations.

In a preferred embodiment, inertial sensor 1058 may be a commercially available micro-electro-mechanical systems (MEMS), e.g., LIS394AL which is a 3-axis accelerometer manufactured by ST Microelectronics. Those skilled in the art will appreciate that other types of inertial sensor circuits may also be employed.

The variable brightness on lamp module 2128 may be determined by changing the duty cycle on lamp module 2128 with a frequency that is higher than a human's eye can detect. A duty cycle on lamp module 2128 may be produced by a sequence of high and low states on the output of load switch circuit 1006, which can be driven by controller 1008 together with other components. If the time period of conduction is longer, lamp module 2128 is brighter. On the other hand, if the time period of conduction is shorter, lamp module 2128 is dimmer.

The variable blinking rate on lamp module 2128 can also be determined by changing the duty cycle on lamp module 2128 but with a frequency that is detectable by a human's eye. The circuits that support the variable blinking rate can be the same as that which support variable brightness described previously.

As a combination, the SOS mode with variable brightness or a blinking lighting with variable brightness on lamp module 2128 may be produced by making a duty cycle on lamp module 2128 with a frequency that is detectable by a human's eye. During the low cycle, lamp module 2128 is oft while during the high cycle, lamp module 2128 can have a duty cycle with a frequency that is higher than a human's eye can detect. In other words, there is a high frequency duty cycle within the high period of a low frequency duty cycle. This function can be performed by controller 1008.

Figure 34:
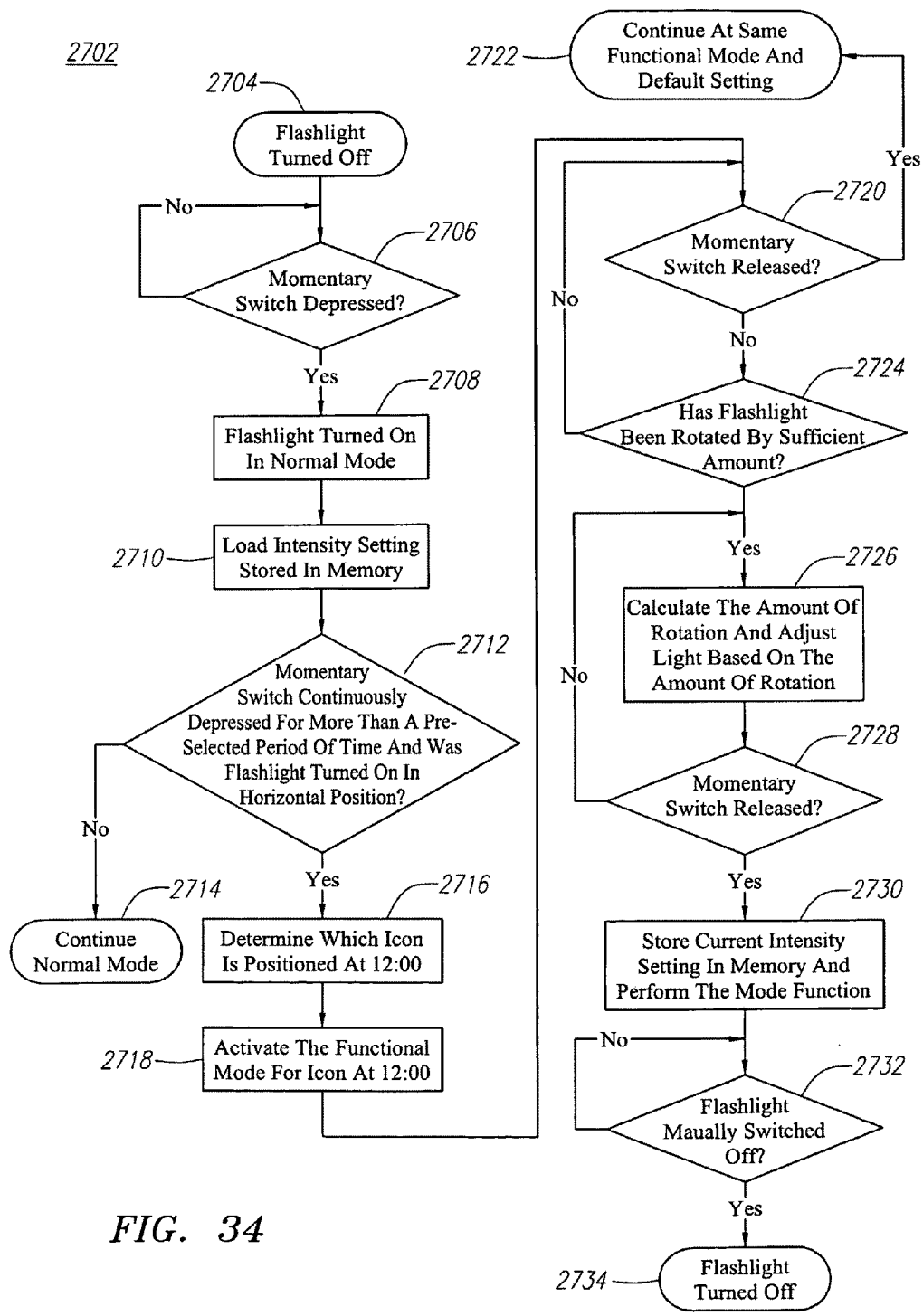
FIGS. 34, 35, 36A, 36B and 37 are flow diagrams illustrating operations of a flashlight according to different aspects of the invention.

As indicated above, it is preferred that flashlight 2300 may operate in multiple modes. The operation and accessing of these modes are now further discussed. FIG. 34 is a flow diagram illustrating a preferred manner of operation 2702 in which flashlight 2300 may access and perform various modes.

When flashlight 2300 is turned off 2704, circuit board 2348 can still be powered by the battery cassette 2330. Therefore, flashlight 2300 continuously monitors the position and motion of the flashlight 2300 while detecting the position of momentary switch 2168. If switch 2168 is depressed 2706, flashlight 2300 is turned on in normal mode 2708.

When flashlight 2300 is turned on in normal mode 2708, default intensity information may be loaded from a memory 2710 for controller 1008 to provide a control signal to control the brightness on lamp module 2128. In a preferred embodiment, the memory may be an EEPROM embedded in controller 1008. The default intensity information can be the intensity of the last usage before flashlight 2300 is turned off. Alternatively, the default intensity information may be a predetermined setting, for example, the maximum intensity. Other intensities may be predetermined.

After the default intensity information is loaded from memory 2710, if flashlight 2300 is not held in horizontal position when turned on or if switch 168 is not continuously depressed for more than a predetermined period of time 2712, flashlight 2300 continues in normal mode 2714. In one embodiment, the predetermined period of time is one second. Other time periods can be used. At this stage, flashlight 2300 is working as a normal flashlight with a steady brightness and can be turned off when the switch 168 is depressed a second time.

On the other hand, if flashlight 2300 is held in a horizontal position when turned on while switch 168 is continuously depressed for more than a predetermined period of time 2712, flashlight 2300 can enter into a new mode of operation.

The new mode of operation can be designated as one of the following examples: a dim light with a variable brightness (DIM), a blinking light with a variable blinking frequency (STROBE), an SOS mode with variable brightness (SOS), a motion sensitive signal mode (SIGNAL), or a night light mode (NITE LITE). The new mode of operation is determined by the icon associated with the new mode. If a specific icon is facing up, or in the 12:00 o'clock direction, while switch 168 is continuously depressed for more than a predetermined period of time 2712 and flashlight 2300 is held in horizontal position when turned on, the mode associated with the specific icon is selected 2716.

For example, if the DIM icon 2370*a* is facing up as shown in FIG. 31B, then after step 2716, the DIM functional mode is selected. On the other hand, for example, if the SOS icon 2370*c* is facing up, then after step 2716, the SOS functional mode is selected. This interface simplifies the mode selection procedure for a user. Any mode can be directly selected by facing the desired mode associated icon to a predefined position so that guessing or remembering a sequence of operations is not required by a user.

When flashlight 2300 enters a new functional mode 2718, default intensity information may be loaded from a memory 2710 for controller 1008 to provide a control signal to control the brightness on lamp module 2128. The default intensity information can be the intensity of the last usage before flashlight 2300 is turned off. Alternatively, the default intensity information may be a predetermined setting, for example, the maximum intensity. Other intensities may be predetermined.

In the present embodiment, when the current mode is DIM mode, STROBE mode, SOS mode or SIGNAL mode, the intensity of the last usage before flashlight 2300 is turned off is used as the default intensity. On the other hand, if the current mode is NITE LITE mode, the maximum intensity is used as the default intensity.

At this moment, if switch 168 is released 2720, flashlight 2300 will continue in the current functional mode with default intensity setting 2722 until flashlight 2300 is turned off by a designated method. For example, if switch 168 is depressed and then released, flashlight 2300 may recognize this sequence as a switch off command and flashlight 2300 will be turned off.

If flashlight 2300 is rotated left or right 2724 about its principal axis of projection 2310 while switch 168 is still continuously depressed 2720, the amount of rotation can be calculated by controller 1008 and an adjustment is performed 2726. If the current mode of operation is DIM mode, for example, the brightness of flashlight 2300 may be varied based on the calculated amount of rotation 2726. On the other hand, if the current mode of operation is STROBE mode, then, the frequency of duty cycle may be varied based on the calculated amount of rotation 2726.

In a preferred embodiment, before the flashlight 2300 is rotated, the flashlight brightness is set to the intensity information stored in memory. When the flashlight 2300 is rotated left or right 10°, the flashlight brightness is set to the maximum if the current mode of operation is the DIM mode, the SOS mode, or the SIGNAL mode. While when the flashlight 2300 is rotated left or right 45° and beyond, the flashlight brightness is set to the minimum. In other words, when the flashlight 2300 is rotated left or right from 10° to 45°, the flashlight brightness can change linearly from maximum to minimum.

If the current mode of operation is the STROBE mode, when flashlight 2300 is rotated left or right 10°, the flashlight frequency is set to the maximum. While when the flashlight 2300 is rotated left or right 45° and beyond, the flashlight frequency is set to the minimum. In other words, when the flashlight 2300 is rotated left or right from 10° to 45°, the flashlight frequency can change linearly from maximum to minimum.

Since mode selection is based on icon position at startup, rotating the barrel along the principle axis of projection of flashlight 2300 is used only for mode adjustments. Therefore, the adjustments can be performed by either left rotation or right rotation. The adjustments to the modes are symmetrical and mirrored across a virtual vertical plane that runs longitudinally through the principal axis of projection 2310 of flashlight 2300, therefore, this feature helps the users with either left-handed or righted-hand preference.

In the present embodiment, the maximum brightness is performed by providing a pulse current with 100% duty cycle to the lamp module 2128 and the minimum brightness has a duty cycle of 5%.

If a suitable brightness (for DIM, SOS, or SIGNAL modes) or frequency (for STROBE mode) is found while flashlight 2300 is rotating left or right 2724, the switch 168 may be released 2728 and the brightness or frequency existing at that time may be stored in a memory and perform the selected mode function 2730. Flashlight 2300 may retain that level of brightness or frequency until a new setting is stored next time.

On the other hand, if switch 168 is released 2728 and the current mode is SIGNAL mode, the motion sensitive signal operation may be performed 2730 by detecting whether there is a left or right rotation along the principal axis of projection 2310 of flashlight 2300. If a rotation is detected, then flashlight 2300 can be turned on. If the flashlight 2300 is turned back to the previous position, then flashlight 2300 can be turned off. In other words, flashlight 2300 can be toggled between on and off by rotating it left or right and then rotating it back.

Flashlight 2300 may be turned off 2734 by a designated method. For example, if switch 168 is depressed and then released, flashlight 2300 may recognize this sequence as a switch off command 2732 and flashlight 2300 will be turned off 2734.

Those skilled in the art will appreciate that the flow diagram 702 illustrated in FIG. 14 is an example, and that other types of operations may also be employed.

The operation flow 2702 shown in FIG. 34 can be implemented by software stored in a memory of controller 1008. Thus, controller 1008 can be programmed to control the sequence of operation based on signals received from the outputs of 3-axis accelerometer circuit 1010. When controller 1008 receives information from outputs X-VOUT 1038 and Y-VOUT 1036 of the accelerometer circuit 1010, controller 1008 may change its sequence of execution based on such information.

Controller 1008 may also be programmed to control the flow of electrical power through lamp module 2128 based on signals received from the outputs of accelerometer circuit 1010. When controller 1008 receives information from X-VOUT 1038 and Y-VOUT 1036, controller 1008 may change some of its output signals based on the execution of software stored in the controller 1008.

Other types of movements of flashlight 2300 that may cause a change in the outputs of the accelerometer circuit 1010 may also be used as a command for flashlight 2300 to change features. Accordingly, the current invention is not limited to the movements described herein for interfacing with controller 1008.

Figure 35:
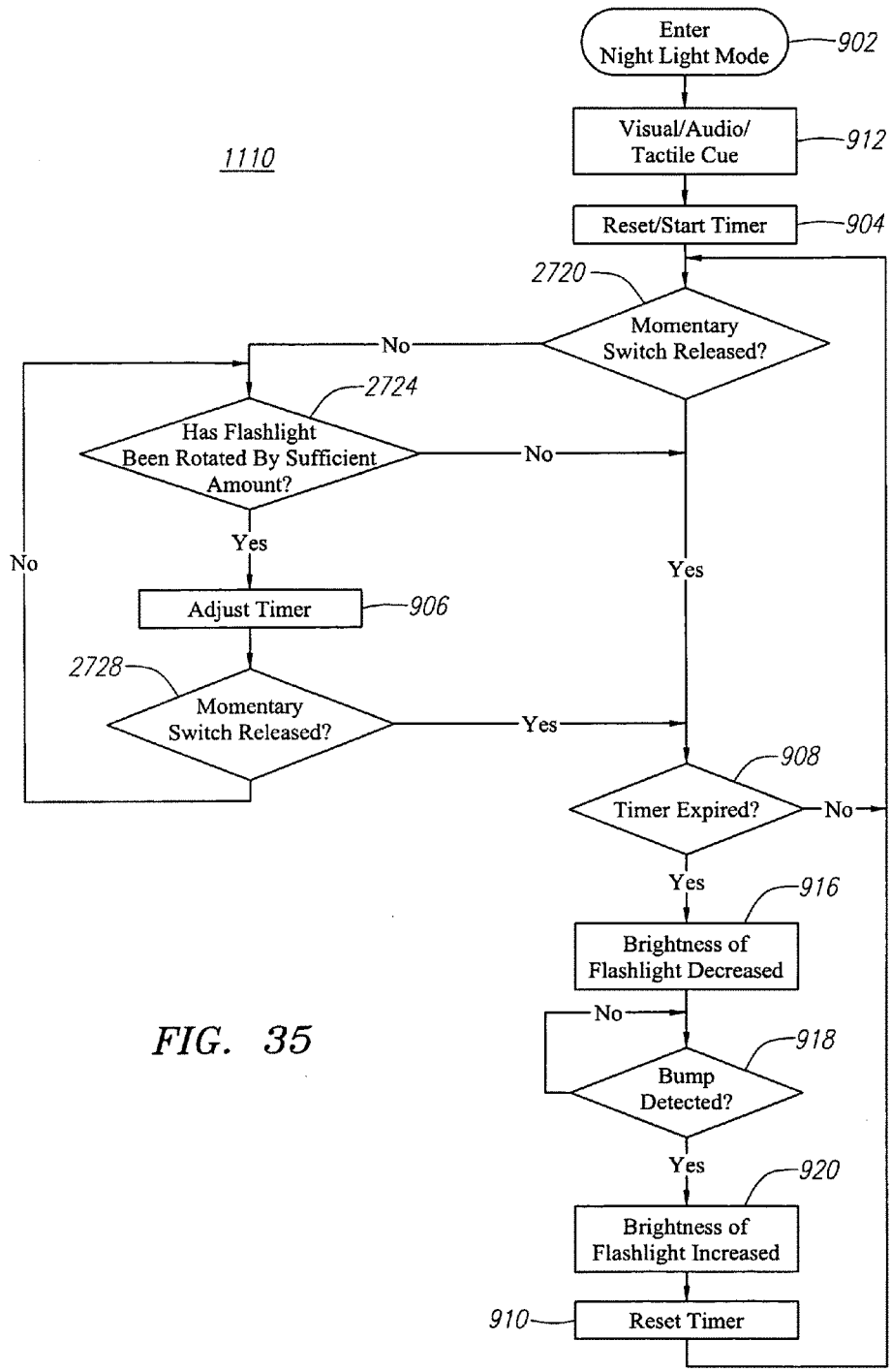

FIG. 35 is a flow diagram illustrating a method 1110 for operating flashlight 2300 in a night light mode of operation. The method 1110 shown in FIG. 35 for operating flashlight 2300 in a night light mode of operation is shown in more detail than that provided in FIG. 34. Step 902 thus corresponds to step 2718 in FIG. 34 when the night light mode is selected. When flashlight 2300 enters the night light mode in step 902, the controller 1008 is preferably configured so that the light source of flashlight 2300 initially provides light at a constant brightness.

After flashlight 2300 enters the night light mode in step 902, in step 1912 the controller 1008 may be programmed to output a command to load switch 1006, audio interface & speaker 518, and/or vibrator 520 to provide a visual, audio, and/or tactile cue that the night light mode has been selected and entered. This cue provided in step 1912 is beneficial because, in the absence of such a cue in the present embodiment, there would be no immediate operational change in the brightness of the light source before the timer is expired at step 1908. Thus, providing a visual, audio, or tactile cue in step 1912 will inform the user of the selection of the night light mode and make the use of the flashlight 2300 more user friendly.

The visual cue may be a simple flash of the light off and then back on. Alternatively, it could be a series of two or more flashes. To provide an audio cue in step 1912, either in addition to the visual cue or in the alternative, the controller 1008 may be programmed to output a certain sequence of beeps or provide beeps of different tones through the audio interface & speaker 518 (see FIG. 32), which is in communication with controller 1008. A tactile cue on the other hand may be provided through the vibrator 520 (see FIG. 32), which is in communication with controller 1008.

Once the visual audio or tactile cue is performed in step 1912, a timer may be reset and started in step 1904. The timer is used to determine the period of time before the flashlight begins to dim. Preferably each time a bump of a predefined magnitude is sensed by controller 1008 based on one or more inputs from accelerometer 1010, the timer is reset, so that the timer is only allowed to expire, and the brightness of the light source 101 dim, if the flashlight 2300 remains still for a predefined default period of time, such as 15 or 30 seconds, after the night light mode is entered in step 902. Thus, as long as the flashlight continues to be moved around with sufficient force to cause a requisite change in acceleration, the flashlight 2300 will not dim.

In certain embodiments, it may be desirable to allow a user to add additional time to the timer, thereby extending the amount of time required to pass in step 1908 without the controller 1008 sensing an acceleration of sufficient magnitude to dim the brightness of the light source 101 in step 1916. In the embodiment shown in FIG. 32, controller 1008 is programmed to permit the user to adjust the timer. In the illustrated embodiment, the user can adjust the timer if he or she does not release the momentary switch once the night light mode is entered in step 902. On the other hand, once the user releases the momentary switch, he or she can no longer adjust the timer.

In a preferred embodiment, the timer is set initially to expire in a period of 30 seconds in step 1904. If the momentary switch 168 is released any time after entering the night light mode without adjusting the timer, then controller 1008 will simply wait for the timer to expire after the default period of time lapses in step 1908 before dimming the brightness of the light source 101 in step 1916. However, as noted above, preferably the timer is reset each time controller 1008 senses that flashlight 2300 is moved with sufficient force. It goes to step 1908 to let timer expired.

On the other hand, if the controller determines in step 2720 that the momentary switch 168 has not been released, then the user can adjust the default period of time of the timer, thereby delaying the time period that must lapse without movement before the brightness of the light source 101 is dimmed in step 1916. For example, in the illustrated embodiment, if in step 2724 the controller 1008 determines that the flashlight 2300 has been rotated left or right about its principal axis of projection 310 while momentary switch 168 has been continuously depressed, the amount of rotation can be calculated by controller 1008 and the timer 1906 adjusted based on the amount of rotation. The timer may be incrementally increased, by for example 15 or 30 seconds, each time flashlight 2300 is rotated left or right and then rotated back to center. In other words, if additional wait time is desired, steps 2724, 1906 can be repeated as long as it is determined that the momentary switch remains depressed in step 2728.

Once the timer has been increased by the desired amount, the user may release the momentary switch. When the release of the momentary switch is detected in step 2728, the timer will begin to run until it is determined in step 1908 that it has expired. As before, preferably the timer is reset (now to the adjusted timer preset) each time a force of sufficient amount is detected so that the timer is permitted to expire only if the flashlight remains still (or relatively still) for the adjusted time period.

Although the timer is preferably only adjusted by a relatively small period of 15 to 30 seconds for each left or right rotation, the timer may be incrementally increased by any amount in step 1906, including for example by periods of 1 minute or 5 minutes.

As an alternative to adjusting the timer in step 1906 by an incremental amount for each time that that flashlight is rotated left or right, the timer adjustment performed in step 1906 can also be performed based on the amount of rotation of flashlight 2300. For example, the timer may be increased by 15 seconds if the flashlight is rotated by at least 15° and less than 30°, and increased by 30 seconds if the flashlight 2300 is rotated left or right by 30° or more. In other implementations other times or angles may be used. For example, the timer may be increased by an extra five minutes when flashlight 2300 is rotated left or right by at least 15° and less than 30° and the timer may be increased by an extra ten minutes when flashlight 2300 is rotated left or right for 30° or more.

In another implementation, a visual, audio, or tactile cue is provided when the timer is increased in step 1906. Preferably the cue corresponds to the amount of time added to the timer or the adjusted period of time of the timer, so that the user knows by how much the timer has been increased.

Once the timer expires in step 1908, the brightness of the light source 101 of flashlight 2300 may be decreased in step 1916. In the present embodiment, light source 101 of flashlight 2300 may be gradually dimmed until reaching its lowest brightness. In another embodiment, light source 101 of flashlight 2300 may be gradually dimmed until eventually it is completely off.

Once flashlight 2300 has been dimmed in step 1916, it may continuously provide the lowest (or other pre-set) brightness until flashlight 2300 detects a bump in step 1918, at which point the brightness of flashlight 2300 may be increased 1920 to the brightness level stored in memory. In the present embodiment, the brightness of light source 101 of flashlight 2300 is set to the brightness level that had previously been stored in memory by the user from the dim mode. In other embodiments, however, the brightness of light source 101 of flashlight 2300 may simply be adjusted to its highest brightness level. Once the brightness has been increased in step 1920, the timer is reset in step 1910 to the adjusted time period the timer had been adjusted to in step 1906, or the default time period. The routine then goes back to step 2720 and then to step 1908 where the controller 1008 monitors whether the reset timer has expired. Again, preferably the timer is reset each time a movement of a sufficient magnitude is detected so that the brightness of the light source 101 of flashlight 2300 is only dimmed if the flashlight 2300 remains still or is not moved sufficiently quickly.

As previously described in connection with FIGS. 32 and 33D, accelerometer circuit 1010 has outputs that may also be coupled to controller circuit 1008. The accelerometer circuit 1010 may be mounted on circuit board 2348 with its Z-axis extending along the longitudinal axis of flashlight 2300. When flashlight 2300 is in a horizontal position, if flashlight 2300 is rotated clockwise or counter-clockwise about its longitudinal axis 310, the magnitudes of the acceleration in the X and Y axes may change, and the gravity information on X and Y may be sent to controller 1008 through X-VOUT 1038 and Y-VOUT 1036, respectively. Controller 1008 may use information from X-VOUT 1038 and Y-VOUT 1036 to determine whether there is a rotation about the longitudinal axis 310 of flashlight 2300. When flashlight 2300 is in a horizontal position, if flashlight 2300 is tilted up about 45°, the magnitude of the acceleration in the Z axis will change, and the gravity information on Z may be sent to controller 1008 through Z-VOUT 1034. Controller 1008 may use information from Z-VOUT 1034 to determine whether there is a tilting up of flashlight 2300 and where extra wait time is required. Flashlight 2300 may detect a bump or rolling (or the information change on X-VOUT 1038 and Y-VOUT 1036) and use this information to determine whether flashlight 2300 should remain as a night light.

The brightness on lamp module 2128 may be determined by changing the duty cycle on lamp module 2128 to a frequency above which a human eye may detect. A duty cycle on lamp module 2128 may be produced by a sequence of high and low states on the LOAD_ENABLE 1044 signal which is driven by controller 1008. This sequence of high and low states on signal LOAD_ENABLE 1044, together with other components on the load electrical path, may cause NMOS 1054 to be conductive and non-conductive alternately. When the percentage of conduction time in each cycle is at 100%, lamp module 2128 will be at its brightest. On the other hand, as the percentage of conduction time in each cycle approaches 0%, lamp module 2128 will be at its lowest brightness.

The operation flow 900 shown in FIG. 35 may be implemented by software stored in a memory of controller 1008. Controller 1008 may be programmed to control the sequence of operation based on signals received from outputs of accelerometer circuit 1010. When controller 1008 receives information from X-VOUT 1038 and Y-VOUT 1036 of the accelerometer circuit 1010, controller 1008 may change its sequence of execution based on the information.

Controller 1008 may also be programmed to control the flow of electrical power through lamp module 2128 based on signals received from outputs of accelerometer circuit 1010. When controller 1008 receives information from X-VOUT 1038 and Y-VOUT 1036, controller 1008 may change some of its output signals based on the execution of software stored in controller 1008.

Figure 36A:
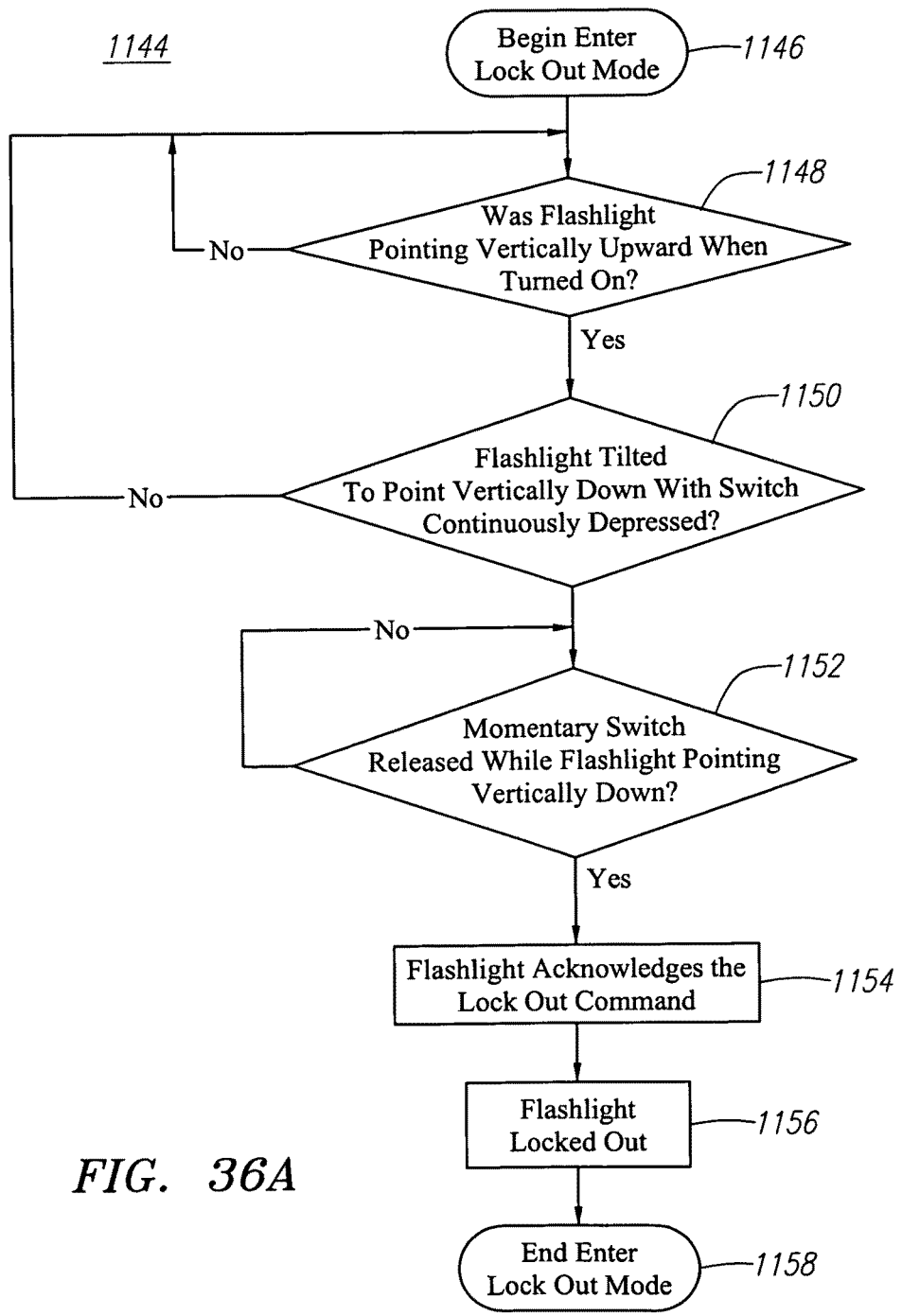
Figure 36B:
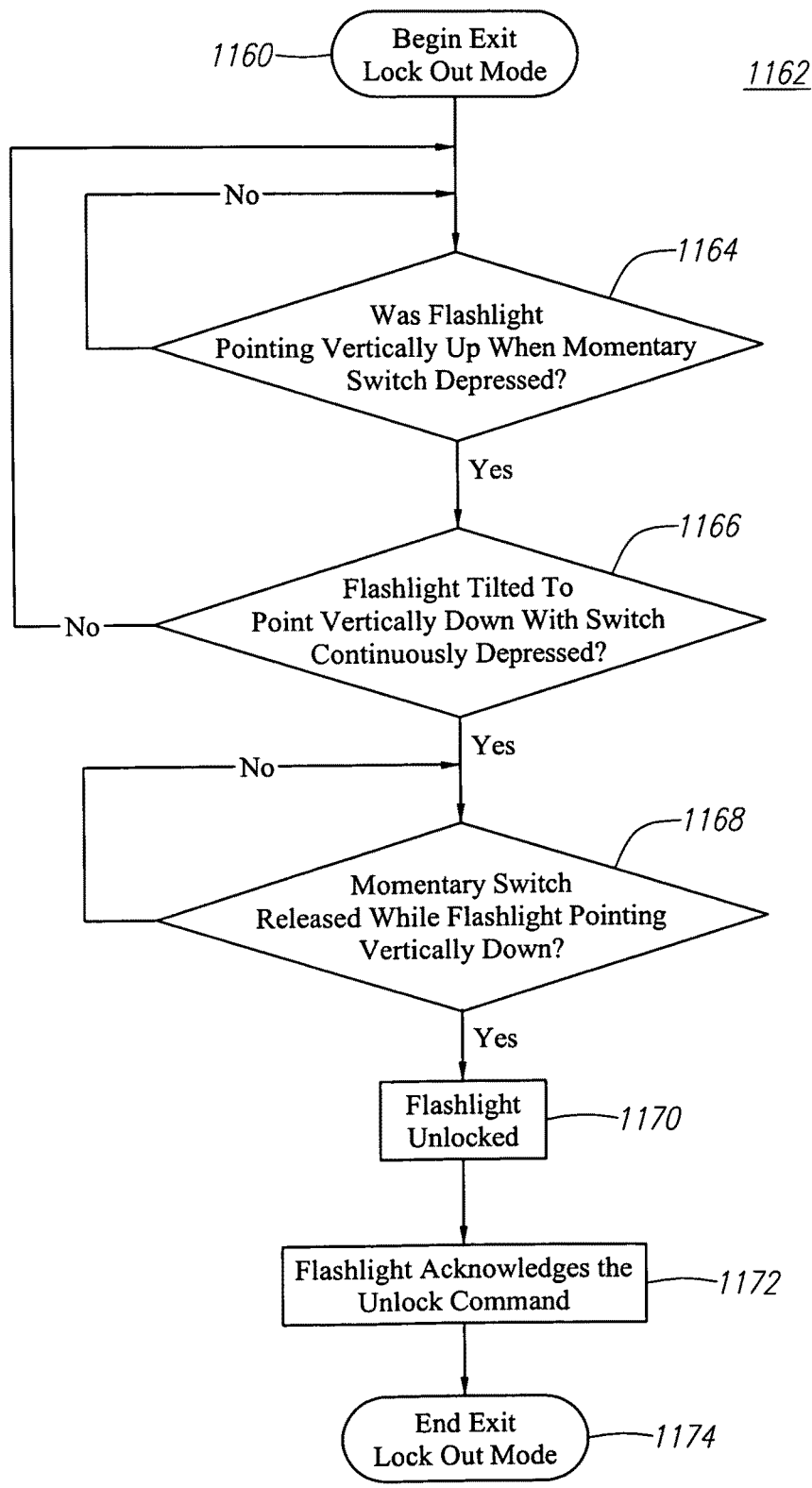

FIGS. 36A and 36B illustrate flow diagrams 1145, 1162 of a lock out feature of flashlight 2300. After flashlight 2300 is turned off 1146, the switch 168 might be accidentally pushed under certain conditions, such as movements of the flashlight 2300 stored in a purse, a glove box, or a tool box. The accidental push on switch 168 might turn on flashlight 2300 and power would lost.

The lock out feature 1145, 1162 would prevent accidental turn-on of flashlight 2300 by performing a sequence of operations for flashlight 2300 to enter into a lock out mode. Once flashlight 2300 is in the lock out mode, all subsequent presses on switch 168 would be ignored until another sequence of operations are performed to unlock flashlight 2300.

The lock out feature 1145 starts at step 1146. If flashlight 2300 is net-turned on when the principal axis of projection 310 is pointed up in a substantially vertical direction 1148, followed by pointed down in a substantially vertical direction while switch 168 is continuously depressed 1150, flashlight 2300 interprets the sequence as a command to lock out. Once the switch 168 is released 1152, in the present embodiment, flashlight 2300 acknowledges the lock out command 1154 and enters into the lock out mode 1156. The operation of entering lock out mode 1145 is then complete 1158. While in another embodiment, once the switch 168 is released 1152, flashlight 2300 may directly enter into the lock out mode 1156 without acknowledging the lock out command 1154.

In the present embodiment, flashlight 2300 acknowledges the lock out command 1154 by making a blink. Alternatively, flashlight 2300 may acknowledge the lock out command 1154 by providing audible or tactile responses in addition to the visual response or in the alternative.

Once flashlight 2300 is locked out 1156, the only way to exit the lock out mode is through an operation of exiting lock out mode 1162. The operation 1162 starts at step 1160. If the principal axis of projection 310 is pointed up in a substantially vertical direction followed by pointed down in a substantially vertical direction 1164 while switch 168 is continuously depressed 1166, flashlight 2300 interprets the sequence as a command to exit the lock out mode. Once the switch 168 is released 1168, flashlight 2300 is released (or unlocked) from lock out 1170. In the present embodiment, flashlight 2300 acknowledges the unlock status 1172 and that completes the exiting lock out mode operation 1162 at step 1174. In another embodiment, once flashlight 2300 is released (or unlocked) from lock out 1170, the operation of exiting lock out mode 1162 is completed without performing the step of acknowledging the unlock status 1172. In one embodiment, once the operation of exiting lock out mode 1162 is completed 1174, flashlight 2300 is subsequently turned on. Once flashlight 2300 is locked out 1156, before flashlight 2300 receives the unlock command, flashlight 2300 cannot be switched on by a press and release sequence on switch 168.

In the present embodiment, flashlight 2300 acknowledges the unlock command 1172 by making a blink. Alternatively, flashlight 2300 may acknowledge the lock out command 1172 by providing audible or tactile responses in addition to the visual response or in the alternative.

Alternatively, other types of movements of flashlight 2300 that may cause a change in outputs X-VOUT 1038 and Y-VOUT 1036 or Z-VOUT 1034 of accelerometer circuit 1010 may also be used as a command for flashlight 2300 to enter or exit the lock out mode.

Figure 37:
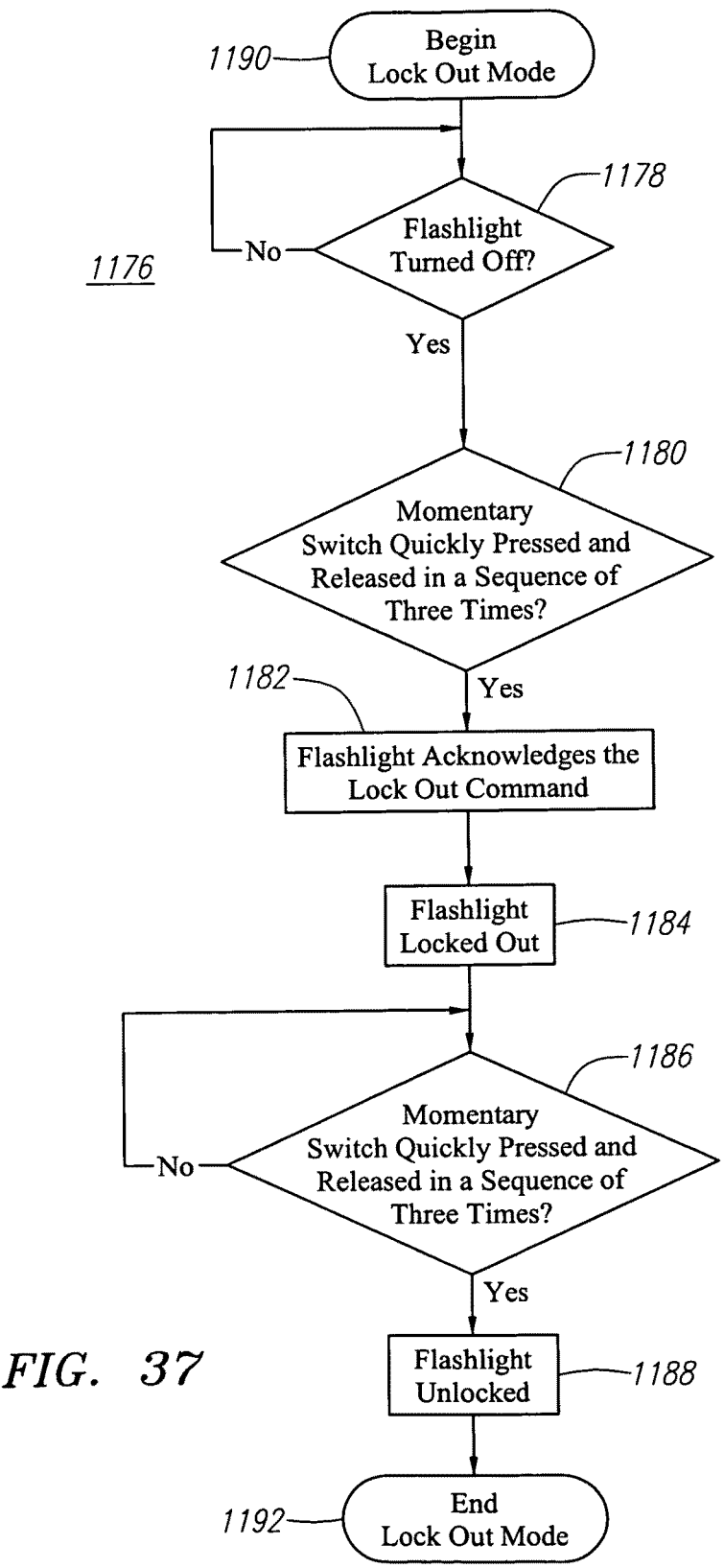

FIG. 37 is a flow diagram illustrating another lock out feature 1176 of flashlight 2300. The operation starts at step 1190. If flashlight 2300 is off 1178, before flashlight 2300 receives the lock out command, flashlight 2300 can be switched on by a switch on command such as a press and release sequence on switch 168, the light source of flashlight 2300 may start producing light and the flashlight 2300 may enter into a default user mode of operation.

If flashlight 2300 is off 1178, and if the switch 168 is pressed and released in a sequence of three times 1180, flashlight 2300 interprets the sequence as a command to lock out. In the present embodiment, flashlight 2300 acknowledges the lock out command 1182 and enters into the lock out mode 1184. Alternatively, once flashlight 2300 receives a lock out command, flashlight 2300 may directly enter into the lock out mode 1184 without the step of acknowledgement 1182. Once flashlight 2300 is locked out 1184, before flashlight 2300 receives the unlock command, flashlight 2300 cannot be switched on by a press and release sequence on switch 168.

When flashlight 2300 is locked out 1184, if the switch 168 is pressed and released in a sequence of three times 1186, flashlight 2300 interprets the sequence as a command to unlock, or release, and flashlight 2300 is subsequently unlocked 1188 and exit lock out mode 1192. In one embodiment, once the operation of exiting lock out mode 1192 is completed, flashlight 2300 is subsequently turned on.

In the present embodiment, flashlight 2300 acknowledges the lock out command 1182 by making a blink. Alternatively, flashlight 2300 may acknowledge the lock out command 1182 by providing audible or tactile responses in addition to the visual response or in the alternative.

As previously described in connection with FIG. 33D, accelerometer circuit 1010 may include outputs X-VOUT 1038, Y-VOUT 1036 and Z-VOUT 1034 that may be coupled to controller circuit 1008. Accelerometer circuit 1010 may be mounted on circuit board 2348 with its Z-axis extending along the longitudinal axis of the flashlight 2300. When flashlight 2300 is pointed up vertically, the magnitude of the acceleration in the Z axis would be −1G. When flashlight 2300 is pointed down vertically, the magnitude of the acceleration in the Z axis would be +1G. The gravity information on Z may be sent to controller 1008 through Z-VOUT 1034.

Controller 1008 may use the information on Z-VOUT 1034 to determine whether flashlight 2300 is pointing up or down to determine whether lock out is desired.

The operation flow diagrams 1145, 1162 shown in FIGS. 36A and 36B may be implemented by software stored in the memory of controller 1008. Controller 1008 may be programmed to control the sequence of operation based on signals received from the outputs of accelerometer circuit 1010. When controller 1008 receives information from Z-VOUT 1034 of accelerometer circuit 1010, controller 1008 may change a user's preference (or parameter setting) based on this information.

A multi-mode portable electronic lighting device is contemplated. The device comprises a controller and a user interface. The controller is configured to implement a plurality of modes of operation. The user interface is configured to input commands to the controller. The user interface can have a position sensitive interface in which commands are input through at least one predefined position of the portable electronic lighting device.

A portable lighting device is contemplated. The portable lighting device is configured to operate using a portable source of power. The portable lighting device comprises a light source; a main power circuit for electrically connecting the light source to the portable source of power, the main power circuit including an electronic power switch disposed electrically in series with the light source; an inertial sensor for detecting a plurality of predetermined positions and movements of the portable lighting device; and a controller electrically coupled to the portable source of power. The controller including an output for providing a control signal for controlling the flow of power through the electronic power switch and light source in the main power circuit, wherein the controller is configured to control the flow of power through the electronic power switch based on the plurality of predetermined positions or the movements of the portable lighting device.

A method of controlling a multi-mode portable electronic lighting device is contemplated. The method comprises the steps of: determining if the portable lighting device has been positioned in one of a plurality of predetermined positions; and entering into a new mode of operation when one of the plurality of predetermined positions is detected.

While various embodiments of an improved flashlight and its respective components have been presented in the foregoing disclosure, numerous modifications, alterations, alternate embodiments, and alternate materials may be contemplated by those skilled in the art and may be utilized in accomplishing the various aspects of the present invention. For example, the power control circuit and short protection circuit described herein may be employed together in a flashlight or may be separately employed. Further, the short protection circuit may be used in rechargeable electronic devices other than flashlights. Thus, it is to be clearly understood that this description is made only by way of example and not as a limitation on the scope of the invention as claimed below.

What is claimed is:

1. A multi-mode portable electronic lighting device, comprising:
   a housing including a source of power;
   a light source electrically connected to the source of power which emanates light away from the housing toward a plane along a principal axis of projection that is perpendicular to the plane at a point of intersection with the plane when an on/off switch is not in an off state;
   a controller configured to implement a plurality of modes of operation of the light source along the principal axis of projection when the on/off switch is not in the off state and a momentary switch is actuated; and
   a user interface for inputting commands to the controller,
   wherein the user interface comprises a motion sensitive interface in which commands are input through a first predefined movement of the portable electronic lighting device;
   wherein the controller will not change operation of the light source between the plurality of modes of operation when the on/off switch is not in the off state and the momentary switch is not actuated;
   wherein the controller is configured to change a mode of operation of the light source when the controller determines that the multi-mode portable electronic lighting device has been moved in the first predefined movement, so that the light source operates in a changed mode of operation; and
   wherein the controller is further configured to adjust light output of a given mode of operation of the light source when the controller determines that the multi-mode portable electronic lighting device has been moved in a second predefined movement when the on/off switch is not in the off state and the momentary switch is not actuated.

2. The multi-mode portable electronic lighting device of claim 1, wherein the user interface includes an inertial sensor electrically coupled to the controller.

3. The multi-mode portable electronic lighting device of claim 2, wherein the inertial sensor is an accelerometer.

4. The multi-mode portable electronic lighting device of claim 3, wherein the accelerometer is a 3-axis accelerometer.

5. The multi-mode portable electronic lighting device of claim 1, wherein the first predefined movement is rotation of the multi-mode portable electronic lighting device in a single direction about the principal axis of projection.

6. The multi-mode portable electronic lighting device of claim 5 wherein the second predefined movement is rotation of the multi-mode portable electronic lighting device about the principal axis of projection in a direction opposite to the first predefined movement.

* * * * *